United States Patent [19]
Ogawa

[11] Patent Number: 6,072,281
[45] Date of Patent: *Jun. 6, 2000

[54] FILL-IN LIGHT EMITTING APPARATUS AND STILL VIDEO CAMERA

[75] Inventor: Kimiaki Ogawa, Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/915,936

[22] Filed: Aug. 21, 1997

Related U.S. Application Data

[60] Continuation of application No. 08/550,983, Oct. 31, 1995, abandoned, which is a division of application No. 08/113,322, Aug. 30, 1993, Pat. No. 5,485,201.

[30] Foreign Application Priority Data

| Aug. 28, 1992 | [JP] | Japan | 4-253955 |
|---|---|---|---|
| Nov. 26, 1992 | [JP] | Japan | 4-339718 |
| Dec. 2, 1992 | [JP] | Japan | 4-349789 |
| Jan. 19, 1993 | [JP] | Japan | 5-23683 |
| Jan. 19, 1993 | [JP] | Japan | 5-23684 |
| Feb. 10, 1993 | [JP] | Japan | 5-45854 |
| Feb. 18, 1993 | [JP] | Japan | 5-52958 |
| Feb. 19, 1993 | [JP] | Japan | 5-55013 |
| Feb. 22, 1993 | [JP] | Japan | 5-56505 |
| Feb. 24, 1993 | [JP] | Japan | 5-59556 |

[51] Int. Cl.$^7$ ................................ H04N 9/73
[52] U.S. Cl. ................ 315/241 P; 315/241.5; 315/149; 315/151; 396/716; 396/717; 396/718; 348/223; 348/224; 348/227
[58] Field of Search ............ 315/241 P, 241 S, 315/149, 151; 348/222, 223, 224, 236, 227; 396/716, 717, 718

[56] References Cited

U.S. PATENT DOCUMENTS

| 3,680,457 | 8/1972 | Uno et al. | 95/42 |
|---|---|---|---|
| 3,681,649 | 8/1972 | Uno et al. | 315/151 |
| 3,682,056 | 8/1972 | Tokutomi | 315/241 P |

(List continued on next page.)

FOREIGN PATENT DOCUMENTS

| 0372494 | 6/1990 | European Pat. Off. . |
|---|---|---|
| 0375963 | 7/1990 | European Pat. Off. . |
| 375963 | 7/1990 | European Pat. Off. . |
| 3307369 | 9/1983 | Germany . |
| 3732062 | 4/1988 | Germany . |
| 6469185 | 3/1989 | Japan . |
| 2216422 | 8/1990 | Japan . |
| 2120403 | 11/1983 | United Kingdom . |
| 2225106 | 5/1990 | United Kingdom . |
| 2226925 | 7/1990 | United Kingdom . |
| 2236918 | 4/1991 | United Kingdom . |

OTHER PUBLICATIONS

U.K. Examiner's Report with respect to U.K. counterpart application No. GB 9318062.8., dated Jan. 10, 1997.

Copy of United Kingdom Examiner Report with counterpart application No. GB 9318062.8, dated May 20, 1996.

Copy of United Kingdom Examiner Report with counterpart application No. GB 9318062.8, dated Oct. 9, 1996.

*Primary Examiner*—Arnold Kinkead
*Attorney, Agent, or Firm*—Greenblum & Bernstein, P.L.C.

[57] ABSTRACT

A fill-in light emitting apparatus having an illuminating mechanism for emitting illumination light whose color temperature can be varied; a color temperature metering mechanism for measuring the color temperature of the external light; and a color temperature controlling mechanism for varying the color temperature of the illumination light in accordance with color temperature data measured by the color temperature metering mechanism.

13 Claims, 80 Drawing Sheets

U.S. PATENT DOCUMENTS

| | | | |
|---|---|---|---|
| 3,709,123 | 1/1973 | Tokutomi | 315/241 P |
| 3,836,924 | 9/1974 | Kawasaki | 315/151 |
| 4,003,065 | 1/1977 | Chikahige | 354/132 |
| 4,485,336 | 11/1984 | Yoshiyama et al. | 315/241 P |
| 4,589,015 | 5/1986 | Nakata et al. | 348/259 |
| 4,853,600 | 8/1989 | Zeltner et al. | 315/241 P |
| 4,918,519 | 4/1990 | Suzuki | 348/224 |
| 5,001,552 | 3/1991 | Okino | 348/224 |
| 5,065,232 | 11/1991 | Kondo | 348/224 |
| 5,132,825 | 7/1992 | Miyadera | 358/29 |
| 5,191,406 | 3/1993 | Brandestini | 348/111 |
| 5,379,069 | 1/1995 | Tani | 348/333 |
| 5,418,564 | 5/1995 | Aoki et al. | 348/264 |
| 5,712,535 | 1/1998 | Ogawa | 315/241 P |
| 5,838,369 | 11/1998 | Aoki et al. | 348/223 |

FIG. 6

- Release button (switch) — P1, P2
- Photometric/exposure calculation — P3
- Color measurement — P4
- Color temperature varying filter setting — P5
- Color signal amplifier gain setting — P6
- Strobe quenching level setting — P7
- Diaphragm — P8
- Electronic shutter — P9
- Strobe emission trigger — P10
- Commence the integration of the light 206 reflected from the object 96 — P11
- Strobe emission intensity — P12
- Strobe quenching signal — P13
- Read-out and record — P14, P15, P16, P17

| | 10000K | Blue sky |
| Slightly blue color | 9000K | |
| | 8000K | |
| | 7000K | Cloudy |
| | 6000K | Strobe light |
| | 5000K | Sunlight |
| Slightly white color | 4000K | |
| | 3000K | Halogen lamp bulb |
| Slightly red color | 2000K | Incandescent light bulb |
| | 1500K | Candle light |

FIG. 21 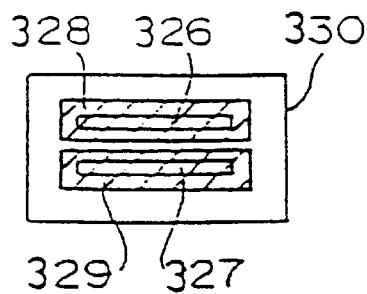 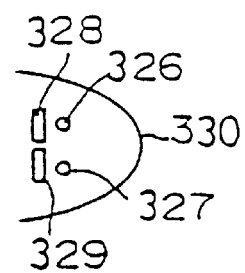
FIG. 22 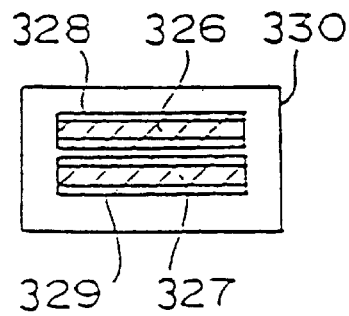 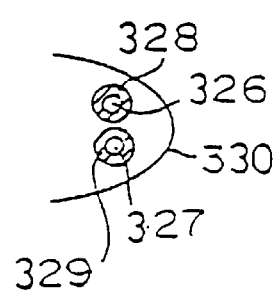
FIG. 23 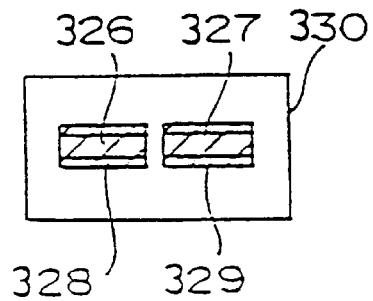 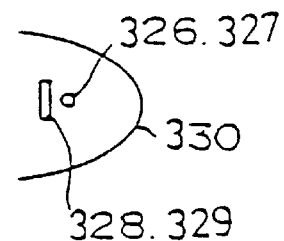
FIG. 24 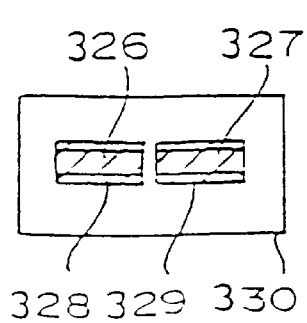 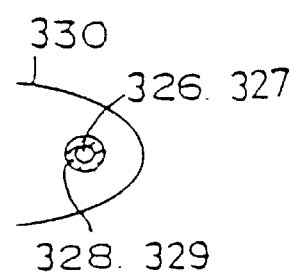

A case when the reflected light from subject is low

A case when the reflected light from subject is high

A case when the reflected light from subject is high

The case wherein the charging voltage at the time of release is high

The case wherein the charging voltage at the time of release is low

The case wherein the charging voltage at the time of release is high

The case wherein the charging voltage
at the time of release is low

FILL-IN LIGHT EMITTING APPARATUS AND STILL VIDEO CAMERA

This application is a continuation, of application Ser. No. 08/550,983, filed Oct. 31, 1995 now abandoned, which is a division of Ser. No. 08/113,322, filed Aug. 30, 1993, that issued as U.S Pat. No. 5,485,201.

BACKGROUND OF THE INVENTION

1. Field of the Invention

The present invention relates to a fill-in light emitting apparatus which can match the color temperature of strobe light of, for example, a still video camera, to the color temperature of ambient light, upon strobe emission.

2. Description of Related Art

In conventional still video cameras, white balance adjustment is effected to reproduce a white image of a white object as it is, regardless of the color temperature of illuminating light. For instance, in a known still video camera having a strobe device, the white balance adjustment upon strobe emission is normally controlled in accordance with the color temperature of the strobe light. However, the color temperature of the strobe light emitted from a xenon discharge tube incorporated in the strobe device is high. Consequently, during the white balance adjustment upon the emission of strobe light, blue light is suppressed in a whole image to prevent a reproduced image of a white object from being shifted to blue under the influence of the strobe light.

Nevertheless, in the control mentioned above, if there is illuminating light whose color temperature is different from that of the strobe light, the color distribution of the photographed image tends to be irregular. As an example, in FIG. 13A in which an incandescent light bulb 241 illuminates from above a human object M standing in front of a wall W, the color temperature of the illuminating light emitted from the incandescent light bulb 241 is lower than that of the illuminating light emitted from a strobe device 242, and accordingly, the color of the human object M is correctly reproduced in the taken image, but the color of the wall W which receives less strobe illuminating light than the illuminating light from the incandescent light bulb 241 is shifted to red, as shown in FIG. 13B.

To prevent the reproduction of such unnatural colors, it is known to carry out the white balance adjustment upon the emission of strobe light, in accordance with the color temperature automatically selected from among those of the strobe light and the external light, and a color temperature intermediate between those of the strobe light and the external light, as disclosed from example in Japanese Unexamined Patent Publication No. 64-69185.

However, in the known apparatus as mentioned above, it is difficult to faithfully reproduce colors over a whole image plane, since white balance adjustment is not completely effected for both the light reflected from a subject portion which fully receives the fill-in light (strobe light) and a subject portion which does not, respectively.

SUMMARY OF THE INVENTION

The primary object of the present invention is to provide a fill-in light (auxiliary light) emitting apparatus in which object colors can be faithfully reproduced in an image taken using the fill-in light.

A fill-in light emitting apparatus according to the present invention essentially comprises an auxiliary illuminating means for emitting fill-in light, and a color temperature varying means for varying color temperature characteristics of the auxiliary illuminating means.

To achieve the object mentioned above, according to an aspect of the present invention, there is provided an illuminating means for emitting illumination light; and, a color temperature controlling means for varying the color temperature of the illumination light emitted by the illuminating means.

In terms of the above problems, it is therefore an object of the present invention to provide a strobe light emission control apparatus which can avoid the above problem and produce good colors at all times in instances using strobe lights.

A strobe according to the present invention is characterized by having strobe light emitters which emit different color temperatures of strobe light, a color temperature metering means for measuring a color temperature of external light; and, a color temperature controlling means for controlling the quantity of the strobe light of each of the strobe emitters in accordance with color temperature data measured by the color temperature metering means.

In terms of the above problems, it is therefore an object of the present invention to provide a still video camera to further optimize white balance of pictures photographed using a plurality of light emission tubes of differing light emission color temperatures, and having a strobe light emission control apparatus in which the color temperature of light projected onto a photographing object from the strobe light emission apparatus is matched to the color temperature of illumination in the photographing object by time-sharing of the light emission time of the respective light emission tubes to obtain an optimal exposure. At the same time the reduced number of parts reduce the manufacturing cost and size of the still video camera.

A still video camera according to the present invention is characterized by having a plurality of light emission means of differing light emission color temperatures, a plurality of switching means for controlling the ON and OFF of each light emission means, an electric charge accumulating means for accumulating electric charge for the flash of said light emission means, a light emission trigger means for applying a light emission trigger signal to said each light emission means by said switching means being turned ON, a color temperature means for measuring color temperature of the peripheral light of the photographing object, and a strobe light emission apparatus for adapting the entire light emission color temperatures of said plurality of light emission means to the color temperature measured by said color temperature measuring means.

A further object of the present invention is to provide, in a strobe apparatus using a plurality of light emitting tubes of differing emission color temperatures, a strobe apparatus that prevents the rapid discharge of the main condenser by preventing a large increase in discharge current from the main condenser stemming from the emissions of a plurality of light emitting tubes, and prevents a condition wherein the emission of light from one light emitting tube consumes a large part of the electric charge and makes impossible the emission of the other light emitting tube.

The strobe apparatus relating to the present invention is characterized in that it comprises an illuminating means for emitting illumination light whose color temperature can be varied, a single electric charge accumulating means for accumulating an electric charge used in the flash of said light emitting means, a color measuring means for measuring the color temperature of peripheral light, and a light emission controlling means for carrying out the emission of light by the above stated illuminating means in order of the lowest emission quantity first according to a comparison of the quantity of light emission of parts of the above stated illuminating emitting means as determined based on information about the measured color temperature from said color measuring means.

A still further object of the present invention is to provide a strobe apparatus that optimizes the white balance of the photograph image by the use of a plurality of emission tubes of differing color temperatures and in which the white balance is maintained by insuring that all stored electric charge is not used up by the first xenon tube to emit light.

The strobe apparatus according to the present invention is characterized in that it comprises an illuminating means for emitting illumination light whose color temperature can be varied; at least one electric charge accumulation means for accumulating the electric charge for light emission by the illuminating means; a color measuring means for measuring the color temperature of the peripheral light; and, a light emission control means for determining the light emission quantity ratio of part of said light illuminating means from the measured color temperature to make the synthetic value of the emission color temperature of the illuminating means match the color temperature of the peripheral light along with controlling the commencement and suspension of the light emission of part of said light illuminating means in order to prevent the deviation of the synthetic value of the emission color temperature from the control target color temperature when part of the light emission quantity of said illuminating means increases.

Another object of the present invention is to provide a strobe apparatus that uses a plurality of light emission tubes of differing color temperatures in which by detecting the output voltage of the main condenser to determine the light emission ratios of each xenon tube for that output voltage, the white balance of the photograph image is further optimized.

The strobe apparatus according to the present invention is characterized by comprising; an illuminating means for emitting illumination light whose color temperature can be varied; at least one electric charge accumulation means for accumulating the electric charge for light emission by the illuminating means; voltage detection means for detecting the terminal voltage values of the electric charge accumulation means; color measuring means for measuring the color temperature of a peripheral light; and, light emission control means for controlling the emission quantity of parts of said illuminating means based on the color temperature and the terminal voltage values in order to make the composite light emission color temperature value of said illuminating means match the color temperature of the peripheral light.

Another further object of the invention is to provide a strobe apparatus capable of not only providing positive light emission by each light emission tube of differing light emission color temperature but also obtaining more natural photographed images by adapting a synthetic color temperature of each flash to the color temperature of the peripheral light through the adjustment of the quantity of light emission by each light emission tube.

A strobe apparatus according to the invention is characterized in that it comprises a plurality of light emission means, a plurality of electric charge accumulating means for accumulating electric charge for said individual light emission means, a voltage detecting means for detecting terminal voltage values of said electric charge accumulating means, a charging means for outputting electric charge signals according to said terminal voltage values measured by said voltage detecting means; and a plurality of switching means for opening and closing an electric connection for said charging means and each electric charge accumulating means. A still further object of the invention is to provide a strobe apparatus in which color temperature conversion filters corresponding to the desired range of the synthetic color temperatures can be specified according to the original color temperature of the light emission tube to be used and in which the synthetic light emission color temperatures can be produced freely and accurately.

A strobe apparatus according to the present invention comprises: light emission means having a color temperature Kc [degrees Kelvin]; a color temperature conversion filter, to be installed on said light emission means, having the color temperature conversion ability Ta given by the algebraic expression 5 below; light emission means having a color temperature Kc' [degrees Kelvin]; a color temperature conversion filter, to be installed on said light emission means, having the color temperature conversion ability Tb given by the algebraic expression 6 below, and is characterized in that the synthetic light emission color temperature of each of said light emission means can be controlled between the color temperatures Ka' and Kb' (where Ka' <Kb').

$$Ta \geq 10^6/Ka' - 10^6/Kc \text{ (mired)} \quad\quad 5$$

$$Tb \leq 10^6/Kb' - 10^6/Kc' \text{ (mired)} \quad\quad 6$$

ka':lowest limit color temperature
kb':highest limit color temperature

A further object of the invention is to provide a strobe apparatus capable of adapting a synthetic light emission color temperature of the entire strobe apparatus, to the color temperature of the light incoming from the periphery of a photographing object by adjusting the quantities of emission of a plurality of light emission tubes different in light emission color temperature, making the color repeatability of a photographed image more natural in appearance.

A strobe apparatus according to the invention is characterized in that it comprises a plurality of light emission means which are different in light emission color temperature; an electric charge accumulating means for accumulating electric charge for light emission of said light emission means; charging means for said electric charge accumulating means; light emission control switching means for controlling the commencement and suspension of light emission by each light emission means; light emission trigger means for generating light emission trigger signals; and selective switching means for selecting each light emission means for applying said light emission trigger signals.

Another object of the present invention is to provide a strobe apparatus that can at all times realize optimal imaging even in the presence of peripheral light of the respective spectral characteristics.

The strobe apparatus relating to the present invention is characterized in that it is provided with color temperature measuring means for measuring the color temperature of peripheral light, and strobe emission control means for controlling the timing of suspension of strobe light emission, based on information concerning the color temperature measured according to the color measuring means.

The present disclosure relates to subject matter contained in Japanese patent application Nos. 04-253955 (filed on Aug. 28, 1992), 04-339718 (filed on Nov. 26, 1992), 04-349789 (filed on Dec. 2, 1992), 05-23683, 05-23684, (both filed on Jan. 19, 1993), 05-45854 (filed on Feb. 10, 1993), 05-52958 (filed on Feb. 18, 1993), 05-55013 (filed on Feb. 19, 1993), 05-56505 (filed on Feb. 22, 1993), and 05-59556 (filed on Feb. 24, 1993) which are expressly incorporated herein by reference in their entirety.

BRIEF DESCRIPTION OF THE DRAWINGS

The invention will be described below in detail with reference to the accompanying drawings, in which;

FIG. 6 is a timing chart of photographing operations of a still video camera shown in FIG. 1;

FIGS. 21 through 27 are schematic views of seven examples of a light emitter of a strobe device;

DESCRIPTION OF THE PREFERRED EMBODIMENTS

Figure 1:
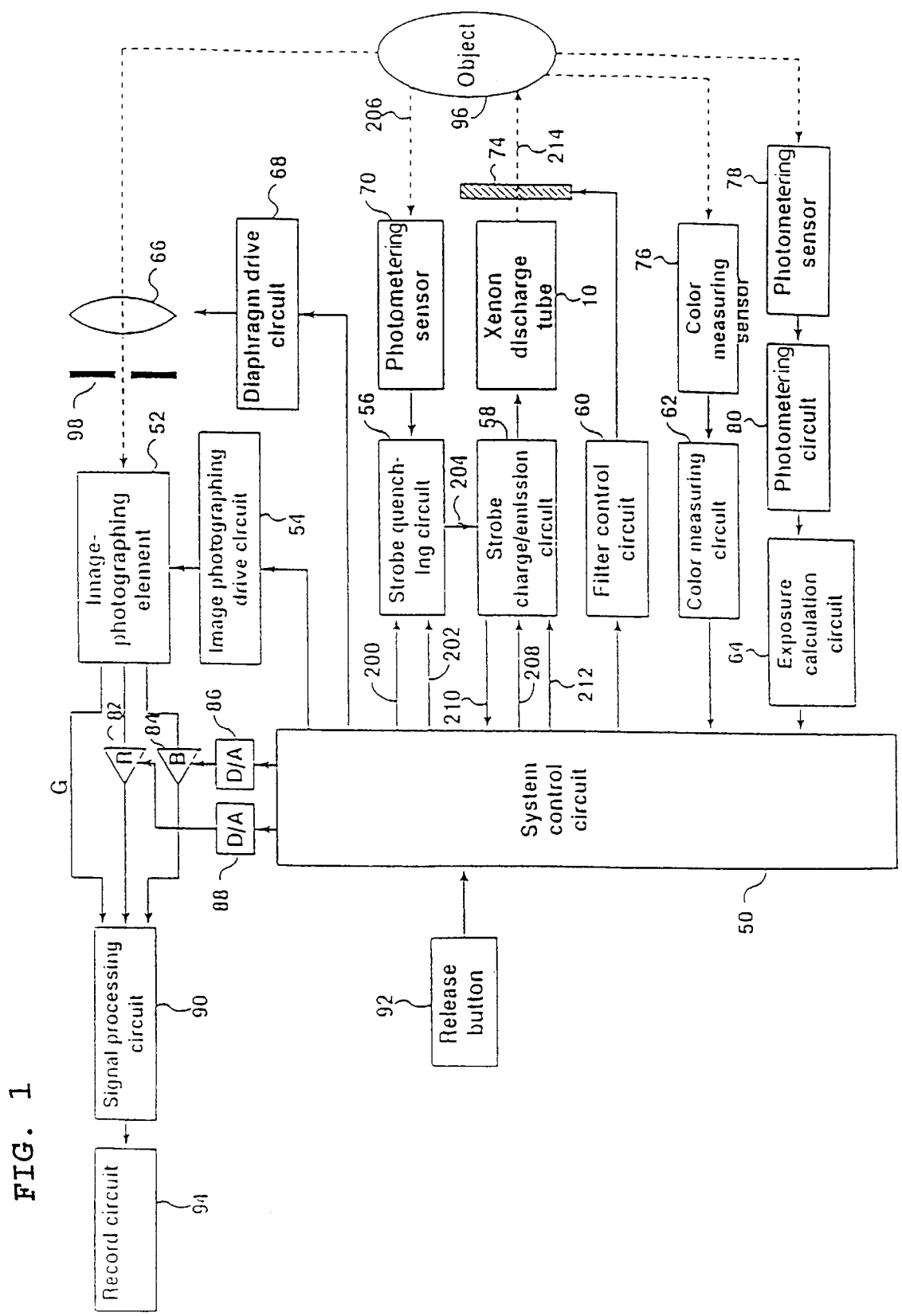
FIG. 1 is a first block circuit diagram of a still video camera having a single light emitting tube, to which the present invention is applied.

As can be seen in FIG. 1 which shows a block diagram of a still video camera to which the present invention is applied, a system controller (control circuit) 50 is electrically connected to an image photographing drive circuit 54, a strobe control circuit (quenching circuit) 56, a strobe charge/emission circuit 58, a filter control circuit 60, a color measuring circuit 62, an exposure calculation circuit 64, a diaphragm drive circuit 68, D/A converters 86 and 88, and a release button 92 to generally control these components.

An image photographing element 52 having an electronic shutter function is connected to the image photographing drive circuit 54 to convert light, (color signals) incident thereon through an image photographing lens 66 and a diaphragm 98, to electrical signals. The image photographing element 52 is connected to a signal processing circuit 90 and amplifiers 82 and 84, so that the color signals (light) that have been converted to the electrical signals are sent to the amplifiers 82 and 84, and the signal processing circuit 90.

A recording circuit 94 is connected to the signal processing circuit 90, so that the video signals thus processed are sent to the recording circuit 94. A diaphragm 98 is connected to the diaphragm driving circuit 68 to control the quantity of light to be received by the image photographing element 52. A xenon discharge tube 10 is connected to the strobe charge/emission circuit 58 for control of the strobe emission and the strobe charge for emission.

Figure 5A:
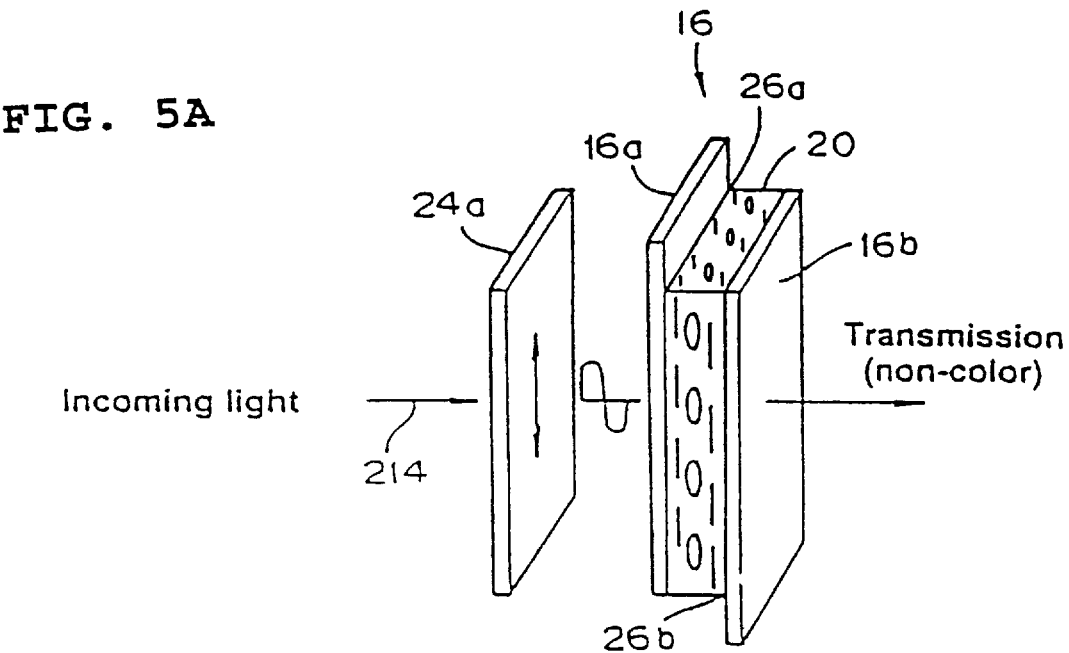
FIGS. 5A and 5B are schematic views of a GH liquid crystal cell used in a still video camera shown in FIG. 1.
Figure 5B:
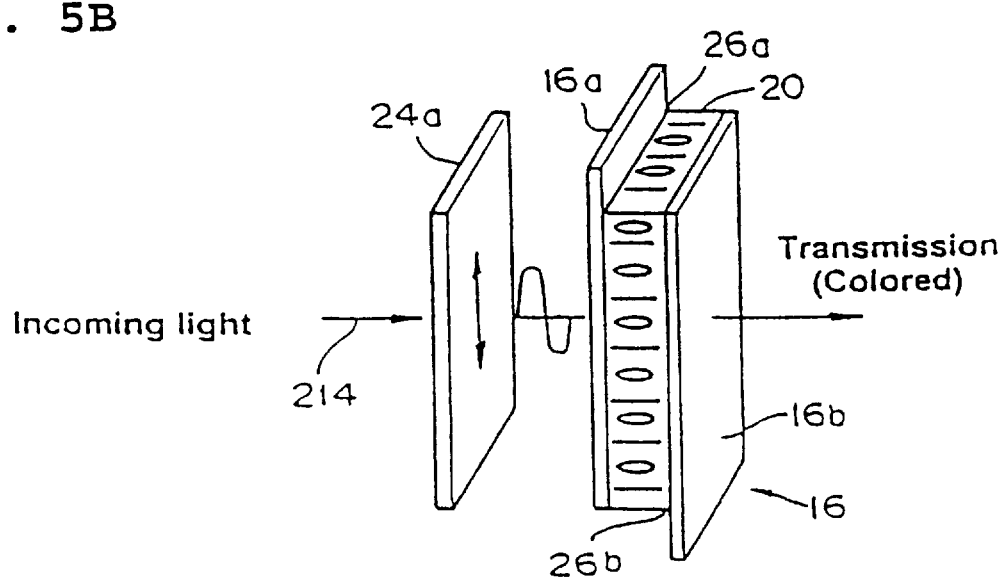

A color temperature controlling filter 74 connected to the filter control circuit 60 is provided in front of the xenon discharge tube 10 to control the color temperature of light emitted from the xenon discharge tube 10. The color temperature controlling filter 74 which will be discussed in detail hereinafter is made of a guest/host (GH) liquid crystal cell having transparent electrodes 26a and 26b (FIGS. 5A and 5B). The color temperature of the light 214 transmitted through the color temperature controlling filter 74 is controlled in accordance with the amplitude of voltage to be applied to the transparent electrodes 26a and 26b from the filter control circuit 60.

A photometering sensor 70 is connected to the strobe control (quenching) circuit 56 to detect the quantity of the strobe light emitted from the xenon discharge tube 10 and reflected by an object 96 to be taken, so that quenching signal 204 is output to the strobe charge/emission circuit 58.

A color measuring sensor 76 which includes a plurality of photoelectric conversion elements, including filters having different spectral transmission distributions, is connected to the color measuring circuit 62. Consequently, the color temperatures of the ambient light (external light) reflected from the object 96 or the like are detected, and the color temperatures thus detected are used as one of the white balance controlling factors.

The exposure calculating circuit 64 is connected to a photometering circuit 80, which is in turn connected to a photometering sensor 78 having photoelectric conversion elements. The brightness of the object 96 is detected by the photometering sensor 78 and the photometering circuit 80. As a result, the exposure is calculated by the exposure calculation circuit 64 in accordance with the object brightness data. The release button 92, which is in the form of a button switch having two contacts, is actuated to command the system controller 50 to commence the photographing operations including the detection of the object brightness and color, the control of the aperture of the diaphragm, the control of the electronic shutter, etc.

The color measuring sensor 76, and the color measuring circuit 62, together form a color detecting means; the color controlling filter 74 and the filter control circuit 60 make up a color temperature varying means; the amplifiers 82 and 84 and the D/A converters 86 and 88 form a color signal control means; the photometering sensor 78, the photometering circuit 80 and the exposure calculating means 64 are included in a photometering means, respectively. The xenon discharge tube 10, which is a form of strobe emission means, can be replaced with other flashing devices.

Figure 2:
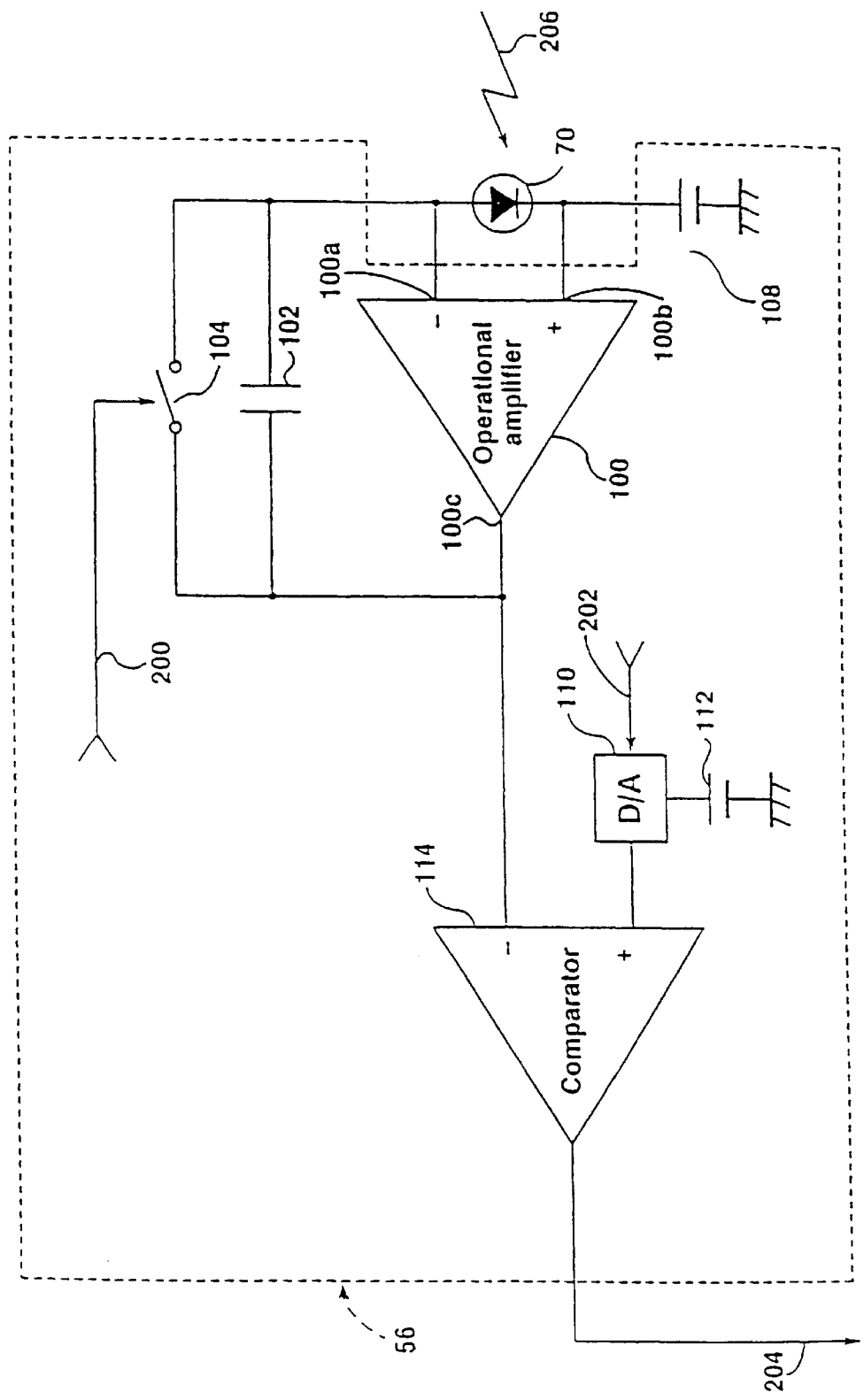
FIG. 2 is a circuit diagram of a strobe control circuit shown in FIG. 1.

FIG. 2 shows an internal structure of the strobe quenching circuit 56. In FIG. 2, a condenser 102 and a switch 104 are connected in parallel to an inversion input terminal 100*a* and an output terminal 100*c* of an operation amplifier 100. The photometering sensor 70, comprising a photoelectric conversion element such as, e.g., a photo diode, is connected to the inversion input terminal 100*a* and a non-inversion input terminal 100*b* of the operation amplifier 100. A reference voltage power source 108 is connected to the non-conversion input terminal 100*b* of the operation amplifier 100. The operation amplifier 100 integrates the photoelectric current of the photometering sensor 70 which is varied in accordance with the light reflected from the object 96.

The output terminal 100*c* of the operation amplifier 100 is connected to an inversion input terminal 114*a* of a comparator 114 whose non-inversion input terminal 114*b* is connected to an output terminal of a D/A converter 110. The D/A converter 110 is connected to a reference voltage power source 112. Quenching level setting data 202 is input to the D/A converter 110 from the system controller 50 to set the duration of the emission of light of the xenon discharge tube 10. The output terminal of the comparator 114 is connected to the strobe charge/emission circuit 58. Comparator 114 compares the voltage value determined in accordance with the quenching level setting data 202, and the output voltage value of the operation amplifier 100 to thereby output the quenching signals 204.

Figure 3:
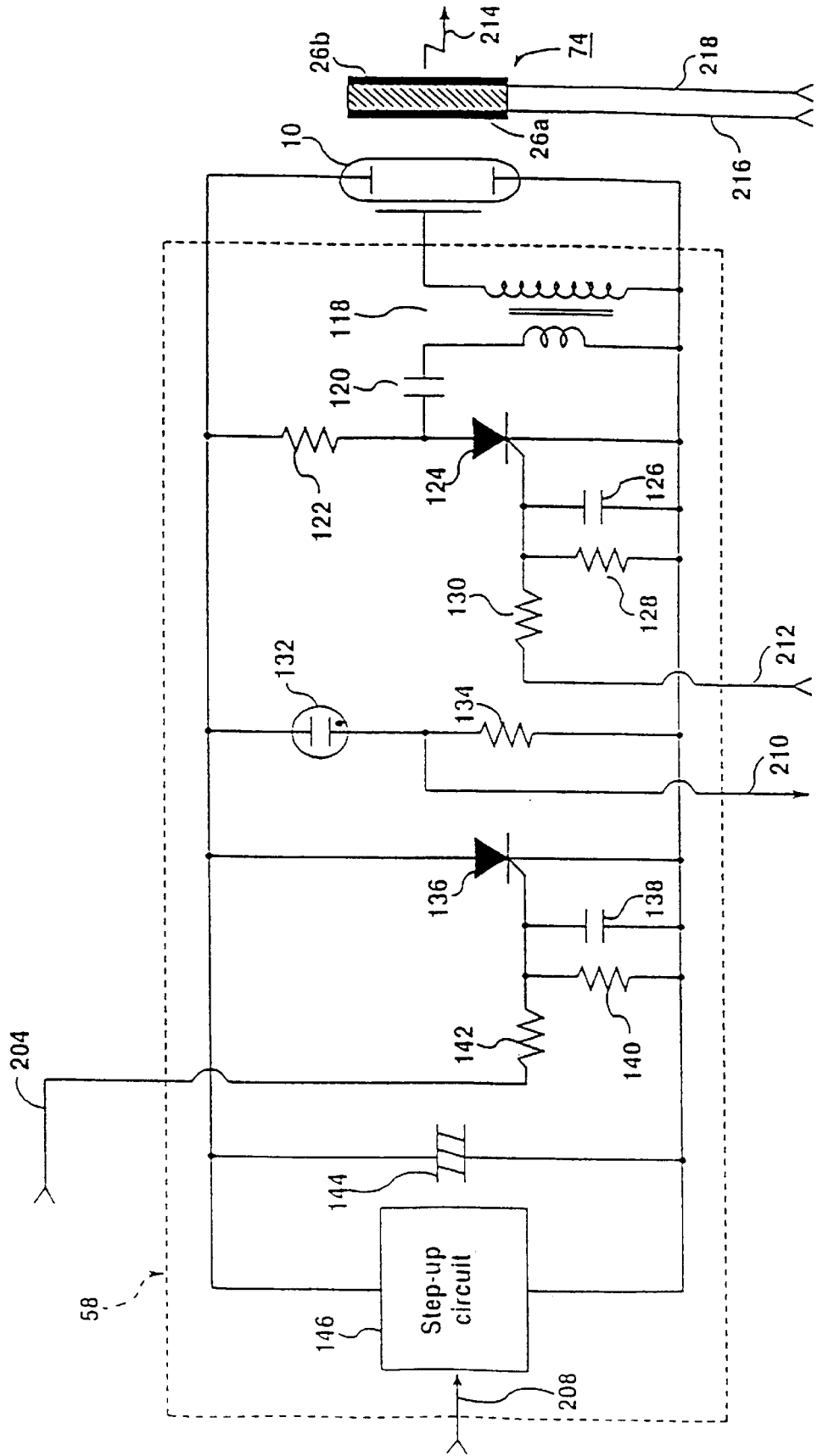
FIG. 3 is a circuit diagram of a strobe charge/emission circuit shown in FIG. 1.

FIG. 3 shows an internal structure of the strobe charge/emission circuit 58. Two output terminals of a step-up circuit 146 are connected to a main condenser 144, a thyristor 136, a neon tube 132 connected to a resistor 134, a thyristor 124 connected to a resistor 122, and the xenon discharge tube 10 in parallel. The step-up circuit 146 is also connected to the system controller 50, so that a charge commencing signal 208 is input to the step-up circuit 146.

Between the gate terminal and the cathode terminal of the thyristor 136 are connected a resistor 140 and a condenser 138 in parallel to prevent the thyristor 136 from being actuated by mistake due to a leakage current. Furthermore, the gate terminal is connected to the output terminal of the comparator 114, so that the quenching signal 204 can be input thereto through an input protecting resistor 142.

One end of the neon tube 132 connected to the resistor 134 is connected to the system controller 50 to output a charge completion signal 210 thereto. Between the gate terminal and the cathode terminal of the thyristor 124 are connected a condenser 126 and a resistor 128 in parallel to prevent the thyristor 124 from being actuated by mistake due to a leakage current, similarly to the thyristor 136. Furthermore, the gate terminal of the thyristor 124 is connected to the system controller 50 through the resistor 130 to receive an emission demanding signal 212 therefrom.

The anode terminal of the thyristor 124 is connected to one end of the resistor 122 and the condenser 120, the other end of which is connected to a primary coil of the trigger transistor 118. The secondary coil of the trigger transistor 118 is connected to the trigger electrode of the xenon discharge tube 10. The transparent electrodes 26*a* and 26*b*, provided on opposite surfaces of the color temperature controlling filter 74 provided in front of the xenon tube 10, are connected to the filter control circuit 60, so that pulse signals 216 and 218 having opposite or in-phase polarities can be input thereto.

Figure 4:
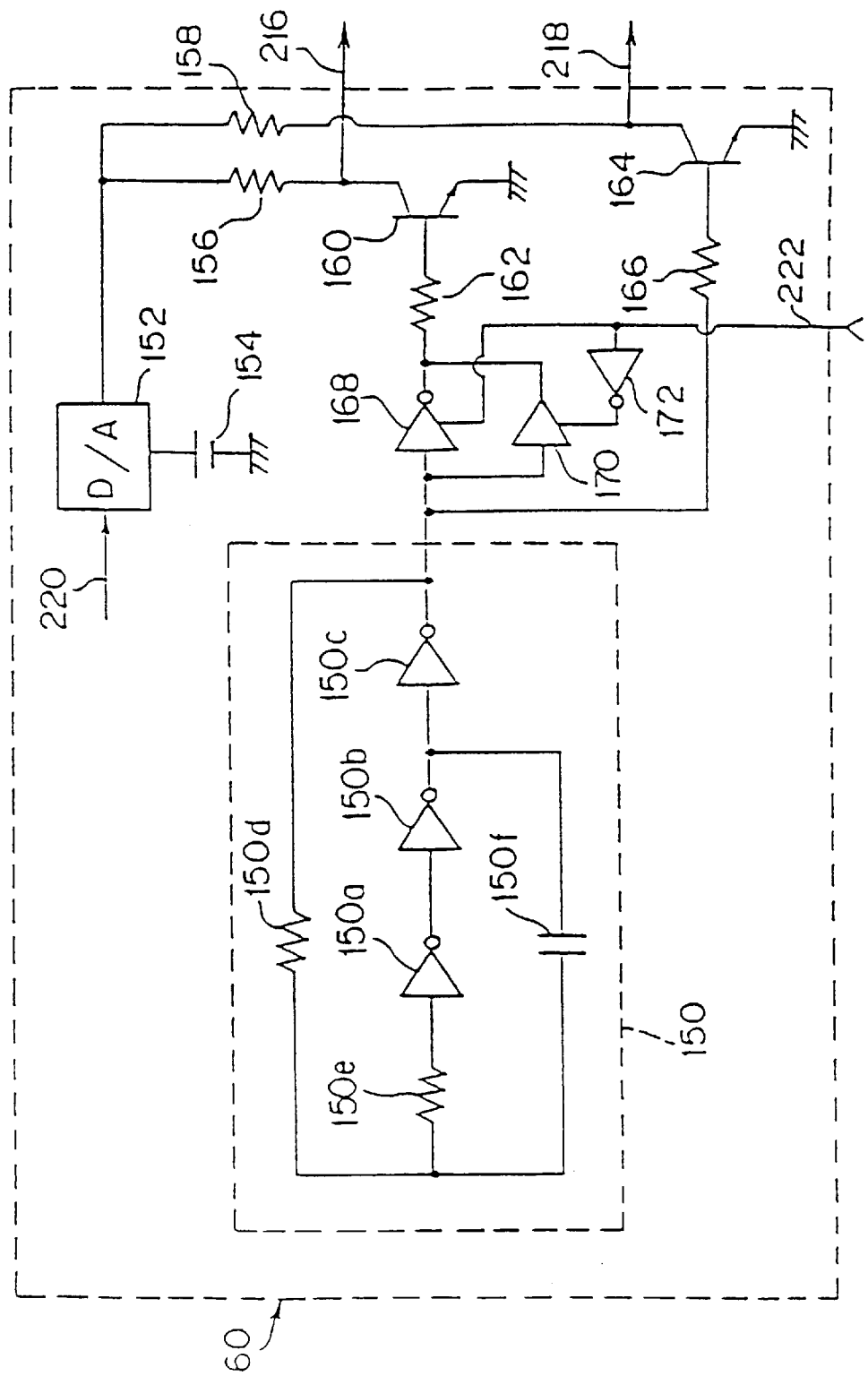
FIG. 4 is a circuit diagram of a filter control circuit shown in FIG. 1.

FIG. 4 shows a circuit arrangement of the filter control circuit 60. In FIG. 4, an output terminal of an oscillator circuit 150, which includes three inverters 150*a*, 150*b*, 150*c*, two resistors 150*d* and 150*e*, and a condenser 150 is connected to input terminals of an inverter buffer 168 and a non-inverter buffer 170, and also to a base terminal of the transistor 164 through a resistor 166. The output terminals of the inverter buffer 168 and the non-inverter buffer 170 have a three-state output. Namely, when the output enabling terminals of the buffers 168 and 170 are at a low voltage, the output terminals thereof are in a high impedance state.

The output enabling terminal of the buffer 170 is connected to the output terminal of the inverter 172 whose input terminal and the output enabling terminal of the inverter buffer 168 are connected to the system controller 50 to input an oscillation control signal 222 thereto.

The output terminals of the inverter buffer 168 and the non-inverter buffer 170 are connected to the base terminal of a transistor 160 through a resistor 162. Collector terminals of transistors 160 and 164 are connected to an output terminal of a D/A converter 152 through resistors 156 and 158, respectively. The collector terminals of the transistors 160 and 164 are connected to the transparent electrodes 26*a* and 26*b* of the color temperature controlling filter 74, respectively (see 216 and 218 in FIG. 4). The D/A converter 152 is connected to a reference voltage power source 154 as well as the system controller 50. Consequently, digital data 220 is input to the D/A converter 152 to control the amplitude of the rectangular wave signals 216 and 218 to be supplied to the color temperature controlling filter 74.

FIGS. 5A and 5B show a GH liquid crystal cell of which the color temperature controlling filter 74 is made. The liquid crystal cell 16 is comprised of a liquid crystal substance 20 made of elongate liquid crystal molecules, and glass substrates 16*a* and 16*b* on which the transparent electrodes 26*a* and 26*b* are mounted, respectively, so that the liquid crystal substance 20 is held between the glass substrates 16*a* and 16*b*. The liquid crystal cell 16 also includes a polarizing plate 24*a* closely secured to the surface of the glass substrate 16*a* adjacent to the xenon discharge tube 10. Consequently, the light emitted from the xenon discharge tube 10 is limited to a predetermined linearly polarized light by the polarizing plate 24*a*.

The GH liquid crystal cell 16 can be made of, for example, a liquid crystal of homogeneous orientation (in which the elongate liquid crystal molecules are oriented parallel to the planes of the glass substrates between which the liquid crystal molecules are sandwiched) that has a positive dielectric aeolotropy (in which the dielectric constant of the elongated liquid crystal molecules in the major axis direction thereof is greater than that in the direction perpendicular thereto), wherein the elongated color molecules are dissolved in the liquid crystal of homogeneous orientation, so that the color molecules absorb light which oscillates in the minor axis direction more effectively than light which oscillates in the major axis direction.

The fill-in light emitting apparatus according to the present invention operates as follows.

When the charge completion signal 208 is sent to the step-up circuit 146, high voltage is intermittently applied to the main condenser 144 and the condenser 120. As a result, the electric charges are gradually accumulated in the main condenser 144, thus resulting in a large voltage difference (electrical potential difference) between both ends of the main condenser 144. As soon as the voltage difference reaches a predetermined value, an electric current flows in the neon tube 132, and the charge completion signal 210 is output to the system controller 50. Following the completion of the charging, a predetermined amount of electric charge is stored in the condenser 120.

When the emission signal 212 is input to the strobe charge/emission circuit 58 from the system controller 50, the emission signal 212 is applied to the gate terminal of the thyristor 124 to activate the latter. Upon activation of the thyristor 124, the electric charges stored in the condenser 120 are suddenly discharged, so that high voltage is induced in the secondary coil of the trigger transformer 118. The induced high voltage is then applied to the trigger electrode of the xenon discharge tube 10. Consequently, the xenon gas is ionized in the xenon discharge tube 10 by the high voltage applied to the trigger electrode thereof, so that the resistance between the positive and negative electrodes of the xenon discharge tube 10 is quickly decreased. As a result, the electric charges stored in the main condenser 144 are discharged within the xenon discharged tube 10, resulting in a production of a flash. Light 214 emitted from the xenon discharge tube 10 by the flash is made incident upon the object 96 through the color temperature controlling filter 74.

An integration commencing signal 200 is output to the strobe quenching circuit 56 simultaneously with the issuance of the emission signal 212 from the system controller 50. The integration commencing signal 200 turns the switch 104 OFF, so that the photoelectric current of the photometering sensor 70 which has been varied by the light 206 reflected from the object 96 is integrated by the operational amplifier 100 having the condenser 102.

An analog signal of a predetermined level is input to the non-inversion input terminal 114b of the comparator 114, based on the quenching level setting data 202 input to the D/A converter 110 from the system controller 50. When a difference between the voltage level of the analog signal input to the non-inversion input terminal 114b and the voltage level of the analog signal input to 114a from the output terminal 100c of the operational amplifier 100 becomes a predetermined value, a predetermined level of the quenching signal 204 corresponding to the output signal of the comparator 114 is obtained.

The quenching signal 204 thus obtained causes the thyristor 136 of the strobe charge/emission circuit 58 to be turned ON. As a result, the electric charges of the main condenser 144 that have been discharged in the xenon discharge tube 10 are discharged through the thyristor 136, and flash of the xenon discharge tube 10 does not occur.

The filter control circuit 60 (shown in FIG. 4) operates as follows.

The digital data 220 input from the system controller 50 is converted to an analog voltage signal by the D/A converter 152 and is sent to the collector terminals of the transistors 160 and 164. The amplitude of the voltage applied to the transparent electrodes 26a and 26b of the color temperature controlling filter 74 is controlled by the collector terminal voltages of the transistors 160 and 164.

The rectangular wave signal output from the oscillator circuit 150 is sent to the input terminals of the inverter buffer 168 and the non-inverter buffer 170 and base-terminal of the transistor 164 after passing through resistor 166. If the control signal 222, output from the system controller 50, is at a low level, the output of the non-inverter buffer 170 is active, so that the signals sent to the base terminals of the transistors 160 and 164 have the same phase. Consequently, the signals 216 and 218 applied to the transparent electrodes 26a and 26b, respectively, have the same phase, and accordingly, there is no voltage difference between opposite sides of the liquid crystal substance 20.

Conversely, if the control signal 222 is at a high level, the output of the inverter buffer 168 is active, so that the phase of the signal sent to the base terminal of the transistor 160 is inverted with respect to the phase of the signal sent to the base terminal of the transistor 164. Consequently, the signals 216 and 218 applied to the transparent electrodes 26a and 26b have opposite phases, and accordingly, a voltage difference is established between both sides of the liquid crystal substance 20.

If the control signal 222 is a low level signal and there is no electrical potential difference between both sides of the liquid crystal substance 20, the direction of polarization of the incident light is identical to the direction of the array of the liquid crystal molecules, i.e., the major axis direction of the color molecules that is perpendicular to the direction in which the color molecules have a higher light absorbability, as shown in FIG. 5A. Consequently, absorption of the transmission light in the color temperature controlling filter 74 does not occur, and hence the light of the xenon discharge tube 10 is directly emitted towards the object 96.

Conversely, as shown in FIG. 5B, if the control signal 222 is a high level signal and there is an electrical potential difference above a predetermined value between both sides of the liquid crystal substance 20, the liquid crystal molecules in the homogeneous array are transformed into a homeotropic array, and the major axis direction of the color molecules is changed to the direction of the electric field. Consequently, the direction of polarization of the incident light is normal to the direction of the major axis direction of the color molecules, so that the color molecules effectively absorb the light, and hence the transmission light from the xenon discharge tube 10 is colored, thus resulting in a change in the color temperature of the light as a whole.

Since the degree of transformation of the color molecules from the homogeneous array to the homeotropic array varies depending on the voltage to be applied to the liquid crystal substance 20, it is possible to proportionally vary the light absorbability of the color molecules accordingly. Therefore, it is possible to control the color temperature of the light emitted from the xenon discharge tube 10 in accordance with the voltage which is applied thereto. For example, if the color molecules dissolved in the liquid crystal absorb a short wavelength of visible radiation, the color temperature of the strobe light can be gradually decreased by increasing the applied voltage.

FIG. 6 shows a timing chart of the photographing operation of a still video camera upon emission of the strobe light, according to the present invention.

When the release button 92 is pressed down by a half step (at time P1), the brightness of the object 96 is measured by the photometering sensor 78 and the photometering circuit 80 in accordance with the control of the system controller 50. Thereafter, the exposure value is calculated by the exposure calculating circuit 64, based on the object brightness data and is input to the system controller 50. The system controller 50 determines the aperture of the diaphragm 98 and the duration of opening of the electronic shutter in the image photographing element 52, based on the object brightness or the exposure value (time P3).

When the release button 92 is fully pressed down (time P2), the color measuring sensor 76 and the color measuring circuit 62 measures the color temperature of the ambient light around the object 96 (time P4), in accordance with the control of the system controller 50 and inputs the measured color temperature data to the system controller 50. Thereafter, the system controller 50 sets the digital data 220 to determine the voltage to be applied to the liquid crystal substance 20, based on the color temperature data and outputs the digital data to the D/A converter 152 of the filter control circuit 60 (time P5).

To adjust the gain of the R signal and the B signal of the color signal output from the image photographing element 52 to thereby execute the white balance adjustment, the digital data to be input to the D/A converters 86 and 88 are set (time P6), and the quenching level setting data 202 to adjust the duration of emission of the strobe light is obtained, based on the color temperature data and is input to the D/A converter 110 of the strobe quenching circuit 56 (time P7).

If the ambient light around the object 96 is judged to be darker than a predetermined brightness level, based on the brightness data and the color temperature data obtained by the photometering sensor 78, the control signal 222 is set to be a low level signal, so that the color temperature of the light emitted from the xenon discharge tube 10 and the white balance adjustment and the setting of the strobe quenching level, corresponding to the color temperature are not adjusted.

Upon completion of the determination of the voltage value to be applied to the color temperature controlling filter 74, the adjustment of the gain of the amplifiers 82 and 84, and the setting of the strobe quenching level, the system controller 50 controls the aperture of the diaphragm 98 through the diaphragm drive circuit 68 (time P8) and opens the electronic shutter of the image photographing element 52 through the image photographing drive circuit 54 (time P9). At the same time, the emission signal 212 is sent to the strobe charge/emission circuit 58 which causes the xenon discharge tube 10 to emit the strobe light (time P10). Prior to the strobe emission, the system controller 50 outputs the charge permitting signal 208 to the strobe charge/emission circuit 58 to charge the main condenser 144.

At the same time as the issuance of the emission signal 212, the system controller 50 outputs the integration commencing signal 200 to the strobe quenching circuit 56 (time P11), so that the operational amplifier 100 of the strobe quenching circuit 56 executes the temporal integration of the light 206 reflected from the object 96 (time P12). When the voltage output from the operational amplifier 100 is lowered below the voltage output from the D/A converter 110 as a result of the temporal integration of the reflected light 206, the quenching signal 204 is output from the comparator 114 to the strobe charge/emission circuit 58 to stop the strobe emission (time P13).

When the output of the integration commencing signal 200 into the strobe charge/emission circuit 56 terminates, the switch 104 is closed (time P14), and the integration of the operational amplifier 100 ends. Moreover, the electronic shutter of the image photographing element 52 is closed (time P15), and the diaphragm 98 is also closed (time P16). Thereafter, the electric charges that have been stored in the image photographing element 52 while the electronic shutter was open are read and sent to the signal processing circuit 90 (time P17).

As can be seen from the above discussion, if the brightness of the ambient light is above a predetermined value, the color temperature of the fill-in light emitted from the xenon discharge tube 10 is matched to the color temperature of the ambient light around the object 96 measured by the color measuring sensor 76, and the gain of the R signal, and thus the R signal read from the image photographing element 52, are adjusted to adjust the white balance. Conversely, if the brightness of the ambient light is below a predetermined value, the white balance adjustment and the setting of the strobe quenching level are carried out in accordance with the color temperature of the ambient light without adjusting the color temperature of the fill-in light emitted from the xenon discharge tube 10.

Figure 7A:
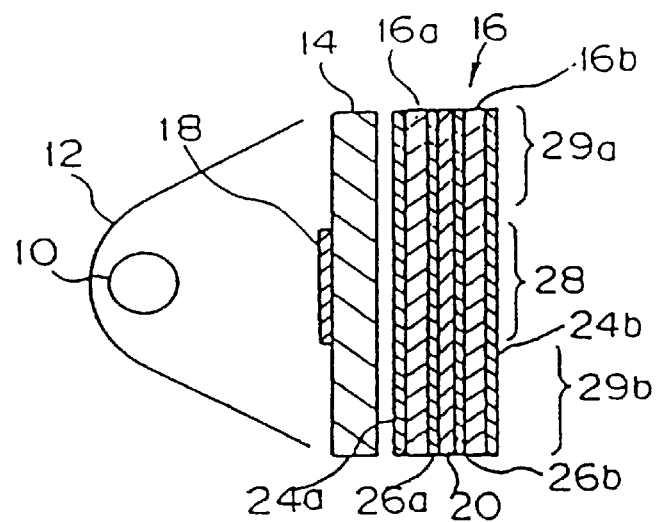
FIGS. 7A, 7B and 7C are cross sectional views of a strobe emission device according to second and third embodiments of the present invention.
Figure 7B:
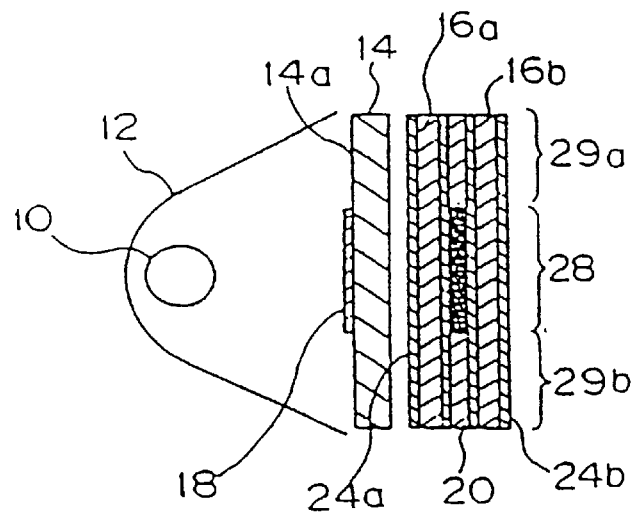
Figure 8A:
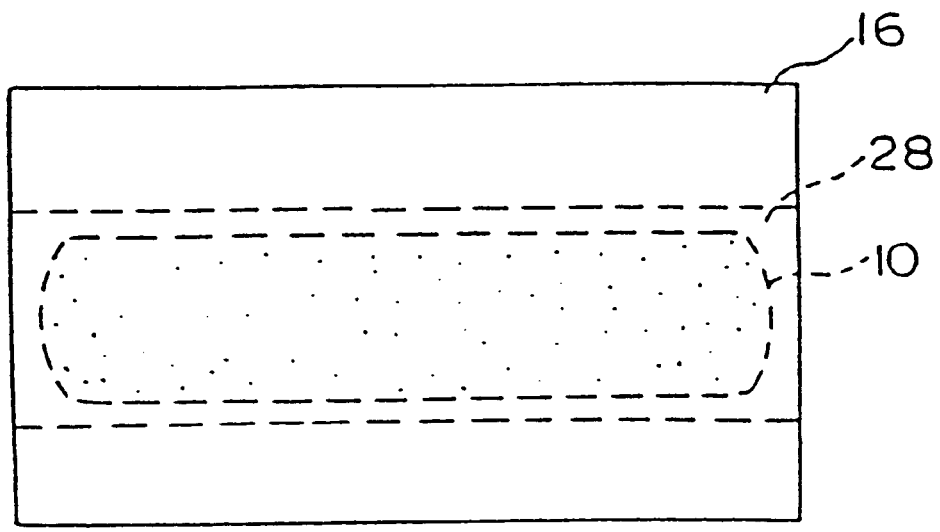
FIGS. 8A and 8B are front elevational views of a strobe emission device according to second and third embodiments of the present invention, shown in FIGS. 7A through 7C.

FIGS. 7A and 7B show a second embodiment of the color temperature controlling filter to vary the color temperature in the strobe emission apparatus. FIG. 8A is a front elevation view of an emitting surface of the strobe emission apparatus shown in FIGS. 7A and 7B. In these drawings, there is a reflector 12 located behind the xenon discharge tube 10 to substantially surround the same. The reflector 12 effectively reflects the light emitted from the xenon discharge tube 10 towards the front side of the strobe emission apparatus.

A diffusion plate 14 which is formed by a chemical treatment (e.g., chemical etching) is provided in front of the reflector 12. The diffusion plate 14 is provided, on a center portion 28 of one of the surfaces thereof, with an amber filter coating 18 which is formed by a vapor-deposition or the like to lower the color temperature of the light radiated from the xenon discharge tube 10. The liquid crystal cell 16 is attached to the outer side of the diffusion plate 14.

The liquid crystal cell 16 may be made from a glass or transparent plastic plate. Namely, the liquid crystal cell 16 comprises, for example, a pair of glass substrates 16a and 16b having the transparent electrodes 26a and 26b, and a liquid crystal substance 20 of homogeneous orientation sandwiched between the glass substrates 16a and 16b. The orientation of the liquid crystal molecules in the major axis direction thereof constitutes a TN (twisted nematic) liquid crystal cell. An analyzing plate 24b and a polarizing plate 24a having orthogonal polarizing planes are closely attached to both the side faces of the liquid crystal cell 16. The transparent electrodes 26a and 26b are, as shown in FIG. 7A, partially formed on the respective glass substrates so that the voltage can be applied to the liquid crystal substance 20 located at the center portion 28 of the liquid crystal cell 16 opposed to the filter coating 18.

In the second embodiment of the color temperature controlling filter illustrated in FIGS. 7A and 7B, when the light emitted from the xenon discharge tube 10 and transmitted through the diffusion plate 14 reaches the polarizing plate 24a, only the linearly polarized light whose polarization direction is identical to the array direction of the liquid crystal molecules of the glass substrate 16a of the liquid crystal cell 16 can be made incident on the liquid crystal substance 20. The light incident upon the liquid crystal substance 20 optically rotates by approximately 90° along the twist of the liquid crystal modules and thus can be transmitted through the analyzing plate 24b.

However, as shown in FIG. 5B, when the voltage is applied only between the transparent electrodes 26a and 26b of the center portion 28 of the liquid crystal cell 16, the orientation of the liquid crystal molecules of the center portion 28 is in the direction of the electrical field. Consequently, the homogeneous orientation is transformed into the homeotropic orientation. As a result, the polarization plane of a large part of the light emitted from the xenon discharge tube 10 and transmitted through the filter coating 18 in the center portion 18 does not optically rotate, and accordingly, the light cannot be transmitted through the analyzing plate 24b.

Consequently, if voltage is not applied to the transparent electrodes 26a and 26b of the center portion 28, as shown in FIG. 7A, the light emitted from the xenon discharge tube 10 is split into central light which is transmitted through the filter coating 18 at the center portion 28 of the liquid crystal cell 16 and peripheral light which is not transmitted through the filter coating 18 in the peripheral portions 29a and 29b. Both the central light and the peripheral light are emitted from the liquid crystal cell 16.

The central light passing through the filter coating 18 has a decreased color temperature and hence becomes yellow light. However, there is no change in the color temperature of the peripheral light that does not pass through the filter coating 18. Consequently, the light emitted from the strobe emission apparatus includes first transmission light whose color temperature has been decreased and second transmission light whose color temperature has not been decreased. Thus, the light exhibits a yellow tint as a whole.

Conversely, as shown in FIG. 7B, if the voltage is applied to the center portions 28 of the transparent electrodes 26a and 26b of the liquid crystal cell 16, the liquid crystal molecules do not cause the light to rotate by 90°, and accordingly, a substantial part of the transmission light which has been linearly polarized by the polarizing plate 24a cannot be transmitted through the analyzing plate 24b. Accordingly, the major part of the transmission light whose color temperature has been lowered by the filter coating 18 is not emitted outside. Owing to absence of the transmission light whose color temperature has been lowered by the filter coating 18, the emission light of the xenon discharge tube 10, as a whole, has a high color temperature and exhibits a color with suppressed yellow tint, in comparison with FIG. 7A.

Figure 7C:
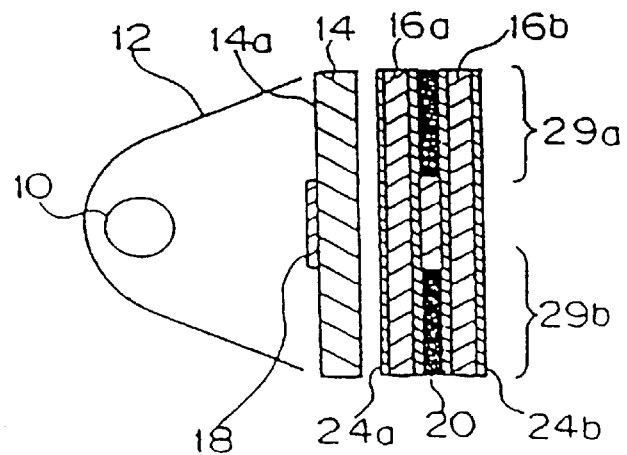
Figure 8B:
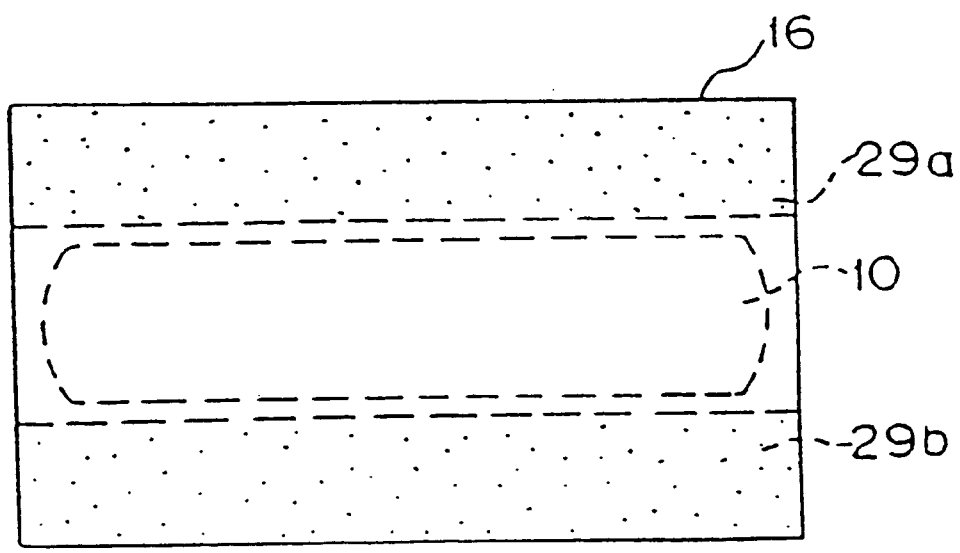

FIG. 7C shows a third embodiment of the color temperature controlling filter. FIG. 8B shows a front elevation of FIG. 7C. In these drawings, the transparent electrodes 26a and 26b are constructed such that the voltage is applied only to the peripheral portions 29a and 29b of the liquid crystal substance 20 that are not opposed to the filter coating 18. The xenon discharge tube 10, the reflector 12, the diffusion plate 14, the filter coating 18, the polarizing plate 24a, and the analyzing plate 24b are identical to those shown in FIGS. 7A and 7B.

In the third embodiment illustrated in FIG. 7C, when the voltage is applied to the peripheral portions 29a and 29b of the transparent electrodes 26a and 26b, the molecular orientation of the liquid crystal substance 20 corresponding to the peripheral portions 29a and 29b is aligned with the direction of the electric field, as mentioned above, and accordingly, the liquid crystal substance does not cause 90° optical rotation of the transmission light. Consequently, the light cannot be transmitted through the analyzing plate 24b. Therefore, a large part of the transmission light which would be transmitted through the peripheral portions 29a and 29b to maintain the original color temperature cannot be transmitted through the liquid crystal cell 16. Consequently, the whole transmission light of the xenon discharge tube 10 has a color temperature lower than that of the second embodiment shown in FIG. 7B.

Figure 9A:
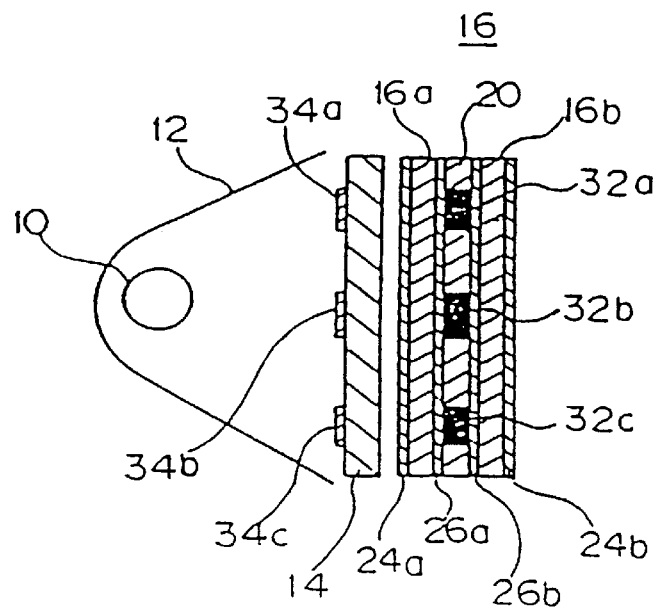
FIGS. 9A and 9B are cross sectional views of a strobe emission device according to fourth and fifth embodiments of the present invention.

FIG. 9A shows a fourth embodiment of a liquid crystal cell, in which there are three separate amber filter coatings 34a, 34b and 34c formed on one end face of the diffusion plate 14. The transparent electrodes 26a and 26b are formed such that the voltage is applied only to the portions 32a, 32b and 32c of the liquid crystal substance 20 corresponding to the filter coatings 34a, 34b and 34c. The xenon discharge tube 10 and the reflector 12 are the same as those in the second embodiment shown in FIG. 7A.

In the arrangement shown in FIG. 9A, the voltage is applied only to the portions 32a, 32b and 32c corresponding to the filter coatings 34a, 34b and 34c. Consequently, a large part of the light whose color temperature has been lowered by the filter coatings 34a, 34b and 34c is intercepted, so that the color temperature of the emission light of the xenon discharge tube 10 is increased as a whole in comparison with the color temperature when no voltage is applied. Furthermore, there is less possibility of irregular emission which would otherwise occur when an object to be taken is located at a close distance if the second embodiment illustrated in FIG. 7A is used, since the filter coatings are separately provided on he diffusion plate 14 in the fourth embodiment shown in FIG. 9A.

Figure 9B:
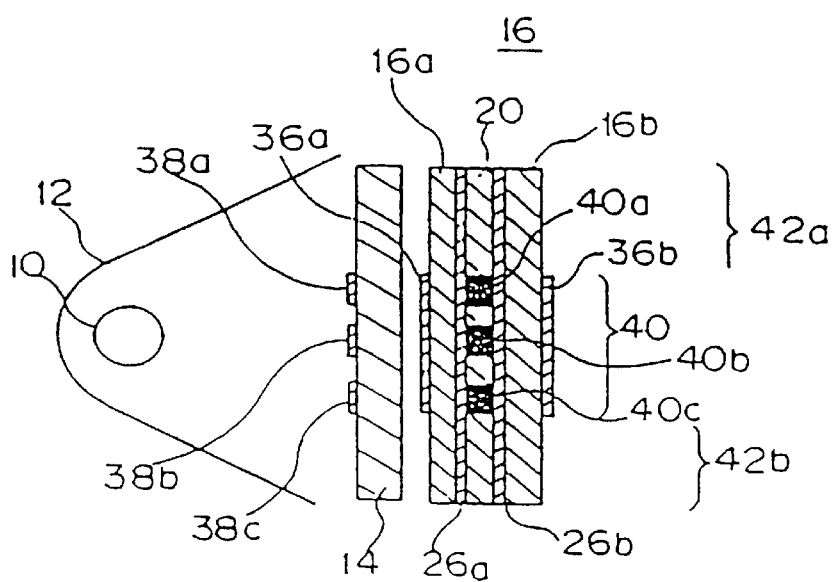

FIG. 9B shows a fifth embodiment of a liquid crystal cell, in which there are three separate filter coatings 38a, 38b and 38c attached to one end face of the diffusion plate 14 at the center portion thereof. Furthermore, a partial diffusion plate 36a and a partial analyzing plate 36b are attached to the center portion 40 of the liquid crystal cell 16. Beyond the partial diffusing plate 36a the partial analyzing plate 36b and the filter coatings 38a, 38b and 38c, lie the peripheral portions 42a and 42b, which allow maximum light transmission from the xenon discharge tube. The transparent electrodes 26a and 26b are constructed such that the voltage is applied to the portions 40a, 40b and 40c of the liquid crystal cell 16 opposed to the respective filter coatings 38a, 38b and 38c. The xenon discharge tube 10 and the reflector 12 are the same as those in the second embodiment shown in FIG. 7A.

In the fifth embodiment, the voltage is applied to the transparent electrodes 26a and 26b only in the areas corresponding to the filter coatings 38a, 38b and 38c, similar to the fourth embodiment mentioned above. This causes light intercepting portions 40a, 40b and 40c to intercept the substantial part of the light transmitted through the filter coatings 38a, 38b and 38c. Consequently, the overall color temperature of the light emitted from the strobe emission apparatus can be increased in comparison with the case where voltage is not applied to the transparent electrodes 26a and 26b. Furthermore, in this embodiment, the surface areas of the polarizing plate 36a and the analyzing plate 36b are smaller than those in the second through fourth embodiments discussed above, and accordingly, the amount of light from tube 10 which is by the polarizing plate 36a and the analyzing plate 36b can be minimized, thus preventing a reduction of the guide number of the strobe emission apparatus itself.

In the second through fifth embodiments mentioned above, the transparent electrodes 26a and 26b are partially provided, only on the portions of the liquid crystal cell corresponding to those of the liquid crystal substance to which the voltage is to be applied. Alternatively, it is possible to provide transparent electrodes 26a and 26b which comprise an array of a plurality of elongated indicating electrode elements juxtaposed in the Y-axis direction and an array of a plurality of elongated scanning electrode elements juxtaposed in the X-axis direction, respectively. The elongated indicating electrode elements and the elongated scanning electrode elements on the opposed surfaces of the glass substrates are located in a matrix arrangement. The indicating electrode elements and the scanning electrode elements are selectively used to apply the voltage to the necessary portions of the liquid crystal cell 16 to thereby control the quantity of light to be transmitted therethrough. Thus, the color temperature and the quantity of emission can be wholly controlled.

Figure 10A:
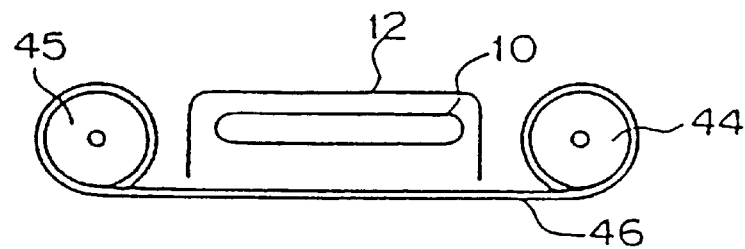
FIGS. 10A through 10D are schematic views of a strobe emission device according to sixth and seventh embodiments of the present invention.
Figure 10B:
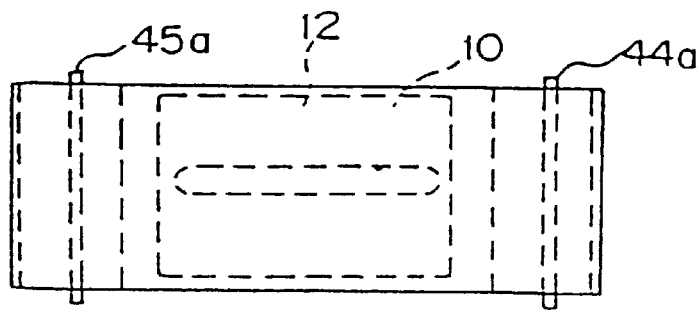

FIGS. 10A and 10B show a sixth embodiment of a color temperature controlling filter in a strobe emission apparatus of the present invention.

Similarly to the second through fifth embodiments mentioned above, the sixth embodiment includes a xenon discharge tube 10 and a reflector 12. In addition thereto, rotors 44 and 45 are provided on opposite sides of the reflector 12 and are mounted to respective rotor shafts 44a and 45a which are rotated by a driving means, such as a motor (not shown). The rotors 44 and 45 are provided with one filter 46 in the form of an amber film, which is wound about the rotors 44 and 45. The filter film 46 includes filter sections 46a, 46b, 46c and 46d (FIG. 10D) having different filter densities. The filter sections 46a, 46b, 46c and 46d selectively come to face the xenon discharge tube 10 when the filter film 46 is wound in the forward or reverse direction by the rotation of the rotor shafts 44a and 45a in the clockwise or counterclockwise direction. The color density of the filter sections 46a, 46b, 46c and 46d decreases towards the filter section 46d from the filter section 46a.

Figure 10C:
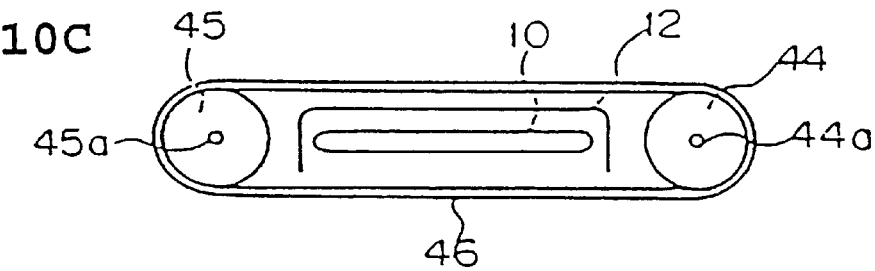

FIG. 10C shows a seventh embodiment of a color temperature controlling filter in a strobe emission apparatus of the present invention.

Figure 10D:
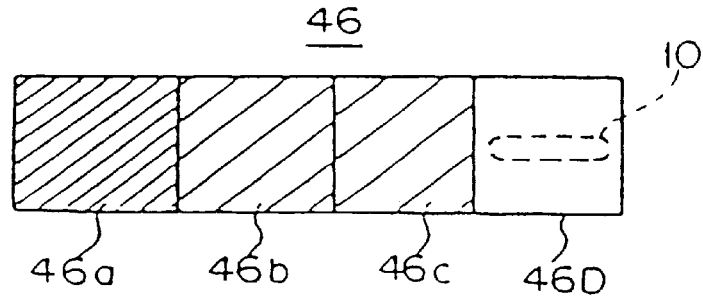
Figure 11A:
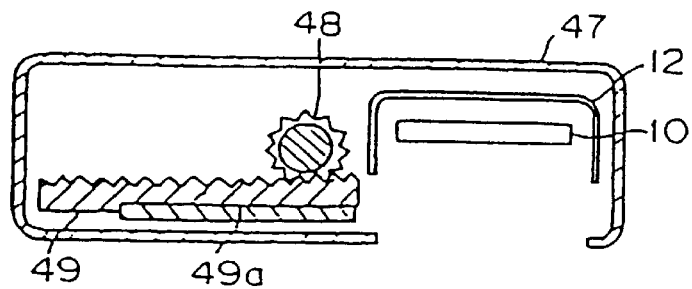
FIGS. 11A through 11D are schematic views of a strobe emission device according to an eighth embodiment of the present invention.
Figure 11B:
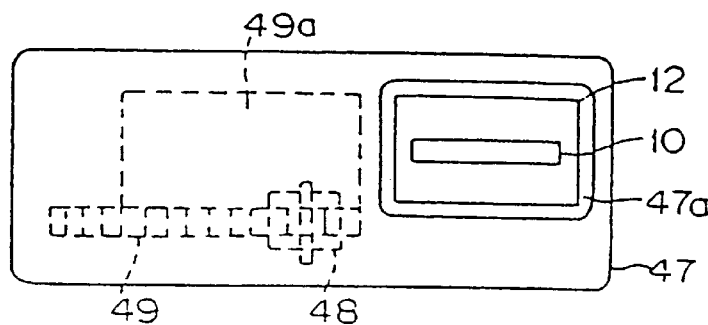
Figure 11C:
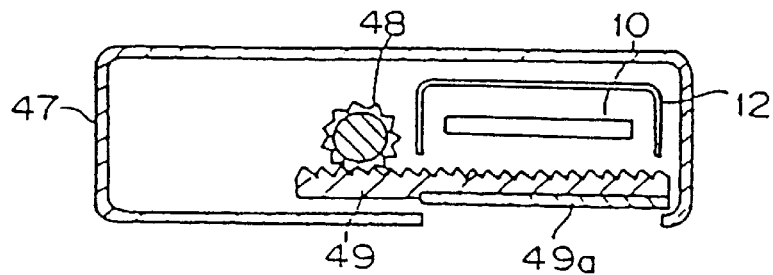
Figure 11D:
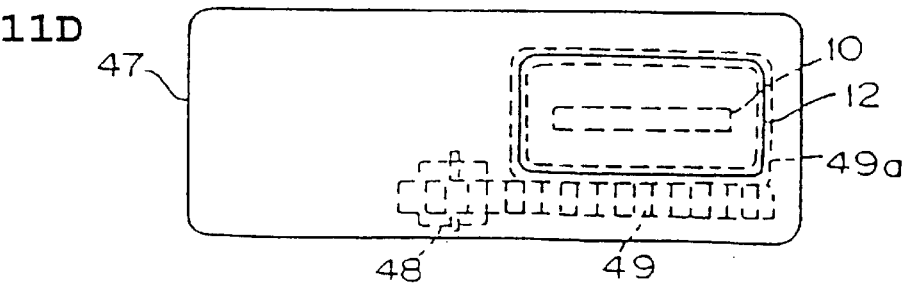

In this embodiment, the filter film 46 shown in FIG. 10D is replaced with an endless filter film 46' which surrounds the xenon discharge tube 10 and the reflector 12. The endless filter film 46' includes a plurality of filter sections having different color densities, similarly to the filter film shown in FIG. 10D. In the above-mentioned sixth and seventh embodiments, the color temperature of the strobe emission apparatus can be varied by appropriately selecting the filter sections 46a, 46b, 46c and 46d which cover the front surface of the xenon discharge tube 10 by rotating rotors 44 and 45. Namely, as the color density of the filter increases, the color temperature of the emitted light decreases. It is possible to use a filter film 46 whose color density continuously changes along the length thereof in order to continuously adjust the color temperature.

FIGS. 11A through 11D show an eighth embodiment of a color temperature controlling filter in a strobe emission apparatus of the present invention.

In the eighth embodiment, there is a gear wheel 48 provided in a housing 47 of the strobe emission apparatus. The gear wheel 48 is rotated by a driving means such as a motor (not shown) and is in mesh with a slidable rack (slider) 49 which is linearly and reciprocally movable in the housing 47. The slider 49 is provided thereon with a filter 49a projecting therefrom, so that when the slider 49 is moved by the gear wheel 48, the filter 49a is moved in the same direction together with the slider 49 to come in a position in which a front opening 47a of the reflector 12 is covered by the filter 49a. In the eighth embodiment, when the gear wheel 48 is rotated, the filter 49a is projected into the opening 47a to cover the same. In this position, the filter 49a faces the xenon discharge tube 10 to decrease the color temperature of the latter.

Note that, in the sixth, seventh and eighth embodiments it is possible to provide the diffusion plate 14 in front of or behind the filter film 46, 46' or 49a.

The color of the filter coatings 18, 34a, 34b, 34c, 38a, 38b, and 38c in the second through fifth embodiments is not limited to amber and can be red or the like in which the longer wavelength of light can be transmitted through the red filter, or blue or the like in which a higher color temperature can be obtained.

In the fourth or fifth embodiment in which there is more than one filter coating attached to the diffusion plate 14, it is possible to combine different kinds of filters having different spectral power distributions of transmission light. Alternatively, in the second embodiment, it is possible to provide one filter coating having an irregular spectral power distribution of transmission light. Such an irregular spectral power distribution can be realized by a filter coating having a non-uniform thickness or a multi-layered varicolored or speckled-colored filter coating. Moreover, if the portion to which the voltage is to be applied by the transparent electrodes 26a and 26b is subdivided so as not to partially intercept the center portion 28, an extended range of the adjustment of the color temperature can be obtained.

In the fourth and fifth embodiments shown in FIGS. 9A and 9B, although the portions to which the voltage is to be applied to intercept the light are formed by the portions 32a through 32c and 40a through 40c corresponding to the filter coatings 34a through 34c and 38a through 38c, respectively, it is possible to apply the voltage to the portions having no filter coating (e.g., the peripheral portions 42a and 42b in FIG. 9B) to intercept non-filtered light emitted from the xenon discharge tube 10.

Although the polarizing plate 24a and the analyzing plate 24b have orthogonal polarization planes in the second through fifth embodiments illustrated in FIGS. 7 (7A, 7B, 7C) through 9 (9A, 9B), it is possible to use parallel polarization planes. In this alternative, the transmission of light by the application of the voltage is opposite to the foregoing. Namely, the application of the voltage causes the liquid crystal molecules of the TN liquid crystal cell to have a homeotropic orientation, so that the twist of the polarizing planes of the transmission light disappears. Consequently, the linearly polarized light transmitted through the polarizing plate 24a can be directly transmitted through the analyzing plate 24b. Thus, the ON/OFF state of the applied voltage is opposite to the above discussion.

In the second through fifth embodiments discussed above, although the liquid crystal substance 20 has a positive dielectric aeolotropicity and includes the glass substrates 16a and 16b which have been subject to a homogeneous orientation treatment to constitute a twisted nematic orientation cell, the liquid crystal substance 20 is not limited thereto and can be of any type that can switch a transparent state to an opaque state and vice versa in accordance with the selective application of the voltage. It is not necessary for the liquid crystal substance 20 to have an intensive contrast between the transparent state and the opaque state. Accordingly, a liquid crystal cell which becomes opaque when voltage is not applied thereto, for example, a liquid crystal having a phase change effect, such as a cholesteric liquid crystal or a chiralnematic liquid crystal having a positive dielectric aeolotropicity and a relatively long spiral pitch can be used.

In the first embodiment, although the GH liquid crystal cell is used to vary the color temperature of the radiation of the xenon discharge tube 10, it is possible, instead thereof, to provide between orthogonal polarizing plates a nematic liquid crystal cell of homeotropic orientation (the elongate liquid crystal molecules are oriented in a direction perpendicular to the planes of the glass substrates which hold the liquid crystal therebetween) having an ECB (electro-control birefringence) effect and a negative dielectric aeolotropicity (the dielectric constant of the elongated liquid crystal molecules in the major axis direction is smaller than that in the direction perpendicular to the major axis). The color of the transmission light is varied in accordance with the magnitude of the voltage to be applied thereto.

In other words, since the major axis of the liquid crystal molecules in the liquid crystal cell having the ECB effect is identical to the optical axis of the incident light when voltage is not applied, the liquid crystal cell does not exhibit birefringence, and the light cannot be transmitted through the orthogonal polarizing plates. However, when the voltage is applied, the liquid crystal molecules are inclined in a direction perpendicular to the electric field by the Frederick transition, so that the birefringence of the light occurs in the liquid crystal cell. Thus, part of the incident light passes through the analyzing plate. Since the birefringence depends on the magnitude of the electric field, the color phase of the transmission light can be controlled by the interference effect caused by the magnitude of the voltage to be applied. Thus, the color temperature of the light emitted from the xenon discharge tube 10 can be controlled.

The GH liquid crystal cell can be replaced with, for example, a White/Taylor type liquid crystal cell not having a polarizing plate, employing cholesteric nematic phase change effect. In the White/Taylor type liquid crystal cell, when voltage is not applied thereto, the liquid crystal molecules constitute a cholesteric liquid crystal, and accordingly, an enhanced absorption effect of the light emitted from the xenon discharge tube 10 can be achieved by the coloring molecules in a spiral arrangement, oriented in different directions. Thus, a desired color of light can be obtained.

On the other hand, when the voltage is applied, the liquid crystal molecules turn into a nematic state having a homeotropic orientation, and accordingly, the coloring molecules are aligned in the direction of the electric field. Consequently, the light absorption effect disappears, and the light of the xenon discharge tube 10 is directly transmitted through the filter.

The dielectric aeolotropicity of the liquid crystal molecules used to constitute the GH liquid crystal can be either positive or negative. coloring molecules that exhibit a strong absorption property of light in the major axis direction are dissolved in the liquid crystals whose molecules have a negative dielectric aeolotropicity. These molecules are sandwiched between the substrates which have been subjected to a homeotropic orientation treatment. When a voltage is applied, the transmission light is effectively absorbed by the liquid crystal, and hence a desired color of light can be obtained from the xenon discharge tube 10.

Figure 12A:
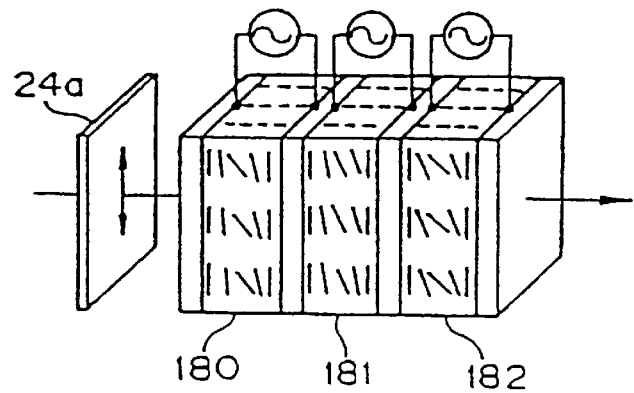
FIGS. 12A and 12B are schematic views of a strobe emission device according to ninth and tenth embodiments of the present invention.

As shown in FIG. 12A, it is also possible to use a composite liquid crystal cell which comprises multi-layered GH liquid crystal cells 180, 181 and 182 in which coloring molecules having different light absorbing spectral power characteristics are dissolved, and one polarizing plate 24a, as shown in FIG. 12A. In such a composite liquid crystal cell, the color of the light transmitted through the whole liquid crystal cell can be optionally selected by selecting the GH liquid crystal cells to which the voltage is to be applied. Thus, an extended range of adjustment of the color temperature can be obtained.

Figure 12B:
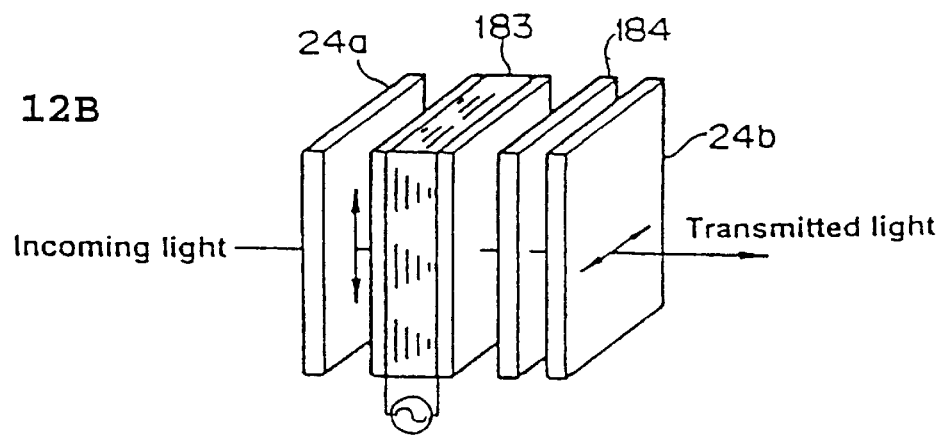
Figure 13A:
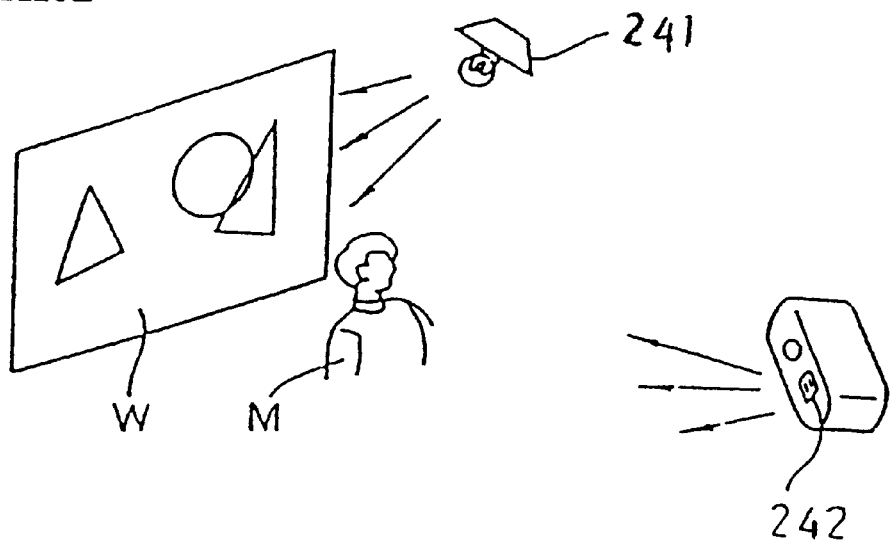
FIGS. 13A and 13B are schematic views showing a picture taking process using strobe light in a conventional still video camera.
Figure 13B:
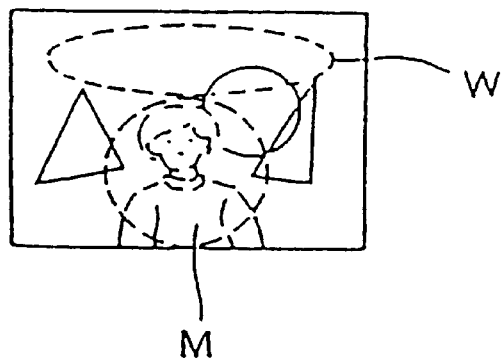

FIG. 12B shows a modified color temperature controlling (varying) filter which comprises a TN liquid crystal cell 183, a birefringence plate 184, a polarizing plate 24a, and an analyzing plate 24b. The polarizing plate 24a and the analyzing plate 24b are arranged such that the directions of the respective polarized transmission of light of the plates 24a and 24b are orthogonal or parallel. In an arrangement shown in FIG. 12B, the color of the light to be obtained depends on the retardation which is determined by the product of the thickness of the birefringence plate 184 and the birefringence thereof. Two complementary colors of transmission light are obtained in accordance with the selective application of voltage to the TN liquid crystal cell.

As can be seen from the above discussion, the color temperature of the strobe emission can be controlled using a GH liquid crystal cell in which the coloring molecules are dissolved or a TN liquid crystal cell provided with filter coating(s). Therefore, there is no limitation to the kind of liquid crystal cell to be used as a filter to control the color temperature. A desired color of filter may be provided in front or rear of the liquid crystal cell, if the latter can adjust the quantity of light to be transmitted therethrough in accordance with the application of the voltage thereto. Furthermore, if the GH liquid crystal cell which can directly vary the color of the transmission light is used, the color temperature of the strobe light can be controlled by the selection of the coloring molecules to be dissolved in the liquid crystal cell.

The color measuring sensor 76 and the photometering sensor 78 are not limited to those in the illustrated embodiments. For example, each sensor may be comprised of a plurality of light receiving elements, so that a whole image taken by the image photographing element 52 is divided into a plurality of image sections corresponding to the respective light receiving elements. It is also possible to provide light guide means, such as prisms or reflecting mirrors in front of the respective light receiving elements. It is also possible to provide light guide means, such as prisms or reflecting mirrors in front of the respective sensors 76 and 78 in order to detect the light incident upon the image photographing element 52 through the photographing optical system (lens) 66.

According to the above-mentioned embodiments, upon photographing using strobe light in a still video camera, even if there is a large difference in the color temperature between the strobe light and the ambient light around an object to be taken, it is possible to match the color temperature of the strobe light to the color temperature of the ambient light by the color temperature controlling filter provided in front of the strobe light emitting tube. Consequently, picture images which have been subject to a good white balance adjustment can be obtained. Furthermore, even if the photographing environment is too dark for the color measuring sensor to measure the color temperature of the object to be taken, the white balance control can be carried out in accordance with pre-recorded color temperature data of the strobe light without adjustment, and hence, there is no error of white balance due to a wrong color measurement.

In addition to the foregoing, according to the first through fifth embodiments, the color temperature of the strobe light can be adjusted by electrical control alone, an improved MTBF (i.e., Mean Time Between Failure) of the whole apparatus can be expected.

In conclusion, as can be understood from the foregoing, according to the present invention, since the color temperature of the strobe light can be controlled and the gain of the color signals from the image photographing element can be adjusted, based on the color measurements by the color measuring sensor or the color temperature data of the strobe light, an optimal white balance can be always achieved.

Figure 14:
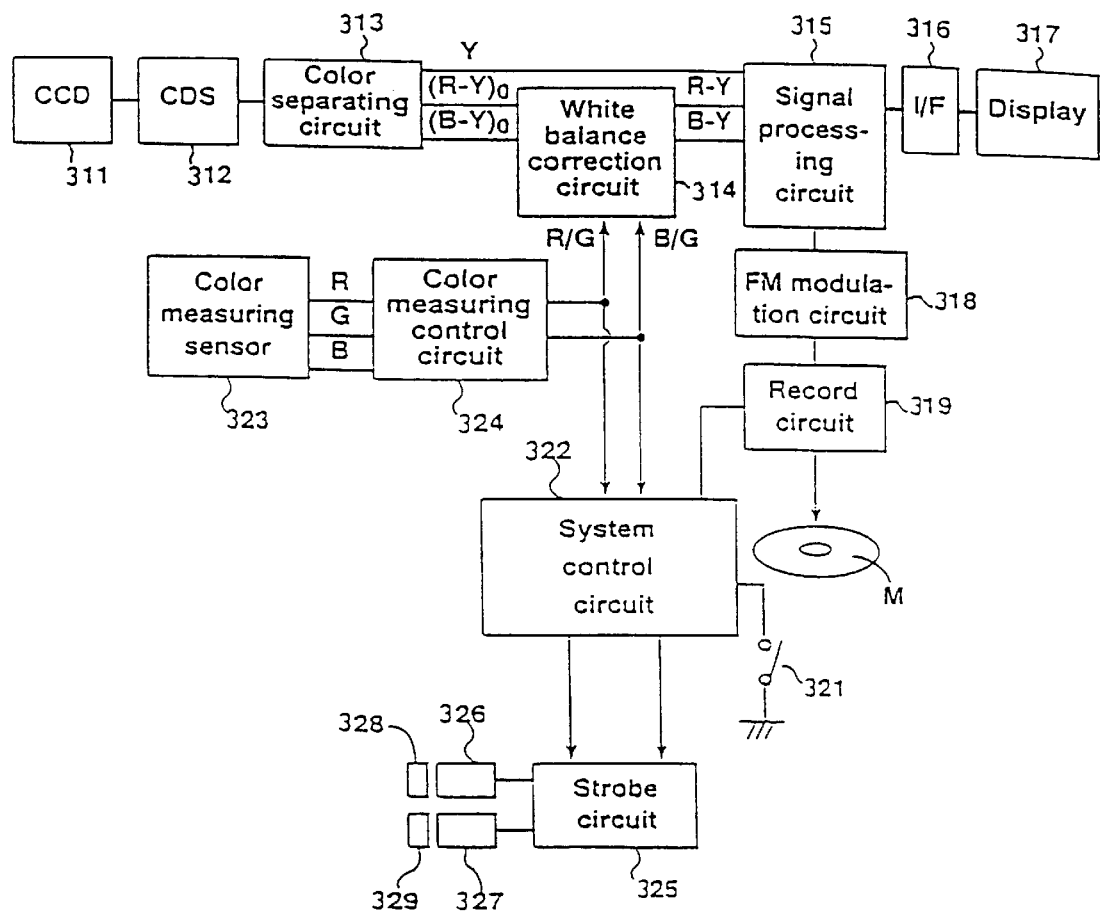
FIG. 14 is a second block circuit diagram of a still video camera having two light emitting tubes, to which the present invention is applied.

The above discussion has been directed to the white balance adjustment by a single flash light emitter. The following discussion will be addressed to embodiments in which a plurality of flash light emitters is provided. FIG. 14 shows a second block circuit diagram of a still video camera according to the present invention.

Light reflected from an object to be taken is incident upon the CCD 311 through the photographing optical system (not shown) to form an object image on the CCD 311. The picture signal corresponding to the object image is sent to a correlative double sampling (CDS) circuit 312 wherein a reset noise is removed. Thereafter, in a color separating circuit 313, a luminance signal Y and two color difference signals $(R-Y)_o$ and $(B-Y)_o$ are produced.

The color difference signals $(R-Y)_o$ and $(B-Y)_o$ are sent to a white balance adjusting circuit 314. The white-balanced color difference signals (R-Y) and (B-Y) as well as the luminance signal Y are sent to a signal processing circuit 315 wherein the signals are processed. The processed signals are output to a display device 317 through an interface circuit 316 to indicate the object image on a screen of the display 3966.S02 device 317. The signals are supplied to an FM modulation circuit 318 from the signal processing circuit 315 and the FM-modulated signals are input to a recording circuit 319 which is connected to a disc apparatus. When the shutter release switch 321 is turned ON, the recording circuit 319 is actuated under the control of a system control circuit (system controller) 322, so that the luminance signal and the color difference signals are recorded on a recording medium M, such as a magnetic disc.

To detect a color temperature of external light (ambient light), there are provided a color measuring sensor 323 which detects the intensities of R (Red), G (Green) and B (Blue) components of the external light, and a color measuring control circuit 324 which calculates R/G and B/G signals. The R/G signal and B/G signal are input to the white balance adjusting circuit 314 and the system controller 322.

Figure 15:
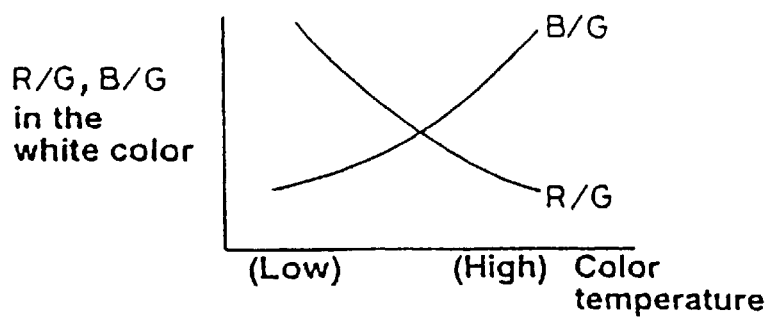
FIG. 15 is a diagram of a color distribution of R/G and B/G components contained in a white color.

The ratio of the R and B components in white varies depending on the color temperature as shown in FIG. 15. Also, the G component depends on the color temperature. Consequently, the color temperature can be detected, based on the R/G and B/G signals. In the white balance adjusting circuit 314, the degrees of amplification for the color difference signals $(R-Y)_o$ and $(B-Y)_o$ are adjusted, based on the color temperature, to execute the white balance adjustment.

The system controller 322 controls the strobe circuit 325 in accordance with the R/G signal and the B/G signal output from the color control circuit 324. In the illustrated embodiment, identical first and second flash light emitters (xenon discharge tubes) 326 and 327 are provided. The emission durations of the first and second flash light emitters 326 and 327 are independently controlled by the strobe circuit 325. The first and second flash light emitters 326 and 327 are respectively provided with first and second color filters 328 and 329 having different spectral transmittances. Consequently, the same effect as the emission of the flash light having the color temperature substantially identical to the color temperature of the external light can be expected from the control of the emission duration of the flash light emitters 326 and 327, as will be discussed hereinafter. Consequently, a good white balance can be achieved to reproduce correct colors.

The control operation of the strobe emission apparatus will be described below with reference to FIGS. 16 (16A, 16B and 16C) through 20. FIGS. 16A, 16B and 16C show white balance characteristics at different color temperatures.

Figure 16A:
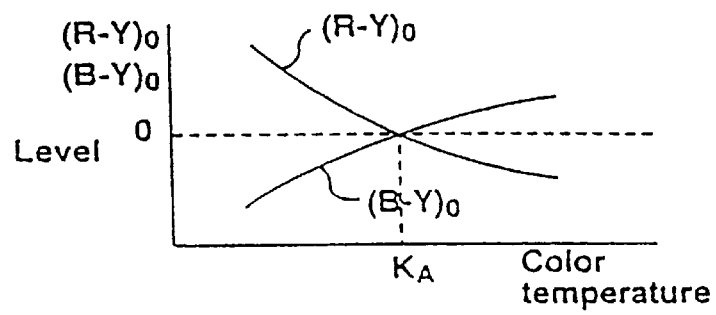
FIGS. 16A, 16B and 16C are diagrams showing white balance properties at different color temperatures.
Figure 16B:
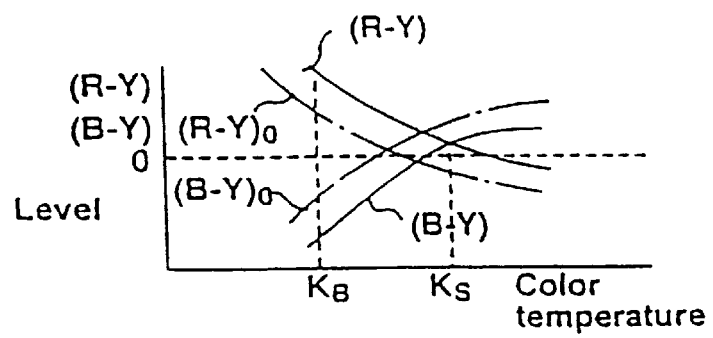

As shown in FIG. 16A, on the assumption that when white balance adjustment is not carried out, the two color difference signals (R-Y), and (B-Y) have the same level "O" at a predetermined color temperature $K_A$, the white object is reproduced as a white image at the color temperature $K_A$. Accordingly, this is equivalent to the execution of the white balance adjustment. If the white balance adjustment is carried out for the strobe light of the color temperature $K_s$, the levels of the color difference signals (R-Y) and (B-Y) are increased and decreased, respectively, as shown in FIG. 16B. Namely, the levels of the two color difference signals (R-Y) and (B-Y) are both "O" at the color temperature $K_s$. However, if there is external light whose color temperature KB is lower than that of the strobe light, the two color difference signals (R-Y) and (B-Y) are both largely deviated from the level "O" for the external light. Namely, if the white balance adjustment is carried out for the color temperature of the strobe light, the color of the object image might become unnatural under the influence of the external light.

Figure 16C:
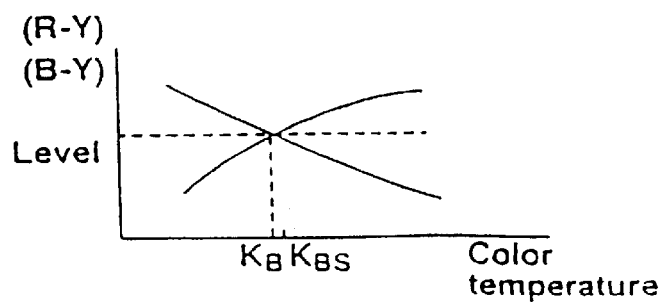

To prevent this, the emission durations of the flash light emitters 326 and 327 are independently controlled to shift the color temperature KBS of the strobe light towards the color temperature KB of the external light to thereby realize a good color reproduction, as shown in FIG. 16C. In other words, the white balance adjustment is effected for the color temperature of the external light. This is equivalent to the matching of the color temperature of the strobe light to the color temperature of the external light. Consequently, the image is prevented from being partly and unnaturally made red or blue. When the color temperature of the ambient light cannot be measured, the emitted color temperature KBS can be set to a predetermined value according to the white balance control.

Figures 17, 18:
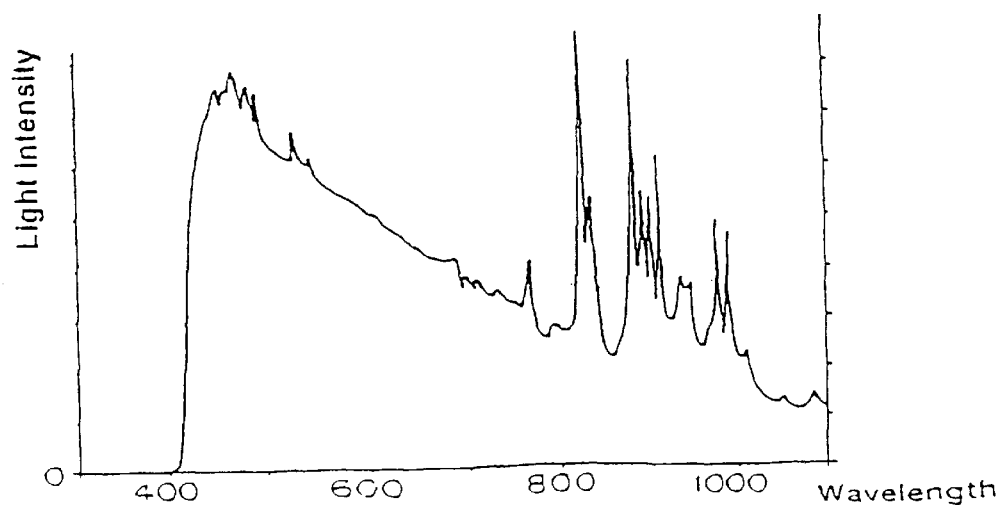
FIG. 17 is a diagram of color temperatures of various light sources.
FIG. 18 is a diagram of a spectral power distribution of strobe light, by way of example.

FIG. 17 shows different color temperatures of various kinds of lights. As can be seen in FIG. 17, the color temperature of the normal strobe light is approximately 6000 K to 7000 K, which is considerably higher than that of the sunlight, a halogen lamp or an incandescent lamp.

As can be seen in FIG. 18, the spectral power distribution of the strobe light exhibits a strong light intensity at the blue side of short wavelength and a weak light intensity at the red side of long wavelength. It is therefore possible to adjust the spectral power distribution to control the color temperature of light. For instance, a strobe light having a low color temperature similar to light of an incandescent lamp can be obtained by reducing the intensity of light of short wavelength and enhancing the intensity of light of long wavelength.

Figure 19A:
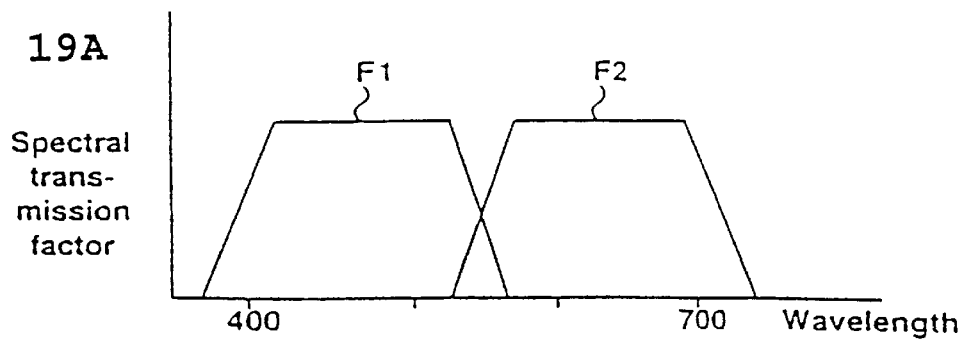
FIGS. 19A, 19B and 19C are diagrams of optical properties of strobe light to explain a control of the color temperature thereof.
Figure 19B:
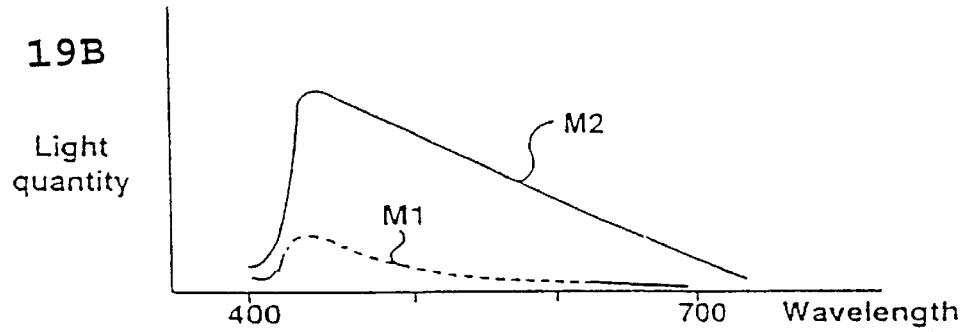
Figure 19C:
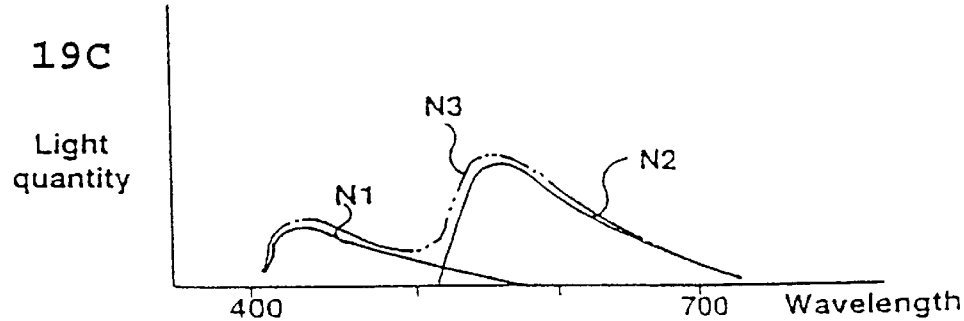

The control of the spectral power distribution of the strobe light will be described below with reference to FIGS. 19A, 19B and 19C.

In the illustrated embodiment, the first color filter 328 has a high spectral transmittance at a short wavelength, as indicated at a solid line F1, and the second color filter 329 has a high spectral transmittance at a long wavelength, as indicated at a solid line F2, respectively.

It is assumed here that the quantity of light of the first flash light emitter 326 is comparatively small, as shown by an imaginary line M1, and the quantity of light of the second flash light emitter 327 is comparatively large, as shown by a solid line M2, respectively.

Consequently, the quantity of the strobe light actually transmitted through the first color filter 328 is represented by the product of M1 (quantity of light) and F1 (transmittance) and is relatively small, as indicated by a solid line N1. Similarly, the quantity of the strobe light actually transmitted through the second color filter 329 is represented by the product of M2 (quantity of light) and F2 (transmittance) and is relatively large, as indicated by a solid line N2. Consequently, in the spectral power distribution of the strobe light to be incident upon the object to be taken, the quantity of light is small on the blue side of short wavelength and large on the red side of long wavelength, as shown by a two-dotted and dashed line N3. That is, a strobe light having the same spectral power distribution as a light of low color temperature can be obtained in the illustrated embodiment.

Figure 20:
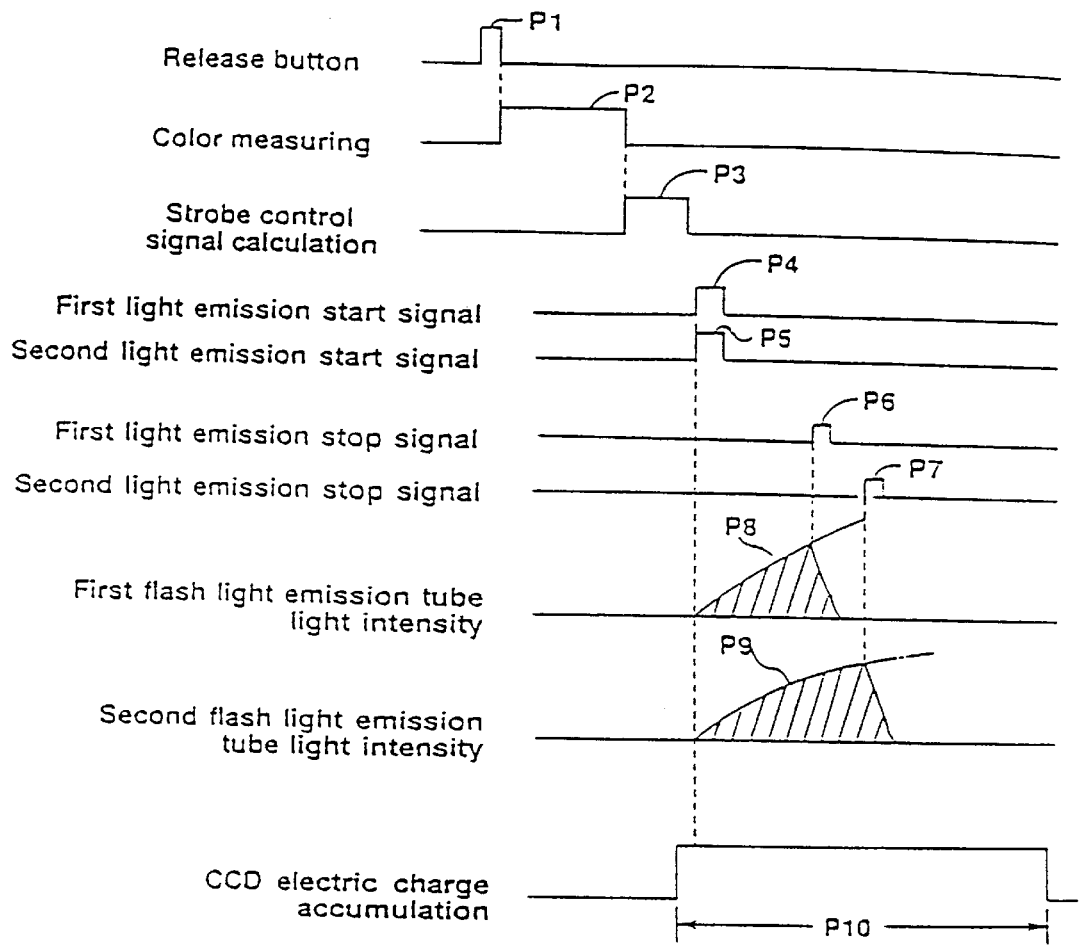
FIG. 20 is a timing chart of control processes of a color temperature of strobe light.

FIG. 20 shows a timing chart of the photographing operation, using the strobe light.

When the shutter release button is fully pressed down (time P1), the color measuring sensor 323 and the color control circuit 324 operate (time P2) to input the R/G signal and the B/G signal to the system controller 322. The system controller 322 then calculates the strobe control signals in accordance with the R/G signal and the B/G signal (time P3). The strobe control signals correspond to the emission durations of the strobe light of the first and second flash light emitters 326 and 327, respectively.

Upon completion of the calculation of the strobe control signals, the first and second emission starting signals (P4 and P5) are simultaneously output from the strobe circuit 18, so that the first and second flash light emitters (e.g., xenon discharge tubes) 326 and 327 commence the emission of the strobe light. Thereafter, the first and second emission stop signals are output at times (P6 and P7) determined in accordance with the strobe control signals to stop the emission of the strobe lights of the first and second flash light emitters 326 and 327. Namely, the first flash light emitter 326 commences and stops the emission in accordance with the issuance of the pulse signal (emission starting signal) P4 and the pulse signal (emission stop signal) P6, respectively. Similarly, the second flash light emitter 326 commences and stops the emission in accordance with the issuance of the pulse signal (emission starting signal) P5 and the pulse signal (emission stop signal) P7, respectively.

The first and second flash light emitters 326 and 327 basically have the same structure and operation, and exhibit the same light intensity variation curve after the commencement of the emission, as indicated at P8 and P9. Consequently, desired quantities of light can be obtained by the control of the emission durations of the first and second flash light emitters 326 and 327. The quantities of light correspond to the hatched areas in FIG. 20. In the illustrated embodiment, the quantity of light obtained through the first flash light emitter 326 and the first color filter 328 is smaller than that obtained through the second flash light emitter 327 and the second color filter 329. Thus, the spectral power distribution of the strobe light detected by the CCD 311 as shown in FIG. 19C is obtained. That is, a strobe light whose color temperature is substantially identical to that of the external light is emitted.

The accumulation of the electric charges in the CCD 311 is carried out immediately before the first and second emission starting pulse signals P4 and P5 are issued. The duration P10 of the accumulation of the electric charges is sufficiently longer than the emission duration of the first and second flash light emitting tubes 326 and 327. In the illustrated embodiment, although the emission of the strobe light of the first and second flash light emitting tubes 326 and 327 begins at the same time, it is possible to independently commence and stop the emission of the strobe light of the first and second flash light emitting tubes 326 and 327 within the duration P10 of the accumulation of the electric charges.

FIGS. 21 through 27 show examples of a strobe light emitter according to the present invention.

In a first example shown in FIG. 21, there are first and second flash light emitting tubes 326 and 327 which horizontally extend within a reflecting mirror 330 having a parabolic section. The first flash light emitting tube 326 is located above the second flash light emitting tube 327. Plate-like first and second color filters 328 and 329 are provided in front of the respective first and second flash light emitting tubes 326 and 327.

In a second example shown in FIG. 22, the first and second color filters 328 and 329 are in the form of a tube, so that the first and second flash light emitting tubes 326 and 327 are fitted in the respective tubular color filters 328 and 329. The other construction of the second example is the same as the first example.

In a third example shown in FIG. 23, the first and second flash light emitting tubes 326 and 327 are located at the focal point of the parabolic reflecting mirror 330 and coaxially extend along the same axis. The first and second color filters 328 and 329 in the form of a plate are provided in front of the respective flash light emitting tubes 326 and 327.

In a fourth example shown in FIG. 24, the first and second flash light emitting tubes 326 and 327 are located at the focal point of the parabolic reflecting mirror 330 and coaxially extend along the same axis, similarly to the third example. The first and second color filters 328 and 329 are in the form of a tube, so that the first and second flash light emitting tubes 326 and 327 are fitted in the respective tubular color filters 328 and 329.

Figure 25:
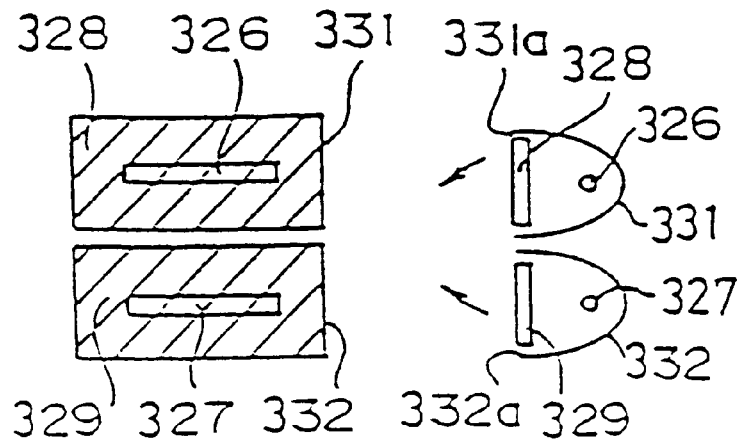

In a fifth example shown in FIG. 25, there are upper and lower parabolic reflecting mirrors 331 and 332. The first and second flash light emitting tubes 326 and 327 are located at the focal points of the upper and lower reflecting mirrors 331 and 332, respectively. The first and second color filters 328 and 329 each have the form of a plate and are provided in the openings 331a and 332a of the reflecting mirrors 331 and 332. The reflecting mirrors 331 and 332 are rotatable in the directions indicated by arrows, in which the color filters 328 and 329 are moved toward each other. Consequently, a uniform spectral power distribution of the strobe light can be obtained throughout the whole object to be taken.

Figure 26:
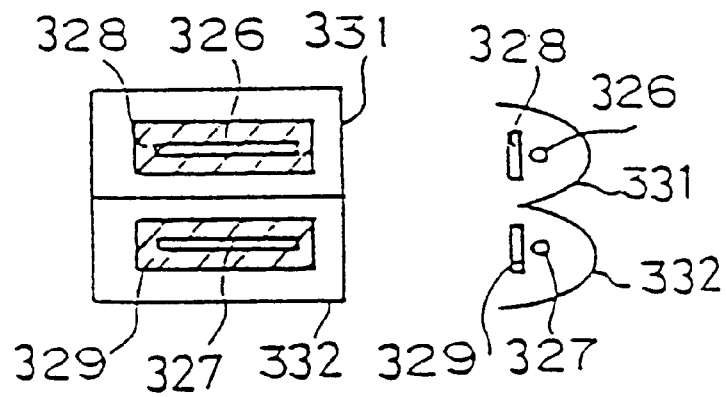

In a sixth example shown in FIG. 26, the upper and lower parabolic reflecting mirrors 331 and 332 are integrally formed. The first and second flash light emitting tubes 326 and 327 are located at the focal points of the upper and lower reflecting mirrors 331 and 332, respectively. The first and second color filters 328 and 329, each in the form of a plate are provided in front of the respective flash light emitting tubes 326 and 327.

Figure 27:
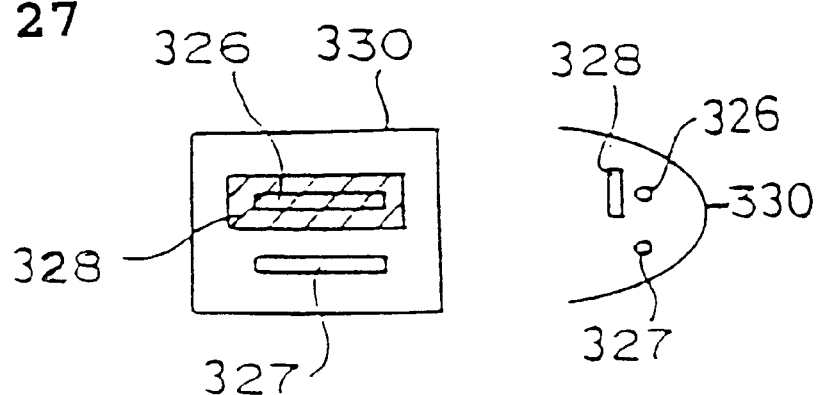

In a seventh example shown in FIG. 27, the first and second flash light emitting tubes 326 and 327 are provided within a single parabolic reflecting mirror 330. The first flash light emitting tube 326 is located above the second flash light emitting tube 327. The single color filter 328 in the form of a plate is provided in front of the first flash light emitting tube 326, and a color filter is not provided in front of the second flash light emitting tube 327. Namely, the arrangement shown in FIG. 27 is equivalent to an arrangement in which a filter having 100% transmittances for all colors of light is provided in front of the second flash light emitting tube 327.

Figure 28:
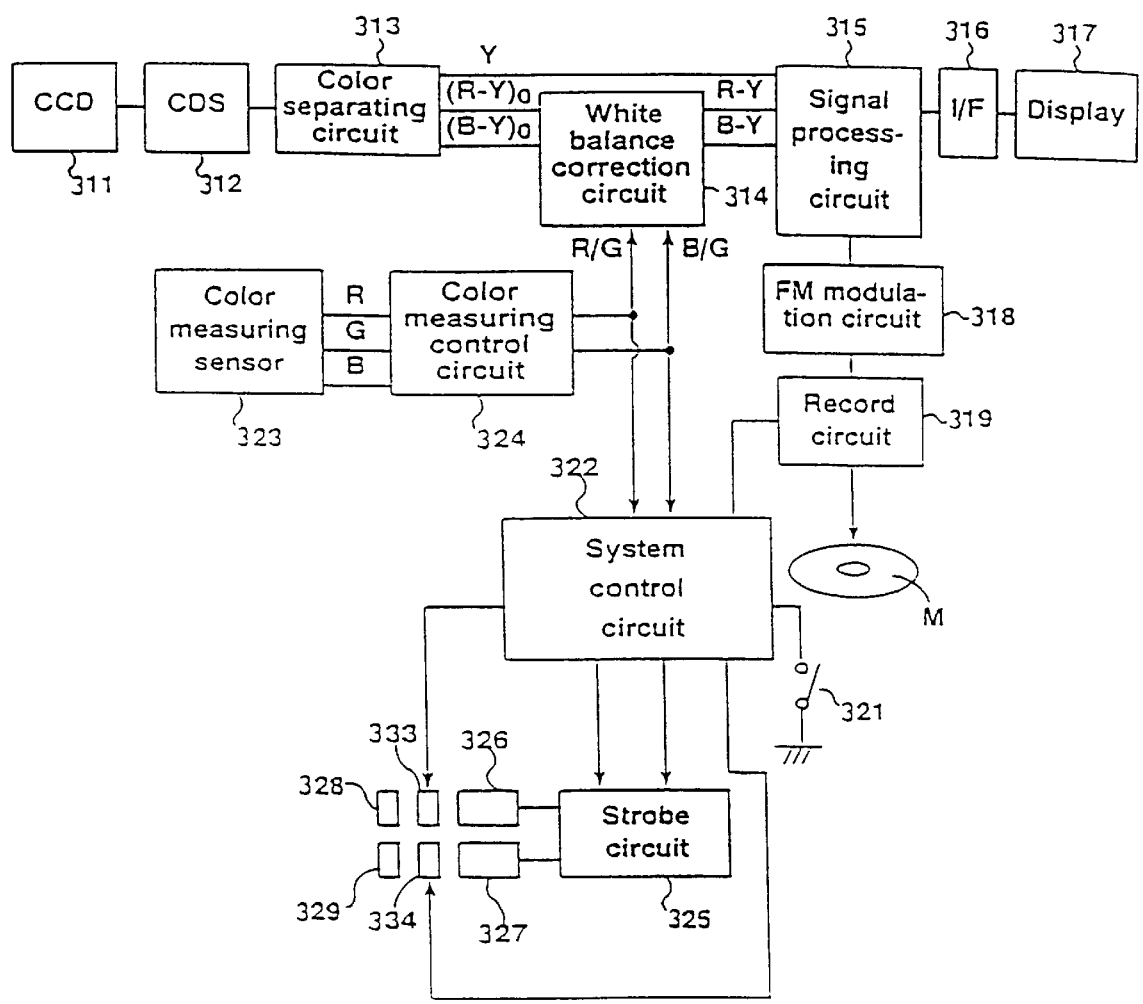
FIG. 28 is a third block circuit diagram of a still video-camera, to which the present invention is applied.

FIG. 28 shows a third block circuit diagram of a still video camera according to the present invention. In FIG. 28, the first and second liquid crystal filters 333 and 334 are provided between the first flash light emitting tube 326 and the first color filter 328 and between the second flash light emitting tube 327 and the second color filter 329 respectively. The liquid crystal filters 333 and 334 are controlled by the system controller 322 so as to vary the transmittance of light. In the illustrated embodiment, the first and second flash light emitting tubes 326 and 327 have the same light emission duration. The intensity of light passing through the color filters 328 and 329 can be varied by controlling the transmittance of the liquid crystal filters 333 and 334 to control the spectral power distribution of the strobe light.

Figure 29:
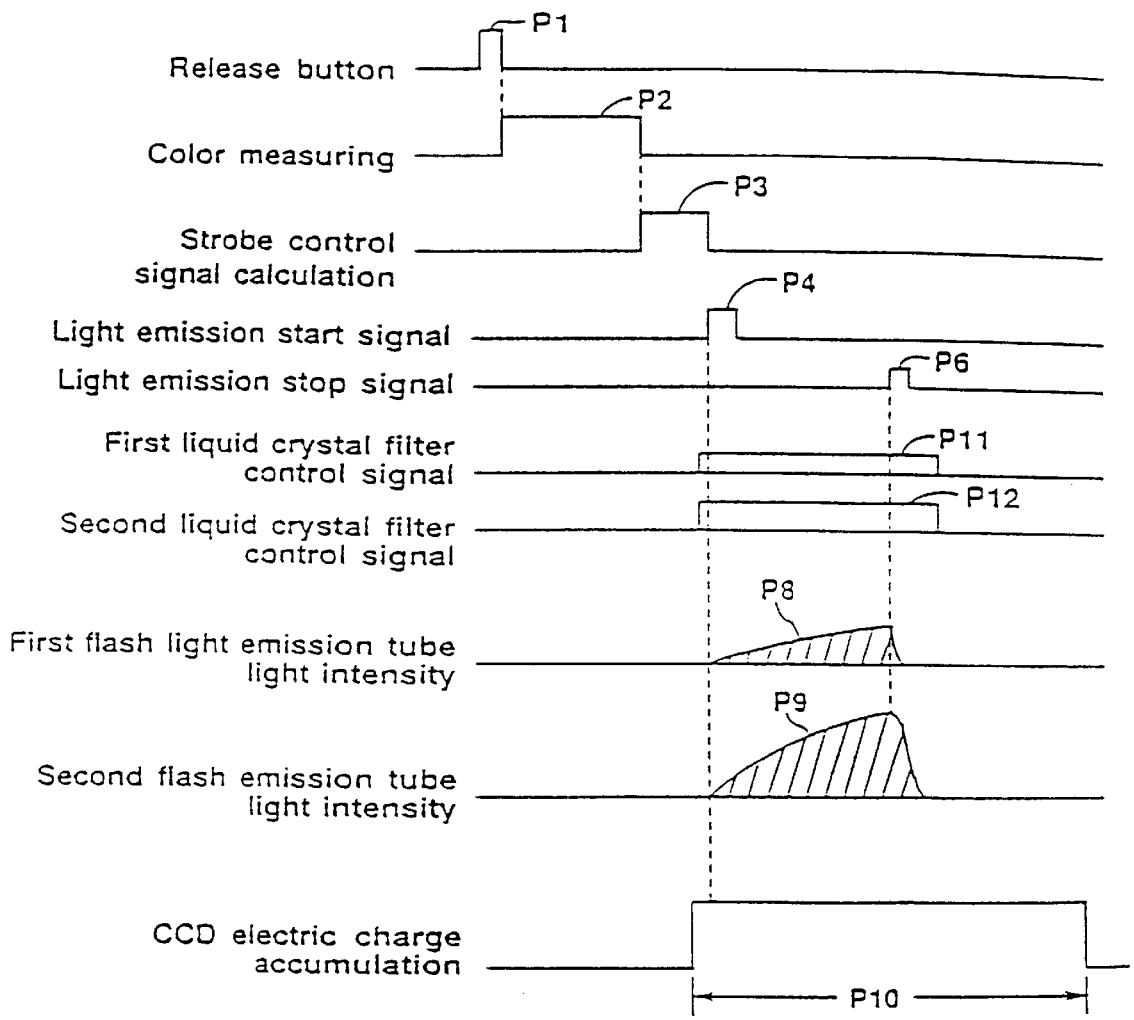
FIG. 29 is a timing chart of operations of a still video camera shown in FIG. 28.

FIG. 29 shows a timing chart of the photographing operation of the still video camera shown in FIG. 28.0 In FIG. 29, "P11" and "P12" designate the control signals of the first and second liquid crystal filters 333 and 334, respectively. As the amplitudes of the control signals increase, the transmittance of the liquid crystal filters 333 and 334 increase. In the illustrated embodiment, although the first and second flash light emitting tubes 326 and 327 simultaneously commence and stop the emission of the strobe light, it is possible to independently commence and stop the emission of the strobe light of the first and second flash light emitting tubes 326 and 327, as long as the emission durations thereof are identical.

As can be seen from the above discussion, it is possible to control the color temperature of the strobe light to be substantially identical to the color temperature of the external light. Consequently, the white balance adjustment can be executed throughout the whole picture to prevent the picture from being unnaturally tinted red or blue.

Furthermore, in the prior art, because the light from the strobe is designed to emit light with a color temperature equivalent to that of sunlight, if the strobe is used during photography, the color temperature is equivalent to sunlight even if another color temperature is desired or required. However, in the present invention, since the color temperature of the strobe light can be made to be identical to the color temperature of the external light, the strobe device properly functions to emit the fill-in light and accordingly, natural colors can be reproduced.

Although the quantity of the strobe light is controlled by the control of the emission duration of the flash light emitting tubes 326 and 327 or the transmittance of the liquid crystal filters 333 and 334 to vary the color temperature of the strobe light in the illustrated embodiments, it is also possible to vary the voltage to be applied to the flash light emitting tubes 326 and 327 to thereby control the color temperature of the strobe light. Furthermore, the xenon discharge tubes can be replaced with other discharge tubes containing gas other than xenon to obtain a different spectral power distribution.

Figure 30:
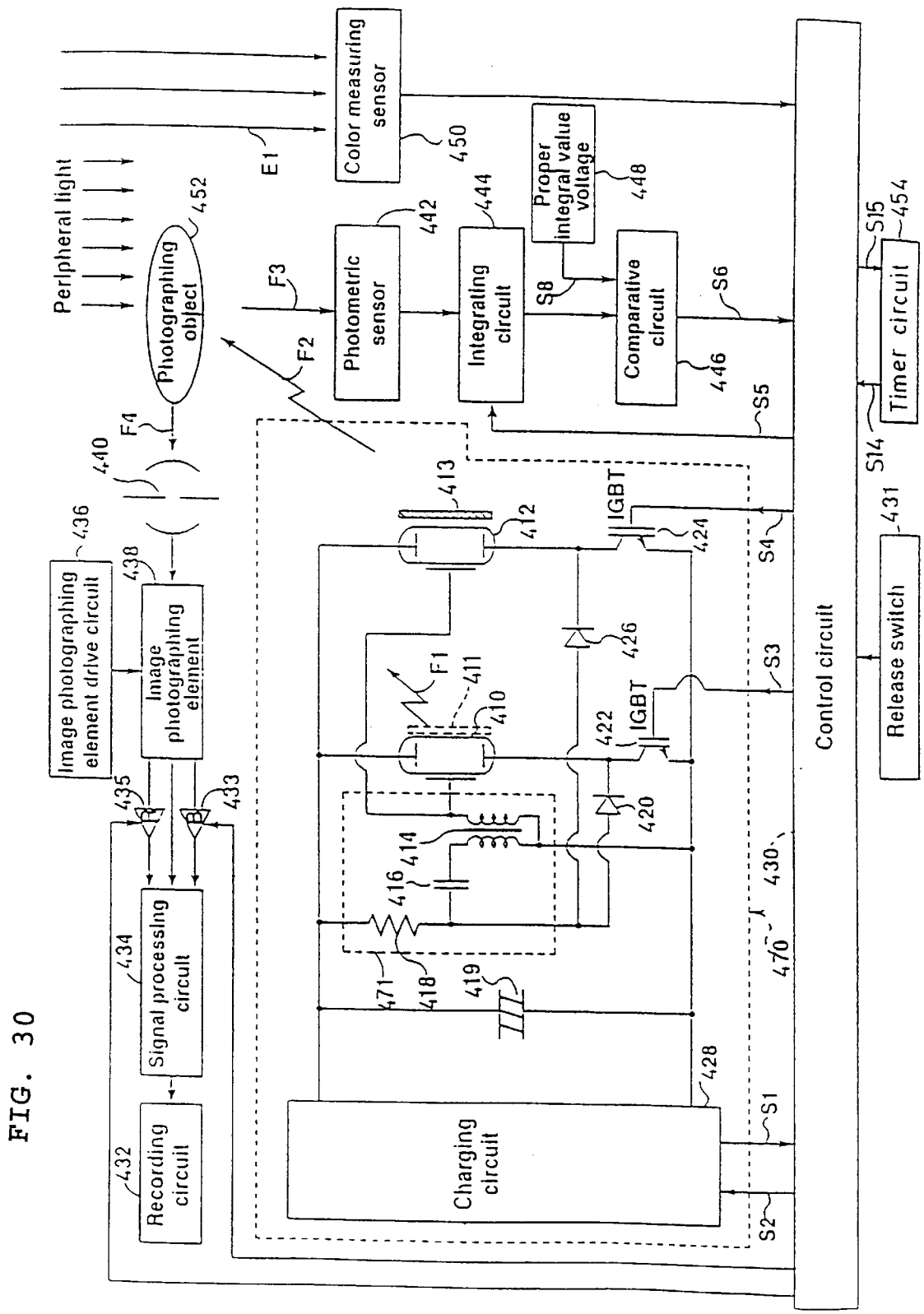
FIG. 30 is a fourth block circuit diagram of a still video camera, to which the present invention is applied.

FIG. 30 is a fourth block circuit diagram of a still video camera to which the present invention is applied. In this figure, to a solid state image photographing element (image pickup device) 438, for converting light reflected from an object 452 into an electric signal, is connected an amplifier 435 for amplifying an R signal of an image signal photoelectrically converted by the solid state image pickup element 438, an amplifier 433 for amplifying a B signal of the image signal, and a signal processing circuit 434 to which a G signal of the image signal is directly input as it is. Output terminals of the amplifiers 433 and 435 are connected to the signal processing circuit 434, where conversion from the image signal of the solid state image photographing element 438 to a predetermined image signal format is performed. The signal processing circuit 434 is connected to a recording circuit 432 in which the predetermined image signal format is magnetically recorded on a recording medium, such as a flexible disk, etc.

An image photographing element drive circuit 436 is connected to the solid state photographing element 438, so that the image signal is read from the solid state image photographing element 438 by shift pulses, etc., which are generated at the image photographing element drive circuit 436. A diaphragm 440 is provided in front of a light receiving surface of the solid state image photographing element 438 to control the quantity of light to be received by the solid state image photographing element 438 from the object 452.

In the still video camera are provided a photometric sensor 442 comprising a photoelectric transducer element, such as a photodiode, for receiving light F3 reflected from the object 452 and for photoelectrically converting the light; and a color measuring sensor 450 comprising a plurality of photoelectric transducer elements of differing spectral sensitivities (for example, R, G and B) of visible light. The brightness of the object 452 is measured by the photometric sensor 442, and the color temperature of the peripheral light (ambient light) E1 around the object 452 is measured by the color measuring sensor 450, respectively.

The photometric sensor 442 is connected to an integrating circuit 444 which is connected to a control circuit 430. The signal photoelectrically converted by the photometric sensor 442 is integrated in the integrating circuit 444, upon receipt of an integration commencement signal S5 output from the control circuit 430. The integrating circuit 444 is also connected to a comparative circuit 446, in which a voltage value input thereto from a voltage output circuit 448 connected to the comparative circuit 446 to output a voltage corresponding to an optimum integration value, is compared with a voltage of a signal obtained by integrating a photoelectrically converted signal of the photometric sensor 442 inputted from the integrating circuit 444.

The comparative circuit 446 and the color measuring sensor 450 are connected to the control circuit 430. The comparison results by the comparative circuit 446 are inputted to the control circuit 430 as a quenching signal S6. Color temperature data, measured by the color measuring sensor 450, is inputted to the control circuit 430. To the control circuit 430 are connected a strobe light emission system 470 having xenon tubes 410 and 412, and a release switch 431 provided in the body of the still video camera, so that the control circuit 430 controls the commencement and cessation of the emission of the xenon tubes 410 and 412, according to the operation of the release switch 431. Light F1 and F2 emitted by the xenon tubes 410 and 412, respectively, is irradiated toward the object 452.

The light emission apparatus 470 includes a main condenser 419 for accumulating electric charges necessary to flash the strobe light via the xenon tubes 410 and 412, a charging circuit 428 for accumulating electric charges in the main condenser 419, a trigger circuit 471 for generating trigger signals for allowing the xenon tubes 410 and 412 to commence flashing, insulating gate bipolar transistors (hereinafter referred to as IGBT) 422 and 424 which constitute a switching means for determining whether or not the xenon tubes 410 and 412 should emit the strobe light, and diodes 420 and 426 for allowing these IGBTs 422 and 424 to operate separately and independently as a switching means.

When an electric charge commencement signal S2 is inputted to the charging circuit 428 from the control circuit 430, a predetermined quantity of electric charges is accumulated in the main condenser 419, and upon completion of the charge accumulation, an electric charge completion signal S1 is outputted to the control circuit 430 from the charging circuit 428 to inform the same of the completion of the electric charge accumulation. The base terminals of each of the IGBTs 422 and 424 are connected to the control circuit 430, so that the commencement and cease of the emission by the xenon tubes 410 and 412 are controlled by the control circuit 430 in accordance with emission trigger signals S3 and S4 outputted from the control circuit 430.

The trigger circuit 471 is comprised of a trigger condenser 416, a trigger transformer 414, and a resistor 418. A filter 413 is located in front of the xenon tube 412, so that the color temperature of the flashlight emitted from the xenon tube 412 is lowered by the filter 413.

Figure 31:
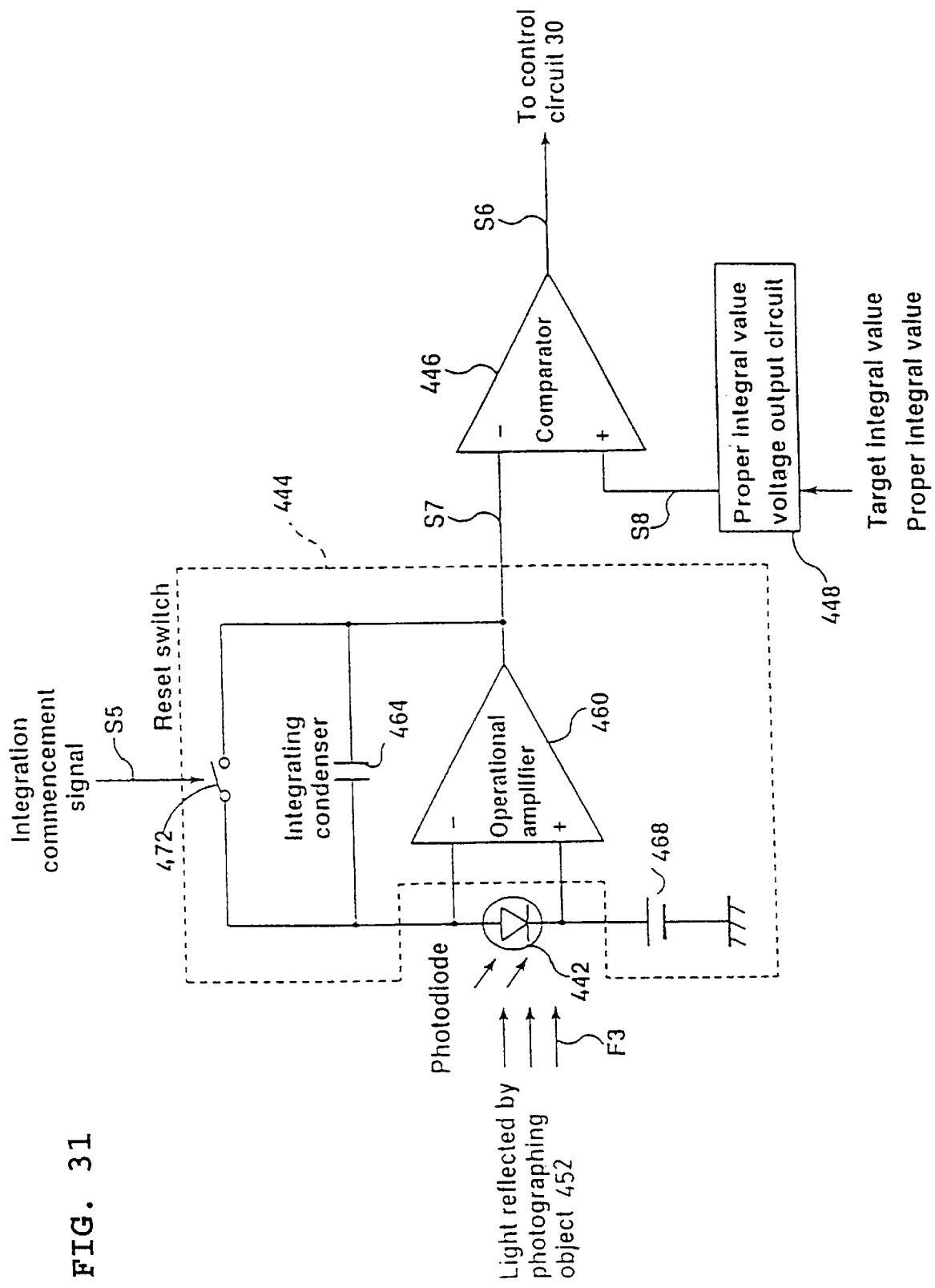
FIG. 31 is a block diagram of a photometering sensor, an integral circuit, and a comparing circuit.

FIG. 31 shows a connection of the photometric sensor 442, the integrating circuit 444, the comparative circuit 446, and the proper integration value voltage output circuit 448. As shown in this drawing, the photometric sensor 442 is connected between an inverted signal input terminal and a non-inverted signal input terminal (non-inversion input terminal) of an operational amplifier 460 in the integration circuit 444. A reference voltage power source 468 which provides a reference voltage value before the integration is commenced is connected to the non-inversion input terminal of the operational amplifier 460.

Note that in this embodiment, when the photo-diode 442 receives the light F3 (commencement of integration), the voltage of signal S7 is decreased. An integrating condenser 464 and a reset switch 472 are connected in parallel between the inverted signal input terminal and output terminal of the operational amplifier 460. The opening and closing of contacts of the reset switch 472 are controlled by an integration commencement (initiating) signal S5 which is inputted thereto from the control circuit 430. When the contacts of the reset switch 472 are opened, the operational amplifier 460 commences the integration. The output terminal of the operational amplifier 460 is connected to the inverted signal input terminal of the comparative circuit 446, where the voltage value S8 from the proper integration value voltage output circuit 448 connected to the non-inversion input terminal of the comparative circuit 446 is compared with the voltage of the output signal S7 of the operational amplifier 460. If the voltage of the output signal S7 is lower than the voltage value S8, the quenching signal S6 is inputted to the control circuit 430 from the comparative circuit 446.

The operation of the strobe emission apparatus of the invention will be described below.

Figure 32:
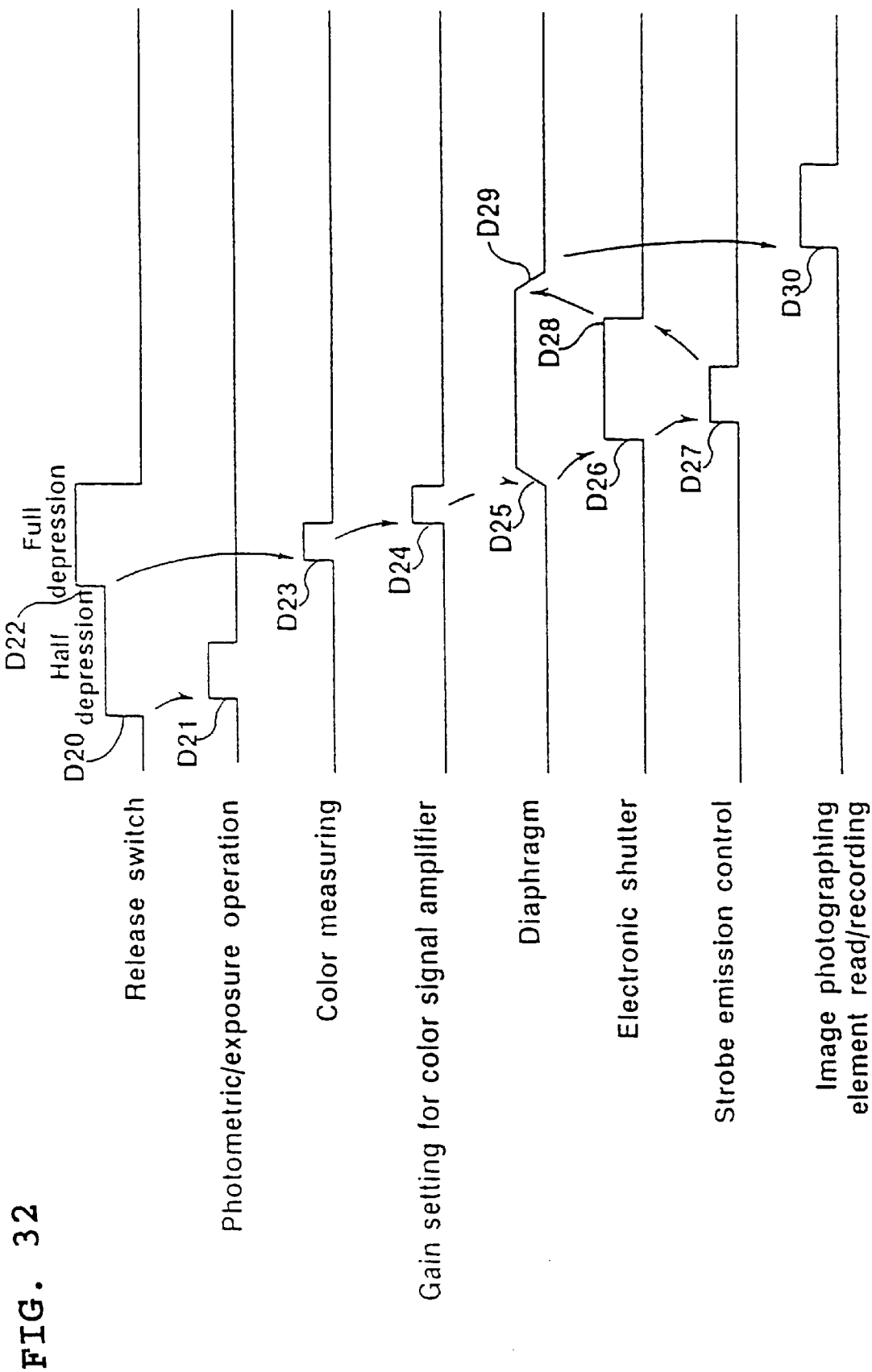
FIG. 32 is a timing chart of sequential operations of a still video camera shown in FIG. 30.

FIG. 32 shows a control sequence of the entire photographing operation of a still video camera of the invention. In FIG. 32, when the release switch is half depressed by an operator (step D20), the luminance of the object 452 is measured by the control circuit 430, using a photometric sensor (not shown) separate from the photometric sensor 442.

An exposure calculating operation is carried out in the control circuit 430 according to the luminance measurement of the object 452 detected by the photometric sensor (not shown) to determine the operating time of an electronic shutter of the solid state image pickup device 438 and whether or not the light emitter 470 emits light (step D21).

When the release switch 431 is fully depressed (step D22), the color temperature of the light surrounding the object 452 is measured by the color measuring sensor 450. As mentioned above, the color measuring sensor 450 comprises at least two photoelectric transducer elements having differing spectral sensitivity characteristics within a visible light range. Consequently, the color temperature of the peripheral light E1 of the object 452 is calculated by the control circuit 430, utilizing a reverse proportional relationship between the logarithm of a ratio of the output signals of the photoelectric transducer elements having differing spectral sensitivities and the color temperature (step D23).

Gains of the amplifiers 433 and 435 are set by the control circuit 430, based on the color temperature data thus obtained (step D24). This is for the white balance adjustment of the image signals to be recorded, according to the measured color temperature of the peripheral light E1 around the object 452.

Following the measurement of the color temperature, the degree of opening (aperture) of the diaphragm 440 located in front of the solid state image pickup element 438 is controlled by the control circuit 430 according to the photometric measurements obtained in step D21 to control the quantity of light F4 to be incident on the solid state image pickup element 438 from the object 452 (step D25). In addition, the electric charge accumulation time, i.e. the shutter time, of the photoelectric conversion signals in the solid state image pickup element 438 is determined, based on the photometric results, and the accumulation of electric charges is commenced (step D26).

As soon as the accumulation of the signal electric charges at step D26 is commenced, the strobe light emission control which will be described hereinafter is commenced according to the photometric results, if the strobe light emission by the light emitter 470 is necessary (step D27). When the strobe light emission control (i.e., strobe light emission) is completed, shift pulses are outputted from the image photographing element drive circuit 436 to the solid state image photographing element 438 under control of the control circuit 430. Consequently, the electric charge accumulation of the solid state image photographing element 438 is stopped in response to the shift pulses issued from the image photographing element drive circuit 436 (step D28), and the diaphragm 440 is closed (step D29). Thereafter, signal electric charge readout control signals, such as transfer pulses are outputted from the image photographing element drive circuit 436 to the solid state image pickup element 438, and the signal charges accumulated in the solid state image photographing element 438 are sequentially read out and outputted to the amplifiers 433 and 435 and the signal processing circuit 434 as image signals (step D30).

The image signals outputted from the solid state image pickup element 438 are converted to a predetermined image signal format in the signal processing circuit 434 and then, recorded on a recording medium, not shown, by the recording circuit 432.

Figure 33:
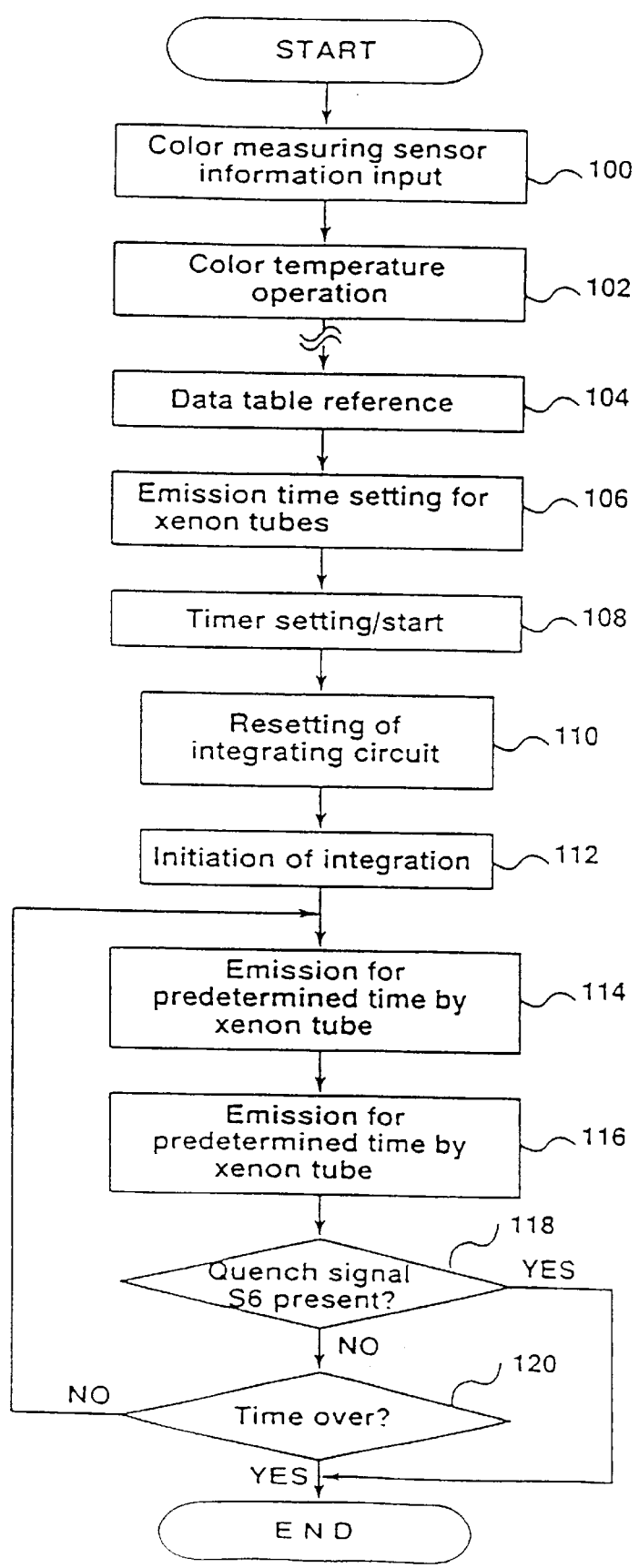
FIG. 33 is a flow chart of sequential operations of a still video camera shown in FIG. 30.

FIG. 33 shows a flow chart of the strobe light emission control of the light emitter 470, based on the color data measured in step D23. In the drawing, a logarithm converted signal of a ratio of the output signals of at least two photoelectric transducer elements is first inputted to the control circuit 430 from the color measuring sensor 450 (step 100). The control circuit 430 calculates the color temperature of the peripheral light E1, based on the value of the logarithm-converted signal inputted thereto from the color measuring sensor 450 (step 102).

After the calculation in step 102 is completed, the gain adjustment, i.e., the white balance control (step D24 above), of the amplifiers 433 and 435 is carried out. Furthermore, based on the color temperature information of the peripheral light E1 measured at step 102, a data table which has been preset and prerecorded is referred to in order to determine a ratio of very short emission durations of the xenon tubes 410 and 412 so as to obtain a color temperature approximate to the color temperature of the peripheral light E1 (step 104).

Thereafter, the ratio of the emission durations of the xenon tubes 410 and 412 is set with reference to the data table by the control circuit 430 (step 106), and at the same time, a timer circuit 454, is set and time measurement is commenced in order to measure a time width synchronous with the release time of the electronic shutter (step 108). Time signals outputted from the timer circuit enable the operations to be carried out at step 120, which will be described later.

The color temperature of the strobe light emitted from the xenon tube 412 is restricted to a low value by the filter 413 provided in front of the xenon tube 412. However, a filter is not provided for the xenon tube 410, thus resulting in a higher color temperature than the xenon tube 412. Hence, the ratio of the emission durations of the xenon tube 410 and 412 is adjusted so that the color temperature of the resultant light of the light F1 and the light F2, to be irradiated onto the object 452 by the xenon tubes 410 and 412, i.e, the color temperature of the light emitter 470, becomes substantially identical to the color temperature of the peripheral light E1 of the object 452.

In this embodiment, only when the ambient color temperature, for instance, in an indoor setting is lower than the color temperature of the xenon tube 410, is adjustment of the emitted color temperature important. In view of this, and in order to reduce costs, a high-color temperature filter 411 is not provided. However, a high-color temperature filter can be provided.

Figure 34:
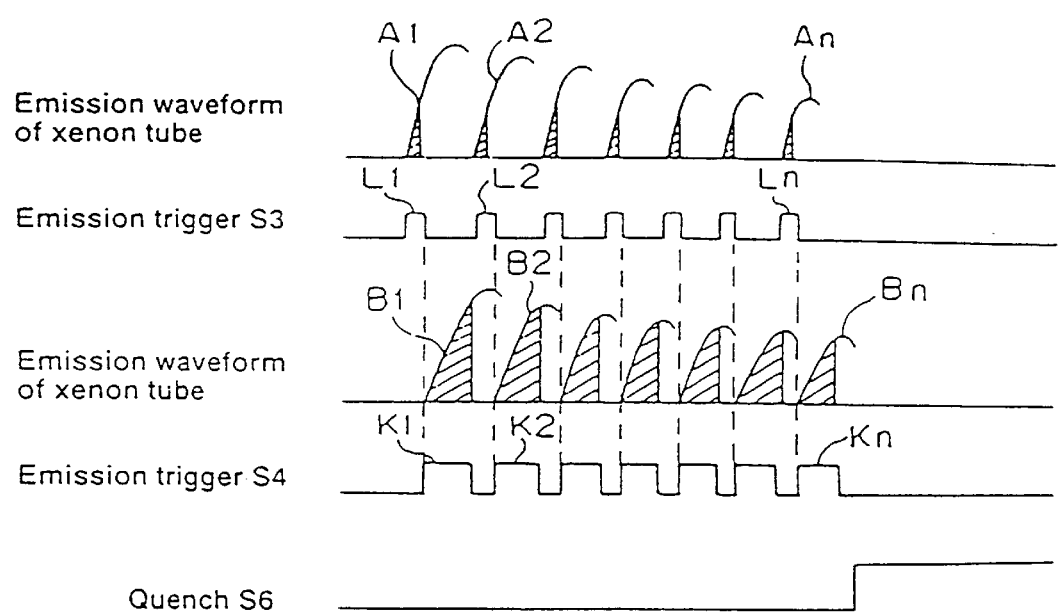
FIG. 34 is a diagram of waveforms of an electric current of xenon discharge tubes with respect to trigger signals in a still video camera shown in FIG. 30.

As the electric charges for the emission by the two xenon tubes are supplied by the single main condenser 419, if the emission time of any one of the xenon tubes is too long, there is an increased consumption of the electric charges necessary for the emission of the other xenon tube, resulting in an imbalance of the color temperature of the resultant overall combined light by the xenon tubes 410 and 412. To prevent this, as shown in FIG. 34, the xenon tubes 410 and 412 intermittently and repeatedly emit the strobe lights at very short intervals.

After a main power switch (not shown) is turned on, or after the photographing using the strobe is completed, a charge commencement signal S2 is outputted from the control circuit 430 to the charging circuit 428, thereby to commence the accumulation of the electric charges in the main condenser 419. If the electric charge completion signal S1 has not been outputted from the charging circuit 428 when the release switch 431 is fully depressed, the control does not proceed until the electric charge completion signal S1 is outputted. Upon receipt of the electric charge completion signal S1, the outputting of the electric charge commencement signal S2 is stopped, and then, the control proceeds to step D23 (step 100).

At the same time as the setting of the timer circuit at step 108, the integrating circuit 444 is reset (the contacts of the reset switch 472 are once closed) by the control circuit 430, and the contacts of the reset switch 472 of the integrating circuit 444 are opened in accordance with the integration commencement signal S5, so that the photoelectric converted signals of the photometric sensor 442 are integrated by the integrating circuit 444 (step 112). This is intended to monitor whether or not the light F3 emitted by the emitter 470 and reflected from the object 452 has reached a predetermined quantity corresponding to an optimal exposure value.

In this embodiment, a voltage value S8 outputted from the proper integration value voltage output circuit 448 is a fixed value, and if the object 452 is judged to be dark below a certain level, based on the result of the brightness/exposure calculation for the photographing object 452 at step D21, the strobe light must be emitted from the emitter 470. If the quantity of light F3 reflected from the object 452 reaches a predetermined value, the light emission of the whole light emitter 470 is forcibly stopped.

Upon commencement of the integration of the photoelectrically converted signals by the integrating circuit 444 (step 112), the xenon tube 410 begins emitting the strobe light. The commencement of the light emission by the xenon tube 410 is in response to the issuance of light emission trigger signal S3 from the control circuit 430 to the IGBT 422.

In other words, the IGBT 422 is turned ON by the light emission trigger signal S3, so that the electric charges accumulated in the trigger condenser 416 are discharged via the diode 420 and the IGBT 422. This enables an electric current to flow in a low voltage coil of the trigger transformer 414, and with this electric current, an induced current flows in a high voltage coil of the trigger transformer 414, thereby causing high voltage to be applied to the trigger electrode of the xenon tube 410. Application of the high voltage to the trigger electrode of the xenon tube 410 ionizes the gas contained in the xenon tube 410, which will be discharged to emit the flash light.

If the output of the light emission trigger signal S3 is stopped after the lapse of a very short time set at step 106 from the commencement of flashing by the xenon tube 410 in response to the light emission trigger signal S3, the IGBT 422 is turned OFF to stop the current flow passing in the xenon tube 410, thereby to stop the light emission of the xenon tube 410 (step 114). Namely, the light emission by the xenon tube 410 continues only for a very short space of time set at step 106.

The short-time light emission control of the xenon tube 412 is carried out in the same way as in step 114 after the lapse of time necessary to accumulate the electric charges at the trigger condenser 416 and after the emission by the xenon tube 410 is stopped (step 116). Namely, the trigger signal S4 is outputted from the control circuit 430 to the IGBT 424 to turn the IGBT 424 ON. When the IGBT 424 is turned ON, a high voltage signal generated by the trigger circuit 471 is applied to the trigger electrode of the xenon tube 412 to commence the light emission. The output of the light emission trigger signal S4 is stopped to stop the emission of the strobe light by the xenon tube 412 after the lapse of time of emission set at step 106 from the commencement of light emission by the xenon tube 412.

By the time that the light emission of the xenon tubes 410 and 412 has executed for only a very short space of time, it is judged whether or not a quenching signal S6 has been inputted from the comparative circuit 446 (step 118). In other words, whether or not the light F3 reflected from the object 452 has reached a predetermined quantity is checked. If a quenching signal S6 is not inputted ("NO" at step 118), whether or not the time, synchronized with the electronic shutter speed determined in steps D26 to D28 is over is checked in accordance with the counting result of time in the timer circuit (step 120).

If the answer is "NO" at step 120, i.e, the time synchronized with the electronic shutter is not over, the control is returned to step 114 to effect again the light emission for a very short period of time by the xenon tubes 410 and 412. If the answer is "YES" at step 118, i.e. a quenching signal S6 is inputted to the control circuit 430 or the answer is "YES" at step 120, i.e. the time is over, light emission by both the xenon tubes 410 and 412 is no longer carried out.

FIG. 34 shows waveforms of a current flowing through the xenon tubes 410 and 412 which intermittently emit the strobe light for a very short period of time at steps 114 to 120, and the light emission trigger signals S3 and S4 and a quench signal S6. As shown in FIG. 34, in a loop of step 114 to 120 a light emission trigger signal S3 consisting of pulses L1 to Ln and a light emission trigger signal S4 consisting of pulses K1 to Kn are outputted intermittently and alternately from the control circuit 430 to the IGBTs 422 and 424, respectively. As a result, waveforms A1 to An of electric current and waveforms B1 to Bn of electric current flow in the xenon tubes 410 and 412, respectively, so that the strobe light is emitted from the light emitter 470 towards the object 452.

The time width of the waveforms A1 to An, i.e., the pulse width of the light emission trigger signal S3, and the time width of the waveforms B1 to Bn, i.e. the pulse width of the light emission trigger signal S4, are identical to the time widths determined by setting the emission durations of the xenon tubes 410 and 412, respectively in step 106.

Figure 35:
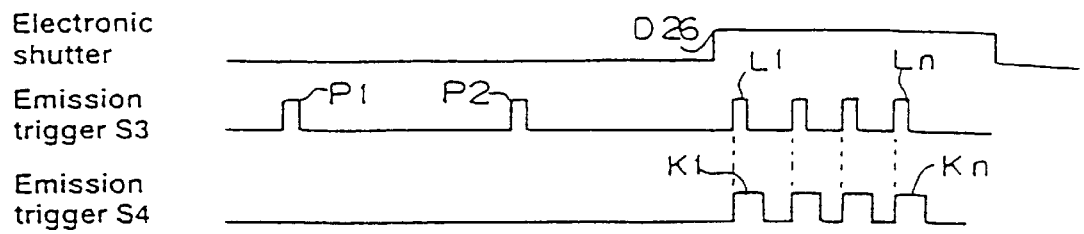
FIGS. 35, 36 and 37 are timing charts of light emission of xenon discharge tubes in a still video camera shown in FIG. 30.
Figure 36:
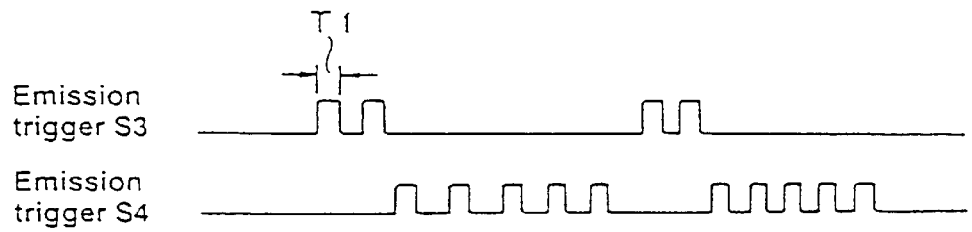
Figure 37:
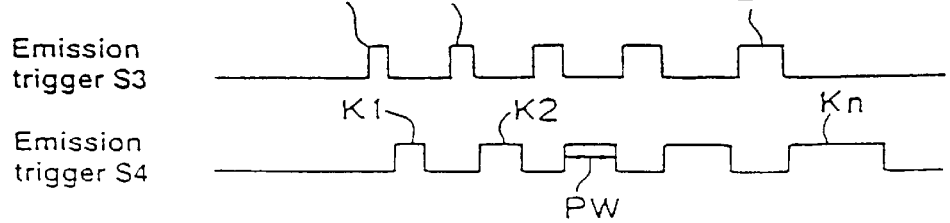

FIGS. 35, 36, and 37 show applied examples of the light emission control method of the xenon tubes 410 and 412 by the control loop consisting of steps 114 to 120 shown in FIG. 33. FIG. 35 shows an example where the light emission by the xenon tube 410 is carried out before the photographing operation and the simultaneous emission of strobe light by xenon tube 410 and 412 to prevent the red-eye phenomenon. Namely, to prevent the red-eye phenomenon in which light is reflected off the back of the eyes, the light emission trigger signal S3 consisting of the pulses P1 and P2 are issued prior to the emission of the strobe light.

FIG. 36 shows an example where the color temperature control of the lights F1 and F2 emitted from the light emitter 470 towards the object 452 is performed in such a way that the time widths of the light emission time Ti of the xenon tubes 410 and 412 are all identical, and there is a difference in the number (occurrence) of the light emission trigger pulses between the xenon tubes. Namely, the color temperature and the quantity of the whole strobe light irradiated onto the object 452 are controlled by increasing the number of the intermittent emissions of the xenon tube 412 which emits the strobe light having a lower color temperature than the xenon tube 410. Consequently, the same effect as the light emission control shown in the FIG. 34 can be obtained in the arrangement shown in FIG. 36.

FIG. 37 shows an example where the pulse widths of the light emission trigger signals S3 and S4 are gradually increased with the time elapsed. The accumulated electric charges of the main condenser 419 are gradually consumed when the flashes of lights are emitted from the xenon tubes 410 and 412. Therefore, the charged voltage of the main condenser 419 is gradually reduced by the repeated light emission of the xenon tubes. Nevertheless, the xenon tubes 410 and 412 can emit predetermined quantities of flash light at the reduced voltage, if the pulse widths of the trigger signals S3 and S4 are increased as mentioned above. Namely, the pulse widths are L1<L2< . . . <Ln, K2 . . . <Kn, and L1/K1=L2/K2= . . . Ln/Kn.

Thus, light having a color temperature nearly the same as that of the peripheral light E1 can be projected constantly on the object 452 during the light emission by the xenon tubes 410 and 412 by the adjustment of the light emission time ratios of the xenon tubes 410 and 412 which intermittently emit the strobe light for a very short period of time. In the case where the object 452 requires a greater quantity of light by the xenon tubes 410 and 412, if the light emission time of one of the xenon tubes is too long, a large quantity of electric charges of the main condenser 419 is consumed and the quantity of the electric charges left in the main condenser 419 might be too small to flash the other xenon tube, thus resulting in a failure to control the color temperature of the strobe light. This does not however occur in the arrangement shown in FIG. 37.

Figure 38:
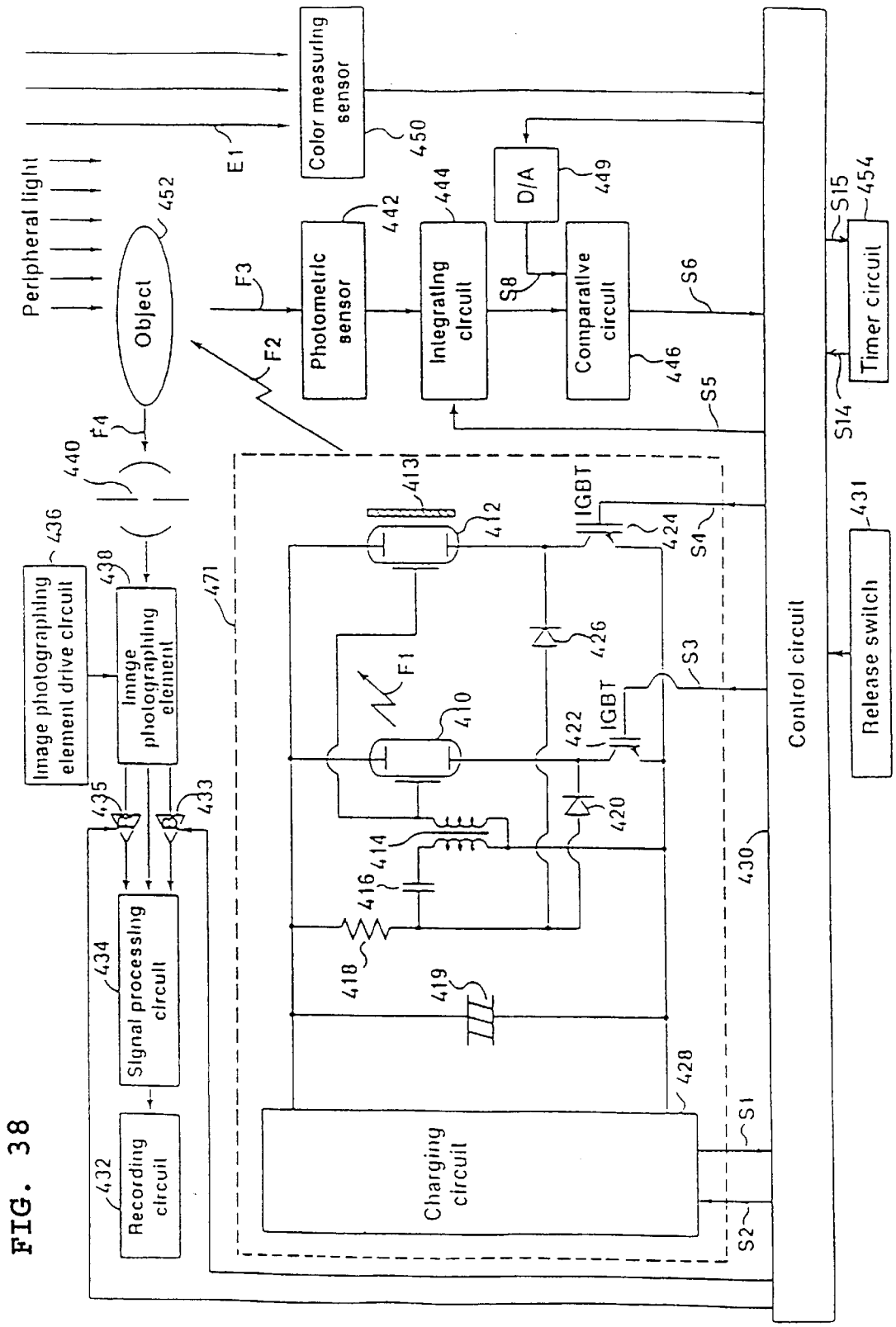
FIG. 38 is a fifth block circuit diagram of a still video camera, to which the present invention is applied.

FIG. 38 shows a fifth block circuit diagram of a strobe emitter of the present invention.

The difference of the arrangement shown in FIG. 38 from that shown in FIG. 30 resides in that the proper integration value voltage output circuit 448 in FIG. 30 is replaced by a D/A convertor 449. The replacement makes it possible to vary the voltage value S8 to be compared with the output signal S7 of the integrating circuit 444 by the comparator circuit 446. The D/A convertor 449 converts digital data inputted from the control circuit 430 to analog values to be outputted to the comparative circuit 446 as a voltage value S8.

The operation of the embodiment shown in FIG. 38 is as follows according to FIGS. 39 and 40 which are flow charts of the operation of the embodiment. The main feature of the embodiment is that the quantity of the light F3 reflected from the object 452 into a still video camera is integrated and measured, based on the light irradiated onto the object 452 by the xenon tubes 410 and 412, to adjust the light emission duration of the xenon tubes 410 and 412.

Figure 39:
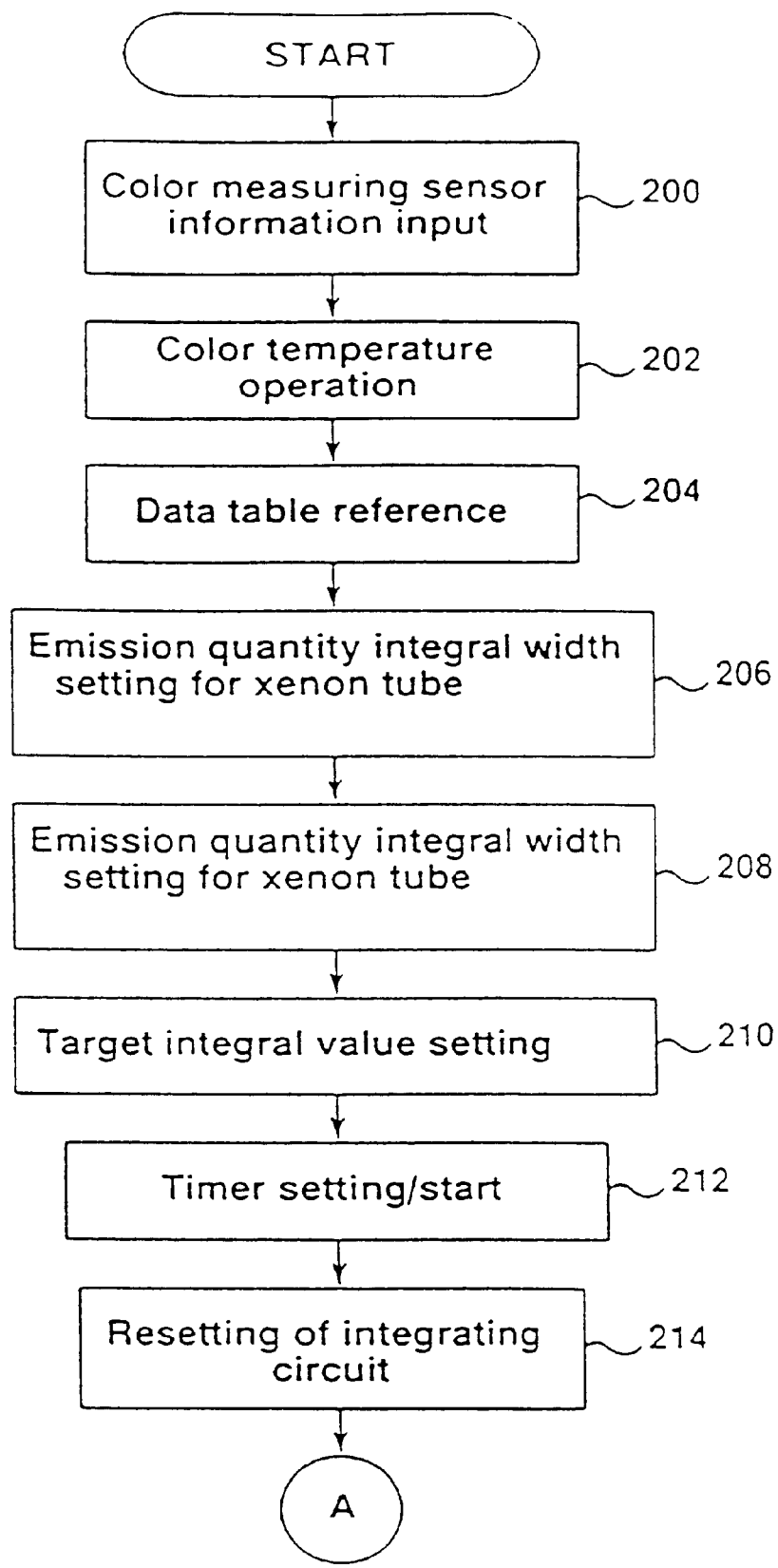
FIGS. 39 and 40 are flow charts of sequential operations of a still video camera shown in FIG. 38.
Figure 40:
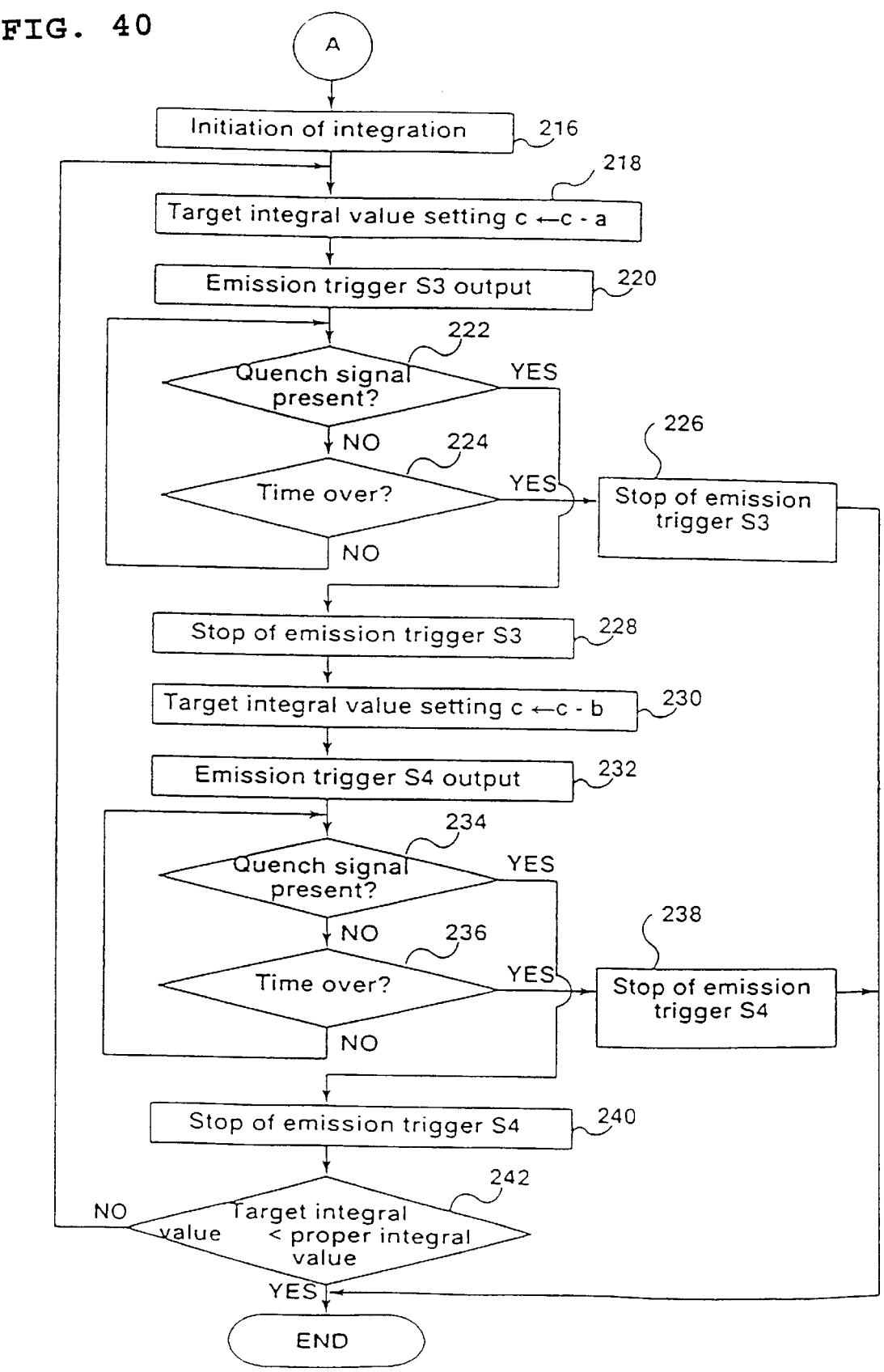

In FIG. 39, at steps 200 to 204, the color temperature is measured and calculated by the color measuring sensor 450, and with reference to the data table, integrated widths (a) and (b) of the quantity of light to be emitted are set to determine the emission duration of the xenon tubes 410 and 412, based on the color temperature of the peripheral light E1 (steps 206 and 208).

In other words, while the xenon tubes 410 and 412 continuously repeat the emission and the cessation of emission, the integration widths (a) and (b) of the quantity of light to be emitted are set in order to determine the emission duration of each xenon tube, so that the color temperature of the entire light to be irradiated onto the object 452 by one emission of the xenon tubes 410 and 412 becomes nearly the same as the color temperature of the peripheral light E1.

Furthermore, the target integral value (c) is set (step 210). The target integral value (c) at step 210 corresponds to an output voltage value of the operational amplifier 460 before the integration by the integrating circuit 444 is commenced and is nearly equal to a voltage value of the reference voltage power supply 468 (see FIG. 31).

Thereafter, at steps 212 to 216, the timer circuit provided in the control circuit 430 is set; the integrating circuit 444 is reset; the integration commencement signal S5 is outputted to the integrating circuit 444; and the measurement of the total quantity of the light F3 reflected from the object 452 is commenced (step 216).

A new target integral value (c) is set in the D/A convertor 449 by subtracting the integration width (a) set at step 206 from the target integrating value (c) set at step 210 (Step 218). If the output voltage of the operational amplifier 460 is smaller than the voltage value S8 corresponding to the new target integral value (c) outputted by the D/A convertor 449, a quenching signal S6 is inputted from the comparative circuit 446 to the control circuit 430.

At the same time as the setting of the new target integral value (C) at step 218, the light emission trigger signal S3 is outputted from the control circuit 430 to the xenon tube 410 to commence the light emission of the xenon tube 410 (step 220). Thereafter, whether or not the quenching signal S6 has been inputted from the comparative circuit 446 is checked (step 222). Furthermore, the timer circuit checks whether or not the light emission time of the light emitter 470 exceeds the time synchronized with the electronic shutter (step 224).

If the time is over at step 224, the output of the light emission trigger signal S3 is stopped to stop the light emission of the xenon tube 410 (step 226). Thereafter, the control of the light emission of the whole emitter 470 is completed. Namely, the strobe light emission is completed when the emission duration exceeds the time synchronized with the release time of the electronic shutter.

Conversely, if the time is not over at step 224, and the input of the quenching signal S6 is detected at step 222, the output of the light emission trigger signal S3 is stopped to stop the light emission of the xenon tube 410 only without stopping the light emission by the light emitter 470 as a whole (step 228).

Next, a new target integral value (c) is set in the D/A convertor 449 by subtracting the integral width (b) set at step 208 from the target integral value (c) set at step 218 (step 230). After that the light emission trigger signal S4 is outputted to the IGBT 424 to commence the light emission of the xenon tube 412 (step 232).

Similarly to steps 222 and 224, whether or not the quenching signal S6 is inputted from the comparative circuit 446, based on the newly set target integral value (c) and whether or not the time set in the timer circuit is over are checked(steps 234 and 236). If the time of the timer circuit is over, the output of the light emission trigger signal S4 is stopped to stop the light emission of the light emitter 470 as a whole(step 238).

If the time is not over, but the quenching signal S6 is inputted to the control circuit 430, the outputting of the light emission trigger signal S4 is stopped to stop the light emission of the xenon tube 412 (step 240). Next, whether or not the new target integral value (c), set at step 230, is below the optimum integral value which is determined in accordance with the sensitivity of the solid state pickup element 438 and the brightness of the photographing lens system, etc., is checked (step 242). In other words, it is judged whether or not the total quantity of the light reflected from the object 452 has reached a predetermined value as a result of the continuous light emission by the xenon tubes 410 and 412, so that the quantity of light received by the solid state image pickup element 438 has become an optimal exposure value.

If the target integral value (c) is still greater than the optimum integral value ("NO" at step 242), the control is returned to step 218 where the integral widths (a) and (b) are repeatedly subtracted from the target integral value (c), and the new target integral value (c) is set in the D/A convertor 449. Thereafter, the light emission and the cessation of emission by the xenon tubes 410 and 412 are repeated according to the new target integral value (c) thus obtained.

Figure 41:
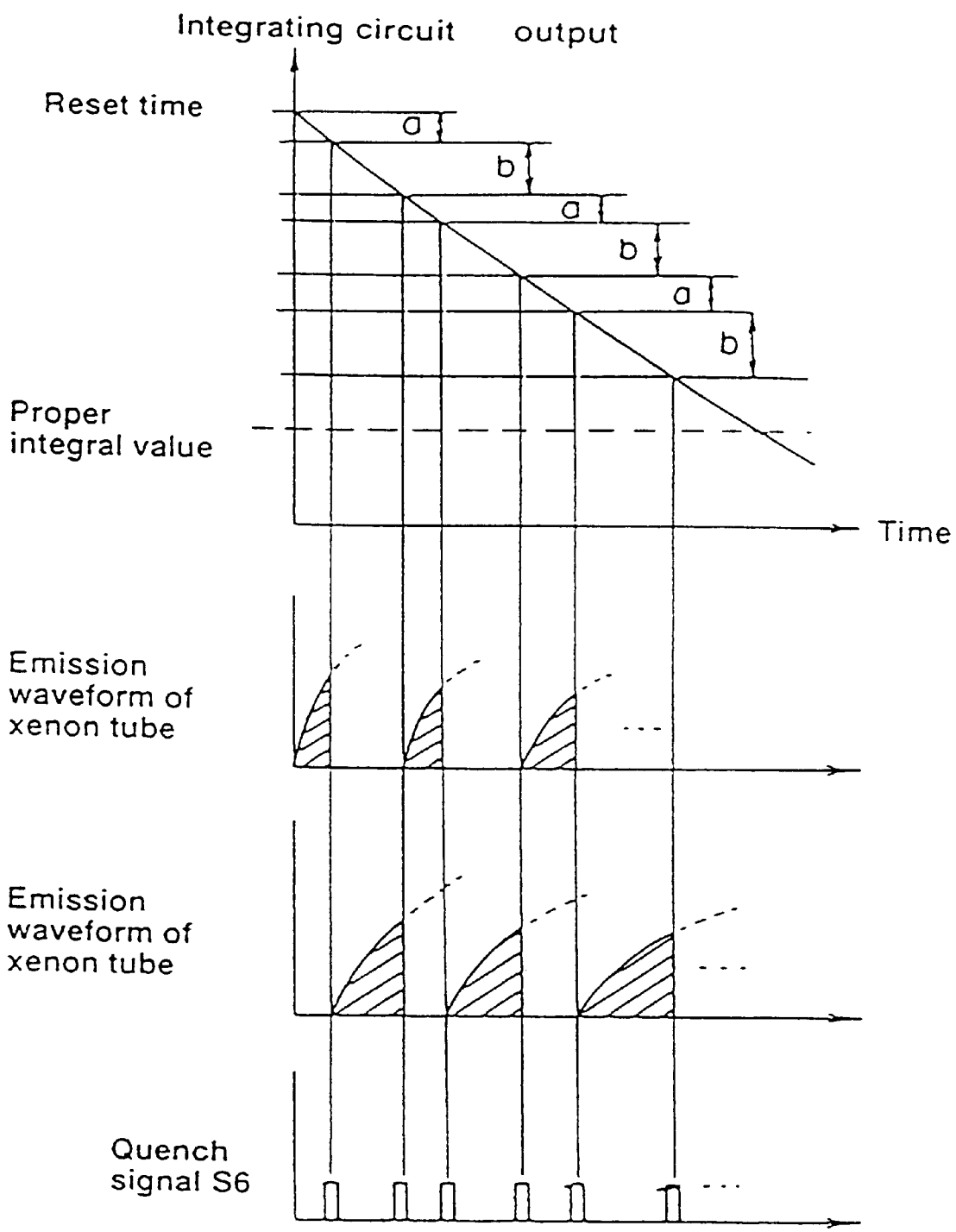
FIG. 41 is a diagram of waveforms of an electric current of xenon discharge tubes with respect to an output of an integral circuit shown in FIG. 38.

FIG. 41 shows waveforms of an electric current flowing through the xenon tubes 410 and 412 whose light emission is controlled by a loop consisting of steps 218 to 242, integral values outputted by the operational amplifier 460, and the target integral value (c) set in the D/A convertor 449. As shown in FIG. 41, the light emissions of the xenon tubes 410 and 412 are repeated alternately, which causes the quantity of electric charges accumulated in the main condenser 419 to decrease. Consequently, the quantity of light to be emitted from the xenon tubes 410 and 412 is reduced, requiring a longer time before the target integral value (c) is obtained.

This is because the repeated light emission consumes the electric charges of the main condenser 419, and consequently, the quantity of light to be emitted from each xenon tube is reduced as time lapses. Therefore, as in the embodiment shown in FIG. 38, if the quantity of light to be emitted by the xenon tubes 410 and 412 is continuously monitored, in accordance with the target integral value (c), which is renewed in the D/A convertor 449 for each light emission by subtracting the light emission integral widths (a) and (b) from the target integral value (c), it is possible to prevent the color temperature of the strobe light emitted from the xenon tubes 410 and 412 from being deviated from a desired value as time elapses. Namely, the color temperature of the light emitted from the light emitter 470 can be kept substantially constant over the entire light emission time.

Figure 42:
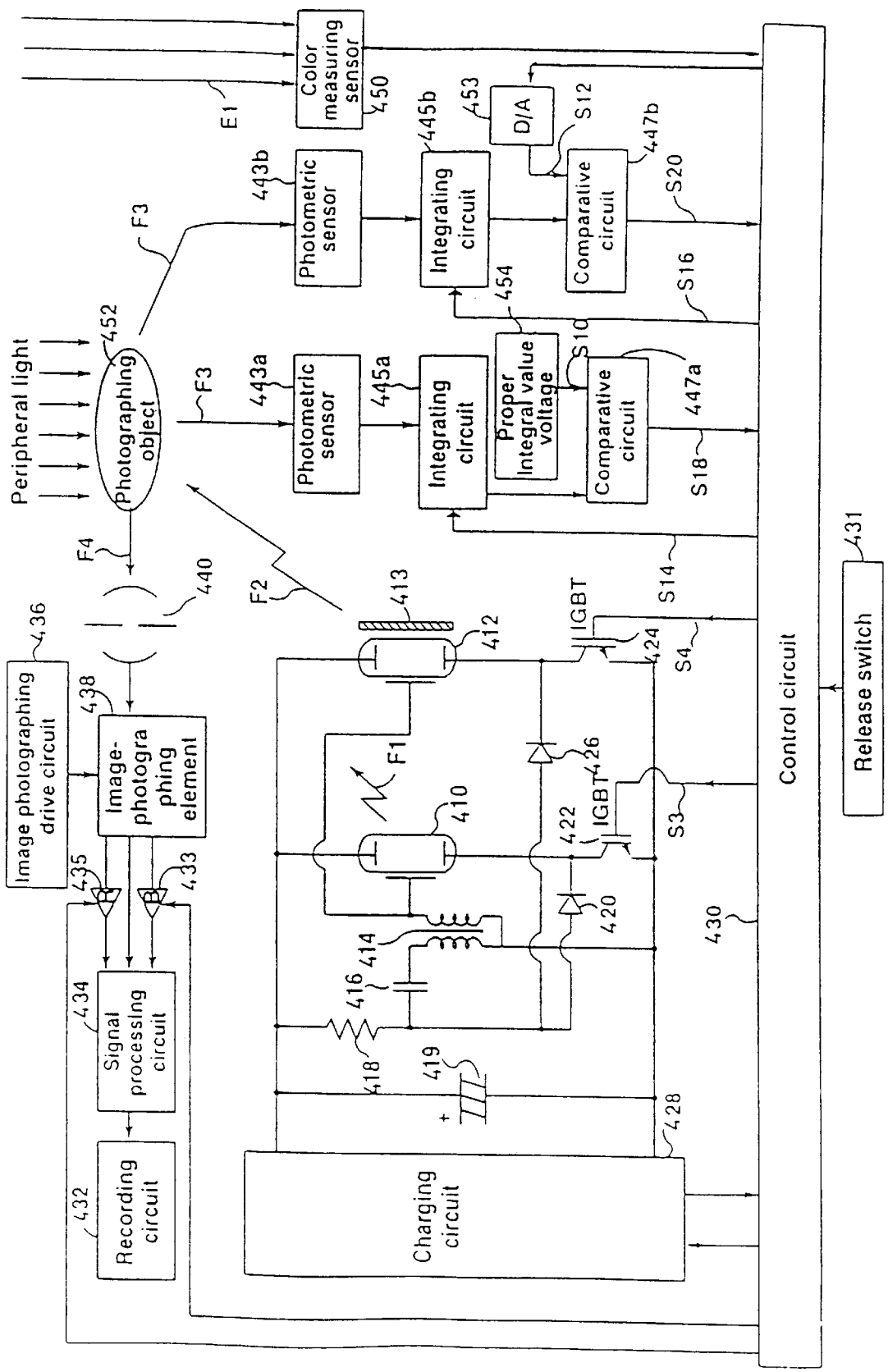
FIG. 42 is a sixth block circuit diagram of a still video camera, to which the present invention is applied.

FIG. 42 shows a sixth block circuit diagram of a still video camera of the invention, in which the same elements as those in FIG. 30 are designated by the same reference numerals. The difference between FIG. 42 and FIG. 30 is provision of two separate photometric sensors 443a and 443b which constitute a means for receiving and measuring the light F3 reflected from the object 452. Accordingly, two independent integrating circuits and 445a and 445b, and two independent comparative circuits 447a and 447b are also provided. Note that the reference signals S10 and S12 to be compared with the integral values inputted to the comparative circuits 447a and 447b are generated by the proper integral value voltage output circuit 454 and the D/A convertor 453 and are inputted to the respective comparative circuits 447a and 447b.

The photometric sensor 443a monitors whether or not the light F3 reflected from the object 452 has reached a proper exposure value, and the emission durations of the xenon tubes 410 and 412 are controlled based on the integral values of the light received by the photometric sensor 443b. A connection of the respective integrating circuits 445a and 445b and the respective comparative circuits 447a and 447b with the optimum integral value voltage output circuit 454 and the D/A convertor 453, respectively, is the same as that of the circuit arrangement shown in FIG. 30.

Figure 43:
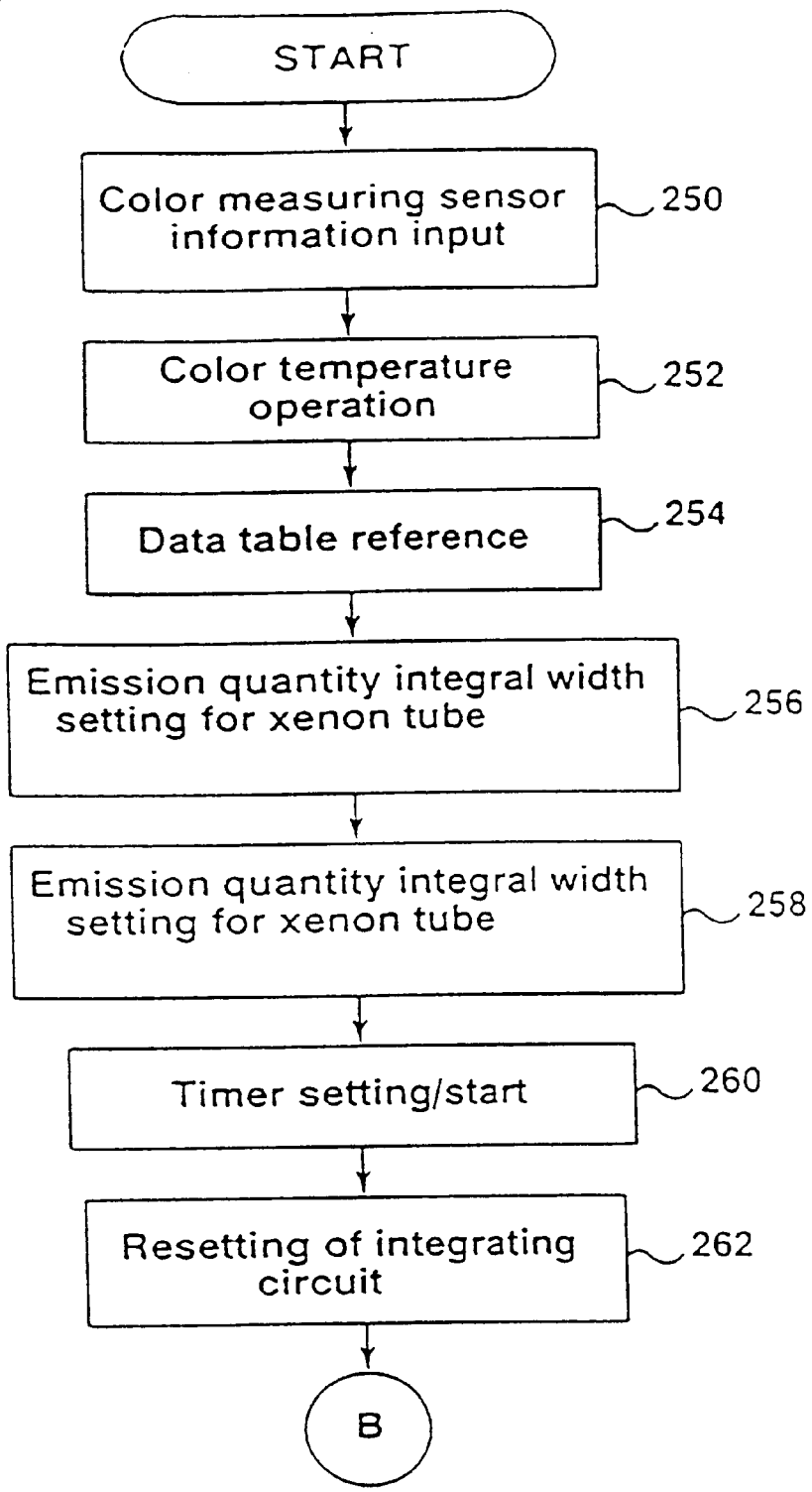
FIGS. 43 and 44 are flow charts of sequential operations of a still video camera shown in FIG. 42.
Figure 44:
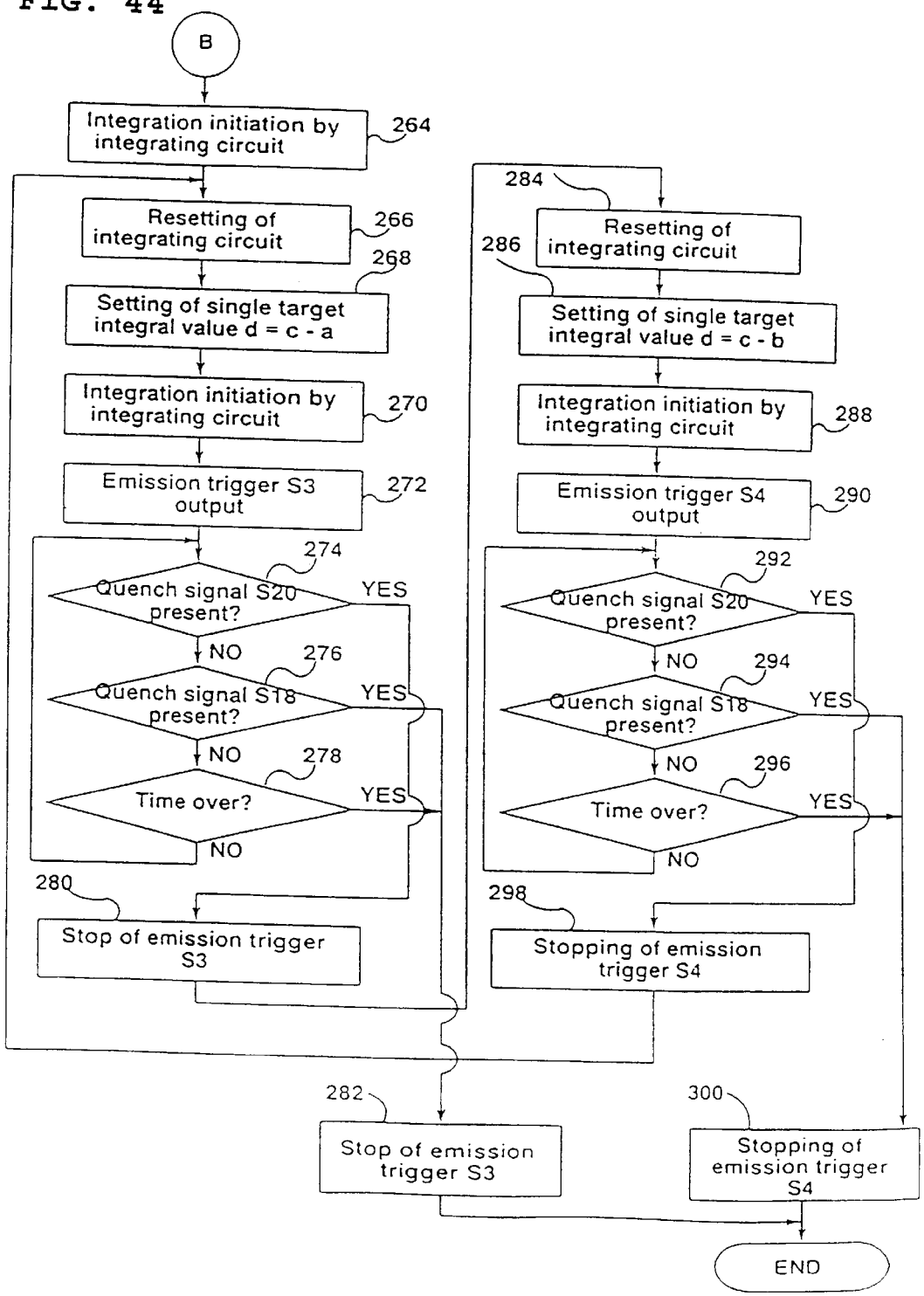

The operation of the embodiment shown in FIG. 42 will be described below according to FIGS. 43 and 44 which are flow charts of the operation. In these drawings, at steps 250 to 254, the color measuring sensor 450, and the integral widths (a) and (b) of the quantity of the light to be emitted for determining the emission duration of the xenon tubes 410 and 412 based on the color temperature of the peripheral light E1 are set with reference to the data table (steps 256 and 258).

Thereafter, the time of the timer circuit in the control circuit 430 is set and the integrating circuit 445*a* is reset at steps 260 to 262. Furthermore, the integration commencement signal S14 is outputted to the integrating circuit 445*a* to commence the measurement of the total quantity of light reflected from the object (step 264).

Next, the integrating circuit 445*b* is reset (step 266). The integral width (a) set at step 256 is subtracted from the output voltage of the operational amplifier 460 when the integrating circuit 445 is reset, i.e., the voltage value (c) of the reference power supply 468, and the target integral value (d) thus obtained is set in the D/A convertor 453 (step 268). At the same time, the integration commencement signal S16 is outputted to the integrating circuit 445*b*, so that the photoelectric conversion signals of the photometric sensor 443*b* are integrated by the integrating circuit 445*b* (step 270). As a result, when the output voltage of the operational amplifier 460 is smaller than the voltage value S12 corresponding to the target integral value (d) outputted from the D/A convertor 453, a quenching signal S20 is inputted from the comparative circuit 447*b* to the control circuit 430.

As soon as the integration by the integrating circuit 445*b* is commenced, the light emission trigger signal S3 is outputted from the control circuit 430 to the xenon tube 410, so that the xenon tube 410 emits strobe light (step 272). Thereafter, whether or not the quenching signal S20 has been inputted from the comparative circuit 447*b* and whether or not the quenching signal S18 has been inputted from the comparative circuit 447*a* are checked (steps 274 and 276), respectively. Furthermore, whether or not the emission time is above the time synchronized with the electronic shutter, is checked (step 278).

If the input of the quenching signal S18 is detected at step 276 or the lapse of a predetermined time is detected at step 278, the output of the light emission trigger signal S3 is stopped to stop the emission of the xenon tube 410 (step 282), and the general control of the light emission of the light emitter 470 is completed. Namely, when a predetermined time synchronized with the electronic shutter release time lapses, the strobe light emission is completed.

If the quenching signal S20 is inputted from the comparative circuit 447*b* at step 274, the light emission of the light emission apparatus 470 as a whole is not stopped, but the output of the light emission trigger signal S3 is stopped to stop the light emission of the xenon tube 410 only (step 280).

Next, the integrating circuit 445*b* is reset (step 284), and the integral width (b) set at step 258 is subtracted from the voltage value (c) of the reference power supply 468, so that the target integral value (d) thus obtained is set in the D/A convertor 453 (step 286), similar to step 268. Thereafter, upon commencement of the integration by the integrating circuit 445*b* (step 288), the light emission trigger signal S4 is output to the IGBT 424 to commence the emission of the xenon tube 412 (step 290).

Similarly to steps 274 to 278 mentioned above, whether or not the quenching signal S20 is outputted from the comparative circuit 447*b* in accordance with the set target integral value (d), whether or not the quenching signal S18 is outputted from the comparative circuit 447*a*, and whether or not the time set in the timer circuit is over are checked, respectively (steps 292 to 296). If the quenching signal S18 is outputted or the time of the timer circuit is over, the outputting of the light emission trigger signal S4 is stopped to completely stop the light emission of the light emission apparatus 470 as a whole (step 300).

If the quenching signal S20 is inputted, the outputting of the light emission trigger signal S4 is stopped to stop the light emission of the xenon tube 412 (step 298). Thereafter, the control is returned to step 266, and the light emission of the xenon tube 410 and the cessation thereof are performed. As described above, in the embodiment shown in FIG. 42, whether or not the total quantity of light emitted from the xenon tubes 410 and 412 reaches an optimum exposure value which is determined depending on the sensitivity of the solid state image pickup element 438, and the brightness of the photographing lens system, etc., is checked based on the quenching signal S18 inputted from the comparative circuit 447*a* and the quantity of light to be emitted by the xenon tubes 410 and 412 is controlled by the quenching signal S20 inputted from the comparative circuit 447*b*.

As described above, in the embodiment shown in FIG. 42, the total quantity of the light emitted from the light emission apparatus 470 and the quantity of light emitted from each of the xenon tubes 410 and 412 are independently measured by the photometric sensors 443*a* and 443*b*, the integrating circuits 445*a* and 445*b*, and the comparative circuits 447*a* and 447*b*, respectively. Accordingly, the quantity of light to be emitted from the xenon tubes 410 and 412 can be controlled more precisely.

Figure 45:
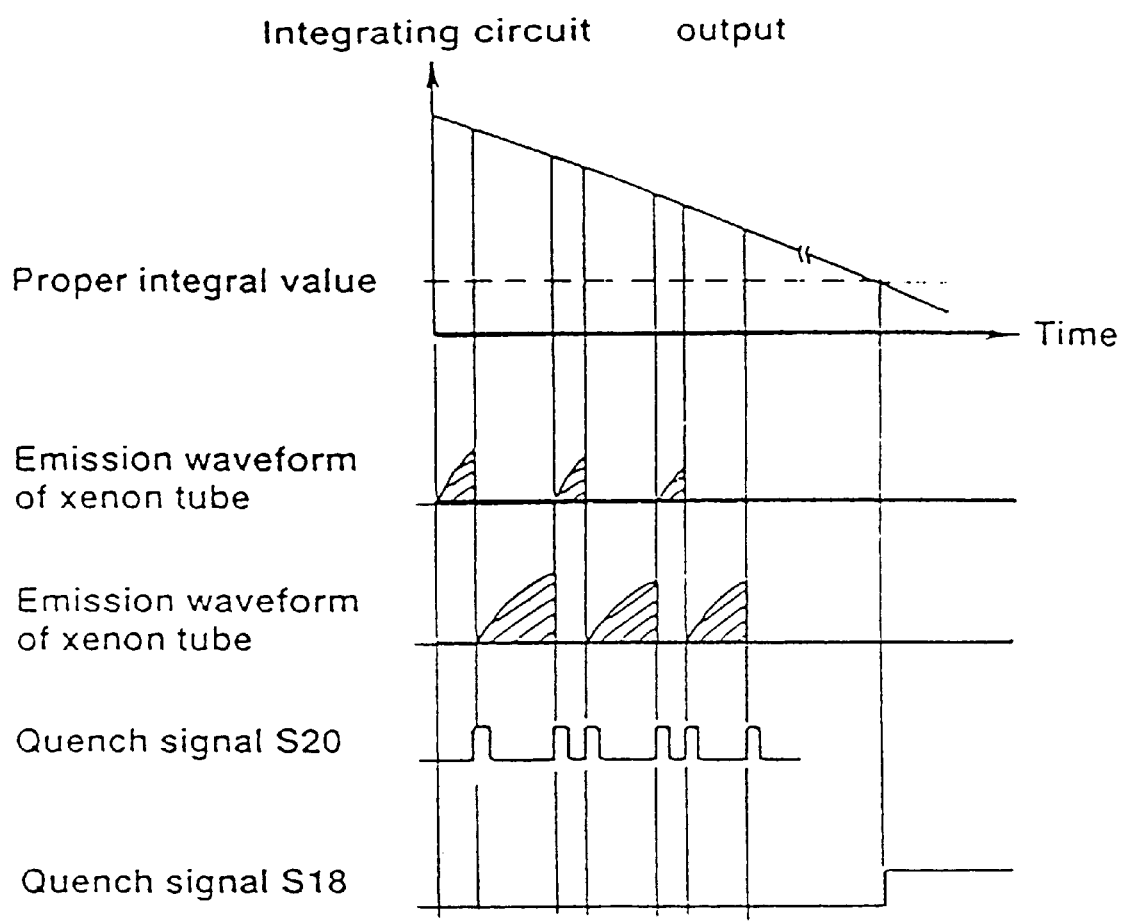
FIG. 45 is a diagram of waveforms of an electric current and quenching signals of xenon discharge tubes with respect to an output of an integral circuit shown in FIG. 42.

FIG. 45 shows electric current waveforms of the xenon tubes 410 and 412 whose light emission is controlled by a loop consisting of steps 266 to 300, the quenching signals S18 and S20, and the output voltage values of the integrating circuit 445*a*.

As described above, according to the embodiments mentioned above, it is possible to prevent an average value of the color temperature of the strobe light in each emission of the xenon tubes from being deviated from a desired value, since provision is made for a plurality of xenon tubes which emit strobe lights having differing color temperatures; the emission duration of each xenon tube is subdivided into extremely short periods of time: and, the light emission and cessation thereof of each xenon tube are alternately or simultaneously carried out. Thus, not only can the color temperature balance over the total emission time be made optimal, but also color imbalance does not take place even under insufficient exposure conditions. Consequently, the strobe light emitter of the present invention is free from the drawbacks that if one of the xenon tubes that has a high (or low) color temperature of light to be emitted therefrom emits the strobe light prior to emission by the other xenon tube that has a low (or high) color temperature of light to be emitted therefrom, the electric charges left in the main condenser 419 might be too low to cause the other xenon tube to emit the strobe light in view of a consumption of a great quantity of the electric charges by the first xenon tube, thus resulting in failure to obtain an optimum exposure and a balance of colors.

Furthermore, as the main condenser 419 and the charging circuit 428 for accumulating the electric charges in the main condenser 419 are common to both the xenon tubes, the number of the elements which would be otherwise increased by the provision of more than one xenon tube can be restricted, thus leading to a reduced production cost, a reduced mounting space for the elements, a reduced weight of the entire apparatus, and an improved reliability of the apparatus.

The number of the xenon tubes used in the present invention is not limited to two, and can be one or more than two. For example, in an alternative, there are three xenon tubes, each having three color filters of R, G and B colors provided thereon, so that each xenon tube can emit three color temperatures of light to realize a more precise color temperature control.

The switching means for controlling the emission of the xenon tubes comprises IGBTs 422 and 424, in the illustrated embodiments, but is not limited thereto. For example, they can be replaced with a plurality of thyristors. Also, the measuring means of the strobe light reflected from the object 452 and the quenching signal generating means are not limited to the operational amplifier and the analog comparator, and can be constituted by digital integration and comparator circuits, respectively.

Furthermore, light reflected from the object and received by the photometric sensor can at least partially be light transmitted through the photographing lens system to execute a more precise light emission control (therefore, color balance control).

In addition, in the illustrated embodiments, although the trigger circuit 471 is common to the xenon tubes 410 and 412, and there are two separate IGBTs (switching means of the emission of the xenon tubes 410 and 412) for the respective tubes, it is possible to provide a single switching means common to both the xenon tubes and separate trigger circuits for the respective xenon tubes, which are actuated in accordance with the control signals output from the control circuit 430. Namely, when the switching means is turned ON to activate one of the xenon tubes to emit the strobe light, the control signal is outputted from the control circuit 430 into the trigger circuit of the associated xenon tube to send the trigger pulses to that xenon tube.

Therefore, the light emission of the plurality of the xenon tubes can be independently controlled by the respective trigger circuits. Also, it is possible to alternately actuate the xenon tubes which alternately repeat the emission. Moreover, it is possible to provide independent switching means and trigger circuits for the xenon tubes. This ensures the same effect as the previous embodiments.

As described above, according to the present invention, a plurality of xenon tubes having different color temperatures of light to be emitted therefrom are connected to a common condenser in which the electric charges for light emission are accumulated. Since the emission time is subdivided into very small intervals of time so as to repeatedly emit strobe light for each xenon tube, not only can the color temperature of the strobe light be well balanced over the entire light emission time, but also the color balance can be ensured even under insufficient exposure conditions. Furthermore, the fewer number of components required reduces the manufacturing cost and weight, miniaturizes the strobe light emission apparatus, and enhances the reliability thereof.

Figure 46:
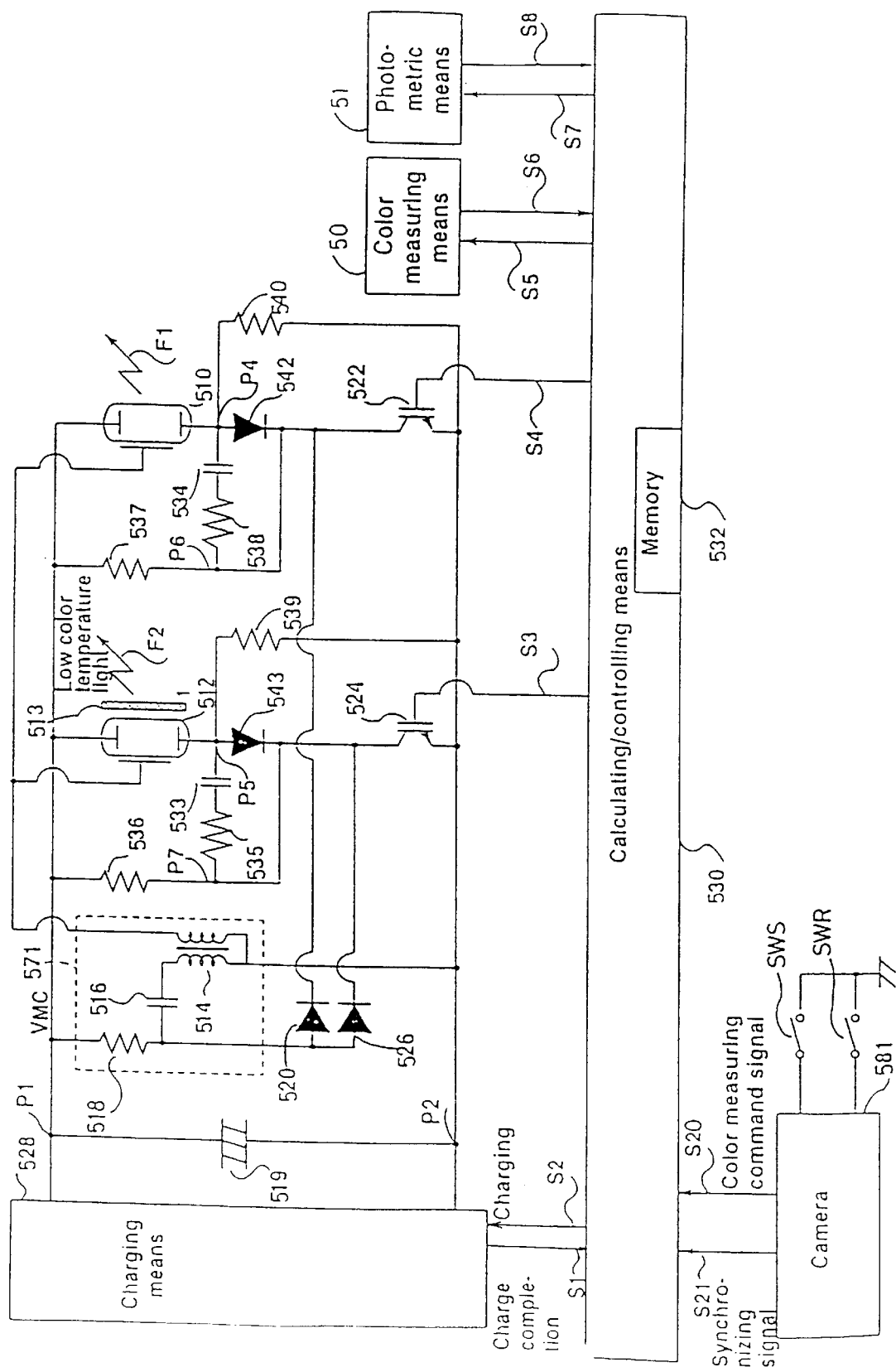
FIG. 46 is a seventh block circuit diagram of a still video camera, to which the present invention is applied.

FIG. 46 is a seventh circuit diagram of a strobe apparatus of the present invention, in which the photometering means 551 for measuring the quantity of light reflected from the object, and the color measuring means 550 for measuring the color temperature of the peripheral light surrounding the object are connected to the calculating/controlling means 530. The signal S8 and S6 are inputted to the calculating/controlling means 530, from the photometering means 551 and the color measuring means 550, respectively. The color measuring means 550 comprises at least two photo-electric converting elements of differing spectral sensitivity characteristics within the visible light region. The color temperature of the peripheral light is obtained by the calculating/controlling means 530, based on a reverse proportional relationship between the logarithm of the ratio of the output signals of the photo-electric converting elements having differing spectral sensitivities and the color temperature of the received light.

The charging means 528 is connected to the calculating/controlling means 530 and the main condenser 519. When the charge commencement signal S2 is inputted from the calculating/controlling means 530 to the charging means 528, the electric charges are accumulated in the main condenser 519 by the charging means 528. When the accumulation of the electric charges in the main condenser 519 is completed, the charge completion signal S1 is outputted from the charging means 528 to the calculating/controlling means 530.

The trigger circuit 571 and the anode terminals of the xenon tubes 510 and 512 are connected to the connecting point P1 side of the main condenser 519. The emitter terminals of insulating gate bipolar transistors (IGBT) 522 and 524 are connected to the connecting point P2 of the main condenser 519. The cathode terminals of the xenon tubes 510 and 512 are connected to the collector terminals of the IGBTs 522 and 524 through the diodes 542 and 543.

The resistor 538 and the condenser 534 which is connected thereto in series are connected in parallel to both ends of the diode 542, and the resistor 537 is connected between the cathode of the diode 542 and the anode of the xenon tube 510. Similarly, the resistor 535 and the condenser 533, which is connected thereto in series, are connected in parallel to both sides of the diode 543. The resistor 536 is connected between the cathode of the diode 543 and the anode of the xenon tubers 512. Furthermore, the cathode terminal of the xenon tube 10 is connected through the resistor 540 to the emitter terminal of the IGBT 522, and the cathode terminal of the xenon tube 512 is connected through the resistor 539 to the emitter terminal of the IGBT 524. The emitter terminals of the IGBTs 522 and 524 are connected to the connecting point P2 of the main condenser 519. The connecting point P2 is connected to ground level.

The trigger circuit 571 comprises the resistor 518, the trigger condenser 516 for generating a trigger signal, and the trigger transformer 514. The trigger condenser 516 is connected to the low voltage-side coil of the trigger transformer 514. This trigger condenser 516 is connected through the diodes 520 and 526 to the collector terminals of the IGBTs 522 and 524, respectively. The electric charges of the trigger condenser 516 are discharged through the diodes 520 and 526 according to the operation of the IGBTs 522 and 524, respectively. The high voltage-side coil of the trigger transformer 514 is connected to the trigger electrodes of the xenon tubes 510 and 512, so that the trigger pulse is applied to each of the xenon tubes 510 and 512 from the trigger circuit 571.

The color temperature varying filter 513 for lowering the color temperature of the flash is provided before the emission surface of the xenon tube 512. That is, the color temperature of the flash of the xenon tube 512 is lowered by the color filter 513. There is no limitation to the structure of the color filter 513 in the illustrated embodiment, and any color filters can be used, so long as the color temperature can be sufficiently lowered or raised thereby in comparison with the xenon tube 510 which has no color filter. The color temperature of the strobe light emitted from the xenon tube 510 is not adjusted.

A memory 532 is incorporated in the calculating/controlling means 530, for storing data table for determining the color temperature of the peripheral light based on the signal S6 inputted from the color measuring means 550. A camera 581, which may be a still video camera or a still camera, is connected to the calculating/controlling means 530, so that the color measuring command signal S20 and the synchronizing signal S21 are inputted from the camera 581 to the calculating/controlling means 530. A release button, which is a two-step push switch comprising a photometric switch SWS and a release switch SWR, is connected to the camera 581.

The operation of the illustrated embodiment will be explained below. When the switch of the present strobe apparatus (not shown) is depressed in accordance with an operator's demand, the charge commencement signal S2 is inputted from the calculating/controlling means 530 to the charging means 528. Electric charges are accumulated in the main condenser 519 in response to the charge commencement signal S2. When a predetermined quantity of electric charges, i.e., enough to cause the xenon tubes 510 and 512 to emit the flash light, has accumulated in the main condenser 519, that is, when the connecting point P1 has a predetermined electrical potential, the charge completion signal S1 is outputted from the charging means 528 to the calculating/controlling means 530.

When the release button of the camera 581, is halfdepressed to turn ON the photometric switch SWS, so that the color measuring command signal S20 is inputted to the strobe apparatus from the camera 581, the calculating/controlling means 530 outputs the signal S5 to the color measuring means 550 which measures the color temperature of the peripheral light. In response to the signal S5, the color measuring means 550 commences the measurement of the brightness of each wavelength of light by the photoelectric converting elements of differing spectral characteristics, and outputs, as the signal S6, a log value of the ratio of the received quantity of each wavelength of light to the calculating/controlling means 530. The calculating/controlling means 530 determines the color temperature of the peripheral light, based on the converted log value of the signal S6, with reference to the data table stored in the memory 532.

Based on color temperature data of the peripheral light thus determined, the calculating/controlling means 530 determines the ratio of the quantities of light emitted from the xenon tube 512, which has a low color temperature, and the xenon tube 510, which has a high color temperature. For example, if the color temperature of the peripheral light is low, the control is carried out such that the quantity of light emitted from the xenon tube 512, which has a low color temperature, is increased (duration of emission is prolonged), and the quantity of light emitted from the xenon tube 510, which has a high color temperature, is reduced. And, as will be described in more detail below, the output timing of the emission commencement signals S3 and S4 is determined based on the emission quantity ratio. Conversely, if the color temperature of the peripheral light is high, the quantity of light emitted by the xenon tube 510 is increased, and the quantity of light emitted by the xenon tube 512 is reduced.

When the release button of the camera 581 is fully depressed, the release switch SWR is turned ON, and the shutter is fully opened. After the lapse of an appointed amount of time following the operation of the release switch SWR, a synchronizing signal S21 is inputted to the calculating/controlling means 530. The calculating/controlling means 530 outputs, in response to the synchronizing signal S21, an emission commencement signal corresponding to the xenon tube that is intended to emit a reduced quantity of the strobe light. For example, if the color temperature of the peripheral light is low, the emission quantity of the xenon tube 510, which has a high color temperature, is set small, hence the emission commencement signal S4 corresponding to the xenon tube 510 is outputted to the IGBT 522.

The IGBT 522 is activated by the emission trigger signal S4, and the charges of the trigger condenser 516 of the trigger circuit 571 are discharged through the diode 520 and the IGBT 522. The discharge of the trigger condenser 516 causes an electrical current to flow in the low-voltage side coil of the trigger transformer 514, inducing a high voltage in the high-voltage side coil. Consequently a trigger pulse is applied to the trigger electrode of the xenon tube 510. This trigger pulse ionizes the gas within the xenon tube 510, and a discharge is generated within the xenon tube 510 by the high voltage from the main condenser 519. Thus, a flash is generated.

The trigger pulse is also applied to the xenon tube 512 by the activation of the trigger circuit 571, nevertheless the xenon tube 512 emits no light, since an emission commencement signal S3 is not inputted to the IGBT 524, so that the IGBT 524 is not turned ON.

Prior to the commencement of the discharge of the xenon tube 510, the electrical charges have been accumulated in the condenser 534, owing to the electrical potential of the connecting point P1 of the main condenser 519. When the IGBT 522 is turned ON, the electrical potential of the connecting point P4 rapidly drops to the minus side due to the electrical potential difference between the two sides of the condenser 534 stemming from the accumulated electrical charges. Accordingly, a higher electrical potential difference is applied between the anode terminal and cathode terminal of the xenon tube 510, hence a discharge/flash is readily created. That is, even if the electrical potential of the connecting point P1 is slightly lower than the electrical potential required to generate a flash in the xenon tube 510, the condenser 534 will lower the electrical potential of the connecting point P4 at roughly the same time as the activation of the IGBT 522, thereby to readily induce a flash in the xenon tube 510.

After the commencement of light emission by the xenon tube 510, and following a period corresponding to the emission quantity determined based on information concerning the measured color temperature, the output of the emission commencement signal S4 is suspended in the calculating/controlling means 530, and light is not emitted from the xenon tube 510. Following this, the emission commencement signal S3, which is for commencing the emission of light from the xenon tube 512 which has the higher light emission quantity, is outputted from the calculating/controlling means 530 to the IGBT 524, and in the same manner as the xenon tube 510, the trigger pulse from the trigger circuit 571 is applied to the xenon tube 512 to generate a flash.

Figure 47:
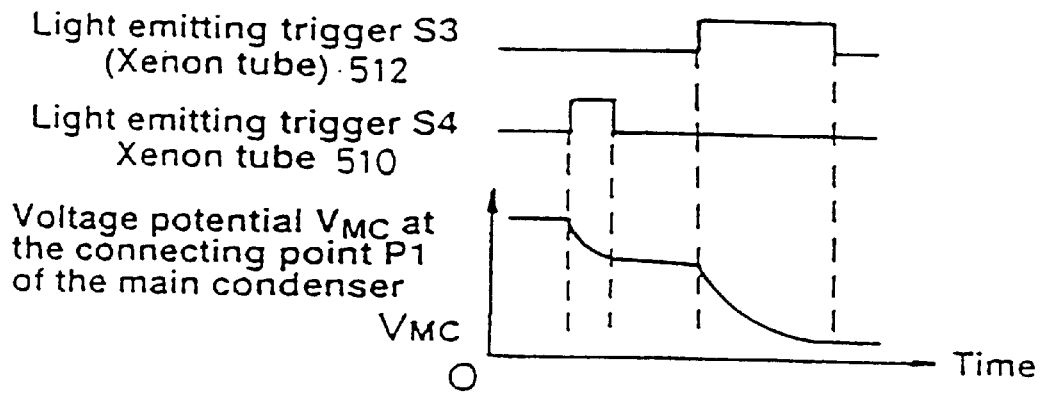
FIGS. 47 and 48 are timing charts of sequential operations of a still video camera shown in FIG. 46.
Figure 48:
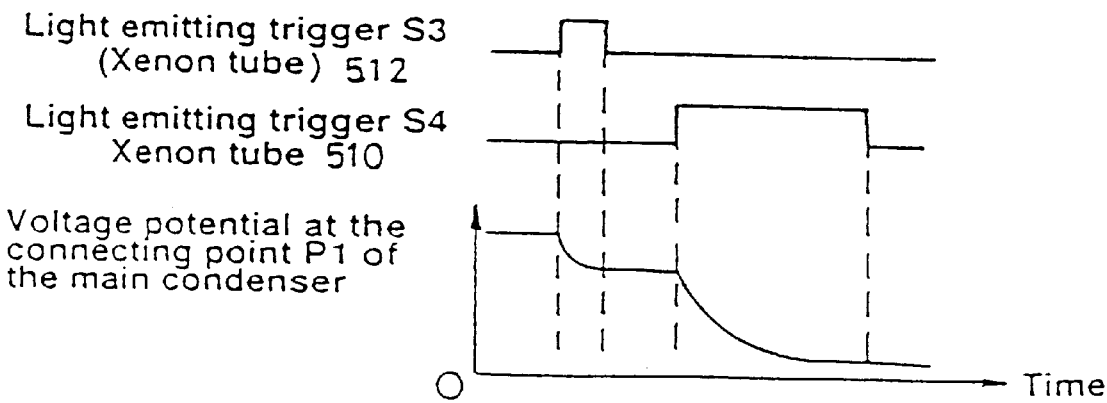

The above described aspect is shown in FIG. 47, in which when the color temperature of the peripheral light surrounding the object is low, the xenon tube 512, which has a low emission color temperature, is caused to emit more light, and hence is caused to emit light after the xenon tube 510, which has a high emission color temperature emits light. Conversely, when the color temperature of the peripheral light surrounding the object is high, as shown in FIG. 48, the quantity of light emitted from the xenon tube 510 of high emission color temperature is great, hence the xenon tube 510 is caused to emit light after the emission of light from the xenon tube 512. In this manner, the color temperature of the peripheral light is measured by the color measuring means 550, and the quantities of light to be emitted by the high emission color temperature xenon tube 510 and the low emission color temperature xenon tube 512 are determined so as to be in agreement with the color temperature of the peripheral light.

Figure 49:
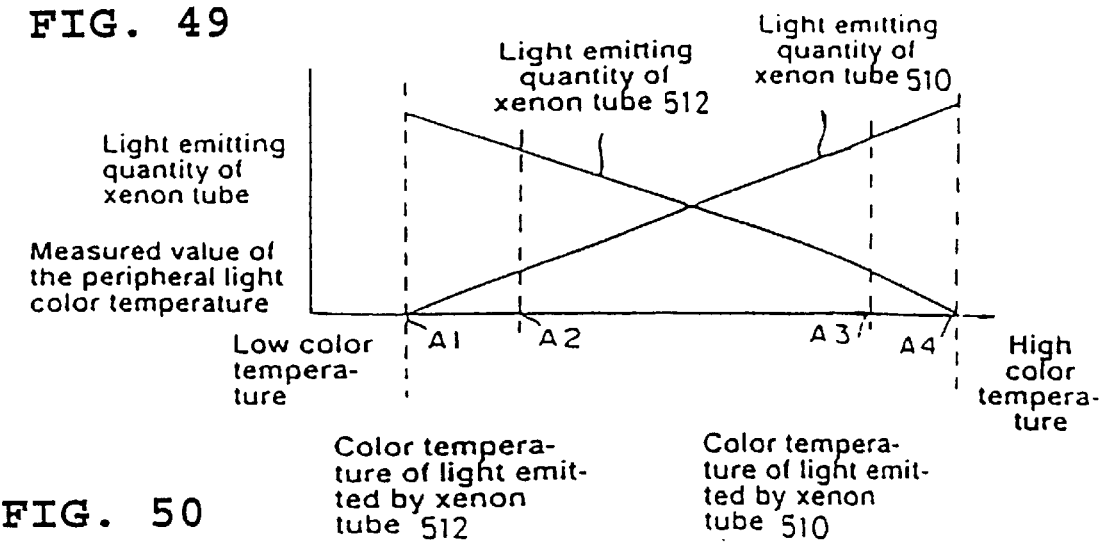
FIG. 49 is a diagram of optical properties of xenon discharge tubes in a still video camera shown in FIG. 46.
Figure 50:
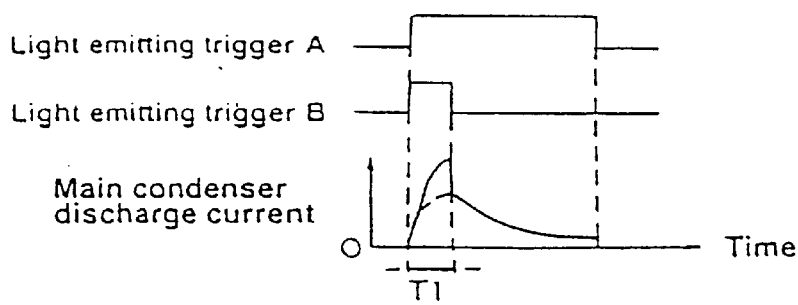
FIGS. 50 and 51 are timing charts of sequential operations of a known still video camera.
Figure 51:
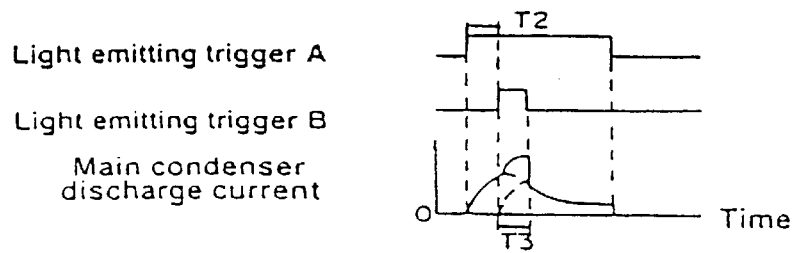

FIG. 49 shows the relationship of the emitted light quantity of the xenon tubes 510 and 512 to the value of the peripheral light color temperature measured by the color measuring means 550. As shown in the drawing, at a point Al, the color temperature of the peripheral light is extremely low, representing a case where only the xenon tube 512 is caused to emit light. At a point A2 in the drawing, the color temperature of the peripheral light is somewhat higher than at the point Al, hence the quantity of light emitted from the xenon tube 512 is somewhat less than at the point A1, and the xenon tube 510 is caused to emit light for a short period of time.

The point A2 corresponds to FIG. 47. Furthermore, at a point A4, the color temperature of the peripheral light is extremely high, representing a case where only the xenon tube 510 is caused to emit light. At a point A3, the color temperature is somewhat lower than at the point A4 representing a case where the xenon tube 512 is caused to emit a small quantity of light.

In this manner, in the illustrated embodiment, the color temperature of the peripheral light is measured by the color measuring means 550, and the quantities of light to be emitted by the xenon tube 510, which has the high emission color temperature, and the xenon tube 512, which has the low emission color temperature, are adjusted to be in agreement with the color temperature of the peripheral light, and at the same time, the xenon tube that is to emit the smaller quantity of light is caused to first emit light, so that the electric charges sufficient to allow light emission by the other xenon tube that is to emit a larger quantity of light are left in the main condenser 519.

Furthermore, the xenon tubes are caused to emit light independently, hence it is possible to reduce the discharge current from the main condenser 519, in comparison with two simultaneous light emissions, and the service life of the main condenser can be extended. In addition, since the recharging of the main condenser following the first light emission is not carried out, there is no need to slow the speed of the camera shutter, so camera shake does not take place. In cases where the strobe apparatus is incorporated in a still video camera as in the illustrated embodiments, charging of the main condenser is not carried out between the emissions of light from the two xenon tubes, hence there is no adverse influence, such as fluctuations of the power source voltage, on the image photographing circuit during image processing.

Furthermore, in the illustrated embodiment, the photometering means 551 measures the brightness of the object and the color temperature of the peripheral light surrounding the object, prior to the commencement of the emission of light from the xenon tubes 510 and 512. The quantity of light emissions of the xenon tubes 510 and 512 is determined based on information concerning the measured brightness and the measured color temperature, so that the control is carried out in accordance with the quantity of light thus determined such that the xenon tube which has the lesser light emission quantity is caused to first emit light, following which the xenon tube which has the higher light emission quantity is made to emit light. In other words, based on the measured brightness data, whether or not the strobe emission is necessary is determined. Alternatively, during the emissions of light from the xenon tubes, it is possible to control the quantity of light to be emitted therefrom by measuring the quantity of light reflected from the object by the photometering means 551. That is, the quenching control may be carried out such that when the quantity of reflected light reaches a predetermined value, the outputting of the emission commencement signals S3 and S4 to the xenon tubes 510 and 512 is stopped according to the signal 58 from the photometering means 551 so as to stop the light emissions from the xenon tubes. In this manner, it is possible to carry out more precise adjustment of the color temperature of the strobe light.

In the embodiment described above, although the color temperature of the strobe light is adjusted using two xenon tubes 510 and 512 having a high color temperature and a low color temperature, respectively, this may also be carried out using three xenon tubes which emit lights of the color temperatures of the three primary colors R, G, and B, respectively. Namely, using a plurality of xenon tubes having differing emission color temperatures, the color temperature of the entirety of the light emitted by the strobe apparatus may be matched to the color temperature of the peripheral light surrounding the object, and the xenon tubes having the least to greatest light emission quantities are caused to successively emit light in this order.

In the present invention, there is no limitation to the number of IGBTs like that represented by reference numeral 522 and trigger circuits like that represented by reference numeral 571. Namely, it is possible to provide separate trigger circuits for the respective xenon tubes; said trigger circuits being connected to the calculating/controlling means 530, so that the respective trigger circuits can be independently activated directly by the calculating/controlling means 530. In this alternative, the IGBT for controlling the supply of the current passing through the xenon tubes 510 and 512 is common to the xenon tubes. The commencing of emission from each xenon tube is carried out by the activation of the respective trigger circuits by the calculating/controlling means 530, and the cessation of light emission is carried out by the inactivation of the single IGBT. Thus, the control similar to the illustrated in this embodiment described above can be executed in this alternative.

According to the present invention, as can be seen from the foregoing, in the control in which the main condenser for accumulating the electric charges for light emission and the charging means are common to a plurality of xenon tubes of differing emission color temperatures, and the color temperature of the entirety of the strobe light is matched to the color temperature of the peripheral light, the order of light emission is controlled in such a manner that the light from the xenon tube of a smaller light emission quantity is caused to be emitted first, following which the light from the xenon tube of a larger light emission quantity is then caused to be emitted. Consequently, there is sufficient electric charge remaining in the main condenser to guarantee subsequent emissions after the first emission.

Figure 52:
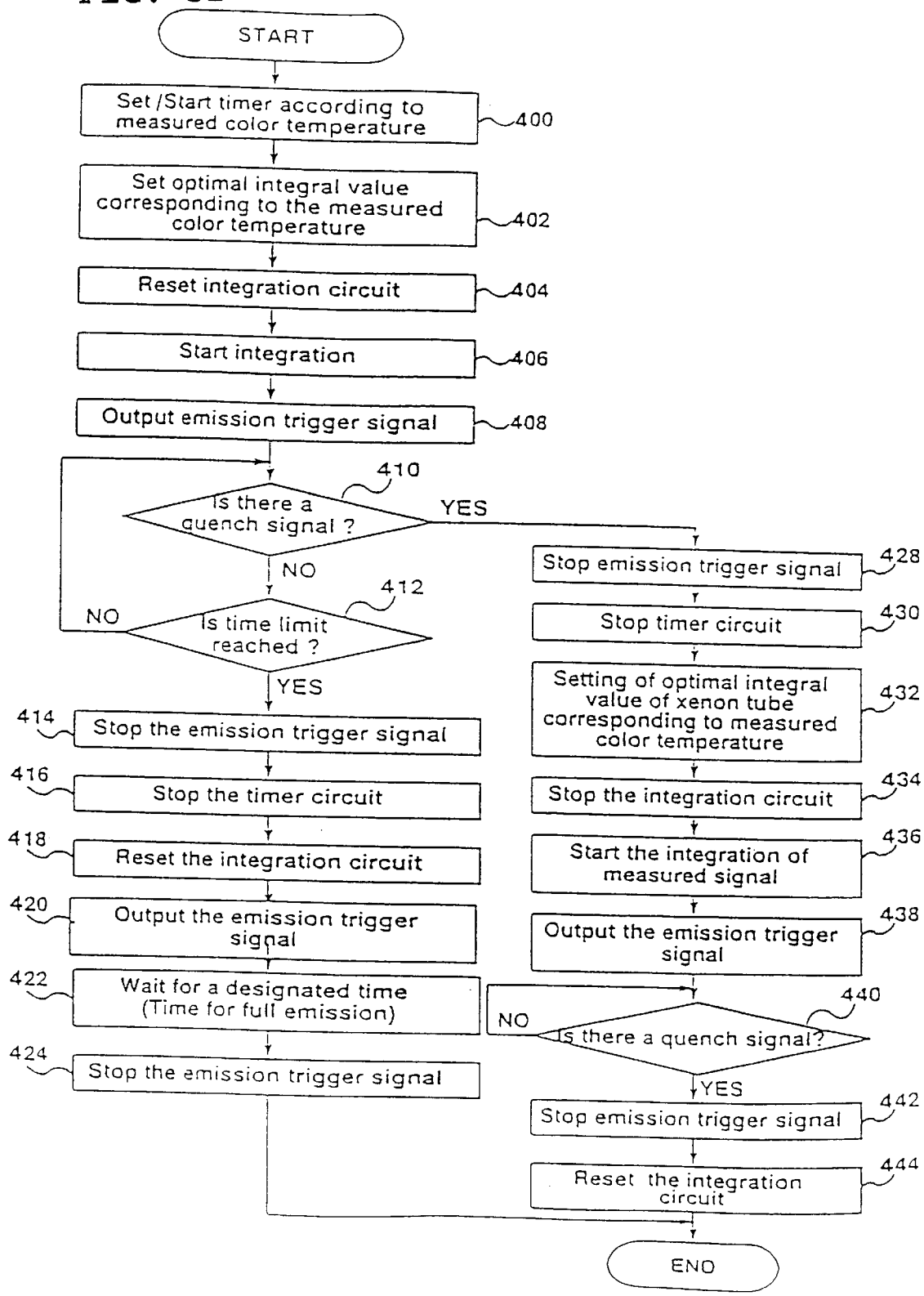
FIG. 52 is another flow chart of sequential operations of a still video camera shown in FIG. 38.
Figure 53:
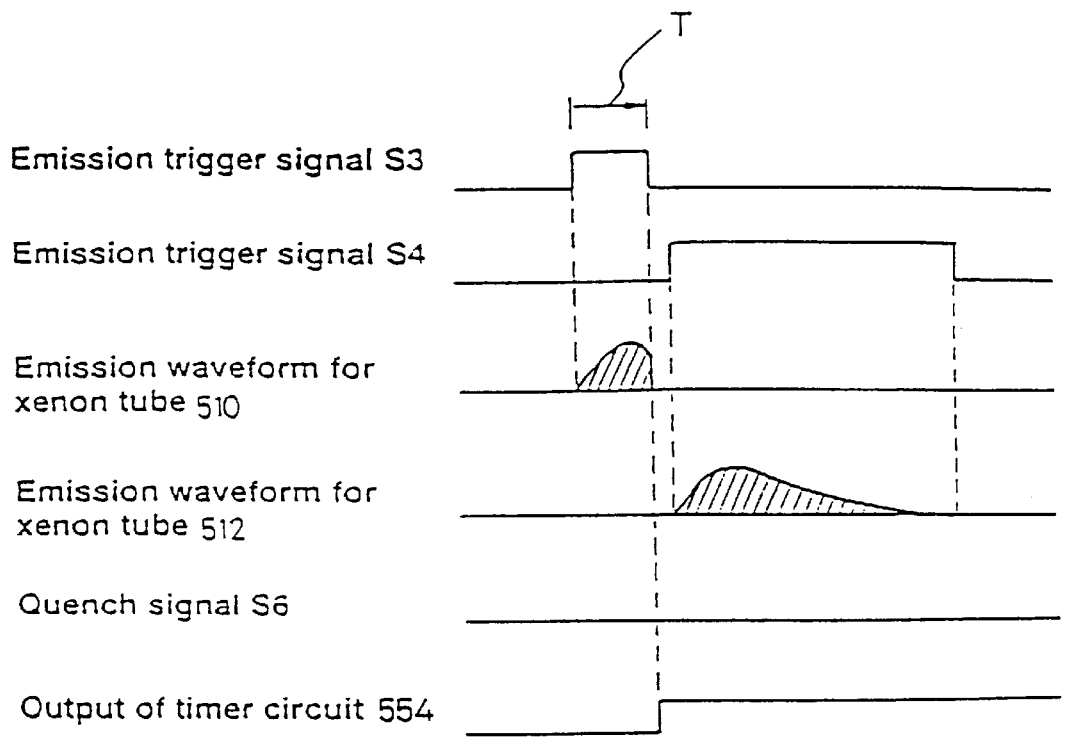
FIGS. 53 and 54 are diagrams of waveforms of an electric current of xenon discharge tubes upon emission of light, with respect to trigger signals in a still video camera shown in FIG. 38.
Figure 54:
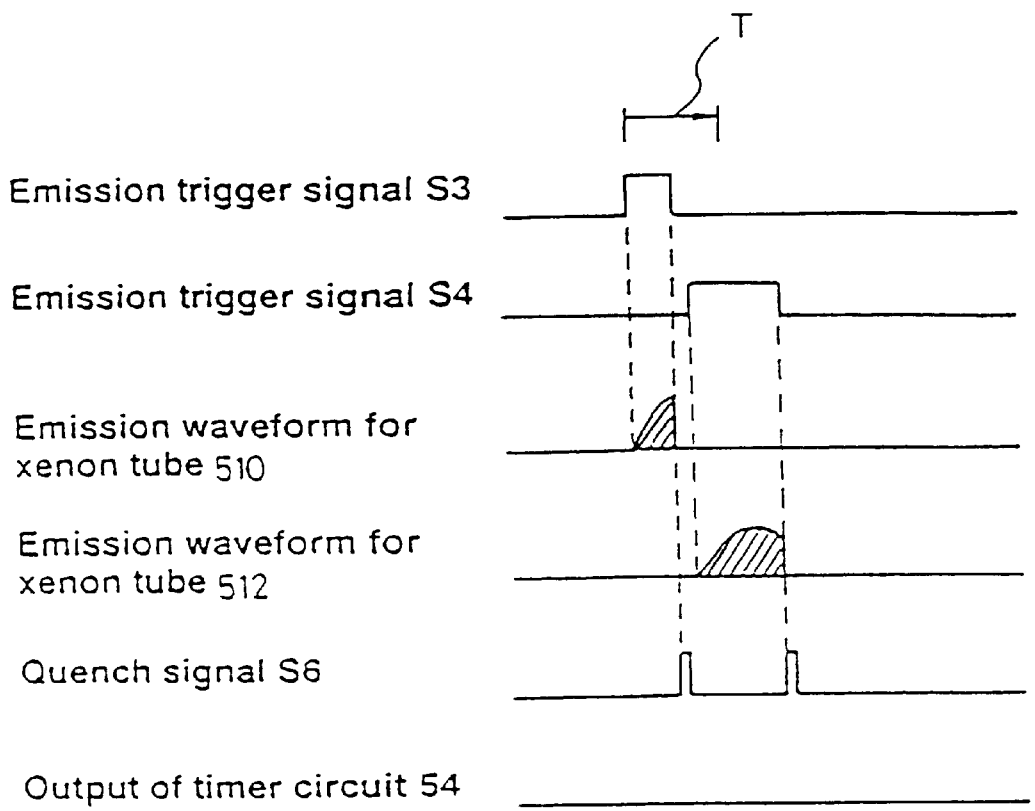

The following discussion will be directed to a modified embodiment of FIG. 38, with reference to FIGS. 52 to 54.

FIG. 52 shows a flowchart of the strobe emission control of a light emission device 470 at step D23 in FIG. 32. The ratio of the emission quantities of the xenon tubes 410 and 412 is determined by the control circuit 430 so as to match the color temperature of the peripheral light E1.

Since the color temperature of the strobe light of the xenon tube 412 is lowered by the color temperature conversion filter 413, while the xenon tube 410 is provided with no color temperature conversion filter, the color temperature of the strobe light of the xenon tube 410 is higher than the strobe light color temperature of the xenon tube 412. Consequently, the adjustment of the emission quantities of the xenon tube 410 which has a high color temperature, and the xenon tube 412 which has a low color temperature, makes it possible to match the color temperature of the strobe apparatus 470 as a whole to the measured color temperature.

For example, if the color temperature of the peripheral light E1 is relatively high, the emission quantity of the xenon tube 410, which has a higher strobe light color temperature, is increased, and the emission quantity of xenon tube 412, which has a lower strobe light color temperature, is decreased. On the other hand, if the color temperature of the peripheral light E1 is relatively low, the emission quantity of the xenon tube 412 is increased, and the emission quantity of the xenon tube 410 is decreased.

Also, upon determination of the emission quantity ratio of the xenon tubes 410 and 412, the control is executed such that the xenon tube with the lower light emission quantity is first caused to emit the strobe light, prior to the emission by the xenon tube with the higher light emission quantity. This is because, if the xenon tube with the higher light emission quantity was caused to emit first, a large part of the electric charges accumulated in the main condenser 419 would be consumed by the emission of that xenon tube having the higher light emission quantity, and consequently, the electric charges left in the main condenser would be too small to apply an electrical potential large enough to emit the flash light, between the anode and cathode terminals of the subsequent xenon tube.

Furthermore, the xenon tube that is caused to emit the strobe light is subject to a quenching control. The quenching control refers to an adjustment of the quantity of light to be emitted in such a manner that the quantity of light reflected from the object 452 reaches a predetermined value at which a good picture can be obtained with the help of the strobe light irradiated onto the object 452 from the strobe apparatus 470, in a strobe photographing of a dark object 452 whose luminance is low. Based on the quenching signal S6 output from the comparative circuit 446, it is determined whether or not a sufficient quantity of light for obtaining good photographic images is made incident on the solid state image photographing element 438.

Therefore, if the distance of the object 452 from the associated still video camera is far, and the quantity of strobe light reflected from the object 452 is small, the xenon tube must more intensively emit the strobe lights for a longer time. That is, depending on the photographing circumstances, the emission quantity of the first xenon tube may be increased due to the quenching control, thus resulting in an increased consumption of the electric charge accumulated in the main condenser 419.

If a huge quantity of electric charges are consumed by the first emission, there might be a shortage of the quantity of light or no quantity of light in the subsequent emission(s). A shortage of the light emission by the subsequent strobe tube could induce a deviation of the resultant color temperature of the strobe apparatus from a desired valve (i.e., target value). This results in a failure to obtain a good picture of natural colors.

To prevent a larger quantity of electric charges accumulated in the main condenser 419 from being consumed, the duration of the first emission is restricted. The temporal limit of the emission duration will be executed as follows steps 400 to 412 in FIG. 52.

In general, the emission quantity of a xenon tube is not proportional to the emission time duration. Therefore, the maximum emission duration T, which is the time limit needed to maintain the emission quantity ratio A:B of the xenon tubes 410 and 412, (where A<B), determined depending on the color temperature of the peripheral light E1 is stored in a data table corresponding to each color temperature, in a memory provided in the control circuit 430. The maximum emission duration T for the xenon tube 410 is read out from the data table in the memory according to the measured color temperature of the measured peripheral light E1 and is set in the timer circuit 454.

The control circuit 430 then instructs the timer circuit 454 to commence the counting operation (step 400), and the emission of the xenon tube 410 is forcibly stopped by the signal inputted thereto from the timer circuit 454.

Next, in order to carry out the quenching control, the control circuit 30 outputs an optimal integral value (digital data) for the xenon tube 410 to the D/A convertor 448 (step 402). This optimal integral value is a value that corresponds to the light emission quantity A of the xenon tube 410. The optimal integral value inputted from the control circuit 430 is converted to an analog voltage signal S8 in the D/A convertor 448 and outputted to the comparative circuit 446.

A reset signal S5 is outputted from the control circuit 430 to the integration circuit 444, and the integral value output of the integration circit 444 is reset (step 404). Thereafter, the reset signal 55 output is stopped; the reset of the integration circuit 444 is released; and the photoelectric current produced in the photometric sensor 442 is time-integrated by the operational amplifier 460 (step 406). In other words, the value of photoelectric current flowing in the photometric sensor 442 varies depending on the illuminance of the light F3 reflected from the object 452 and received by the photometric sensor 442. By integrating the photocurrent value, the cumulative light quantity of the reflected light F3 from the object 452 is detected. Hence, the integral value outputted by the integration circuit 444 represents the cumulative light quantity of the reflected light F3.

Upon the commencement of the measurement of the cumulative light quantity of the reflected light F3 by the integration circuit 444, the light emission trigger signal S3 is outputted from the control circuit 430 to the IGBT 422 (step 408). The IGBT 422 is turned ON by the output of the emission trigger signal S3. By the turning ON of the IGBT 422, the electric charges accumulated in the trigger condenser 416 flow in the common ground signal line S10 through the diode 420 and the IGBT 422.

By the discharge of the trigger condenser 416, electric current flows in the low voltage side coil of the trigger transformer 414, and high voltage is induced thereby in the high voltage side coil of the trigger transformer 414. Since the trigger voltage induced in the high voltage side coil is applied to the trigger electrode of the xenon tube 410, the xenon gas in the xenon tube 410 is ionized. As a result of the ionization of the xenon gas, the resistance between the anode and cathode terminals is rapidly lowered, thereby producing a spark current flowing from the anode terminal to the cathode terminal in order to emit flash light. Thus, the strobe light F1 is projected towards the object 452.

The quantity of light F3 reflected from the object 452 is increased by the strobe light F1. The integral value output from the integration circuit 444, and varying according to the increase in the reflected light F3 is compared with the optimal integral value, which is a value of the signal S8. If the integral value reaches the optimal integral value, a quenching signal S6 is inputted to the control circuit 430 from the comparative circuit 446.

It is checked by the control circuit 430 whether or not the quenching signal S6 is inputted (step 410). If the quenching signal S6 is inputted to the control circuit 430, the output of the emission trigger signal S3 is stopped to stop the emission of xenon tube 410 (step 428).

Conversely, if the quenching signal S6 is not inputted, it is judged by the control circuit 430 whether or not the time set in the timer circuit 454 is over (step 412).

If the set time is not over, the control is returned to step 410 where it is again checked whether or not the quenching signal S6 is inputted. On the other hand, if the time is over, then the output of the emission trigger 15 signal S3 is stopped. When no emission trigger signal S3 is output, the IGBT 422 is turned OFF; the electric current flowing in the xenon tube 410 is cut off by the IGBT 422; the strobe emission by the xenon tube 410 is stopped; and the condenser 416 is re-charged instantly.

When the output of the emission trigger signal S3 is stopped at step 414, the timer circuit 454 is inactivated (step 416). In addition, the integration circuit 444 is reset (step 418). The emission trigger signal S4 is then outputted to control the commencement of the emission of the xenon tube 412, in the same manner as the xenon tube 410.

When the IGBT 424 is turned ON by the light emission trigger signal S4, the electric charges in the trigger condenser 416 are discharged. A trigger pulse is then applied to the xenon tube 412 from the trigger transformer 414, and a flash is generated from the xenon tube 412 by the application of the trigger pulse.

Next, by the generation of flash by the xenon tube 412, the electric charges in the main condenser 419 are completely discharged, and the control does not proceed until the flash of the xenon tube 412 naturally ends (step 422). This is because, since the emission duration of the xenon tube 410 has exceeded a predetermined time ("YES" at step 412), unless the xenon tube 12 fully emits the strobe light, the color temperature balance of the strobe light would be broken.

The electric current flowing in the xenon tubes 410 and 412, that is, the emission control at steps 402 to 424 is shown in FIG. 53. When the electric charges remaining in the main condenser 419 are completely consumed by the flash of the xenon tube 412, and the time in which the flash light naturally disappears (time for full emission) lapses, the output of the light emission trigger signal S4 is stopped (step 424). Thus, even if the xenon tube 410 continues emitting during the maximum emission duration T, the xenon tube 412 fully emits strobe light. Accordingly, the color temperature of the resultant strobe light can be matched to the color temperature of the peripheral light E1.

Thereafter, in accordance with need, the electric charge completion signal S1 is outputted again from the control circuit 430 to the charging circuit 428 to be ready for a subsequent strobe emission control.

Also, if the input of a quenching signal S6 is detected during the emission of the xenon tube 410 (i.e., "Yes" at step 410), then the output of the light emission trigger signal S3 is stopped (step 428). Similar to step 416, the timer circuit 454 is then inactivated (step 430).

Furthermore, in order to perform the quenching control operation to control the light emission quantity of the xenon tube 412, the optimal integral value (digital data) for the xenon tube 412 is outputted to the D/A convertor (step 432). The optimal integral value is determined, based on the light emission quantity B of the xenon tube 412. The integration circuit 444 is then reset (step 434), and the integration by the integration circuit 444 is commenced (step 436). The cumulative light quantity which varies in accordance with the strobe light F2 projected onto the object 452 from the xenon tube 412 is measured based on the integral value of the integration circuit 444.

Upon commencement of the integration performed by the integration circuit 444, the light emission trigger signal 54 is outputted to the IGBT 424 to commence the emission of the xenon tube 412. The control circuit 430 monitors whether or not the quenching signal S6 is outputted (step 440). If the quenching signal S6 is outputted from the comparative circuit 446 to the control circuit 430 (i.e., "Yes" at step 440), the output of the light emission trigger signal S4 is stopped to stop the emission of the xenon tube 12. The integration circuit 444 is then reset, and preparation is made for a subsequent strobe emission control (step 444).

FIG. 54 shows wave shapes of various signals when the quenching signal S6 is inputted during the emission of the xenon tube 410, that is, the emission of the xenon tubes 410 and 412 at steps 402 to 444. From this figure, it can be understood that the quenching signal S6 is inputted to the control circuit 430 within the maximum emission duration T and that the emission of the xenon tube 410 is stopped at a time within the maximum emission duration T.

Thus, if the quenching control is well performed, it is possible to match the resultant color temperature of the strobe light F1 and F2 to the measured color temperature of the peripheral light E1. It is further possible to obtain an optimal exposure, since each of the optimal integral values that control the respective emission intensities of the xenon tubes 410 and 412 is determined, based on the light emission quantities A and B.

When the strobe emission is completed, a shift pulse is outputted, under the control of the control circuit 430, from the image photographing element driving circuit 436 to the solid state image photographing element 438. The shift pulse from the image photographing element driving circuit 436 terminates the accumulation of the electric charges in the solid state image photographing element 438 and causes the diaphragm 440 to be closed. Thereafter, the signal electric charge readout control signals, such as transfer pulses, are outputted from the image photographing element driving circuit 436 to the solid state image photographing element 438, and the signal electric charges accumulated in the solid state image photographing element 438 are sequentially read out and outputted as image photographing signals to the amplifiers 433, 435 and the signal processing circuit 434.

The image signals outputted from the solid state image photographing element 438 are converted to a predetermined format of image signals by the signal processing circuit 434, and then recorded on a recording media (not shown) by the memory circuit 432.

As described above, although the light emission quantity control of at least two xenon tubes is performed based on measured color temperature data of the peripheral light E1, since the emission duration of the xenon tube that is to emit the strobe light first is limited, there is no deviation of the resultant color temperature of the strobe light from the target color temperature caused by lack of the electric charges for the subsequent emission by the second xenon tube, derived from the consumption of a large quantity of electric charges in the main condenser 419 during the first emission.

According to the illustrated embodiment of the present invention, since the trigger circuit 471, the charging circuit 428, and the main condenser 419 are common to both the two xenon tubes 410 and 412, the use of the two xenon tubes do not invite an increase in the number of the associated components, thus resulting in a reduction of the manufacturing cost and an enhanced reliability of the apparatus.

Figure 55:
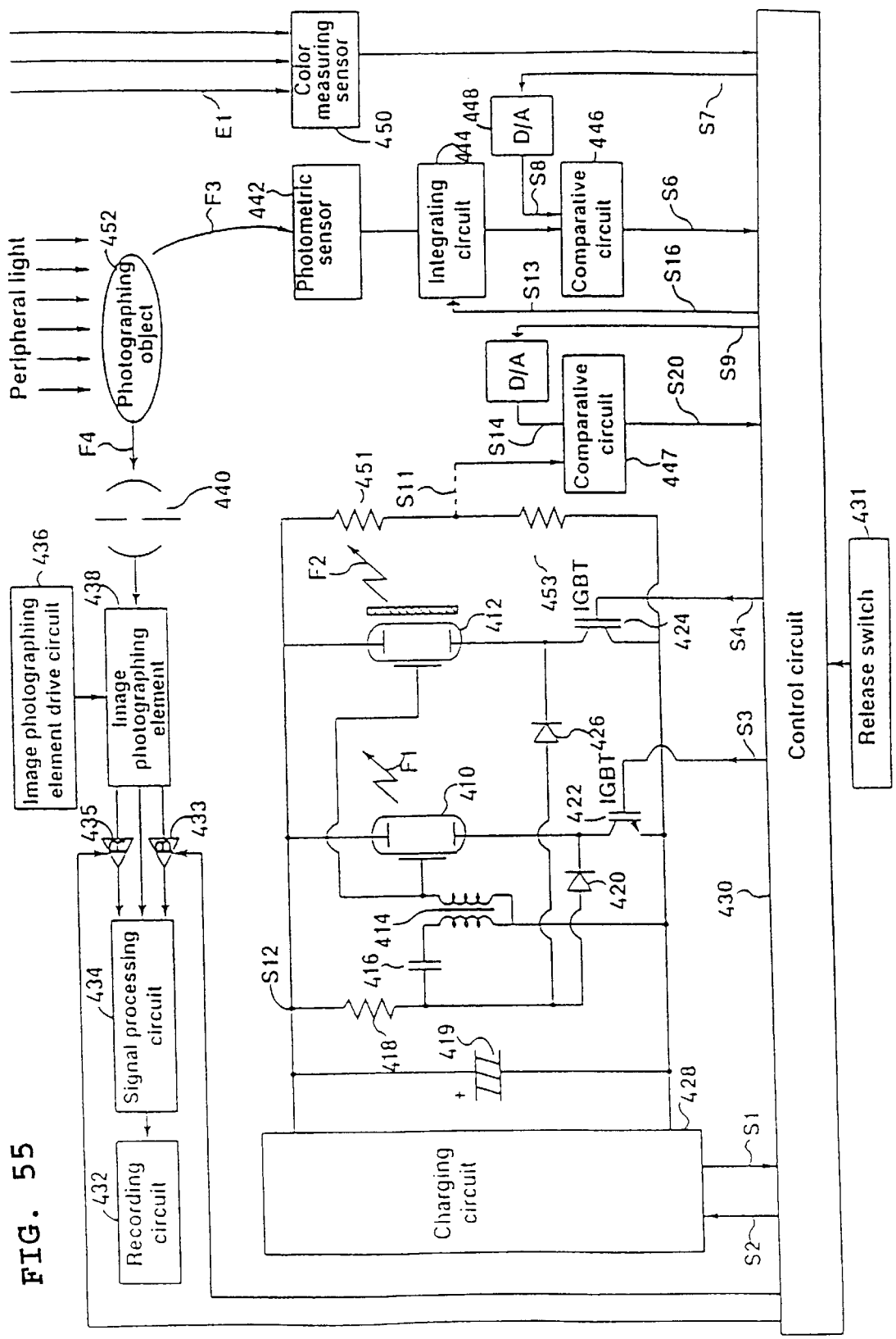
FIG. 55 is an eighth block circuit diagram of a still video camera, to which the present invention is applied.

FIG. 55 shows an eighth block circuit diagram of a still video camera according to the present invention, in which the elements corresponding to those in the previous embodiments are designated by like reference numerals. The difference of this block circuit from the previous ones resides only in the restriction of the light emission quantity of the first xenon tube that is to emit first is carried out, based on the signal S20 inputted from the comparative circuit 447.

One of the input terminals of the comparative circuit 447 is connected to the intermediate contact point of the resistors 451 and 453 that are connected between a signal line S12 and a common ground signal line S10. The other input terminal of the comparative circuit 447 is connected to the output signal of the D/A convertor 449. The input terminal of the D/A convertor 449 is connected to the control circuit 430, so that the digital data corresponding to the comparison reference voltage value is inputted from the control circuit 430 as signal 59.

The output terminal of the comparative circuit 447 is connected to the control circuit 430, and the comparison result by the comparative circuit 447 is inputted to the control circuit 430 as a signal S20.

Figure 56:
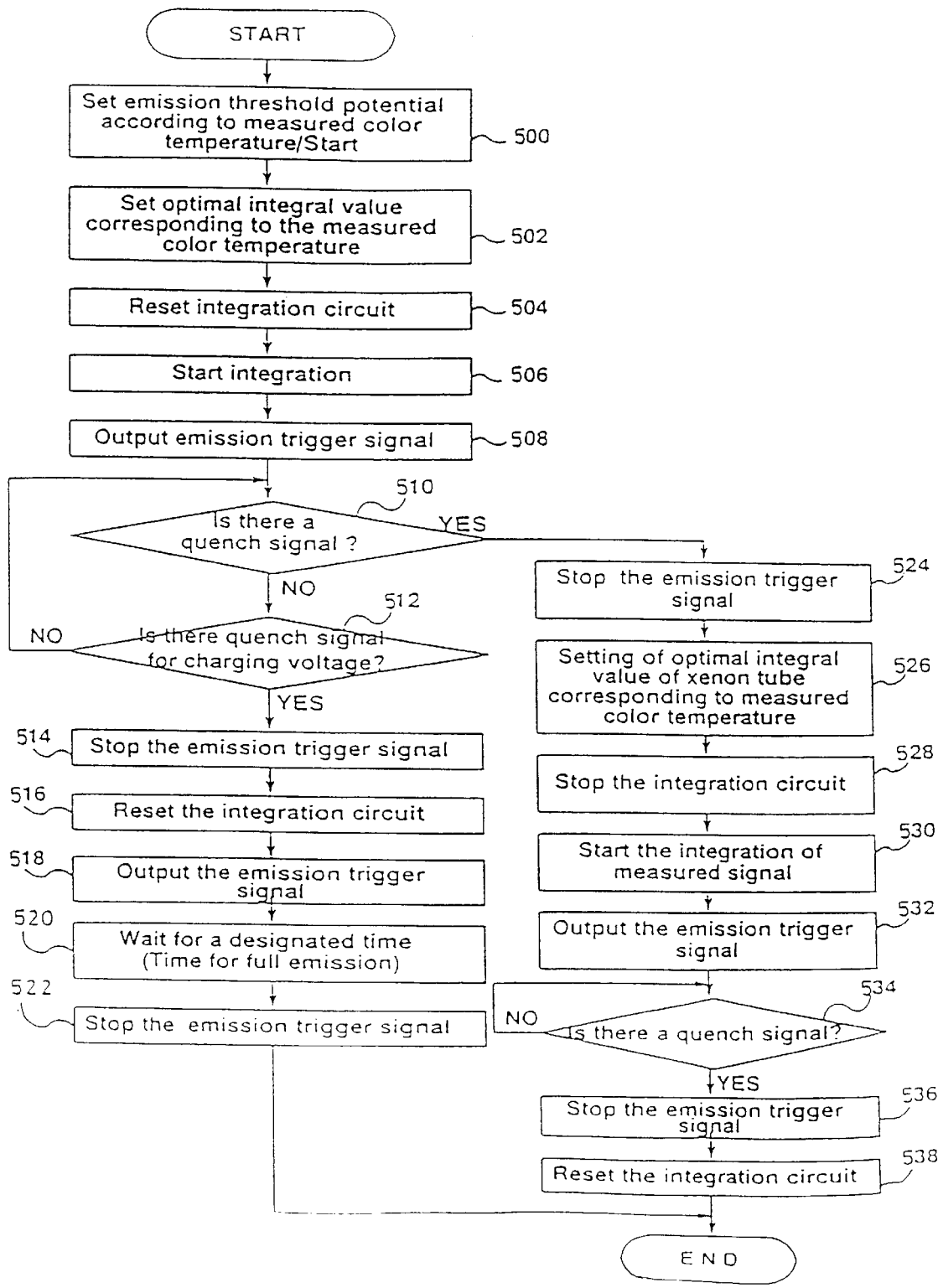
FIG. 56 is a flow chart of sequential operations of a still video camera shown in FIG. 55.

The operation of the arrangement shown in FIG. 55 will be described below. FIG. 56 shows a flow chart of the operation. When the enactment of strobe photographing was determined by the previously carried out exposure calculation operation, the light emission quantity ratio of the xenon tube 410 and the xenon tube 412 is determined according to the measured color temperature as discussed above.

The potential of the signal line S12 is lowered by the accumulated electric charge in the main condenser 419, which is consumed by the emission of the first xenon tube that emits. Therefore, the xenon tube that is to emit first is inactivated when the potential reaches a predetermined value, so that a shortage of electrical charges for the subsequent emission by the second xenon tube does not occur, similar to the previous embodiments. As a result, neither the change of the light emission quantity ratio of the xenon tubes 410 and 412 nor deviation of the synthetic color temperature of the entire strobe light from the target color temperature occurs.

The comparative circuit 447 is thus used to monitor the potential of a signal S11 which is proportional to the potential at a signal line S12. It is assumed that the light emission quantity ratio of the xenon tubes 410 and 412, which has been determined in accordance with the measured color temperature, is A:B. It is further considered that the potential of the signal S11 at the time when the charging of the main condenser 419 is completed is C.

The emission threshold potential V1 of the signal S11 at which the emission of the first xenon tube (e.g., xenon tube 410) must be stopped in order to maintain the above mentioned light emission quantity ratio, even when all of the electric charges in the main condenser 419 are consumed by the emission of the xenon tubes 410 and 412, is determined as follows.

The light emission quantity of the xenon tube is not proportional to the charging voltage of the main condenser 419. Therefore, the emission threshold potential V1 of the main condenser 419 corresponding to the xenon tube 410 is pre-stored (in a data table) corresponding to each color temperature in the memory within the control circuit 430. According to the measured color temperature of the peripheral light E1, the emission threshold potential V1 of the xenon tube 410 is read out from the data table in the memory and set in the D/A convertor 449 (step 500). The digital data that indicates the threshold potential V1 is converted by the D/A convertor 449 to an analog voltage that is then inputted to the comparative circuit 447.

Furthermore, as in the previous embodiment, the optimal integral value of the xenon tube 410 that corresponds to the measured color temperature of the peripheral light E1 is outputted to the D/A convertor 448. In other words, the data for the quenching control is set in the D/A convertor 448 (step 502). The integration circuit 444 is then reset, and the measurement of the cumulative light quantity of reflected light by the integration circuit 444 is commenced (steps 504 to 506).

Along with the commencement of the integration by the integration circuit 444, the emission trigger signal S3 is outputted from the control circuit 430 to the IGBT 422 and the emission of the xenon tube 410 is commenced (step 508). It is determined that the quenching signal is to be inputted from the comparative circuit 446 when the quantity of the reflected light by the integration circuit 444 reaches an appropriate amount (step 510). If the quenching signal is inputted, it is assumed that the appropriate quantity of light has been reflected from the object 452, and the output of the emission trigger signal S3 is stopped by the control circuit 430 to stop the emission of the xenon tube 410 (step 524).

Conversely, if the quenching signal 56 is not inputted, then, whether or not the quenching signal S20 is inputted from the comparative circuit 447 is determined (step 512). In other words, whether or not the potential of the signal S11 is the emission threshold potential V1 is determined. If so, the output of the emission trigger signal S3 is stopped to forcibly stop the emission of the xenon tube 410 (step 514).

Since the xenon tube 418 has emitted the threshold value of strobe light, the xenon tube 412 is made to emit strobe light by consuming all of the remaining electric charges in the main condenser 419. After the integration circuit 444 is reset (step 516), a light emission trigger signal S4 is outputted from the control circuit 430 to the IGBT 424. The emission of the xenon tube 412 is then commenced by the emission trigger signal S4 (step 518).

Control does not proceed until all of the electric charge in the main condenser 419 is consumed and the emission of the xenon tube 412 becomes extremely weak (step 520). Thereafter, the output of the light emission trigger signal S4 is stopped (step 522) to be made ready for the charging of the main condenser 419 in a new emission control operation.

On the other hand, if during the emission of the xenon tube 410, a quenching signal S6 is inputted (i.e., "Yes" at step 510), electric charges in the main condenser 419 are more than sufficient to compensate for the emission of the xenon tube 412. Consequently, the optimal integral value for the xenon tube 412 is outputted from the D/A convertor 448 to the comparative circuit 446 in order to perform quenching control upon the emission of the xenon tube 412 (step 526).

The integration circuit 444 is then reset (step 528); the integration by the integration circuit 444 is commenced (step 530); and the quenching control of the xenon tube 412 is commenced, based on the new optimal integral value. Along with the commencement of the integration by the integration circuit 444, the emission trigger signal S4 is outputted from the control circuit 430 to the IGBT 424 to commence the emission of the xenon tube 412 (step 532).

When the integral value of the integration circuit 444 becomes the optimal integral value, the quenching signal S6 is inputted from the comparative circuit 446 to the control circuit 430 (step 534), and the output of the emission trigger S4 is stopped by the control circuit 430 (step 536), and the integration circuit 444 is reset (step 538).

Therefore, in this embodiment, in order to prevent the consumption of a larger quantity of electrical charges in the main condenser 419 by the light emission quantity of the xenon tube that is to emit first, there is a limit to the light emission quantity of the first xenon tube. The limiting means is effective when the potential of the signal line S12, which is decreased by the consumption of the electric charges of the main condenser 419, that is, the potential of the signal S11, becomes equivalent to the emission threshold potential determined based on the light emission quantity ratio which is, in turn, determined based on the color temperature of the peripheral light E1.

Accordingly, there is no deviation of the synthetic color temperature of the entire strobe apparatus 470 from the target value during the quenching control, which would otherwise be caused by the consumption of a large quantity of light by the xenon tube that emits first, resulting in a lack of emission quantity of the second xenon tube that subsequently emits strobe light.

Figure 57:
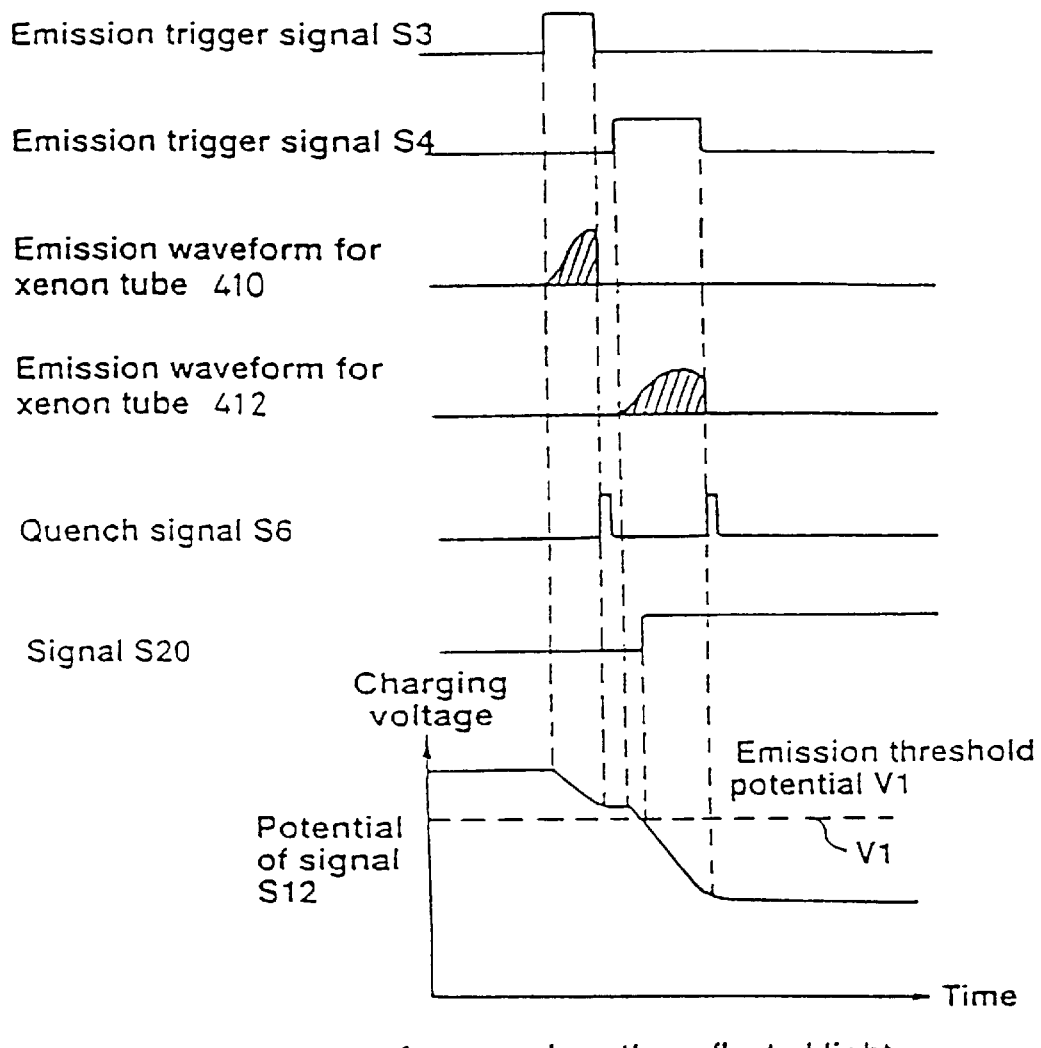
FIGS. 57 and 58 are diagrams of waveforms of an electric current of xenon discharge tubes upon emission of light, in accordance with potential voltage of a main condenser in a still video camera shown in FIG. 55.
Figure 58:
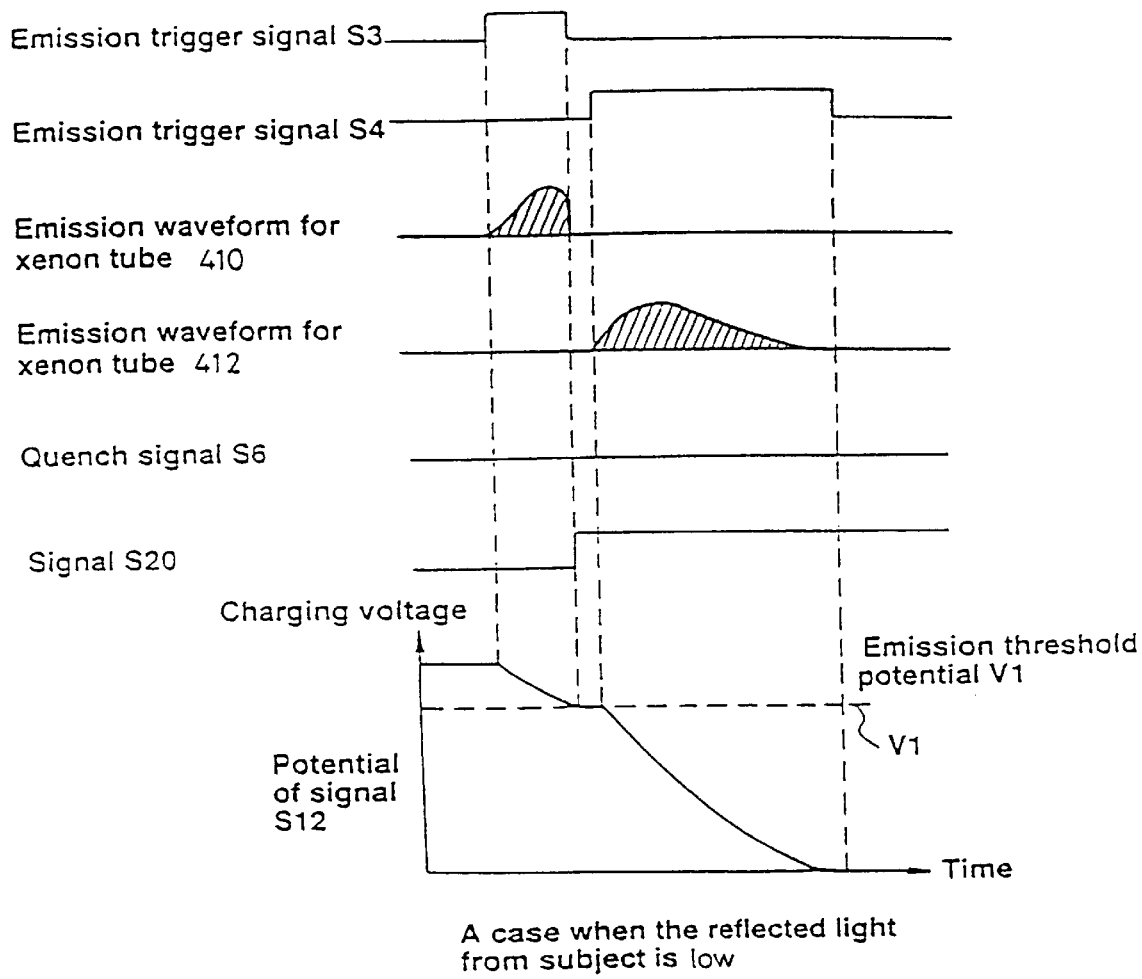

FIGS. 57 and 58 show the emission waveforms of the xenon tubes 410 and 412, controlled by the operation in a loop from step 500 to 538, and the potential of the quenching signals S6 and S20 and the signal line S12, that is, the variation of the divided voltages of the main condenser 419. Namely, FIG. 57 shows an example of when the quantity of reflected light F3 from the object 452 is high and the emission of the xenon tube 410 is stopped by the input of the quenching signal S6 into the control circuit 430 during the quenching control.

FIG. 58 shows an example of when the reflected light F3 from the object 452 is low and no quenching signal S6 is inputted to the control circuit 430 by the quenching control; i.e., the operations at steps 512 to 522 which are performed, in response to "No" at step 510.

The above embodiment has been explained for the situation when the emission ratio A:B is such that A<B. When, conversely, A>B the xenon tube 412 emits light first. Further the sequence of the trigger signals S3 and S4 is reversed.

According to the above-mentioned embodiments, a plurality of xenon tubes having differing emission color temperatures are provided and the light emission quantity of each xenon tubes is determined so as to match the color temperature of the peripheral light of the object, as discussed above. Based on the light emission quantities thus obtained, the emissions are successively effected by the xenon tubes in such a way that the emissions are shifted from the xenon tube of a smaller emission quantity towards the xenon tube of a larger emission quantity. Furthermore, according to the illustrated embodiments, provision is made to limiting means for restricting the emission quantity of the preceding xenon tube(s) with respect to the subsequent xenon tube(s) to prevent lack of the electric charges supplied to the subsequent xenon tube(s) stemming from the heavy consumption of electric charges of the main condenser by the emission of the preceding xenon tube(s) during the quenching control, to thereby prevent the synthetic emission color temperature of all of the xenon tubes from deviating from the color temperature of the peripheral light.

The limiting means is in the form of a temporal limiting means for restricting the emission duration in accordance with time counted by the timer circuit 454, etc., or in the form of a control means for controlling the emission quantity in accordance with the voltage values applied to the xenon tubes by the electric charges of the main condenser 419, which is decreased by the emission of which is decreased by the emission of the xenon tubes. The limiting means effectively prevents a large amount of electrical charges of the main condenser from being consumed by the emission of the preceding xenon tubes, to thereby prevent the synthetic color temperature of the entire strobe apparatus from deviating from the target color temperature.

Furthermore, since the main condenser 419 and the charging circuit 428, for accumulating the electric charges in the main condenser 419, are common to the xenon tubes, there is no increase in the number of associated elements in spite of the provision of a plurality of xenon tubes, thus resulting in a reduction of the manufacturing cost and installation space of the elements, reduction of the weight of the entire apparatus, and an improved reliability of the entire apparatus.

Moreover, if an attempt is made to adjust the color temperature by short, multiple emissions of a plurality of xenon tubes, a substantial part of the electric charges in the main condenser would be consumed to produce the trigger pulses to be applied to the xenon tubes at the commencement of each of the repeated emissions, so that the electrical charges left in the main condenser would be too small to generate flash. However, according to the invention, since each xenon tube executes one emission, electrical charges of the main condenser are not wastefully consumed to generate the trigger pulses, etc., and hence, the electrical charges can be effectively used for the strobe emission.

The number of xenon tubes is not necessarily restricted to two as in the above mentioned embodiments. For example, it is possible to use three xenon tubes, each having R, G and B color filters to perform a finer control of the color temperature of the strobe light. The color filters provide three different levels of emission color temperatures. In this case, the quantities of light to be emitted by the first and second xenon tubes are restricted by the limiting means.

Namely, in an alternative in which there are N xenon tubes, the resultant color temperature of the strobe lights is controlled in such a way that the emission quantities to be emitted from the first to (N−1)th xenon tubes are restricted. It is also possible to restrict the largest light quantities of all of the N xenon tubes by the control means.

Furthermore, although the switching means for controlling the emission and cessation of each xenon tube comprises IGBTs such as 422 and 424 in the above-mentioned embodiments, the switching means is not limited to IGBTS. For example, the IGBTs can be replaced with a plurality of thyristors. The measuring means for measuring the strobe light reflected from the photographing object 452 and the quenching signal generating means are not limited to the operational amplifier and the analog comparator, respectively, as in the illustrated embodiments. For example, the integrating circuit and the comparator circuit may be constructed by digital circuits.

The light reflected from the object and received by the photometric sensor 442 and the color measuring sensor 450, can be part of light transmitted through the photographing lens system provided in the solid state image photographing element 438. This makes it possible to more precisely measure the quantity of light incident on the solid state image photographing element 438.

In addition, although in each of the above-mentioned embodiments the main condenser 419 and the trigger circuit 471 are common to the xenon tubes 410 and 412, while the separate IGBTs which constitute the switching means for controlling the emission of the xenon tubes 410 and 412 are independently provided for the xenon tubes, it is possible to provide a single switching means common to the xenon tubes and provide separate trigger circuits and main condensers independently for the respective xenon tubes, so that the trigger circuits can be independently activated in response to the control signals from the control circuit 430. If the emission of only one of the xenon tubes is necessary, the common switch means is turned ON and at the same time, the control signal is outputted from the control circuit 430 to the trigger circuit of the associated xenon tube that is required to emit, so that the trigger pulse is applied only to that xenon tube to effect the emission. The emission of the xenon tube stops when the switching means is turned OFF.

This makes it possible to control the emission of a plurality of xenon tubes independently by the respective trigger circuits, or to repeat the emission and cessation of emission of each xenon tube. Alternatively, it is also possible to provide independent switching means and trigger circuits for each xenon tube. Although the above-mentioned embodiments are applied to a still video camera, the present invention can also be generically applied to a strobe apparatus comprising the strobe apparatus 470, the photometric sensor 450, and the color measuring sensor 442, etc. Namely, the present invention can be applied to a strobe apparatus which does not have a still video photographing circuit, such as the solid state image photographing element 438, the signal processing circuit 434, or the memory circuit 432. The apparatus of the invention can be incorporated in a conventional still camera.

As described above, with the present invention, since the condenser for accumulating the electric charges for flashing are used commonly for a plurality of xenon tubes of differing color temperatures, and the light emission quantity of the preceding xenon tube(s) is restricted in accordance with the emission duration or the voltage drop of the main condenser, no excess consumption of the electric charges of the main condenser by the preceding tube(s) occurs. Accordingly, there is no deviation of the resultant color temperature of the strobe lights from a desired value. Furthermore, with fewer elements, a reduced manufacturing cost and weight of a strobe apparatus can be expected, thus resulting in a realization of a small, simple and reliable strobe apparatus.

Figure 59:
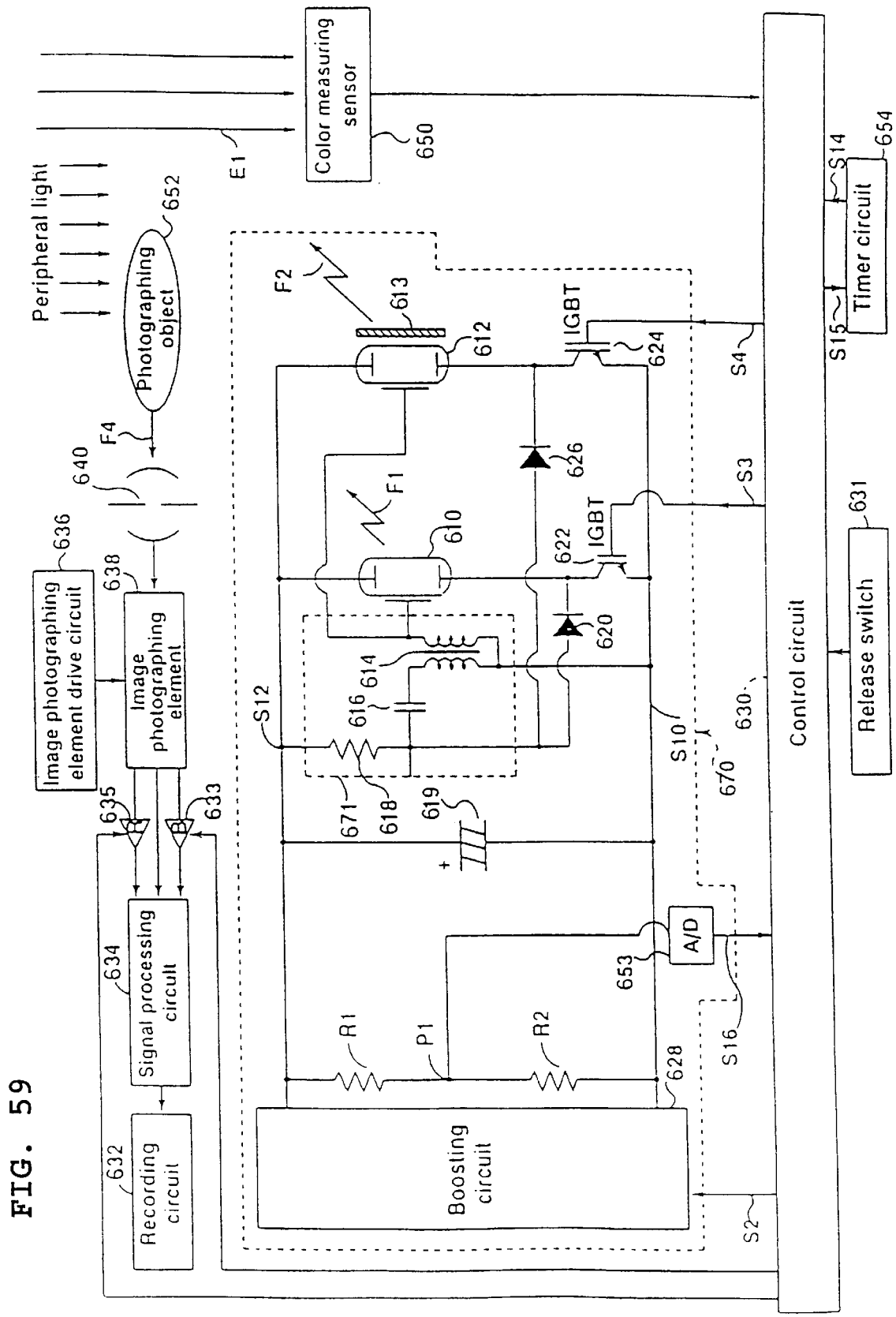
FIG. 59 is a ninth block circuit diagram of a still video camera, to which the present invention is applied.

The connection within the strobe apparatus 670 shown in FIG. 59 will be described below. The positive electrode of the main condenser 619, one end of resistors R1, 618 and the anode terminals of the xenon tubes 610 and 612 are connected to a signal line S12 to which the impulse voltage is outputted from the boosting circuit 628.

The negative electrode of the main condenser 619, the common terminal of a trigger transformer 614, the emitter terminals of IGBT 622 and 624 and one end of the resistor R2 are connected to the common ground signal line S10. The low voltage coil of the trigger transformer 614 is connected through the trigger condenser 616 to the other terminal of the resistor 618 as well as the anode terminals of diodes 620 and 626.

The cathode terminal of diode 620 is connected to the cathode terminal of the xenon tube 610 and to the collector terminal of IGBT 622. The cathode terminal of diode 626 is connected to the cathode terminal of the xenon tube 612 and to the collector terminal of IGBT 624. The point at which resistor R1 and resistor R2 are connected is connected to A/D convertor 653 and the output terminal of the A/D convertor 653 is connected to the control circuit 630 to which the digital data S16 converted by A/D convertor 653 is inputted.

The base terminals of the IGBTs 622 and 624 are connected to the control circuit 630, and electric current flows from the collector terminals to the emitter terminals of the IGBTs 622 and 624 when the IGBTs 622 and 624 are turned ON by the emission trigger signals S3 and S4, respectively, outputted by the control circuit 630.

The electric charge in the trigger condenser 616 is discharged through a diode 620 when the IGBT 622 is turned ON or through a diode 626 when the IGBT 624 is turned ON. Accordingly, the electric current flows in the low voltage coil of a trigger transformer 614 and a trigger pulse is induced at the high voltage coil of the trigger transformer 614.

This trigger signal is applied to the trigger electrodes of the xenon tubes 610 and 612 and a flash is produced in the xenon tube 612. In other words, when the IGBTs 622 and 624 are respectively turned ON, the diodes 620 and 626 function as rectifying elements enabling each of the xenon tubes 610 and 612 to generate flashes independently.

To the control circuit 630 are connected the release switch 631 and the timer circuit 654 that are provided in a still video camera body, and various kinds of controls are performed by the control circuit 630 according to the operation of the release switch 631. Lights F1 and F2 emitted by the xenon tubes 610 and 612 are projected onto the object 652.

Also, an electric charge commencement signal S2 which indicates the commencement of electric charge accumulation to the main condenser 619 is inputted to the boosting circuit 628 from the control circuit 630.

Figure 60:
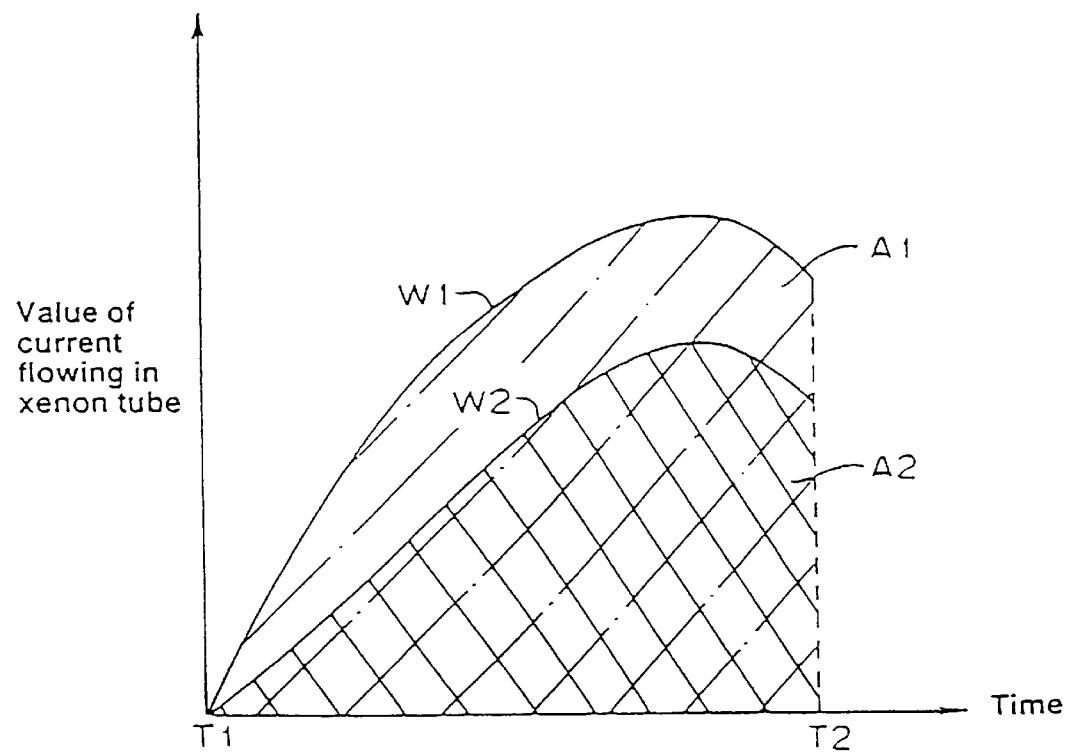
FIG. 60 is a diagram of waveforms of an electric current flowing through xenon discharge tubes at different charge voltages of a main condenser in a still video camera shown in FIG. 59.

As described above, the light emission quantities of the xenon tubes 610 and 612 vary according to the quantity of accumulated electric charge in the main condenser 619, i.e., according to the voltage of the signal line S12. FIG. 60 shows the variations of the electric current flowing in the xenon tubes, that vary depending on the magnitude of the charging voltage of the main condenser 619 at the time of the commencement of light emission.

In FIG. 60, the current curve W1 corresponds to the case wherein the charging voltage of the main condenser 619 has the voltage value V1 at the time T1 of the commencement of light emission, while the current curve W2 corresponds to the case wherein the charging voltage of the main condenser 619 has the voltage value V2 at the time T1 of the commencement of light emission, and the voltage value V1> (is larger than) voltage value V2. Also the time at which the light emission is suspended is indicated as T2. In this Figure, the areas A1 and A2 represent the light emission quantities of the xenon tube. As shown in FIG. 60, if the charging voltage of the main condenser 619 is low, even when the xenon tubes emit strobe light for the same duration of time, differences arise in the light emission quantities, and the reduction of light emission quantity is not simply proportional to the charging voltage. Therefore, in the present embodiment, the light emission quantities of each of the xenon tubes 610 and 612 are respectively adjusted according to the value of the charging voltage of the main condenser 619 at the commencement of light emission in order to always make the light emission ratio of the xenon tube 610 and the xenon tube 612 constant.

This light emission ratio is a value determined by the color temperature of the peripheral light E1 measured by the color measuring sensor 650. Also, the time at which the light emission stops adjusting the light emission quantity of each of the xenon tubes 610 and 612 is determined, based on either the value of the charging voltage of the main condenser 619, which gradually decreases due to the light emissions by each of the xenon tubes, or by using a timer circuit 654 which is set according to the value of the charging voltage value of the main condenser 619 at the time of the commencement of light emission.

In line with this determination of light emission quantities of the xenon tubes 610 and 612, light emissions are controlled in a such a manner that the xenon tube with the lower light emission quantity emits first. If the xenon tube having the larger light emission quantity emits strobe light first, a large amount of electrical charges accumulated in the main condenser would be consumed by the first emission of the xenon tube of large light emission quantity, so that an insufficient voltage for emitting strobe light would be applied between the anode and cathode terminals of the xenon tube that is to subsequently emit light.

Figure 61:
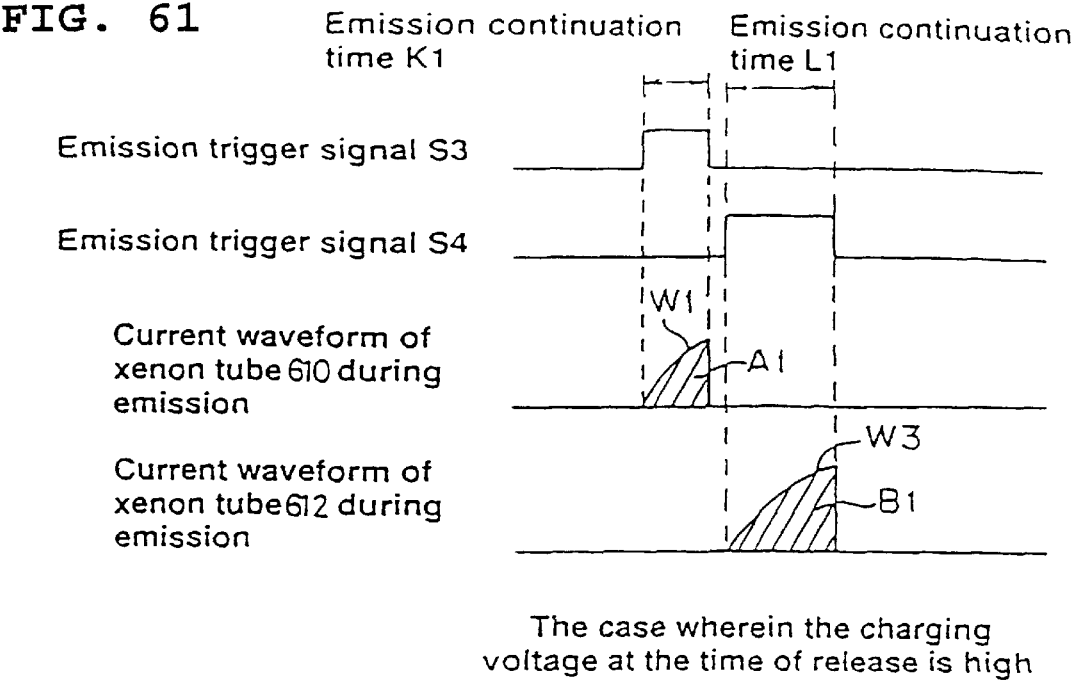
FIGS. 61 and 62 are diagrams of waveforms of an electric current flowing through xenon discharge tubes at different charge voltages of a main condenser in a still video camera shown in FIG. 59.
Figure 62:
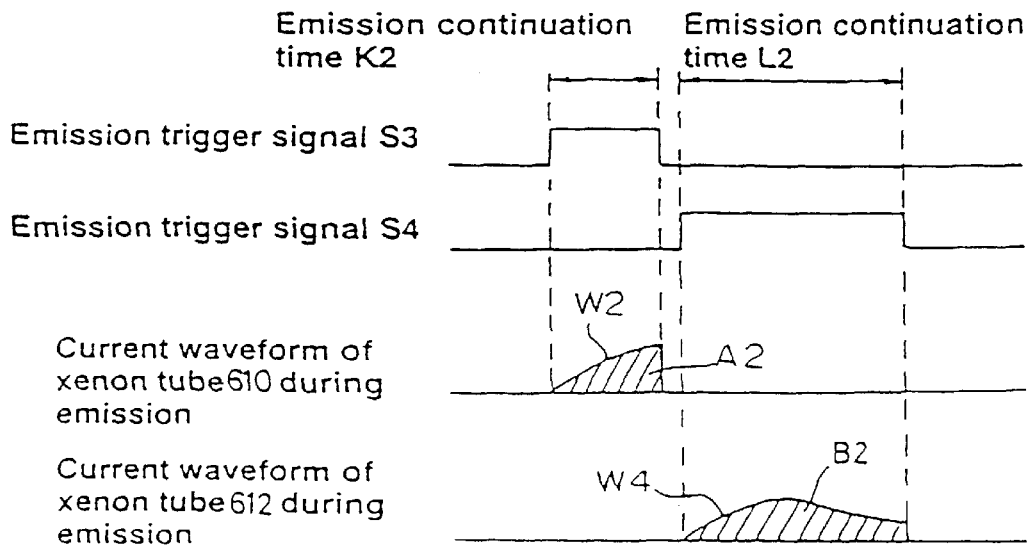
Figure 63:
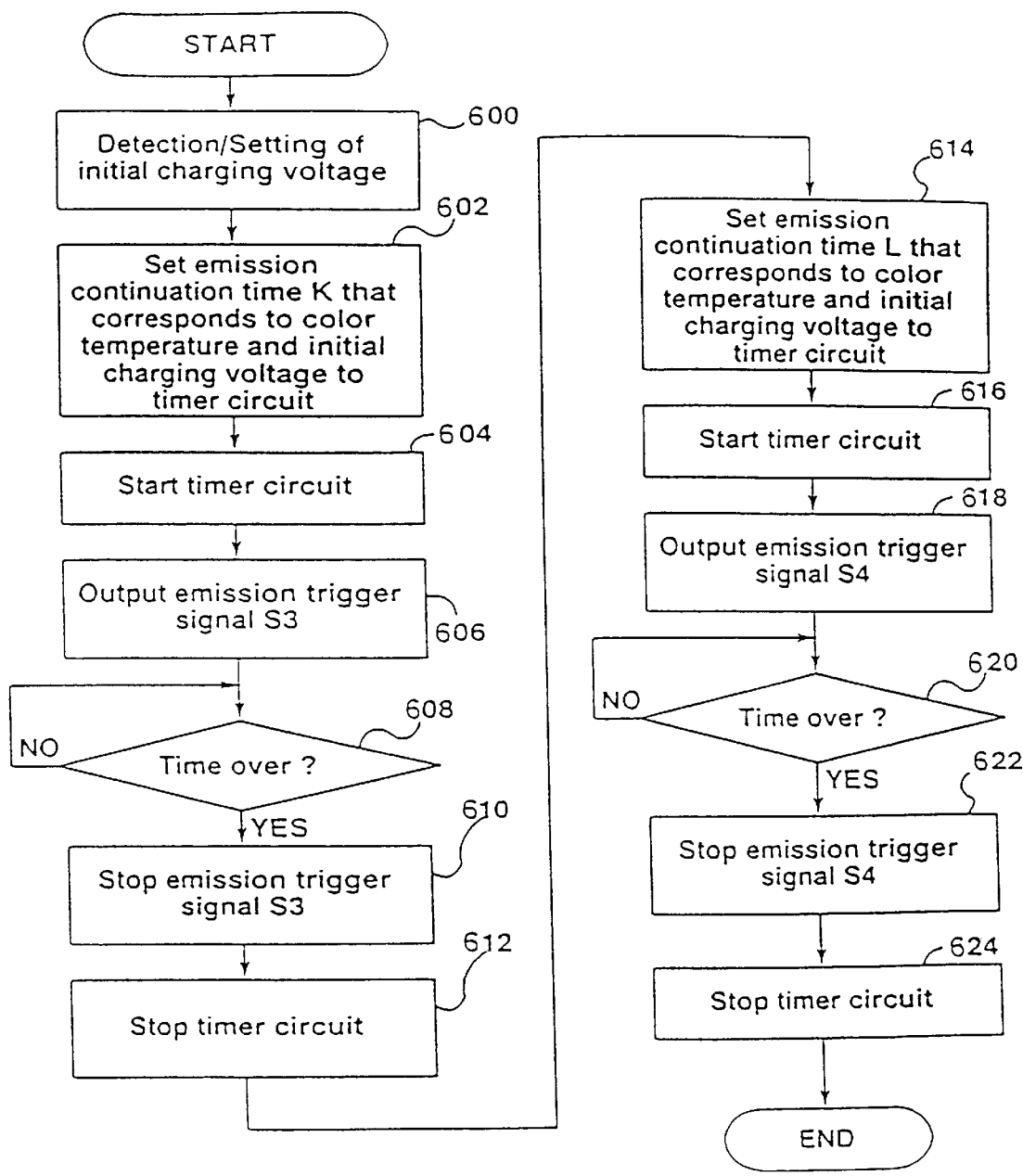
FIG. 63 is a flowchart of emission control operations of a still video camera shown in FIG. 59.

FIGS. 61 and 62 show the electric current waveforms of each of the xenon tubes 610 and 612 during the light emission. These current waveforms vary depending on the value of the charging voltage of the main condenser 619 at the time T1 of the commencement of light emission. FIG. 63 shows the strobe photographing operation in which the light emission quantity control of each of the xenon tubes 610 and 612 is performed.

In this figure, the charging voltage value of the main condenser 619 is detected by the digital data S16 inputted from the A/D convertor 653 (Step 600). Namely, since digital data S16 corresponds to the electric potential at the connection point P1, the potential of the signal line S12, that is, the charging voltage value of the main condenser 619 can be determined based on the given resistance values of resistors R1 and R2 and the electric potential of the connection point P1. When the maximum light emission of the strobe apparatus 670 is required by the photographer, the output of an electric charge commencement signal S2 continues until the charging voltage value of the main condenser 619, identified from the digital data S16, becomes identical to the electric charge completion voltage value.

If the release switch 631 is fully depressed before the charging voltage value of the main condenser 619 reaches the electric charge completion voltage value, the charging voltage value of the main condenser 619 at that moment is detected by the control circuit 630 in accordance with digital data S16. The charging voltage value is stored once in the memory furnished in the control circuit 630. The light emission ratio A:B of the xenon tubes 610 and 612 is then determined by the control circuit 630 based on the color temperature values of peripheral light measured by the color measuring sensor 650.

The light emission continuation time K and L for the xenon tubes 610 and 612, respectively, are calculated in accordance with the light emission ratio A:B, the photometric value determined at step D21 and the initial charging voltage value of the main condenser 619 determined at step 600.

The value of the total light emission quantity of the xenon tubes 610 and 612 is determined from the photometric value so that the quantity of the strobe light reflected from the object 652 is identical to the optimal exposure. Moreover, since the light emission quantities of the xenon tubes vary depending on the charging voltage value of the main condenser 619 at the time of the commencement of light emission as described above, the light emission continuation time K of the xenon tube 610 and the light emission continuation time L of the xenon tube 612 are respectively adjusted so that the light emission quantity ratio is always A:B.

Therefore, in comparing FIG. 61 in which the charging voltage value of the main condenser 619 is high, and FIG. 62, in which the charging voltage value of the main condenser is low, it can be seen that area A1 (the light emission quantity of the xenon tube 610): area B1 (the light emission quantity of the xenon tube 612) =area A2: area B2, but the light emission continuation time K1 of the xenon tube 610 the light emission continuation time L1 of the xenon tube 612 is not identical to the light emission continuation time K2 of the xenon tube 610 : the light emission continuation time L2 of the xenon tube 612 ($k_1 < k_2$, $L_1 < L_2$). However, the total light emission quantities of the xenon tubes 610 and 612 in FIGS. 61 and 62 are controlled to be identical.

Although, in FIGS. 61 and 62, the xenon tube with a higher light emission color temperature is made to emit first, there is a case where the xenon tube with a lower light emission color temperature is caused to emit first. The order of the light emission is determined according to the measured color temperature of the peripheral light E1. For example, in the case that the color temperature of the peripheral light E1 is relatively low, in order to make the resultant light emission color temperature value of the strobe apparatus low, the light emission quantity of the xenon lamp 610 having a higher light emission color temperature is made relatively low, and the light emission quantity of the xenon lamp 612 having a lower light emission color temperature is made relatively high. To this end, in such a case, the xenon lamp 610 of lower light emission quantity is controlled to emit strobe light before the xenon lamp 612 does, as shown in FIGS. 61 and 62.

Therefore, if the color temperature of peripheral light E1 is high, the xenon lamp 612 emits the strobe light first, since the light emission quantity of the xenon lamp 610 is higher than that of the xenon lamp 612.

The light emission continuation time K, determined in accordance with the above requirements, is set in the timer circuit 654 (step 602), and the time measuring operation of the timer circuit 54 is cued by the control circuit 630 (step 604). Thereafter, in order to emit the strobe light from the xenon tube 610, a light emission trigger signal S3 is outputted from the control circuit 630 (step 606).

The IGBT 622 is turned on by the light emission trigger signal S3, and the electric charge stored in the trigger condenser 616 flows towards the common ground signal line S10 through the diode 620 and the IGBT 622.

By the discharge of the trigger condenser 616, an electric current flows in the low voltage side coil of the trigger transformer 614, and a high voltage trigger signal is induced in the high voltage side coil of the trigger transformer 614. Since this trigger voltage is applied to the trigger electrode of the xenon tube 610, the xenon gas in the xenon tube 610 is ionized. The ionization of the xenon gas causes the resistance between the anode and cathode terminals to be rapidly lowered, thereby producing a spark current flowing from the anode terminal to the cathode terminal in order to produce a flash. The flash is then projected onto the photographing object 652 as strobe light F1.

Whether or not the elapsed time from the commencement of light emission of the xenon tube 610 becomes identical to the light emission continuation time K set at step 602 is determined by the control circuit 630 from the time over signal S14 inputted to the control circuit 630 from timer circuit 654 (step 608).

When the time over signal S14 is inputted from the timer circuit 654 (i.e. "Yes" at step 608), the output of the light emission trigger signal S3 is stopped (step 610). When the output of the light emission trigger signal S3 is ceased, the IGBT 622 is turned off; the electric current flowing through the xenon tube 610 is cut off by the IGBT 622; the strobe light emission by the xenon tube 610 stops and the trigger condenser 614 is re-charged instantly. The time counting operation of the timer circuit 654 is then stopped by the control circuit 630 (step 612).

Next, the light emission continuation time L of the xenon tube 612 that has been determined as described above is set in the timer circuit 54 (step 614). Although the value of the light emission continuation time L was determined along with the determination of the light emission continuation time K at step 602, it is also possible to determine the same during the operation at step 614. Moreover, in the operation of step 614, it is possible to obtain again the charging voltage value of the main condenser 619 based on the digital data S16 inputted from the A/D converter, to thereby obtain the light emission ratio A:B with regard to the light emission continuation time K, in accordance with the electric charging voltage value of the main condenser 619 after the light emission of the xenon tube 610, is stopped.

Thus, the light emission quantity of the xenon tubes 610 and 612 can be more precisely controlled. After the light emission continuation time L is set in the timer circuit 654 at step 614, the time measuring operation of the timer circuit 654 is commenced (step 616), and the light emission trigger signal S4 is outputted from the control circuit 630 to the IGBT 624 (step 618). The IGBT 624 is turned ON by the light emission trigger signal S4, so that the electric charge in the trigger condenser 616 is discharged. The trigger signal is then applied to the xenon tube 612 by the trigger transformer 614, so that a flash is generated by the xenon tube 612.

Based on the time over signal S14 inputted to the control circuit 630 from the timer circuit 654, whether or not the elapsed time from the commencement of light emission of the xenon tube 612 is equivalent to the light emission continuation time L (step 620) is checked.

When the time over signal S14 is inputted from the timer circuit 654 (i.e. "Yes" at step 620), the output of light emission trigger signal S4 is stopped (step 622). The light emission by the xenon tube 612 is stopped by the absence of the output of light emission trigger signal S4. The time measuring operation of the timer circuit 654 is then stopped (step 624), and the strobe light emission control is completed.

After the strobe light emission control is thus completed, the main condenser is recharged, if necessary, to be ready for a subsequent strobe light emission control.

Figure 64:
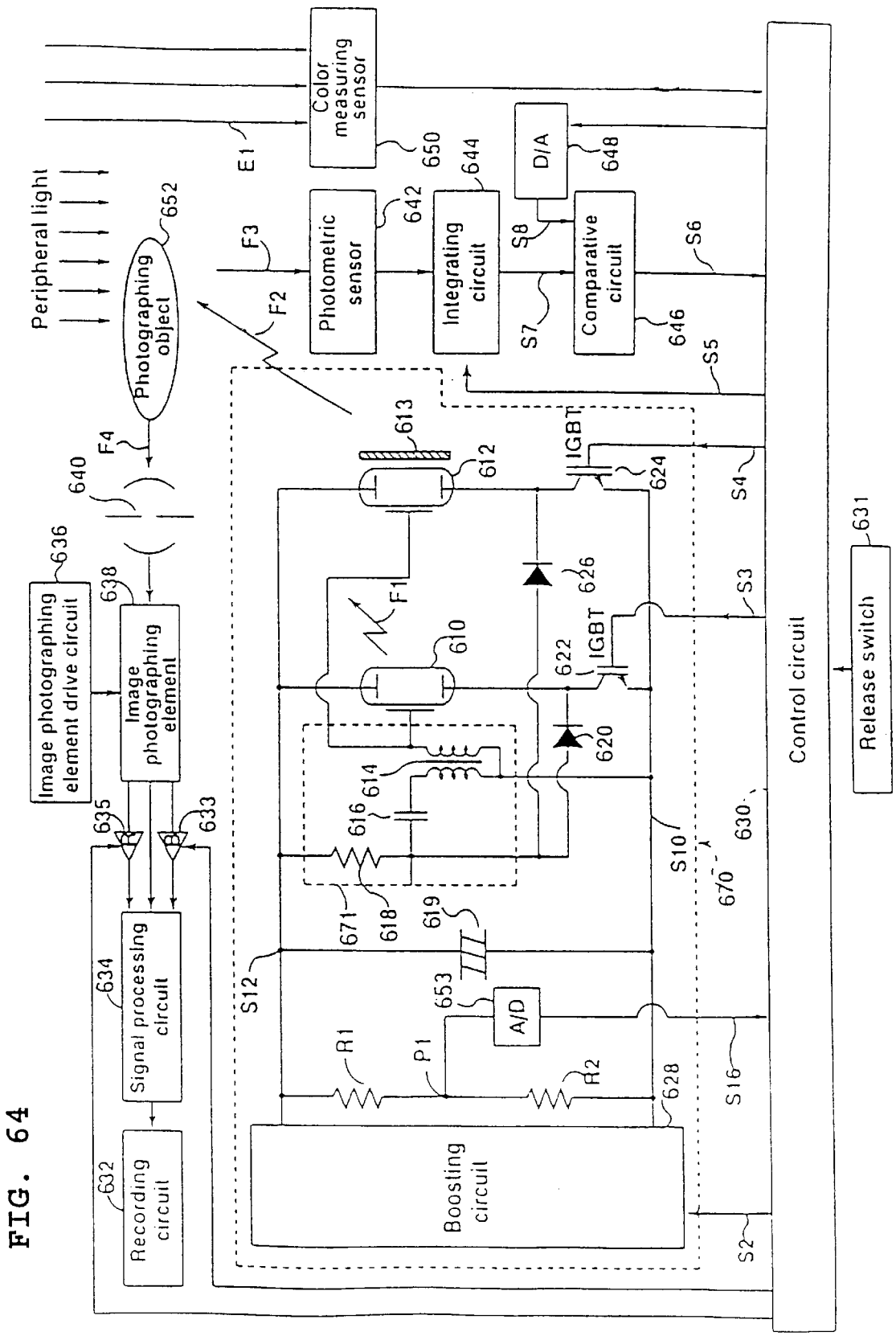
FIG. 64 is a tenth block circuit diagram of a still video camera, to which the present invention is applied.

FIG. 64 shows another embodiment of the present invention. In FIG. 64, the elements corresponding to those in the previous embodiments are designated with like numerals. The difference between this embodiment and the previous embodiment is that no timer circuit 654 is provided in this embodiment. Instead, a quenching control circuit comprising a photometric sensor 642, an integration circuit 644, a D/A converter 648 and a comparator 646 is provided. The quenching circuit is identical to that shown in FIG. 31.

Figure 65:
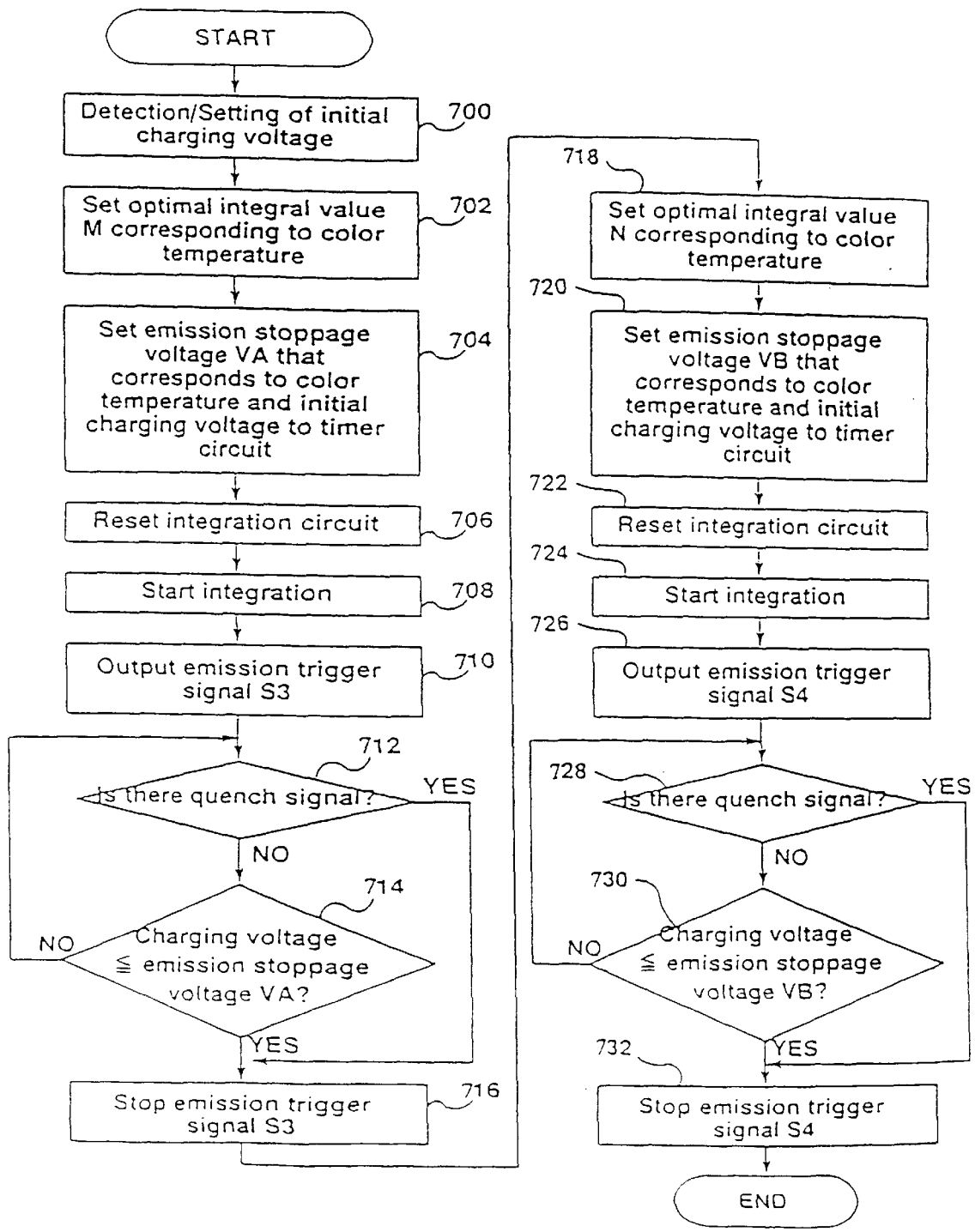
FIG. 65 is a flowchart of emission control operations of a still video camera shown in FIG. 64.

The operation of the apparatus shown in FIG. 64 is as follows. A flowchart of the strobe light emission control is shown in FIG. 65. Since the entire photographing process of the still video camera to which the present embodiment is applied is the same as that in the previous embodiment (shown in FIG. 31), no description thereof will be given herein. As in the previous embodiment, the light emission ratio A:B of the xenon tubes 610 and 612 is determined according to the measured color temperature of the peripheral light E1 by the color measuring process prior to the strobe light emission control.

When the strobe light emission control is commenced, the charging voltage value of the main condenser 619 is detected using the digital data S16 inputted from the A/D convertor 653. The charging voltage value of the main condenser 619 thus obtained is stored in memory (step 700).

The optimal integral value M of the xenon tube 610 corresponding to the measured color temperature of the peripheral light E1 is sent to the D/A convertor 648 (step 702). The optimal integral value will be described below. The exposure for obtaining a good image, that is, the optimal exposure Q, is determined by the sensitivity of a solid state image photographing element 638 and the value of the diaphragm 640 (in the case that the photometric sensor 642 is provided 25 outside the photographing optical system as in the present embodiment). Therefore, when the total light quantity U of reflected light F3 incoming from the object 652 is identical the optimal exposure Q during the electronic shutter release duration (equal to the electric charge accumulation period of 30 the solid state image photographing element 638), an optimum photographing image can be obtained.

Furthermore, the respective light emission quantities of the xenon tubes 610 and 612 which define the total light quantity U must satisfy the light emission ratio A:B. Therefore, from the optimal exposure Q and the light emission ratio A:B, the cumulative light quantity O of the reflected light F3 during the light emission of the xenon tube 610 and the cumulative light quantity P of the reflected light F3 during the light emission of the xenon tube 612 are determined. Since the cumulative light quantities 0 and P can be identified by the integral value S7 outputted from the integration circuit 644, the data corresponding to the cumulative light quantity O is sent to the D/A convertor 648 as the optimal integral value M (step 702).

When the integral value S7 reaches the optimal integral value M, a quenching signal S6 from the comparator 646 is inputted to the control circuit 630. In compliance with the input of the quenching signal S6, the light emission of the xenon tube is stopped by the control circuit 630. Quenching control is indicative of the light emission being stopped when the cumulative light quantities of the reflected light F3 derived from the light emissions of the respective xenon tubes reach the respective cumulative light quantities O and P, respectively.

The maximum light emission quantity that each xenon tube can emit while maintaining the light emission ratio A:B is definitively determined from the charging voltage value of the main condenser at the commencement of all light emissions. That is, the respective maximum light emission quantities CA and CB of the xenon tubes 610 and 612 at which the xenon tubes 610 and 612 can emit the strobe light using the largest allowable quantity of electrical charges in the main condenser and the ratio of the respective light emission quantities of the xenon tubes 610 and 612 is A:B are restricted by the charging voltage value.

Furthermore, the charging voltages of the main condenser 619 which are lowered when each of the xenon tubes 610 and 612 emits strobe light so as to obtain the maximum light emission quantities CA and CB can be experimentally determined. That is, the charging voltage values of the main condenser 619 when xenon tube emits the maximum emission quantity, while maintaining the light emission ratio A:B can be determined from the initial charging voltage value of the main condenser 619 and the color temperature of the peripheral light E1. On the other hand, for example, by monitoring the charging voltage value of the main condenser 619 which is lowered by the light emission of the xenon tube 610, it can be detected that the light emission quantity of the xenon tube 610 has reached the maximum light emission quantity CA.

Hence, the light emission stoppage voltage value VA, when the light emission quantity of the xenon tube 610 has reached the maximum light emission quantity CA while maintaining the light emission ration A:B, is obtained based on the color temperature of the peripheral light E1 and the initial charging voltage of the main condenser 619 (step 704). The light emission stoppage voltage value VA and the charging voltage value of the main condenser 619 determined by digital data S16 are compared in the control circuit 630.

The comparison of the charging voltage value of the main condenser 619, which is lowered by the light emission of the xenon tube 610, with the light emission stoppage voltage value VA, is carried out to prevent insufficient electrical charges of the main condenser for subsequent emission by the xenon tube 612 during the quenching control, in which the light emission time of the xenon tube 610 tends to be prolonged.

For example, if the distance of the object 652 from the still video camera is far and the quantity of strobe light reflected from the object 652 is low, the xenon tube must more strongly emit strobe light for a longer period of time. That is, depending on the photographing situation, thanks to the quenching control, the light emission quantity of the xenon tube that emits strobe light first may be so high that a larger quantity of electric charges accumulated in the main condenser 619 are consumed.

If a large quantity of electrical charge is consumed by the first emission of the preceding xenon tube, the light emission quantity of the xenon tube which emits the strobe light later could become insufficient, and consequently, the composite color temperature of the entire strobe apparatus 670 could be deviated from the target value. To prevent this, the light emission by the xenon tubes is restricted in accordance with charging voltage value of the main condenser 619.

Following steps 702 and 704, a reset signal S5 is outputted to the integration circuit 644 from the control circuit 630, and the integration circuit 644 is reset (step 706). Thereafter, the output of the reset signal S5 is stopped to cancel the reset of the integration circuit 644, and the integration by the integration circuit 644 is commenced (step 708). In other words, the cumulative light quantity of the reflected light F3 is measured, and the quenching control is commenced.

In line with the commencement of integration by the integration circuit 644, a light emission trigger signal S3 is outputted, and the light emission of the xenon tube 610 is commenced (step 710). The control circuit 630 checks whether or not the quenching signal S6 has been inputted (step 712). If the quenching signal S6 is inputted to the control circuit 630, the output of the light emission trigger signal S3 is stopped to cease light emission of the xenon tube 610 (step 716).

Conversely, if the quenching signal S6 is not inputted, the control circuit checks whether or not the charging voltage value represented by digital data S16 is less than or equal to the light emission suspension voltage value VA (step 714). If the charging voltage value of the main condenser 619 is less than or equal to the light emission suspension voltage value VA, the output of trigger signal S3 is discontinued to stop the light emission of the xenon tube 610 at step 716.

When the output of the light emission trigger signal S3 is stopped at step 716, the operations at steps 718 to 732 are performed to control light emission of the xenon tube 612.

Similar to step 702, the data corresponding to the cumulative light quantity P of the reflected light F3 during the light emission of the xenon tube 612 is sent to the D/A convertor 648 as the optimal integral value N (step 718).

The light emission suspension voltage VB at which the light emission quantity of the xenon tube 612 is the maximum light emission quantity CB that can maintain the light emission ratio A:B is determined according to the color temperature of the peripheral light E1 and the initial charging voltage value of the main condenser 619 (step 720). The light emission suspension voltage VB and the charging voltage value of the main condenser 619 determined from digital data S16 are compared in the control circuit 630.

The integration circuit 644 is reset (step 722): the integration by the integration circuit 644 is commenced (step 724), and the cumulative light quantity of the reflected light F3 which varies according to the strobe light of the xenon tube 612 is newly measured. A light emission trigger signal S4 is outputted, and the light emission of the xenon tube 612 is commenced (step 726).

Whether or not the quenching signal S6 is inputted is checked (step 728), if the quenching signal S6 is inputted, the output of a light emission trigger signal S4 is stopped at step 732. Conversely, if no quenching signal S6 is inputted, whether or not the charging voltage value of the main condenser 619 is less than or equal to the light emission suspension voltage value VB is checked (step 230). If the charging voltage value is less than or equal to VB, the output of the light emission trigger signal S4 is stopped at step 732. In the absence of trigger signal S4, light is not emitted from the xenon tube 612.

Figure 66:
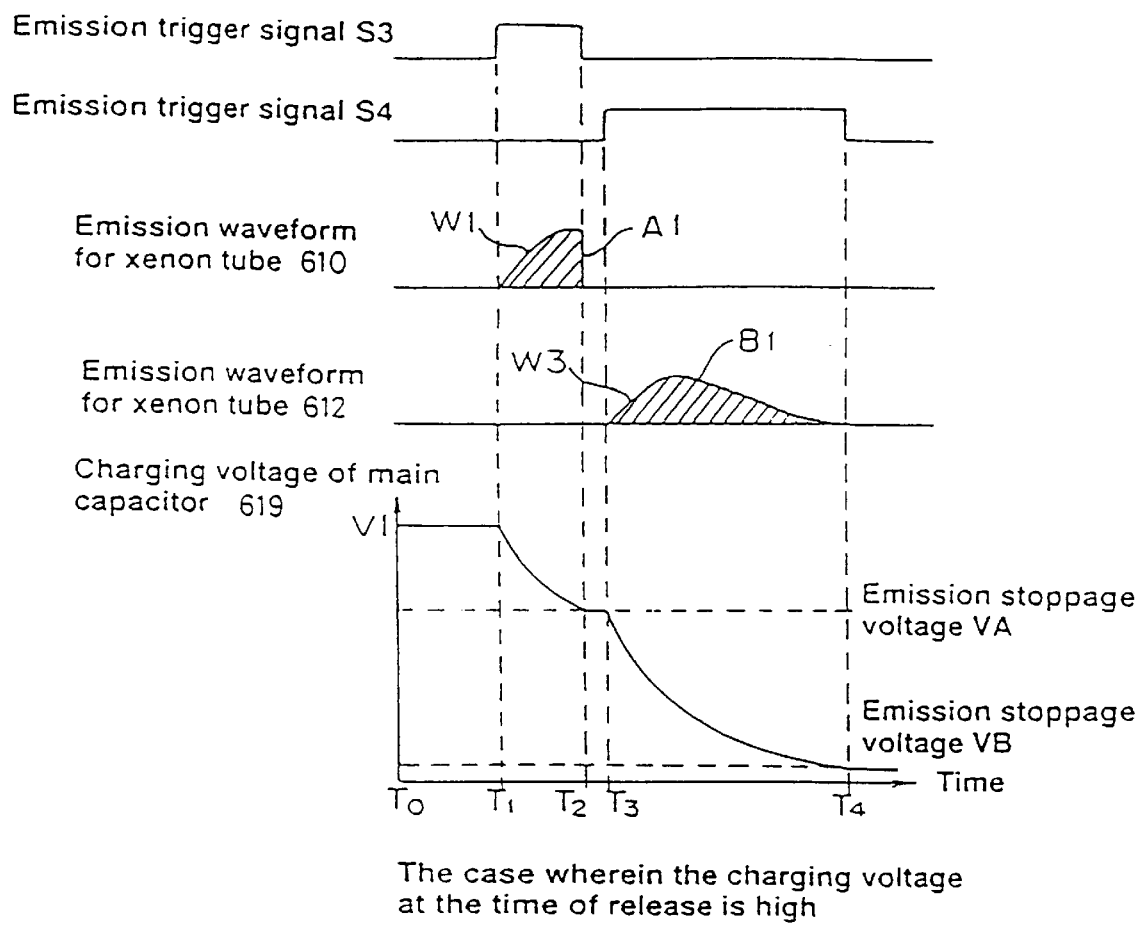
FIGS. 66 and 67 are diagrams of waveforms of an electric current flowing through xenon discharge tubes, controlled in accordance with the charge voltage of a main condenser in a still video camera shown in FIG. 64.
Figure 67:
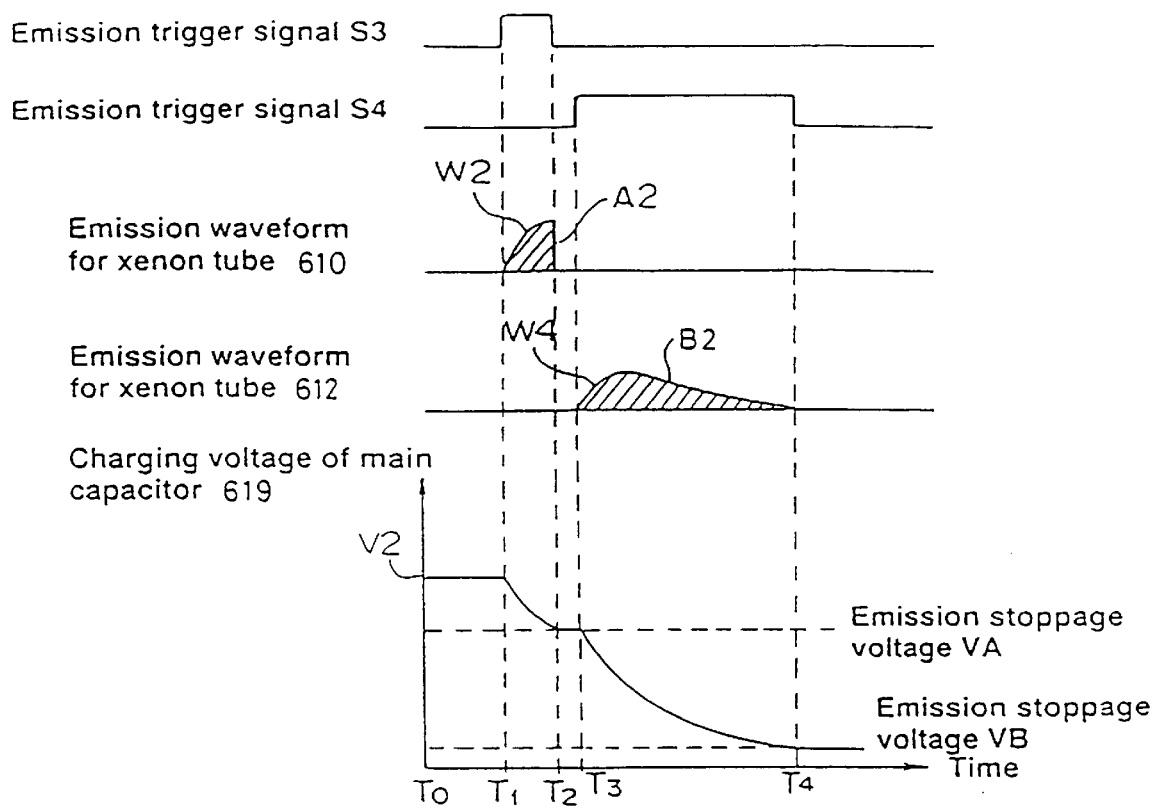

FIGS. 66 and 67 show the quantities of light of the xenon tubes 610 and 612 that vary according to the magnitude of the charging voltage value of the main condenser 619 upon releasing, or commencement of the light emission by the xenon tube 610. In FIG. 66, the charging voltage is relatively high, and in FIG. 67, the charging voltage is relatively low, respectively. In FIGS. 66 and 67, the light emissions by the xenon tubes 610 and 612 are stopped according to the comparison of the charging voltage value of the main condenser 619 with light emission suspension voltage values VA and VB, rather than according to the quench signal S6.

Thereafter, if necessary, an electric charge commencement signal S2 is outputted again from the control circuit 630 to the boosting circuit 628, to prepare for a subsequent new strobe light emission control.

As described above, the light emission quantity control of at least two xenon tubes is performed based on the color temperature of the peripheral light E1, and the quantity of light by the first emission of the first xenon tube is restricted according to the decreasing charging voltage value of the main condenser 619. Consequently, no excessive consumption of the electric charges by one of the xenon tubes occurs during the quenching control, and hence the composite color temperature of the entire strobe apparatus is always matched to the color temperature of the peripheral light E1.

Figure 68:
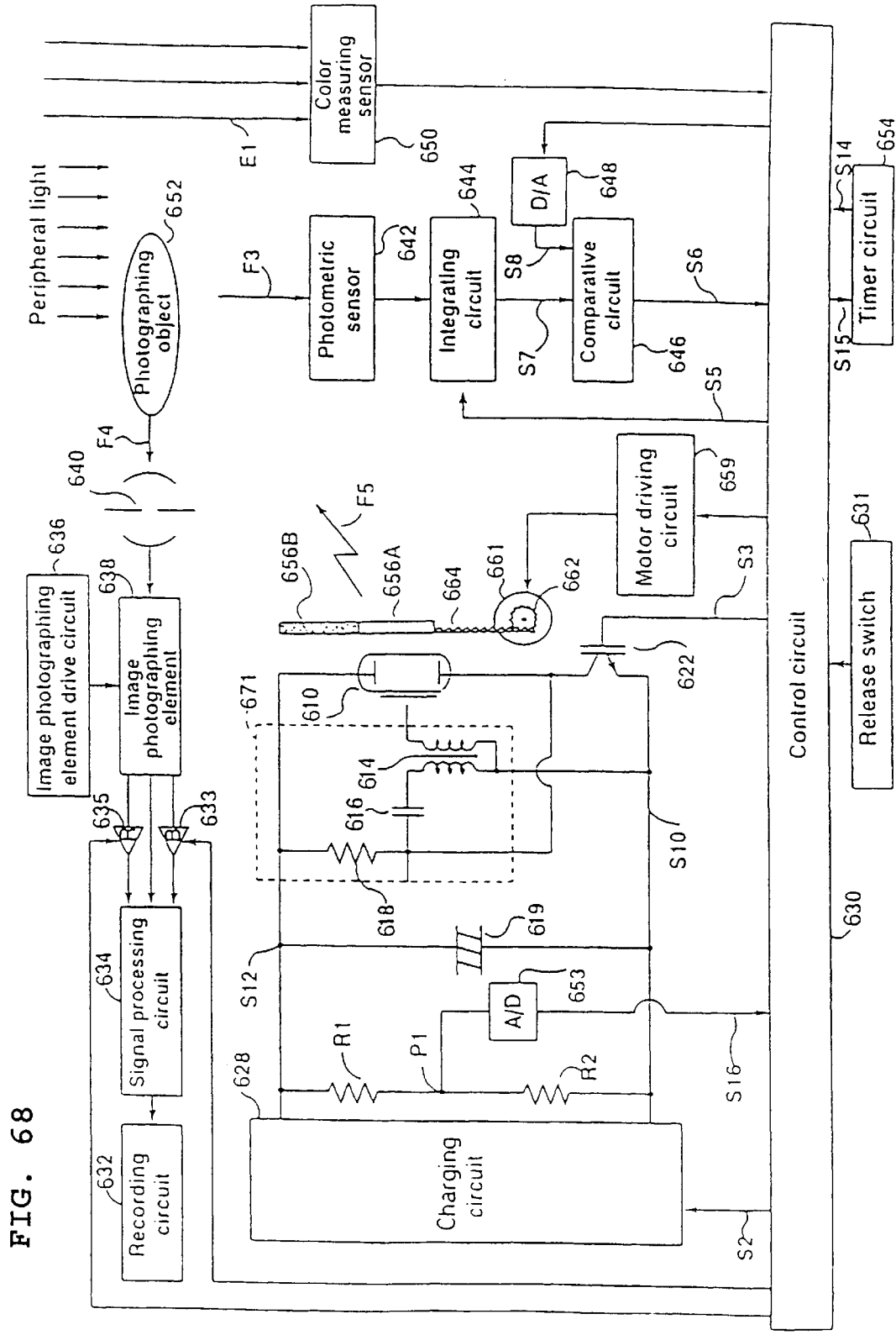
FIG. 68 is an eleventh block circuit diagram of a still video camera, to which the present invention is applied.

FIG. 68 shows another embodiment of the present invention, in which the elements corresponding to those in the previous embodiments are designated with the same reference numerals. In this embodiment, one xenon tube is used, and two color temperature conversion filters 656A and 656B are provided in front of the projection plane of the xenon to alternately move. The filters are selectively moved to the projection plane of the xenon tube to vary the light emission color temperature to thereby control the composite color temperature of the entire strobe apparatus 670. The strobe apparatus 670 in this embodiment is the same as that in FIGS. 69 to 71.

Figure 69:
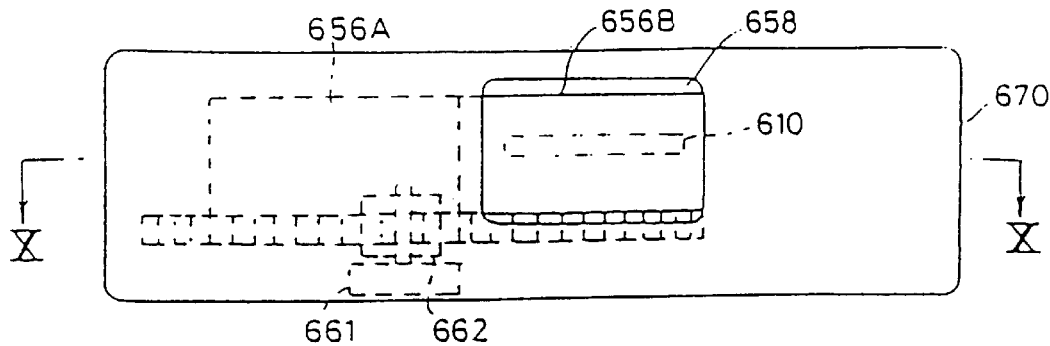
FIG. 69 is a sectional view of a strobe device shown in FIG. 68.
Figure 70:
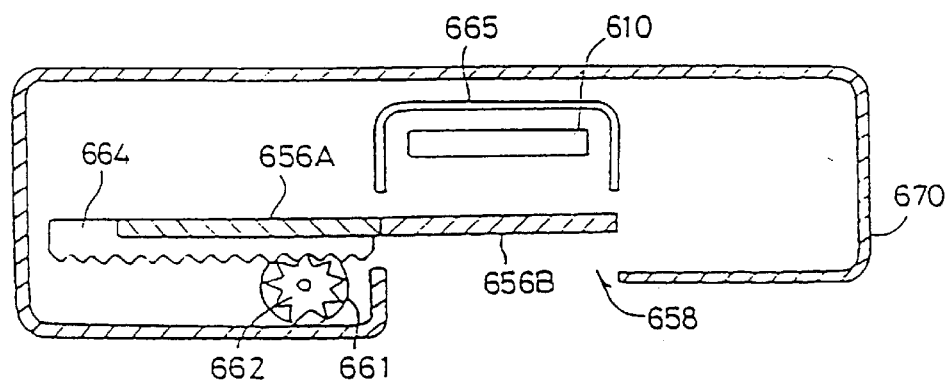
FIG. 70 is a front elevation view of a strobe device shown in FIG. 68.
Figure 71:
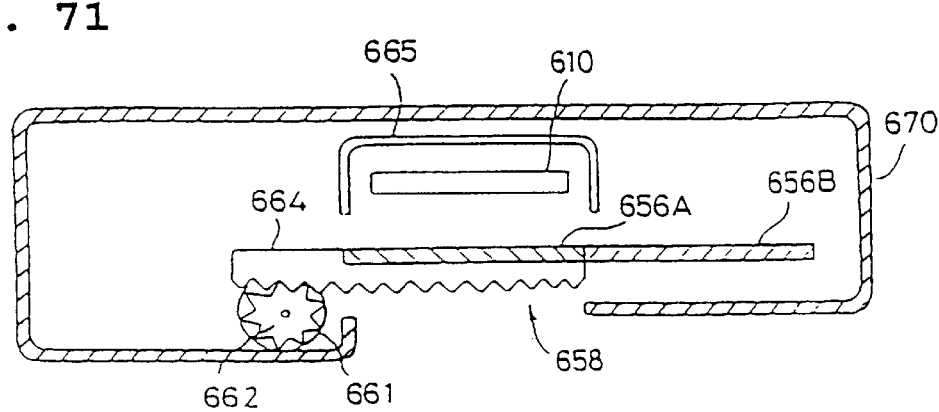
FIG. 71 is a sectional view of a strobe device shown in FIG. 68.

FIGS. 70 and 71 are horizontal cross sections along the line X—X in FIG. 69. As shown in these Figures, the xenon tube 610 is mounted within the opening 658 formed at the center of the strobe apparatus 670, and a reflector 665 is provided behind the xenon tube 610. Color temperature conversion filters 656A and 656B, mounted on a slide 664, are installed in the interior of the strobe apparatus 670 between the reflector 665 and the opening 658.

The color temperature conversion filter 656A functions to increase the color temperature of the xenon tube 610, and the other color temperature conversion filter 656B functions to decrease the color temperature of the xenon tube 610, respectively.

Gear teeth provided on one side of the slide 664 are meshed with a gear 662 which is rotated by a motor 661. By reverse and normal rotation of the motor 661, the color temperature conversion filters 656A and 656B are selectively moved to the front of the reflector 665. Also, the motor 661 is connected to a motor driving circuit 659, which is, in turn, connected to the control circuit 630. Based on instructions from the control circuit 630, the motor 661 is rotated by the motor driving circuit 659, so that the color conversion filter 656A or 656B selectively covers the front opening of the reflector 665.

The remaining structure of the embodiment shown in FIG. 68 is substantially the same as that of the previous embodiments, except that diodes 620 and 626 are not provided and that the light emission and cessation of emission of the xenon tube 610 are controlled by the activation of the IGBT 622.

There are provided a timer circuit 654 (i.e., a time measuring means); a light quantity measuring means for the quenching control, comprising a photometric sensor 642; an integration circuit 644; a D/A convertor 648 and a comparator 646; an image photographing element driving circuit 636 for converting the photographic image of an object 652 into electric signals and recording the signals on a recording medium; a solid state image photographing element 638; a signal processing circuit 634; and, a storage (recording) circuit 632.

Figure 72:
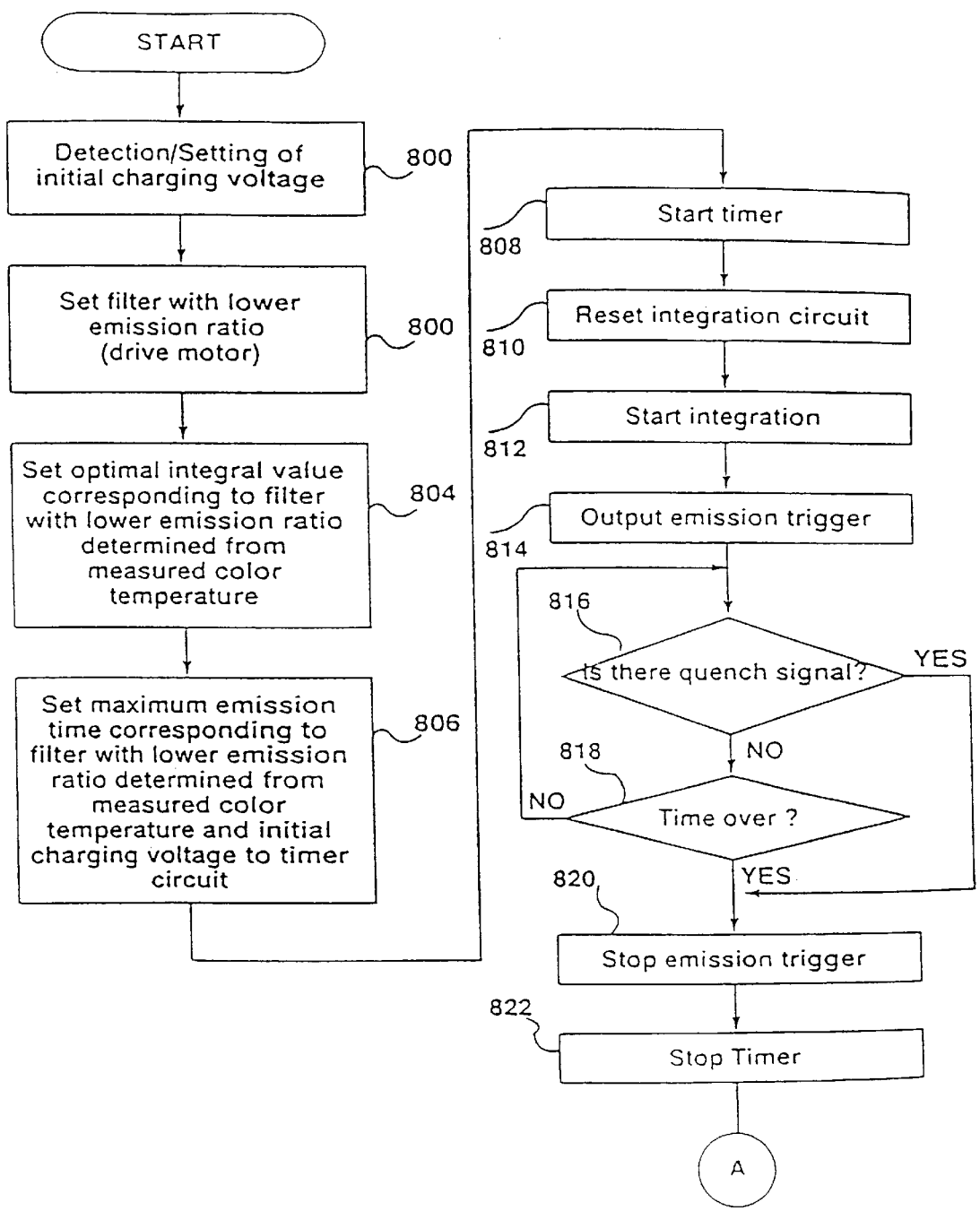
FIGS. 72 and 73 are flow charts of emission control operations of a still video camera shown in FIG. 68.
Figure 73:
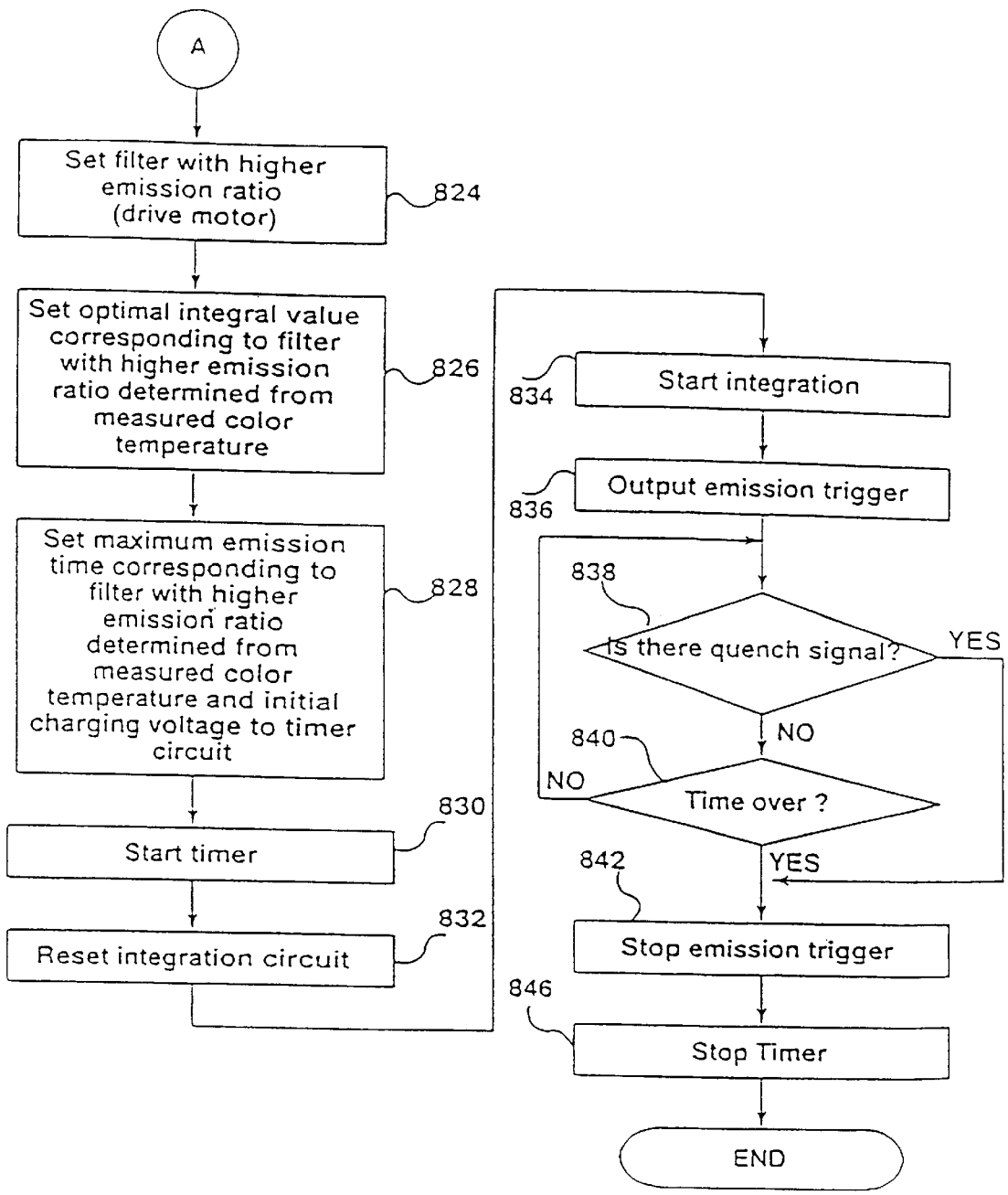

The operation of the embodiment will now be described below. A flowchart of the strobe light emission control is shown in FIGS. 72 and 73. Since the entire photographing process of the still video camera to which the present embodiment is applied is the same as that in a previous embodiment (e.g., see FIG. 31), no description therefor will be given. The light emission ratio A:B of the light emissions of the xenon tube 610 when the color temperature conversion filters 656A and 656B are used, is determined according to the measured color temperature of the peripheral light E1, by the color measuring process prior to strobe light emission control.

Namely, the ratio of the light emission quantity of the xenon tube 610 that emits strobe light through the conversion filter 656A which has been moved in front of the projection plane of the xenon tube and the light emission quantity of the xenon tube 610 that emits the strobe light through the color conversion filter 656B which has been moved in front of the projection plane is determined according to the color temperature of the peripheral light E1.

As in the previous embodiment, the initial charging voltage value of the main condenser 619 is detected using the digital data S16 inputted from an A/D convertor 653. The initial charging voltage thus detected is stored in a memory (step 800).

The motor 661 is driven to move the color temperature conversion filter corresponding to the lower light emission quantity A (e.g., A<B) to the front of the projection plane (step 802). The light emission quantity ratio A:B is determined from the color temperature of the peripheral light E1. In the process at step 802, the color temperature conversion filter 656A is moved to the front of the xenon tube 610. On the other hand, if A>B, then the color temperature conversion filter 656B is moved to the front of the xenon tube 10.

The optimal integral value M of the xenon tube 610 corresponding to the measured color temperature of the peripheral light E1 is then sent to a D/A convertor 648 (step 804). This optimal integral value M is the threshold value required to obtain the optimum photographic image by dimmer control.

Furthermore, the maximum light emission time corresponding to the maximum light emission quantity of the xenon tube 610 using a color temperature conversion filter 56A while maintaining the light emission ratio A:B, is determined from the initial charging voltage value of the main condenser 619 and is set in a timer circuit 654 (step 806).

The maximum light emission time is determined, using a data table stored in the memory of the control circuit 630. The data for each maximum light emission time in which the light emission ratio A:B is maintained, based on the detected initial charging voltage value of the main condenser 619, is stored in the data table.

Following the operation at step 806, the timer circuit 654 is activated (step 808), and the integration circuit 644 is reset by the reset signal S5 (step 810). Thereafter, the integration by the integration circuit 644 is commenced (step 812). Consequently, the quenching control according to the cumulative light quantity of the reflected light F3 is thereby commenced.

With the commencement of the integration by the integration circuit 644, a light emission trigger signal S3 is outputted, to commence the light emission by the xenon tube 610 (step 814). Thereafter, the control circuit 630 determines whether or not a quench signal S6 is inputted (step 816). If the quench signal S6 is inputted to the control circuit 630, outputting of the trigger signal S3 is stopped, thereby stopping the light emission of the xenon tube 610 (step 820).

Conversely, if the quench signal S6 is not inputted, the control circuit 630 determines whether or not the time over signal S14 is inputted (step 818). The time over signal S4 indicates that the elapsed time from the commencement of light emission is above the maximum light emission time. If the time over signal S14 is not inputted, control is returned to step 816. If the time over signal S14 is inputted, the output of light emission trigger signal S3 is stopped thereby stopping light emission of the xenon tube 610 (step 820).

The time counting operation of the timer circuit 654 is then stopped (step 822). Next, the motor 661 is driven to move the filter 656B having the larger light emission ratio to the front of the xenon tube 610 (step 824).

To carry out the quenching control of the xenon tube 610 with the color temperature conversion filter 656B, the optimal integral value N determined from the measured color temperature of the peripheral light E1 is sent to the D/A convertor 648 (step 826). The maximum light emission time corresponding to the color temperature conversion filter 656B is read out from the data table according to the light emission ratio A:B determined from the measured color temperature and the initial charging voltage value of the main condenser 619, and is set in the timer circuit 654 (step 828).

In line with the activation of the timer circuit 654 (step 830), the integration circuit 644 is reset (step 832), to commence the integration by the integration circuit 644 (step 834). As a result, the light emission trigger signal S3 is outputted, and the light emission of the xenon tube 610 is again commenced (step 836).

Thereafter, whether or not the quench signal S6 is inputted from the comparator 646 and whether or not the time over signal S14 is inputted from the timer circuit 654 are checked (steps 838 and 840). If either the quench signal S6 or the time over signal S4 is inputted, the output of the light emission trigger signal S3 is stopped thereby stopping light emission of the xenon tube 610 (step 842). Thereafter, the time counting operation of the timer circuit 654 is stopped (step 846).

When the strobe light emission control is thus completed, the signal electrical charge accumulated in the solid state image pickup device 638 are read out as image signals. The signals are then converted to a predetermined format by the signal processing circuit 634, and are recorded by the recording circuit 632 in a recording medium (not shown). Thereafter, in accordance with need, an electric charge commencement signal S2 is outputted from the control circuit 630 to the boosting circuit 628 again, to prepare for a subsequent strobe light emission control.

As described above, there are two kinds of color temperature conversion filters, 656A and 656B, one of which decreases the color temperature of the transmitted light and the other which increases the color temperature of the transmitted light. The color filters are selectively moved to the front of the xenon tube 610. The ratio of the light emission quantity of the xenon tube 610 when the color temperature conversion filter 656A is located in front of the projection plane and the light emission quantity of the xenon tube 610 when the color temperature conversion filter 656B is located in front of the projection plane is determined from the color temperature of the peripheral light E1 of the object 652, in order to adjust the composite color temperature of the entire strobe apparatus 670.

Also, in the present embodiment, to prevent a substantial increase in one of the light emission quantities caused by the quenching control, the light emission duration of the xenon tube 610 when the color temperature conversion filter 656A is selected or the color temperature conversion filter 656B is selected is restricted, based on the initial charging voltage value of the main condenser 619 and the color temperature of peripheral light E1. Accordingly, it is possible to prevent the light emission quantity of the xenon tube from being increased during the quenching control when one of the color temperature conversion filters is used. Thus, a photographic image having a more natural color can be obtained.

The number of the color filters used in the embodiment is not limited to two. Three or more color temperature conversion filters may be used. Furthermore, it is possible to provide a liquid crystal cell having an electro-birefringent effect in which the hue of the transmitted light can be varied by the magnitude of the applied voltage, in front of the xenon tube 610, in place of the color temperature conversion filters. In this alternative, a voltage control means for varying the voltage applied to the liquid crystal cell is used in place of the motor 61 and the motor driving circuit 659. In other words, the value of the voltage applied to the liquid crystal cell during the light emission with a light emission ratio A and the value of the voltage applied to the liquid crystal cell during the light emission with a light emission ratio B are varied to control the color temperatures of the transmitted light. Consequently, the composite color temperature of the strobe apparatus 670 can thereby be freely controlled.

The light quantity measuring means of strobe light reflected from the object 52 and the quenching signal generating means are not limited to the operational amplifier and the analog comparator. The integrating circuit and the comparative circuit may be constructed by digital circuits.

As the light to be made incident on the photometric sensor 642 and the color measuring sensor 650 can be used, part of the light transmitted through the photographing lens system provided in the solid image photographing element 638, in place of the light reflected from the object. This makes it possible to measure the quantity of light incident on the solid image photographing element 638 more accurately. The present invention can also be generally applied to a strobe apparatus comprising a strobe apparatus 670, a photometric sensor 650, a color measuring sensor 642 etc. Namely, if the present invention is applied to a strobe apparatus having no still video photographing circuit, such as the solid state image pickup element 638, the signal processing circuit 634 and the memory circuit 632, etc., the apparatus can be incorporated in an SV strobe apparatus or a silver chloride camera, etc.

As described above, according to the present invention, since at least one condenser for accumulating the electrical charges for light emission and one xenon tube which can control the color temperature of the transmitted light or a plurality of xenon tubes of differing color temperatures as well as means for restricting the light emission quantity of each xenon tube, based on the charging voltage value of the condenser which decreases by the light emission or the maximum light emission time determined according to the initial charging voltage value and the color temperature of the peripheral light are provided, no deviation of the composite color temperature of the entire strobe apparatus from a target color temperature occurs due to the heavy consumption of the electric charges of the main condenser by one or more of the xenon tubes.

FIGS. 74–81 show another embodiment of the present invention.

The strobe light emission apparatus 770 provided with the xenon tubes 710 and 712 and the release switch 731 provided in the still video camera mainframe are connected to the control circuit 730. The control circuit 730 controls the light emission and cessation thereof by the xenon tubes 710 and 712, according to an operation of the release switch 731. Lights F1 and F2 emitted by the xenon tubes 710 and 712 are projected toward the photographing object 752.

The xenon tube 712 has a color temperature control filter 713 which lowers the color temperature of strobe light and the xenon tube 710 directly projects the strobe light toward the object 752. Each cathode terminal of the xenon tubes 710 and 712 is connected to a ground common signal line S10 via IGBTs 722 and 724.

The trigger circuits 771 and 781 are connected to the trigger electrodes of the xenon tubes 710 and 712. The trigger electrodes 771 and 781 respectively comprise resistors 718 and 778, trigger condensers 716 and 776, and trigger transformers 714 and 774. The trigger condensers 716 and 776 are connected to one end of resisters 718 and 778 and collector terminals of the IGBTs 722 and 724, so that the electric charges of the trigger condensers 716 and 776 can be discharged by activating the IGBTs 722 and 724, and the trigger signals are generated in the high-voltage side coils of the trigger transformers 714 and 774, respectively.

The trigger signals induced in the high-voltage side coils of the trigger transformers 714 and 774 are applied to the xenon tubes 710 and 712, respectively, to generate strobe light. The separate main condensers 719 and 779 for the respective xenon tubes are connected in parallel between the anode and cathode terminals of the xenon tubes 710 and 712 via the IGBTs 722 and 724, so that the electric charges accumulated in the main condensers 719 and 779 can be used to generate the strobe light.

The anode terminal of the xenon tube 712 is connected to one end of a switching portion 784b of a photo MOS relay 785b by a signal line S18, while the anode terminal of the xenon tube 710 is connected to one end of a switching portion 784a of a photo MOS relay 785a by a signal line S12. The other ends of the switching portions 784a and 784b are connected to the cathode terminal of a diode D1 and one end of a resistor R1 by a signal line S19. The anode terminal of the diode D1 is connected to a charging circuit, from which high-voltage electric charge signal pulses are outputted to the switching portions 784a and 784b.

The diode, D1 ensures that electric current does not flow reversely from the main condensers 719 and 779 to the charging circuit 728, even if one of the switches 784a and 784b is turned ON. The switching portions 784a and 784b are comprised of photoelectric devices, bleeder resistors, and power MOSFETS, etc.

Both the cathode terminals of the light emission diodes 782a and 782b of the photo MOS relays 785a and 785b are connected to a common ground signal line S10, and their anode terminals are connected to the control circuit 730 via resistors R3 and R4. The resistors R1 and R2 are connected between a signal line S19 and the common ground signal line S10, while an intermediate point P1 between the resistors R1 and R2 is connected to an A/D converter 753. The A/D converter 753 is connected to the control circuit 730. Voltage of the intermediate point P1 is converted to digital data by the A/D convertor and is outputted to the control circuit 730.

The charging circuit 728 and the timer circuit 754 are connected to the control circuit 730. Time-counting data is outputted from the control circuit 730 to a timer circuit 754 through a signal line S15. A time-over signal S14 is outputted from the timer circuit 754 to the control circuit 730 according to the counted time. An electric charge commencement signal S2 is outputted from the control circuit 730 to the charging circuit 728. A charging current is outputted from the charging circuit 728 to the signal line S19 according to the input of the electric charge commencement signal S2.

The charging operation of the main condensers 719 and 779 will be described below according to FIG. 75 which shows a flow chart of the simultaneous charging operation of the main condensers 719 and 779. Switch control signals S20 and S21 are concurrently outputted from the control circuit 730 to the photo MOS relays 785a and 785b (step 900). Lights emitted by the light emission diodes 782a and 782b are projected on the photoelectric elements of the switching portions 784a and 784b by the switch control signals S20 and S21, so that the photoelectric current is produced in the photoelectric transducer elements. The photoelectric current is converted to voltage signals by a bleeder resistor and is applied between the source gates of the power MOSFET. Consequently, the power MOSFET is turned ON and the switching portions 784a and 784b are activated.

Terminal voltages of the main condensers 719 and 779, i.e., the electric potentials of the signal lines S12 and S18 are identical to the electric potential of the signal line S19, since the switching portions 784a and 784b are made ON. The electric potential of the signal line S19 is proportional to the electric potential of the intermediate connection point P1. The electric potential of the intermediate point P1 is monitored by the control circuit 730, using digital data converted by the A/D convertor 753. Namely, the charging voltage of the main condenser 719 or main condenser 779 is indirectly monitored in the control circuit 730. The control circuit 730 checks whether or not the charging voltage of the main condensers 719 and 779 is above a charge suspension voltage (step 902).

Figure 75:
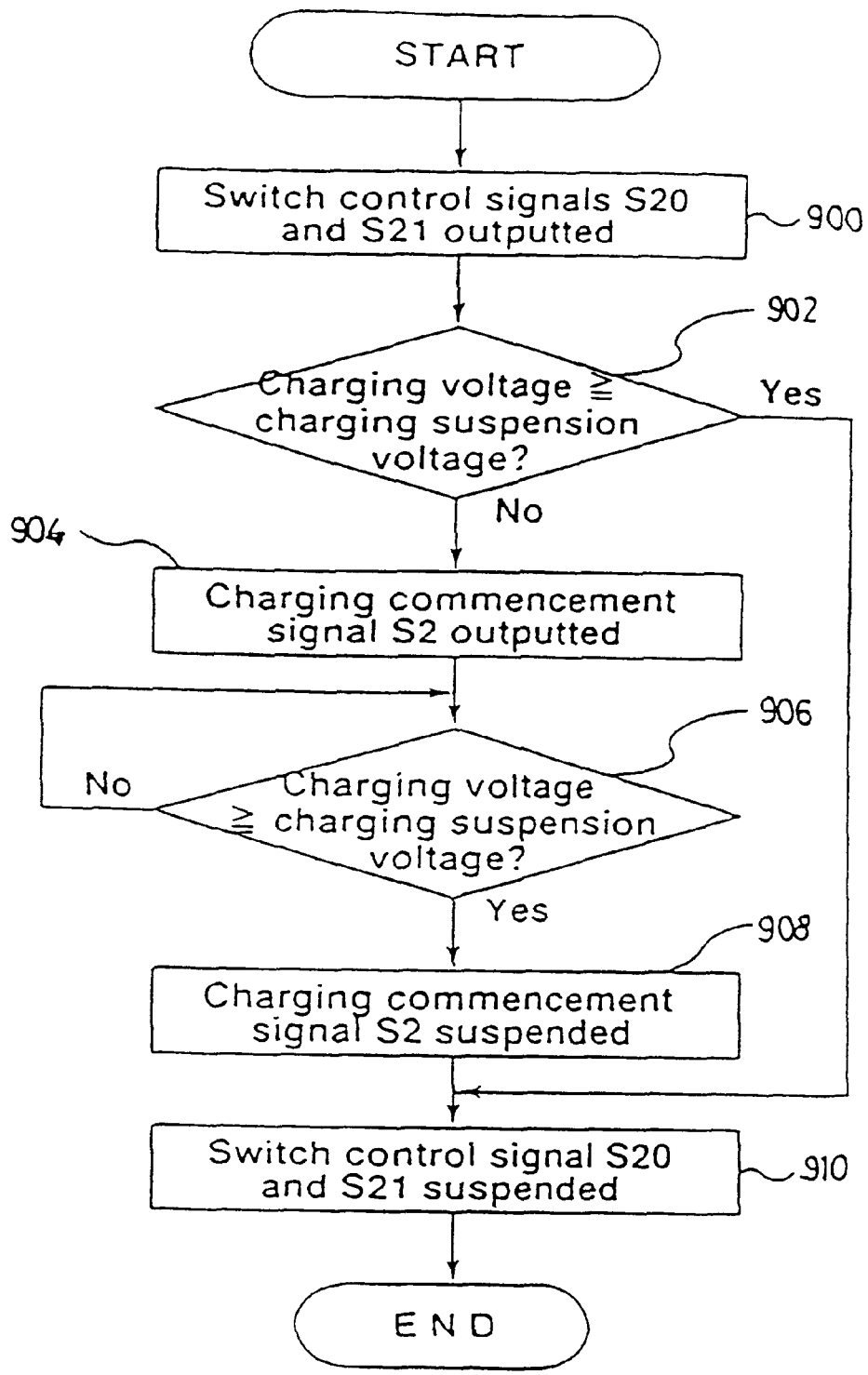
FIG. 75 is a flow chart of simultaneous charging operations of a plurality of main condensers in a still video camera shown in FIG. 74.

If the charging voltage of the main condensers 719 and 779 is more than the charge suspension voltage, switch control signals S20 and S21 are not outputted (step 910), so that the simultaneous charging operation shown in FIG. 75 is completed. The charge suspension voltage refers to a voltage (corresponding to the guide number of the strobe apparatus) at which the light emission by the xenon tube 710 can be commenced or a sufficient quantity of light can be obtained by the strobe light emission. If the charging voltage of the main condensers 719 and 779 is less than a predetermined charge suspension voltage, the charge commencement signal S2 is outputted from the control circuit 730 to the charging circuit 728 (step 904).

The charging signals are outputted from the charging circuit 728 to the main condensers 719 and 779 by the charge commencement signal S2. Consequently, the electric charges are successively accumulated in the main condensers 719 and 779. The charging continues until the charging voltage of the main condensers 719 and 779 are above the charge suspension voltage (step 906).

If the charging voltage of the main condensers 719 and 779 are above the charge suspension voltage (i.e., "Yes" at step 906), the outputting of the charge commencement signal S2 is suspended (step 908) to stop the output of the switch control signals S20 and S21 (step 910). Consequently, the simultaneous charging operation is completed.

Figure 76:
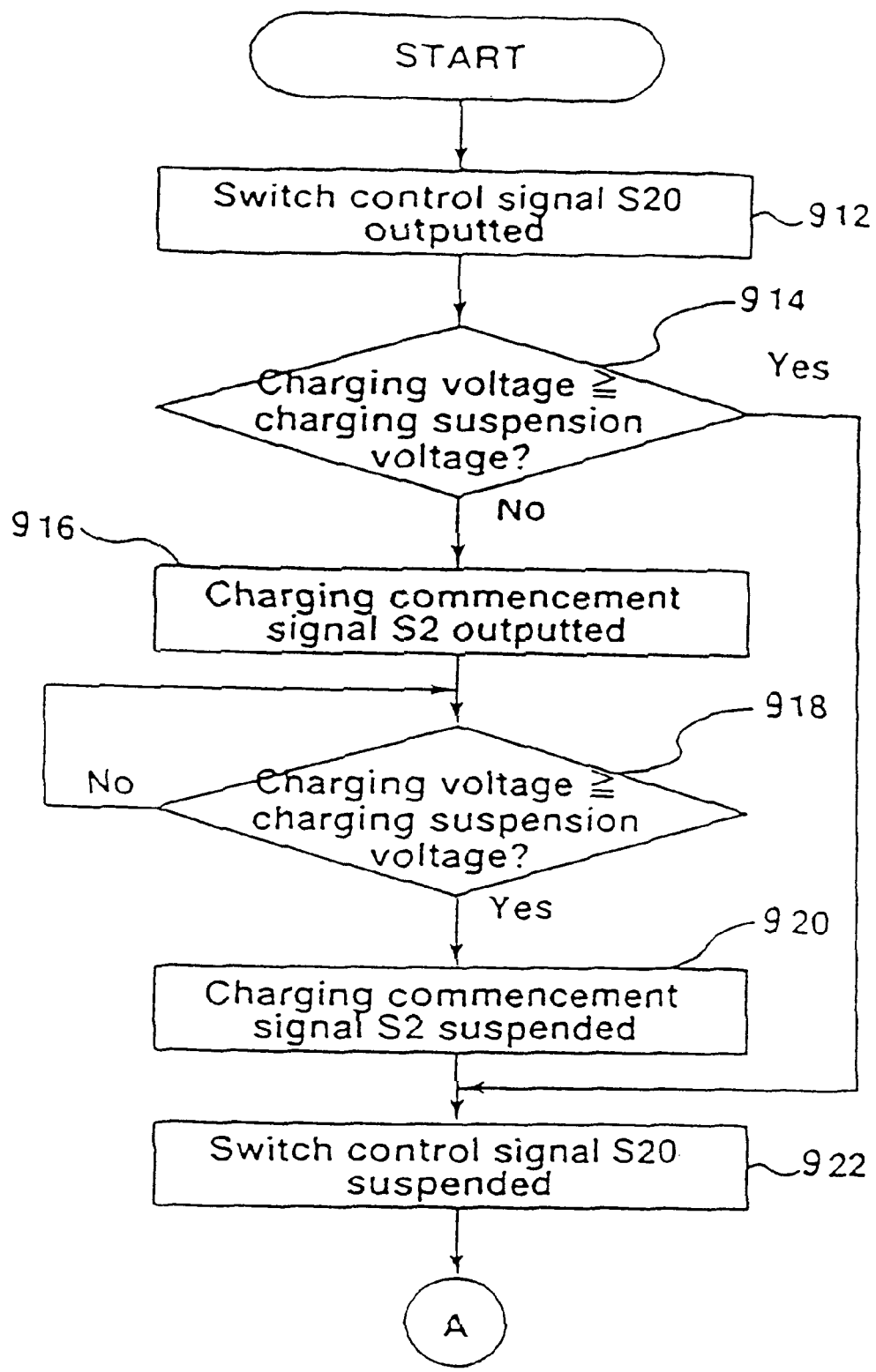
FIGS. 76 and 77 are flow charts of separate charging operations of a plurality of main condensers in a still video camera shown in FIG. 74.
Figure 77:
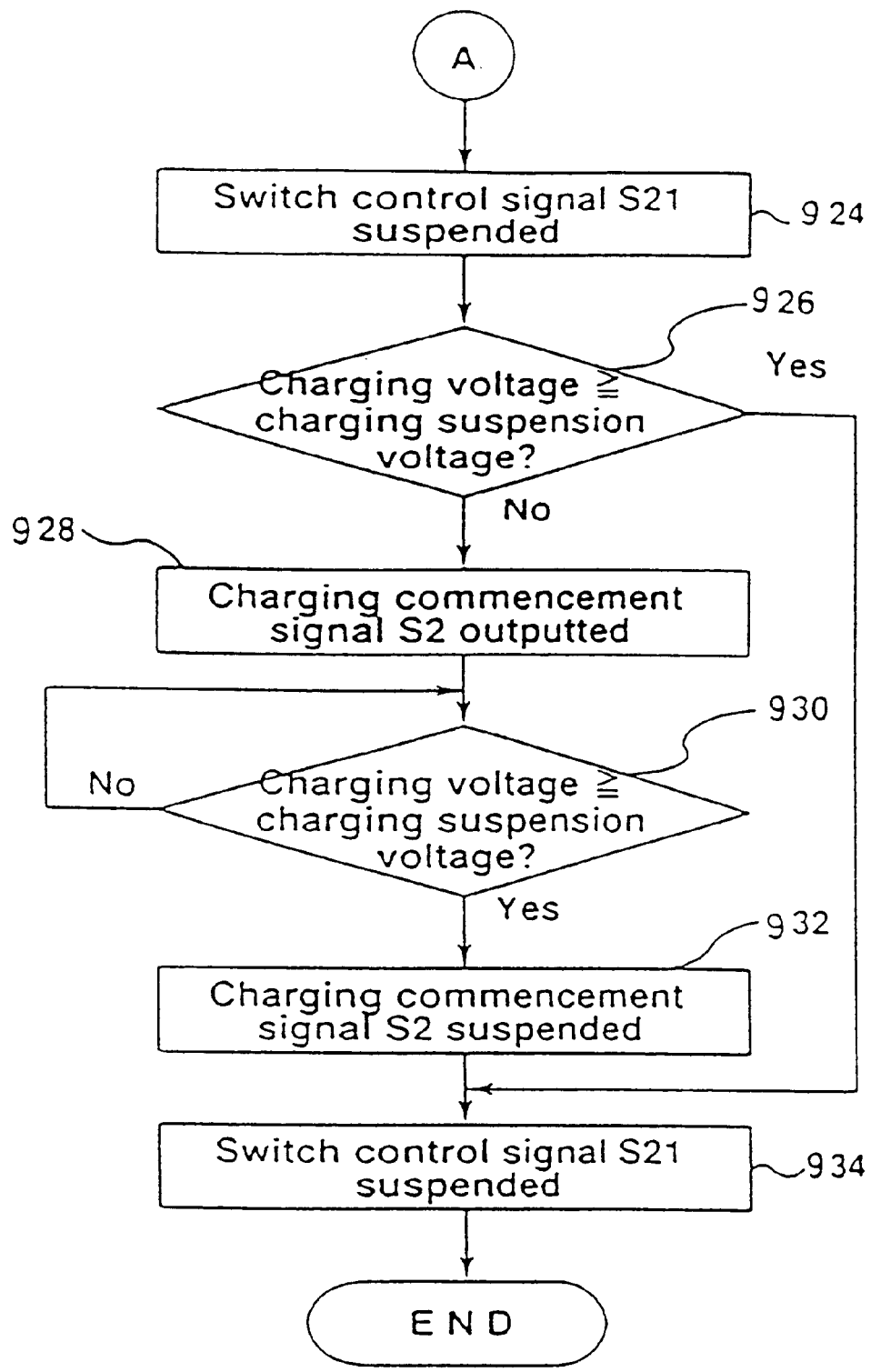

FIGS. 76 and 77 show a flow chart of separate charging operations of the respective main condensers 719 and 779. In FIG. 76, the switch control signal S20 is first outputted from the control circuit 730 to a photo MOS relay 85a (step 912). The switching portion 784a is turned ON by the switch control signal S20.

Next, the control circuit 730 checks whether or not the charging voltage of the main condenser 719 is more than the charge suspension voltage (step 914). If the charging voltage is higher than the charge suspension voltage, the outputting of the switch control signal S20 is suspended (step 922), and then, the charging operation shown in FIG. 77 is commenced. If the charging voltage of the main condenser 719 is below the charge suspension voltage, the charge commencement signal S2 is outputted from the control circuit 730 to the charging circuit 728 (step 916).

Since the switching portion 784a is turned ON, the charging circuit 728 causes the main condenser 719 to be charged upon receipt of the charge commencement signal S2. The charging is continued until the charging voltage of the main condenser 719 is above the charge suspension voltage (step 918). If the charging voltage of the main condenser 719 is above the charge suspension voltage (i.e., "Yes" at step 918), a charge commencement signal S2 is not outputted (step 920), and the output of the switch control signal S20 is suspended (step 922).

In FIG. 77, the switch control signal S21 is first outputted from the control circuit to the photo MOS relay 785b (step 924) to turn ON the switching portion 784b. Next, the control circuit 730 judges whether or not the charging voltage of the main condenser 779 is above the charge suspension voltage (step 926). If the charging voltage is above the charge suspension voltage, the output of the switch control signal S21 is suspended (step 934), and the sequential charging operation of the main condensers 719 and 779 shown in FIGS. 76 and 77 is completed. If the charging voltage of the main condenser 779 is below the charge suspension voltage, the charge commencement signal S2 is outputted from the control circuit 730 to the charging circuit 728 (step 928).

In response to the charge commencement signal S2, the main condenser 779 is charged by the charging circuit 728. The charging is continued until the charging voltage of the main condenser 779 exceeds the charge suspension voltage ("Yes" at step 930). If the charging voltage of the main condenser 779 is above the charge suspension voltage ("Yes" at step 930), outputting of the charge commencement signal S2 is suspended (step 932), and outputting of the switch control signal S21 is suspended (step 934).

Figure 78:
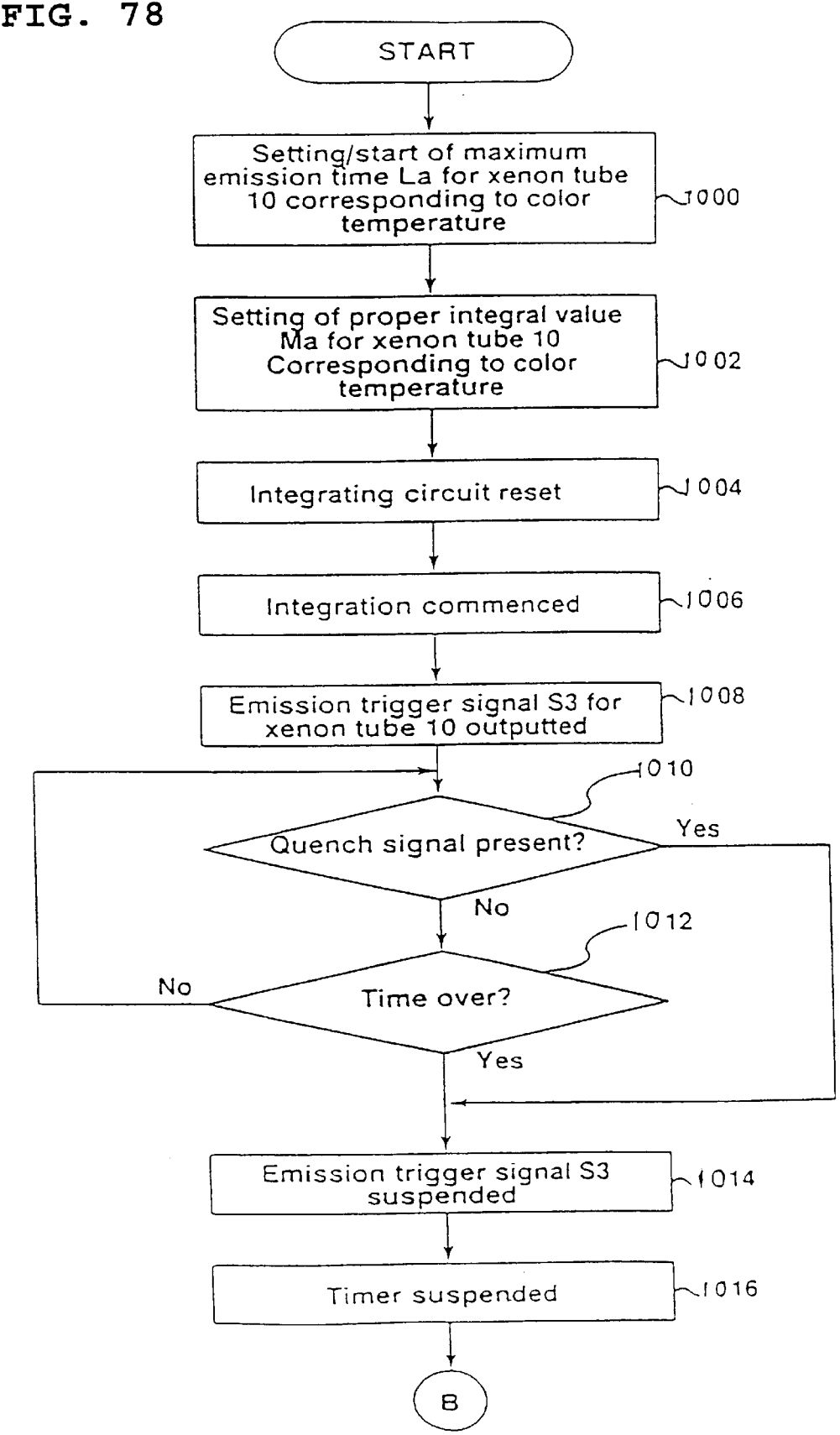
FIGS. 78 and 79 are flow charts of emission control operations of a plurality of main condensers in a still video camera shown in FIG. 74.

The strobe light emission control will be briefly described below, with reference to FIGS. 78 and 79 which show a flow chart of the strobe light emission control. In FIG. 78, the light emission ratio A:B of the xenon tubes 710 and 712 is determined by the control circuit 730 so that the ratio corresponds to the measured color temperature of the peripheral light E1. The light emission ratio A:B is determined depending on a target value (desired value) of the resultant color temperature of the strobe apparatus 770. For example, to obtain a low color temperature, the quantity of light to be emitted by the xenon tube 712 whose color temperature is lowered by the filter 713 is increased, and the quantity of light to be emitted by the xenon tube 710 whose color temperature is high is reduced, respectively.

The maximum light emission time (duration) La of the xenon tube emitting light 710 (it is assumed herein that the xenon tube 710 is intended to emit light first) is obtained from the data table stored in the memory of the control circuit 730, in accordance with the measured color temperature. The maximum light emission time La of the xenon tube 710 refers to the maximum period of time in which the above ratio A:B can be retained when the largest quantities of electric charges charged in the main condensers 719 and 779 are used to emit the strobe light from the xenon tubes 710 and 712. Namely, the time La is identical to a limit beyond which if the emission by the xenon tube 710 continues, the ratio of A:B can no longer be maintained, even if the xenon tube 712 emits light, using all the electric charges of the main condenser 779.

Data on the maximum light emission time La is set in the timer circuit 754 via a signal line S15, so that the timer circuit 754 commences counting (step 1000). If the counted time is above the maximum light emission time La, the time-over signal S14 is outputted from the timer circuit 754 to the control circuit 730. In general, the quantity of light emission by a xenon tube is not proportional to the light emission duration. Hence, the quenching control is carried out for the xenon tube.

Accordingly, if the distance of the object 752 from the still video camera is long and the quantity of the light reflected from the object 752 is small, it is necessary for the xenon tube to more intensively emit light for a longer time. Namely, depending upon the state of photographing circumstances, the quenching control may invite an increase in the quantity of light to be emitted by the xenon tube which is to emit light first.

If the quantity of light emitted by the first xenon tube is increased, there is a possibility that the ratio of A:B cannot be maintained even by a full light emission of the second xenon tube which emits light later, as stated above. If the proper ratio of A:B cannot be maintained, it would be impossible to adjust the synthetic color temperature of the strobe apparatus 770 to be identical to a target value, thus an object image with unnatural coloring is created. To prevent this, the quantity of the strobe light emitted by the first xenon tube 710 is restricted by the maximum light emission time La, mentioned above.

To perform the quenching control, an appropriate integral value Ma (digital data) corresponding to the xenon tube 710 is outputted from the control circuit 730 to a D/A convertor 748 (step 1002). The appropriate integral value Ma corresponds to the quantity A of the xenon tube 710 and can be obtained from the measured color temperature value of the peripheral light E1, using the data table stored in the memory of the control circuit 730. The integral value Ma inputted to the D/A convertor 748 is converted to an analog voltage signal S8, and outputted to a comparing circuit 746.

Next, a reset signal S5 is outputted from the control circuit 730 to an integrating circuit 744 which is then reset (step 1004). After this resetting, the integration of the integrating circuit 744 is commenced (step 1006). Consequently, the photocurrent of the photometric sensor 742 is integrated. That is, the photocurrent flowing through the photometric sensor 742, that changes according to the luminance of the light F3 reflected from the object 752 and received by the photometric sensor 742 is integrated to detect the accumulative quantity of the reflected light F3. Thereafter, the integral value is compared with the appropriate integral value Ma in the comparing circuit 746.

As soon as the integration is commenced, a light emission signal S3 is outputted from the control circuit 730 to an IGBT 722 (step 1008). The output of the light emission trigger signal S3 turns the IGBT 722 ON, and the electric charges accumulated in the trigger condenser 716 are fed to the common ground signal line S10 via the IGBT 722.

The discharge of the electric charges of the trigger condenser 716 causes an electric current to flow through the low-voltage side coil of the trigger transformer 714, and a high-voltage trigger signal is induced in the high-voltage side coil of the trigger transformer 714, so that a spark current flows to generate flash light.

The strobe light F1 increases the quantity of light F3 reflected from the object 752. Consequently, if the integral value output from the integrating circuit 744 reaches the proper integral value Ma, a quenching signal S6 is inputted from the comparing circuit 746 to the control circuit 730. The control circuit 730 checks whether or not the quenching signal S6 is inputted (step 1010). If the quenching signal S6 is inputted, the output of the light emission trigger signal S3 is suspended (step 1014).

The IGBT 722 is turned OFF as a result of the absence of the light emission trigger signal S3, the current flowing through the xenon tube 710 is interrupted by the IGBT 722, and the xenon tube 710 stops the emission. If a quenching signal S6 is not inputted, the control circuit 730 checks whether or not the time-over signal S14 is inputted from the timer circuit 754 (step 1012).

If the time-over signal S14 is not inputted, the control proceeds to step 1010 to check again whether or not the quenching signal S6 is inputted. On the contrary, if the time-over signal S14 is inputted, the output of the light emission trigger signal S3 is suspended to stop the light emission by the xenon tube 710 (step 1014).

At step 1014, the suspension of light emission trigger signal S3 causes the timer circuit 54 to be suspended (step 1016), and the commencement of subsequent emission by the second xenon tube 712 is controlled.

Figure 79:
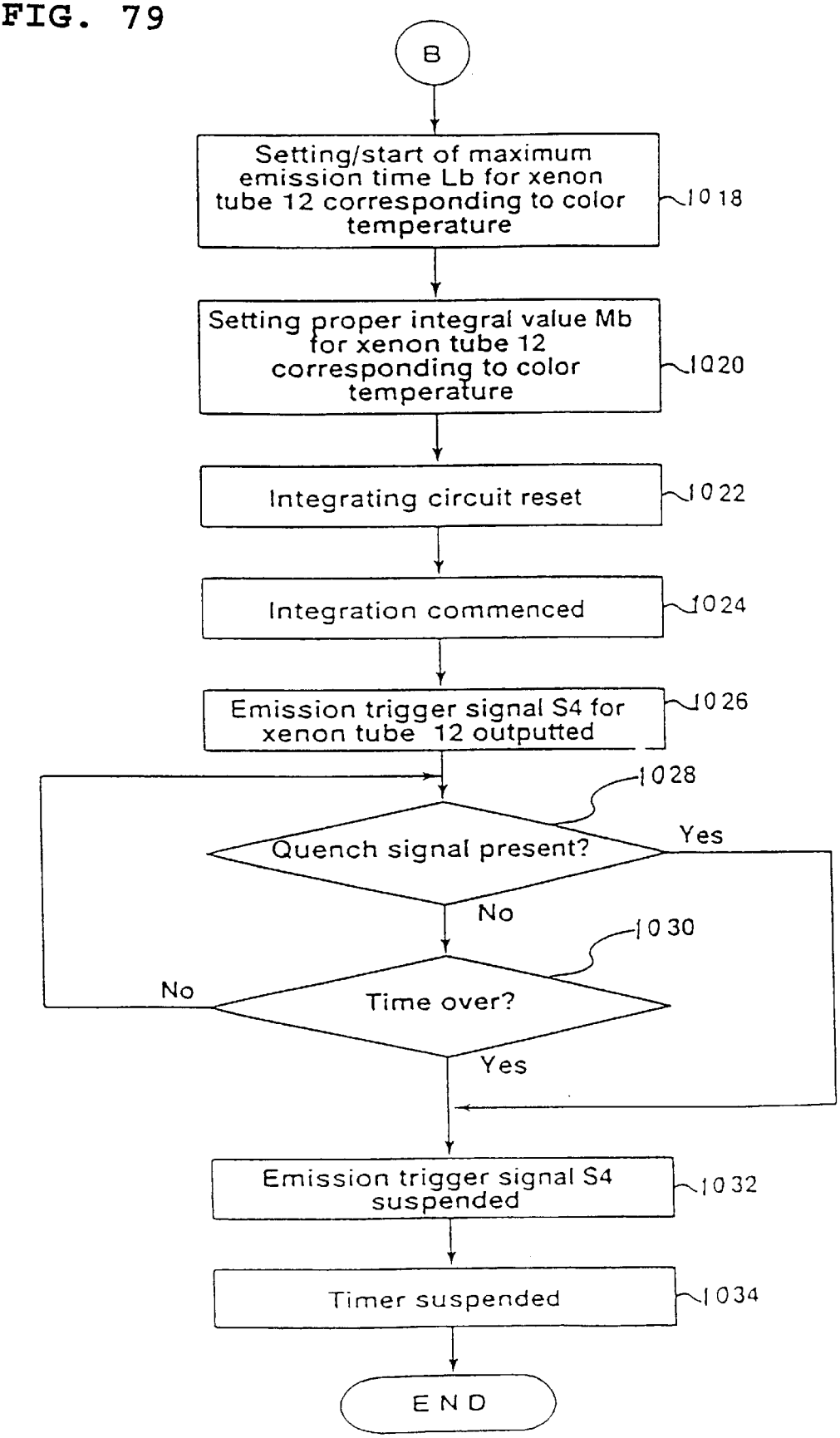

In FIG. 79, similarly to step 1000, the maximum light emission time Lb for the xenon tube 712 is obtained from the data table, in accordance with the color temperature measurement value of the peripheral light E1. The maximum light emission time Lb is set in the timer circuit 754 and the counting operation of the timer circuit 754 is commenced (step 1018).

In order to perform the quenching control of the xenon tube 712, a proper integral value Mb (digital data) corresponding to the quantity B of the xenon tube 712 is obtained, using the data table stored in the memory of the control circuit 730, on the basis of the color temperature measurement value of the peripheral light E1 and is outputted to the D/A convertor 748 (step 1020). The proper integral value Mb inputted to the D/A convertor 748 is converted to an analog voltage signal S8 and is outputted to the comparing circuit 746.

The proper integral value Mb is a threshold value at which, similar to the above-mentioned proper integral value Ma, the ratio of A:B can be maintained while determining whether or not the quantity of light reflected from the object 752 is enough to obtain an optimal image.

The integrating circuit 744 is reset by the reset signal S5 (step 1022), and the integration by the integrating circuit 744 is commenced (step 1024). Thereafter, the emission trigger signal S4 is outputted to the IGBT 724 and the xenon tube 712 commences the emission (step 1026).

If the quenching signal S6 is inputted from the comparing circuit 746 or the time-over signal S14 is inputted from the timer circuit 754, the output of the emission trigger signal S4 is suspended to stop the emission of the xenon tube 712 (step 1032). Furthermore, the timer circuit 754 stops counting (step 1034).

Thereafter, a charging operation in FIGS. 75 to 77 is executed to prepare for a subsequent new strobe emission control, if necessary.

Figure 74:
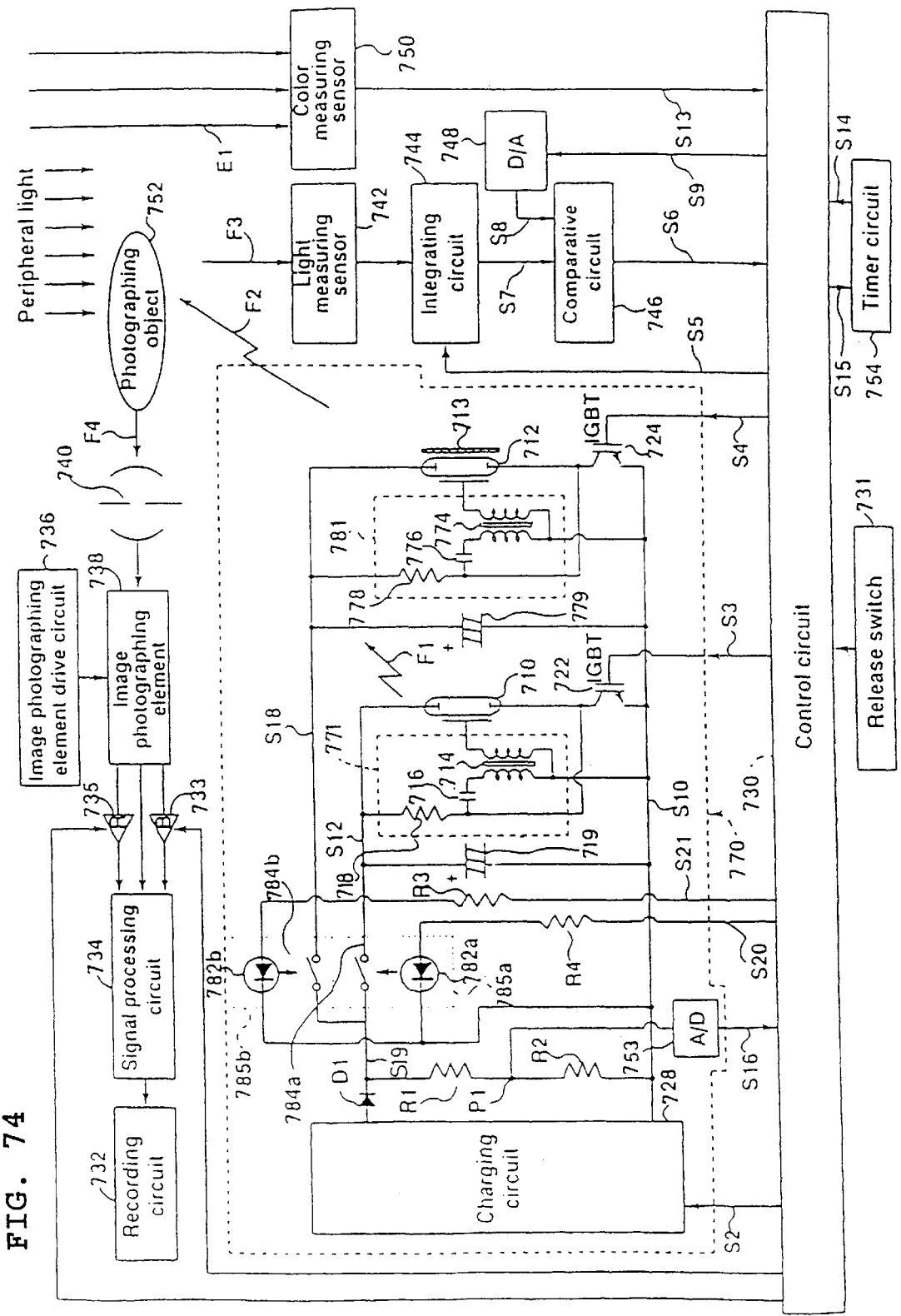
FIG. 74 is a twelfth block circuit diagram of a still video camera, to which the present invention is applied.

As can be understood from the foregoing, according to embodiment illustrated in FIG. 74, the independent condensers are provided for the respective xenon tubes having different color temperatures to control the resultant synthetic color temperature of the strobe apparatus, so that the electric charges for emission can be accumulated in the respective condensers. Consequently, not only a sufficient quantity of emission by each xenon tube can be guaranteed, but also the resultant color temperature of the strobe apparatus can be precisely controlled. Nevertheless, the single charging circuit (changing means) 728 is common to the plural condensers which can be selected by the MOS relays 785*a* and 785*b*. The provision of the single common charging circuit 728 contributes to a realization of a small and light strobe apparatus. In addition, since the switching portions 784*a* and 784*b* are turned OFF when the charging of the main condensers 719 and 779 is completed, the electric charges from the main condensers 719 and 779 do not discharge to the common ground signal line S10 via the resistors R1 and R2, thus resulting in the prevention of the electric charges from being wastefully consumed.

In the present embodiment, the photo MOS relays 785*a* and 785*b* can be replaced with mechanical relays in which a secondary-side switch is opened and closed by magnetic energy, or photo-couplers in which the primary-side and the secondary-side are electrically insulated.

Figure 80:
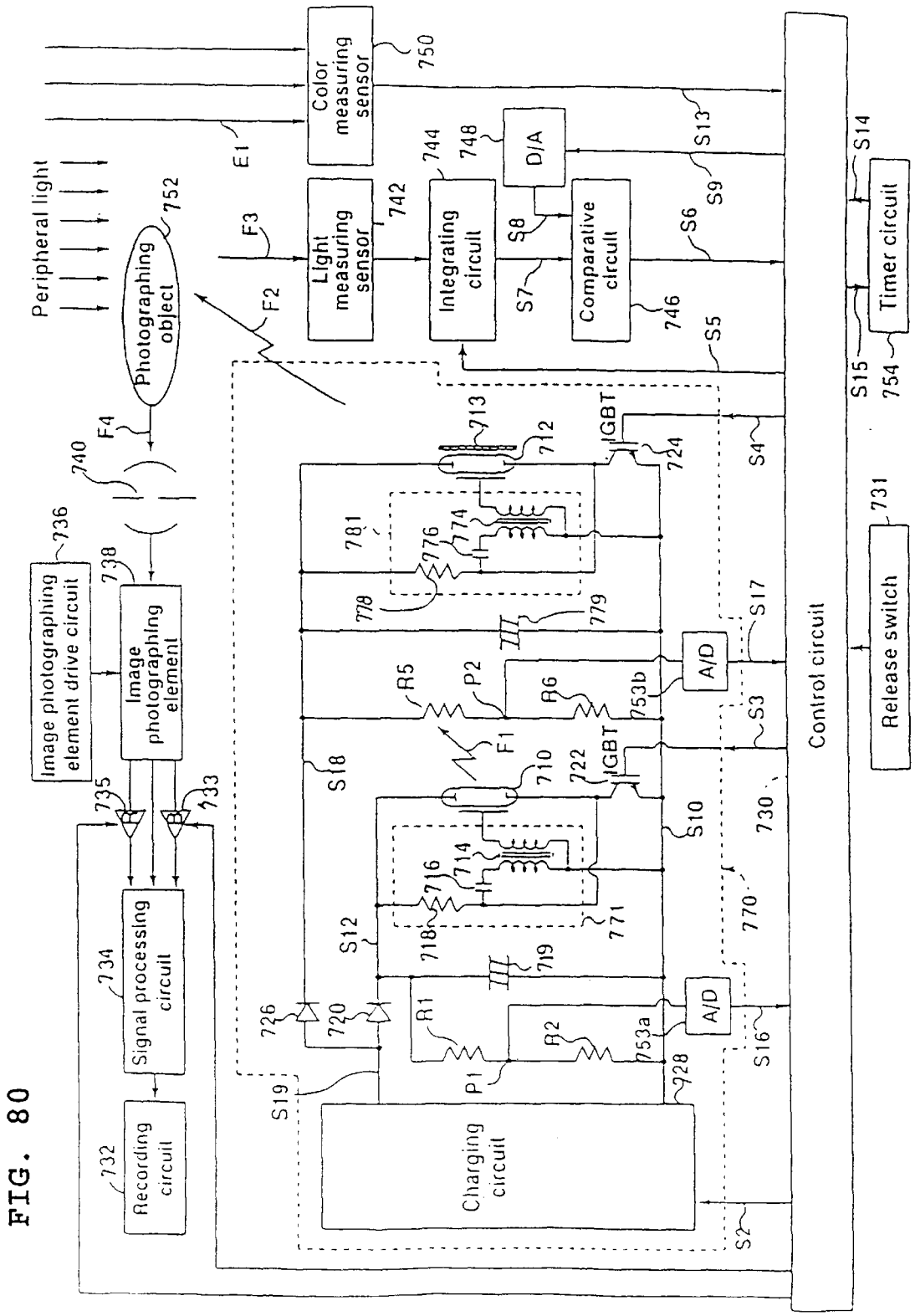
FIG. 80 is a thirteenth block circuit diagram of a still video camera, to which the present invention is applied.

FIG. 80 shows another embodiment of the present invention. In the drawing, the same symbols are given to the elements corresponding to those in the previous embodiment. In this embodiment, the diodes 720 and 726 are connected between the signal lines S19 and S12 and between the signal lines S19 and S18, respectively, so that the charging signal outputted from the charging circuit 728 is outputted to the main condensers 719 and 779 via the diodes 720 and 726, respectively. The diodes 720 and 726 prevent the electric charges accumulated in the main condensers 719 and 779 from being mixed and from flowing to the charging circuit 728.

Resistors R5 and R6 are connected in series between the signal line S18 and the common ground signal line S10. The intermediate point P2 between the resistors R5 and R6 is connected to an A/D convertor 753*b*. Resistors R1 and R2 are connected in series between the signal line S12 and the common ground signal line S10. The intermediate point P1 between the resistor R1 and the resistor R2 is connected to an A/D convertor 753*a*. The A/D convertors 753*a* and 753*b* are connected to the control circuit 730.

The A/D convertor 753*a* is used for monitoring the charging voltage of the main condenser 719, and the A/D convertor 753*b* is used for monitoring the charging voltage of the main condenser 779. The remaining construction in FIG. 80 is substantially the same as that of the previous embodiment in FIG. 74.

Figure 81:
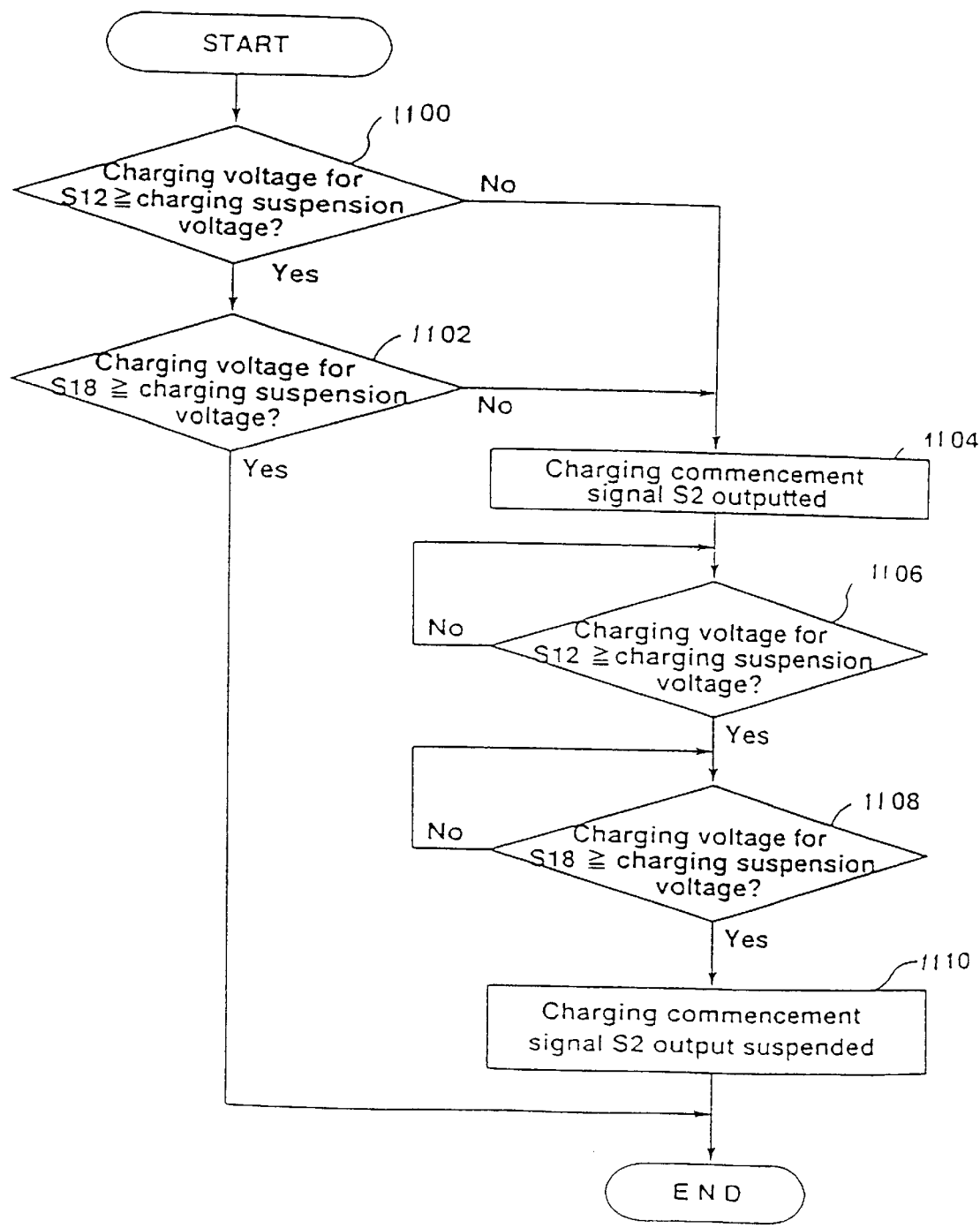
FIG. 81 is a flow chart of charging operations of a plurality of main condensers in a still video camera shown in FIG. 80.

The operation in the embodiment shown in FIG. 80 will be described below. Since the still video photographing operation and the emission control are the same as those of the embodiment shown in FIG. 74, a description thereof 80 is substantially the same as embodiment in FIG. 74, a description thereof will not be given herein. FIG. 81 shows a flow chart of the charging process of the main condensers 719 and 779. In the drawing, the voltage of the signal line S12, that is, the charging voltage of the main condenser 719, is monitored, using the A/D convertor 753*a*. If the charging voltage of the main condenser 719 is not above the charge suspension voltage ("No" at step 1100), a charge commencement signal S2 is outputted from the control circuit 730 to the charging circuit 728 (step 1104).

Conversely, if the charging voltage of the main condenser 719 is above the charge suspension voltage ("Yes" at step 1100), the voltage of the signal line S18 is monitored by the control circuit 730, using the A/D convertor 753*b* (step 1102). Namely if the charging voltage of the main condenser 779 is not above the charge suspension voltage ("No" at step 1102), the charge commencement signal S2 is outputted from the control circuit 730 to the charging circuit 728 (step 1104). On the contrary, if the charging voltage of the main condenser 779 is above the charge suspension voltage, charging is not carried out and the control ends.

After the charge commencement signal S2 is outputted (step 1104), whether or not the charging voltage of the main condenser 719 is above the charge suspension voltage (step 1106) is checked. If the charging voltage of the main condenser 719 is above the charge suspension voltage ("Yes" at step 1106), it is determined whether or not the charging voltage of the main condenser 779 is above the charge suspension voltage (step 1108). If the charging voltage of the main condenser 779 is above the charge suspension voltage, the output of the charge commencement signal S2 is suspended (step 1110).

As described above, in the embodiment shown in FIG. 80, the independent condensers are provided for the respective xenon tubes having different color temperatures to adjust the synthetic color temperature of the strobe apparatus. Nevertheless the single charging circuit 728, is provided commonly to the condensers and the charging voltages of the latter are discriminated by the A/D convertors 753a and 753b. Consequently, not only can a sufficient quantity of emission of each xenon tube be guaranteed, but also the synthetic color temperature of the strobe apparatus 770 can be precisely controlled. The provision of the single charging circuit miniaturizes the strobe apparatus.

In addition, lights of various synthetic color temperatures can be easily obtained, irrespective of the color temperature of respective light emission means (xenon tubes), by adjusting the quantity of emission of each xenon tube, using color temperature control filters which vary the color temperature of the associated xenon tube. Accordingly, light of the color temperature corresponding to normal or natural light or artificial light, such as light of a fluorescent lamp, etc. can be obtained, and hence a picture image having an improved color balance can be obtained in any photographing environment.

Although one color temperature controlling (varying) filter is provided only for the xenon tube 712, it is possible to provide an additional color temperature varying filter for the other xenon tube 710. Alternatively, it is also possible to provide more than two color temperature varying filters. In this alternative, more than two xenon tubes corresponding to the color temperature varying filters are provided and the quantity of emission by the respective xenon tubes is controlled according to the color temperature of the peripheral light E1. Also, in this alternative, the number of the main condensers is increased and, in the embodiment in FIG. 74, the number of the photo MOS relays 85 is increased and, in the embodiment in FIG. 80, the number of the A/D converters and/or the diodes is increased, respectively. Consequently, the synthetic color temperature of the strobe apparatus 770 can be freely controlled.

Although the charging voltage of the main condensers is subdivided and indirectly measured by a plurality of resistors, the resistors R1, R2, R5 and R6 may be dispensed with; the comparator circuit and the D/A converters as shown in FIG. 31 can be used instead, as long as the analog values of the charging voltages of the main condensers can be directly converted to digital signals (i.e., the resistance against the input charging pulse signals is high). Namely, whether or not the charging voltage of the main condensers 719 and 779 reaches the necessary value is checked by comparing the charging voltage with the comparative voltage value inputted from the D/A converter by means of the analog comparator. The comparative voltage value to be inputted to the D/A converter is set by the control circuit 730.

As described above, according to the present invention, in which the control of the synthetic color temperature of the strobe apparatus is performed by controlling the quantity of emission by a plurality of emission means having different color temperatures, a condenser is provided for each emission means to accumulate electric charges and accordingly, it is possible to prevent the emission means from being unable to emit light because of a drop of the charging voltage. consequently, the synthetic color temperature of the strobe apparatus does not deviate from a target value.

The color temperature varying filters (color filters) 411 and 413 will now be described below. The color filter 413 (713) which is mounted in front of the projection plane of the xenon tube 412 (712), is made of a filter having a color temperature conversion power Ta that satisfies the algebraic formula 7 indicated below.

$$Ta \geq (10^6/Ka')-(10^6/Kc) \text{ [mired]} \qquad 7$$

If the sign of Ta is positive, the color filter is amber; if the sign of Ta is negative, the color filter is blue.

The color filter 411, which is mounted in front of the projection plane of the xenon tube 410 (710), is made of a filter having a color temperature conversion power Tb that satisfies the algebraic formula 8 indicated below.

$$Tb \leq (10^6/Kb')-(10^6/Kc) \text{ [mired]} \qquad 8$$

If the sign of Tb is positive, the color filter is amber; if the sign of Tb is negative, the color filter is blue.

Namely, the color filter 413 can change the color temperature Kc (degrees Kelvin) of the direct light which passes through the filter, by filtering out specified wave lengths of light; to Ka [degrees Kelvin]. Similarly, the color filter 411 can change the color temperature Kc [degrees Kelvin] of the direct light to Kb [degrees Kelvin].

Note that the color temperature of the resultant strobe light is controlled within a range G defined by Ka'≦G ≦Kb', wherein Ka'≧Ka and Kb'≦Kb. Ka' and Kb' are determined to establish the control range G as wide as possible (Ka≦Ka'≦G≦Kb'≦Kb).

Figure 82:
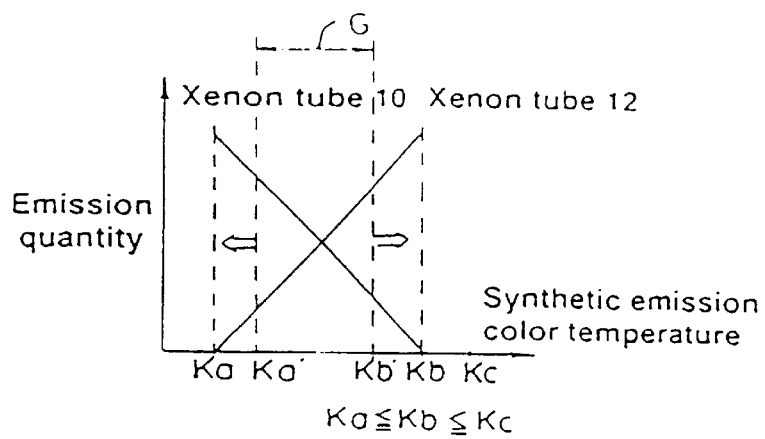
FIG. 82 is a diagram of optical properties of xenon discharge tubes whose primary color temperatures are located in an upper part of a color temperature range which is varied in accordance with color temperature controlling filters.
Figure 83:
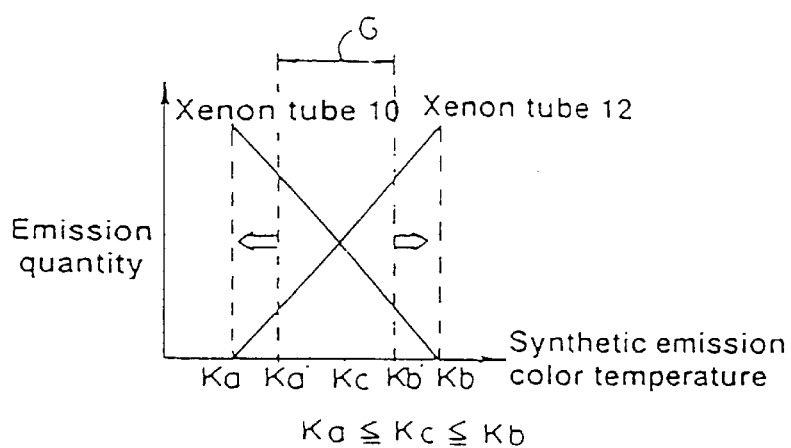
FIG. 83 is a diagram of optical properties of xenon discharge tubes whose primary color temperatures are located in an intermediate part of a color temperature range which is varied in accordance with color temperature controlling filters.
Figure 84:
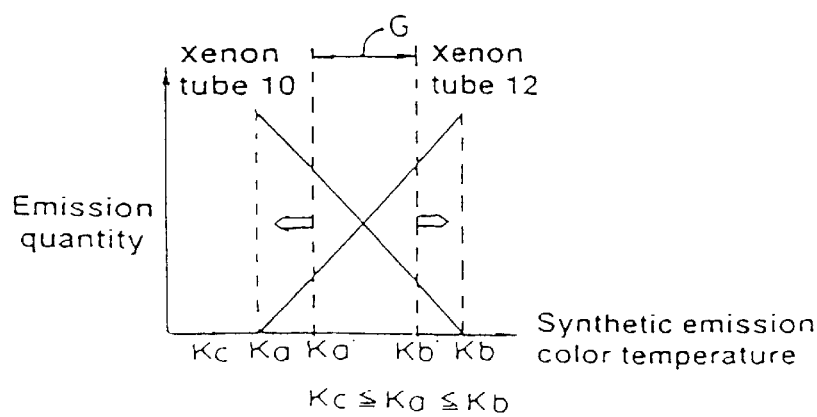
FIG. 84 is a diagram of optical properties of xenon discharge tubes whose primary color temperatures are located in a lower part of a color temperature range which is varied in accordance with color temperature controlling filters.

The relationships of the control range G, the direct color temperature Kc of the xenon tubes 410 and 412, and the color temperatures Ka and Kb are shown in FIGS. 82, 83 and 84. FIG. 82 shows Kc≧Kb; FIG. 83 shows Ka≦Kc≦Kb; and, FIG. 84 shows Kc≦Ka, respectively.

In FIGS. 82, 83 and 84, the color temperature conversion power Ta of the color filter 411 that changes the direct color temperature Kc to the color temperature Ka must always satisfy the formula 7, and the color temperature conversion power Tb of the color filter 413 that changes the direct color temperature Kc to the color temperature Kb must always satisfy the formula 8, respectively.

Figure 85:
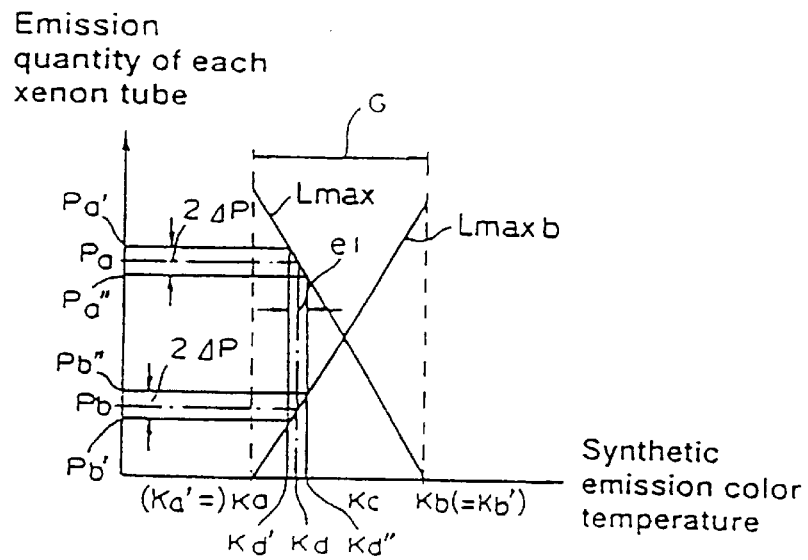
FIG. 85 is a diagram showing displacements of the color temperature from a target temperature within a color temperature range which can be controlled by color temperature controlling filters when a slight change in the quantity of light of xenon discharge tubes takes place.
Figure 86:
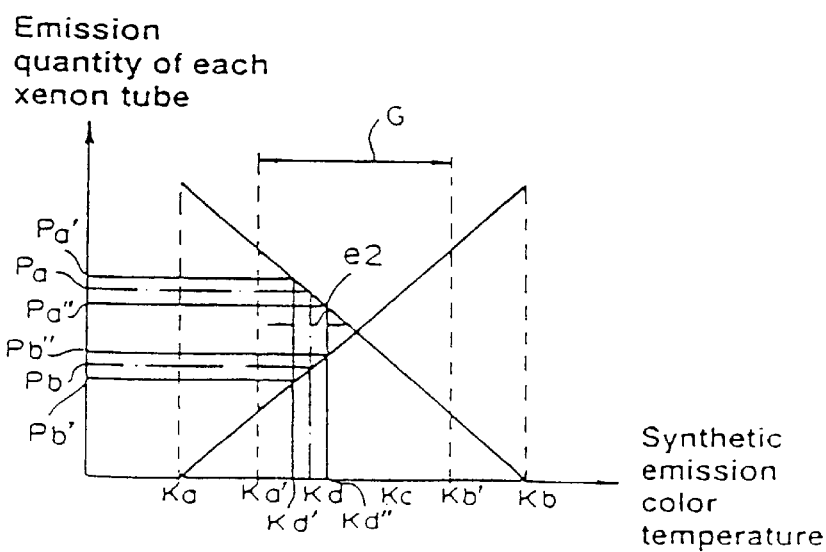
FIG. 86 is a diagram showing displacements of the color temperature from a target temperature within a color temperature range which can be controlled by color temperature controlling filters having larger control power than that of color temperature controlling filters shown in FIG. 85, when a slight change in the quantity of light of xenon discharge tubes takes place.

FIGS. 85 and 86 show variations of the synthetic color temperature relative to slim variations of the light emission quantities Pa and Pb of the xenon tubes 410 and 412, respectively, to control the synthetic color temperature of the strobe apparatus 470 to be Kd. Note that in FIG. 85, the color filter 411 having the color temperature conversion power Ta that satisfies the following formula 9 and the color filter 413 having the color temperature conversion power Tb that satisfies the following formula 10 are used.

$$Ta=(10^6/Ka')-(10^6/Kc) \text{ [mired]} \qquad 9$$

$$Tb=(10^6/Kb')-(10^6/Kc) \text{ [mired]} \qquad 10$$

In FIG. 85, the direct color temperature Kc of the xenon tube 410 which fully emits the strobe light is changed by the color filter 411 to the lower limit Ka' of the control range G, and the direct color temperature Kc of the xenon tube 412 which also fully emits the strobe light is changed by the color filter 413 to the upper limit Kb' of the control range G.

In FIG. 86, the color filter 411 having the color temperature conversion power Ta' that satisfies the following formula 11 and the color filter 413 having the color temperature conversion power Tb' that satisfies the following formula 12 are used.

$$Ta'=(10^6/Ka)-(10^6/Kc)>(10^6/Ka')-(10^6/Kc) \quad 11 \text{ (Ka<Ka')}$$

$$Tb'=(10^6/Ka)-(10^6/Kc)>(10^6/Ka')-(10^6/Kc) \quad 12 \text{ (Kb>Kb')}$$

Therefore, in FIG. 86, the direct color temperature Kc of the xenon tube 410 which fully emits the strobe light is changed by the color filter 411 to a color temperature Ka lower than the color temperature Ka', and the color temperature Kc of the color filter 413 which also fully emits the strobe light is changed by the color filter 413 to a color temperature Kb higher than the color temperature Kb', respectively.

As can be seen in FIGS. 85 and 86, even for the same control range G, if the color conversion powers of the filters used are different, there is a difference in the deviation from the target color temperature Kd. For example, if the light emission quantity of the xenon tube 410 increases by ΔP to become Pa', and the light emission quantity of the xenon tube 412 decreases by ΔP to become Pb', respectively, the synthetic color temperature becomes Kd'. On the other hand, if the light emission quantity of the xenon tube 410 decreases by ΔP to become Pa", and the light emission quantity of the xenon tube 412 increases by ΔP to become Pb", respectively, the synthetic color temperature becomes Kd". Therefore, the deviation (Kd"-Kd') of the color temperature from the target value Kd is represented by e1 in FIG. 85 and e2 in FIG. 86, respectively. It is apparent that e1<e2.

To assure that the target value of the color temperature is within the range G (Ka'≦G≦Kb'), it is ideal to use the color filter 411 satisfying the formula 9 and the color filter 413 satisfying the formula 10.

The upper limit (maximum color temperature) Kb' and the lower limit (minimum color temperature) Ka' depend on the environment in which a picture is taken using the strobe apparatus of the present invention. For example, if it is necessary to establish a wide photographing range which covers photographing environments from natural light to candle light, the upper limit Kb' and the lower limit Ka' of the control range G are set equal to 10000K and 1000K, respectively (Kb'=10000K, Ka'=1000K ).

In the range G, if the direct color temperature Kc of the xenon tubes 410 and 412 is 6000K, then, the color temperature conversion power Ta of the color filter 413 is approximately 833.3 [mireds] and the color temperature conversion power Tb of the color filter 411 is approximately -66.7 (mireds], respectively.

The sequential operation of the embodiment shown in FIGS. 82 to 86 is substantially identical to that of FIG. 32.

The light emission control of the strobe apparatus 470 using the color filters 411 and 413 of the color conversion powers Ta and Tb respectively will now be described below, with reference to FIGS. 87 and 88. In these figures, the ratio A:B of the light emission quantities of the xenon tubes 410 and 412 is determined by the control circuit 430 to match the measured value of the color temperature of the peripheral light E1.

As shown in FIG. 85, the light emission ratio A:B is determined according to the target value of the synthetic light emission color temperature. For example, if the target color temperature is low, the light emission quantity of the xenon tube 412 is increased, and the light emission quantity of the xenon tube 410 is decreased. From the ratio A:B thus determined, the xenon tube of a lower light emission quantity is controlled to emit light first.

For example, if the quantity A is smaller than the quantity B (A<B), the xenon tube 410 emits light first. Along with the selection of the xenon tube that is to emit light first, the maximum light emission time La of the xenon tube 410 is determined from the data table stored in the memory of the control circuit 430, based on the measured values of the color temperature.

The maximum light emission time La of the xenon tube 410 refers to a maximum duration in which the ratio A:B can be maintained when the largest quantities of the electric charges in the main condenser 419 are consumed to emit the strobe light from the xenon tubes 410 and 412. In other words, the maximum light emission time La is a threshold value to maintain the ratio A:B. Consequently, if the xenon tube 410 continues emitting for longer than the maximum light emission time La, it is impossible to maintain the ratio A:B even if all the remaining electric charges are used to emit the strobe light from 412.

The maximum light emission time La is set in the timer circuit 454 through the signal line S15 and the counting operation of the timer circuit 454 is commenced (step 1200). If the counted time is above the maximum light emission time La, the time over signal S14 is outputted from the timer circuit 454 to the control circuit 430.

As mentioned above, the light emission quantity of the xenon tube is usually not proportional to the light emission duration. The quenching control is therefore carried for the xenon tube. In the quenching control, the light emission quantity of the xenon tube is controlled in a manner such that a predetermined quantity of light reflected from the object 452 can be gained by the strobe light emitted towards the object 452 from the strobe apparatus 470 so as to obtain a good photographic image.

Therefore, if the distance of the object 452 from the still video camera is far and the quantity of strobe light reflected from the subject 452 is small, the xenon tube must emit light for a longer time and more intensely. That is, depending on the photographing circumstances, the quenching control may cause an increased light emission quantity of the xenon tube that emits the strobe light first, thus increasing consumption of the electric charges accumulated in the main condenser 419.

The consumption of a large quantity of the electric charges by the first xenon tube that is to emit the strobe light first, as described above, would decrease, possibly even to zero, the emission quantity of the second xenon tube that is to emit the strobe light later. If the emission quantity of the second xenon tube is insufficient, the synthetic color temperature of the strobe light would not reach the target value, and accordingly, the quenching control of the strobe light color temperature will not achieve an object image of natural color. To prevent this, the quantity of the electric charges to be consumed by the first emission is restricted by the maximum light emission is restricted by the maximum light emission time La.

To perform the quenching control, the optimal integral value Ma (digital data) corresponding to the xenon tube 410 is outputted from the control circuit 430 to the D/A convertor 448 (step 1202). The optimal integral value Ma corresponds to the quantity A of the xenon tube 10 and is determined from the measured value of the color temperature of the peripheral light E1, using the data table stored in the memory of the control circuit 430. The optimal integral value Ma inputted to the D/A convertor 448 is converted to an analog voltage signal S8 and outputted to the comparative circuit 446.

The reset signal S5 is inputted from the control circuit 430 to the integration circuit 444 which is then reset (step 1204). Thereafter, the integration by the integration circuit 444 is commenced (step 1206).

Upon commencement of the integration, the light emission trigger signal S3 is outputted from the control circuit 430 to the IGBT 422 (step 1208). The xenon tube 410 emits flash light in response to the light emission trigger signal S3.

The light F3 reflected from the object 452 is increased by the strobe light F1. Consequently, if the integral value outputted from the integration circuit 444 becomes lower than or equal to the optimal integral value Ma, the quenching signal S6 is inputted to the control circuit 430 from the comparative circuit 446. Whether or not the quenching signal S6 is inputted is determined by the control circuit 430 (step 1210). If the quenching signal S6 is inputted into the control circuit 430, the output of the light emission trigger signal S3 is suspended (step 1214).

When the light emission trigger signal S3 is not outputted, the IGBT 422 is turned OFF, and the current flowing in the xenon tube 410 is cut off, so that light emission by the xenon tube 410 is stopped. If the quenching signal S6 is not inputted, whether or not the time over signal S14 is inputted from the timer circuit 454 is checked by the control circuit 430 (step 1212).

If the time over signal S14 is not inputted, the control returns to step 1210 to check again whether or not the quenching signal S6 is inputted. On the other hand, if the time over signal S14 is inputted, the output of the light emission trigger signal S3 is suspended to stop the light emission of the xenon tube 410 (step 1214). By the absence of the light emission trigger signal S3, the timer circuit 454 is inactivated (step 1216), and thereafter, the light emission of the xenon tube 412 is commenced.

Figure 88:
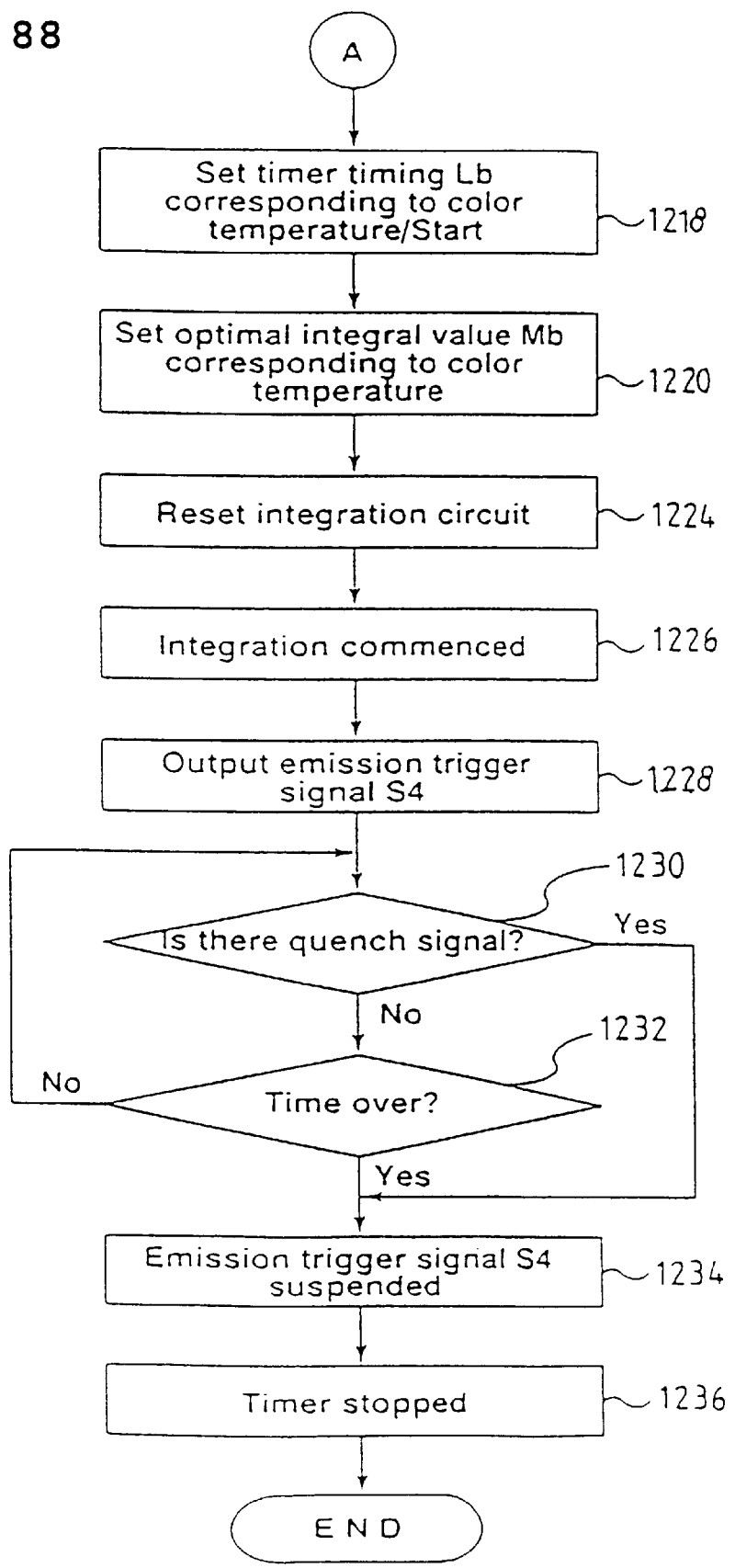

In FIG. 88, the maximum light emission time Lb of the xenon tube 412 is first determined, based on the measured value of the color temperature of the peripheral light E1, using the data table stored in the control circuit 430. The maximum light emission time Lb thus obtained is set in the timer circuit 454 through the signal line S15, and the timer circuit 454 commences the counting of time (step 1218).

Next, to perform the quenching control of the xenon tube 412, the optimal integral value Mb (digital data) corresponding to the light emission quantity B of the xenon tube 412 is outputted to the D/A convertor 448, based on the measured value of the color temperature of the peripheral light E1, using the data table stored in the memory of the control circuit 430 (step 1220). The optimal integral value Mb inputted to the D/A convertor 448 is converted to an analog voltage signal S8 and outputted to the comparative circuit 446. The optimal integral value Mb, similar to the optimal integral value Ma, is a threshold value for maintaining the ratio A:B and for determining that the reflected light quantity from the object 452 reaches a predetermined value to obtain an optimum image.

The integration circuit 444 is reset by a reset signal S5 (step 1224), and integration is commenced by the integration circuit 444 (step 1226). Thereafter, the light emission trigger signal S4 is outputted to the IGBT 424 to commence the light emission of the xenon tube 412 (step 1228).

Then, if a quenching signal S6 is inputted from the comparative circuit 446 or if the time over signal S14 is inputted from the timer circuit 454, the output of the light emission trigger signal S4 is stopped, and the light emission of the xenon tube 412 is suspended (step 1234). Thereafter, the counting operation of the timer circuit 454 is suspended (step 1236).

After the light emission control of the xenon tubes 410 and 412 is thus completed, if necessary, the electric charge commencement signal S2 is outputted from the control circuit 430 to the charging circuit 428 again to prepare for a subsequent new strobe light emission.

Figure 87:
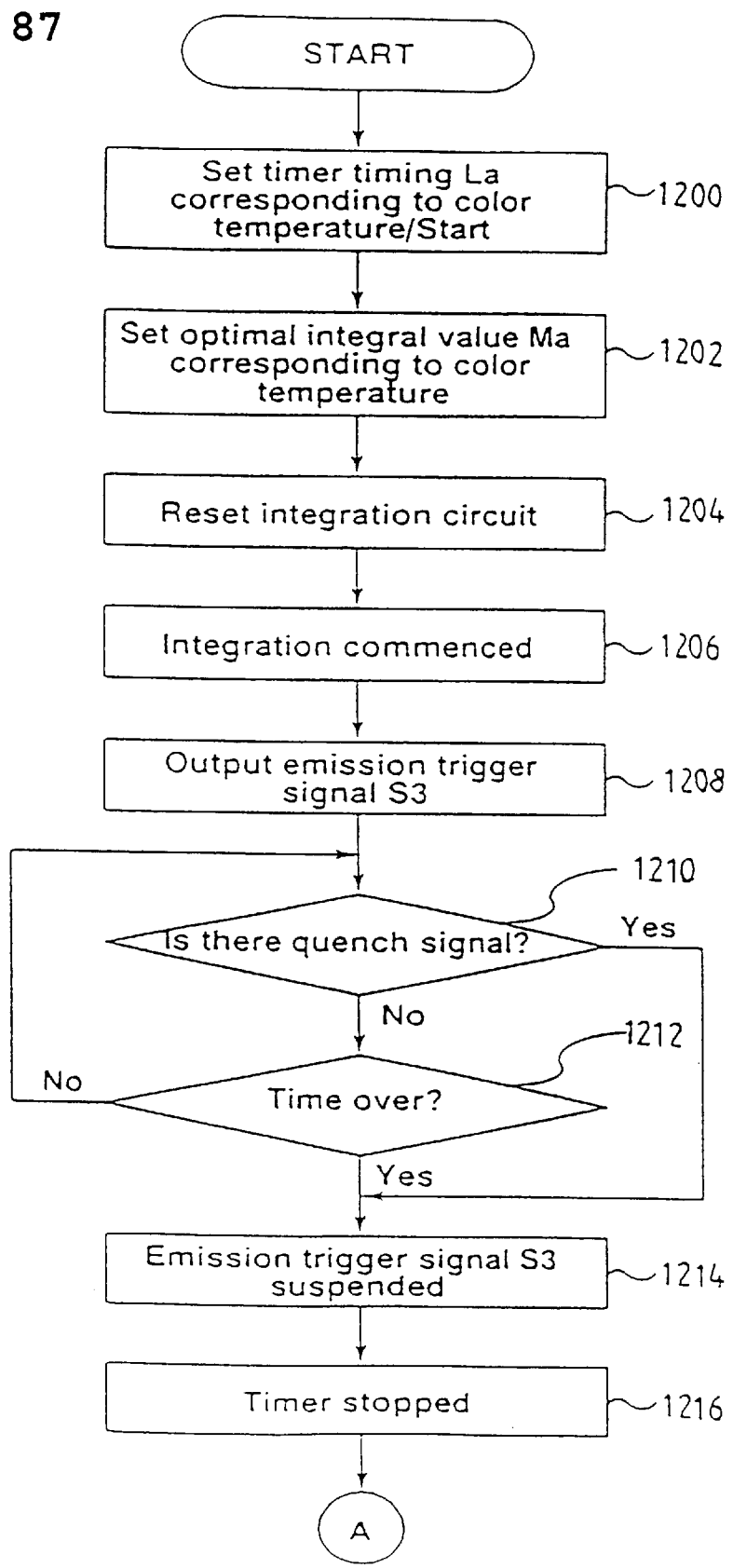
FIGS. 87 and 88 are flow charts of an emission control in a still video camera shown in FIG. 38.

According to the embodiment shown in FIGS. 87 and 88, when the desired control range G [Ka'≦G≦Kb'] of the synthetic light emission color temperatures of the strobe apparatus 470 is determined, it is possible to select easily the color filter 411 having the color temperature conversion power Ta or the color filter 413 having the color temperature conversion power Tb to be used, according to the color temperature Ka and color temperature Kb. Therefore, by the use of the color temperature conversion filter 411 which satisfies at least the formula 7 and/or the color temperature conversion filter 413 which satisfies at least the formula 8, the synthetic light emission color temperature of the strobe light can be varied within the range G, thus resulting in a more precise light emission color temperature control. Consequently, a picture image with natural colors can be obtained using a strobe in a still video camera.

In addition, since the appropriate color temperature conversion filters corresponding to the desired control range G (Ka'≦G≦Kb') can be used, the use of a different color temperature conversion filter does not reduce the color temperature control range. Furthermore, since the control range is not too wide beyond the appropriate range, a slight variation in the light emission quantity of the xenon tube causes only a slight deviation of the synthetic light emission color temperature from the desired value. Also, the use of the xenon tubes as the light source of the strobe apparatus 470 ensures that color temperatures of light corresponding to the general natural light source or artificial light source can be obtained.

Furthermore, since the optimal integral values Ma and Mb, for the quenching control of the light emission quantities of the xenon tubes 410 and 412, are determined according to the ratio A:B which is in turn determined based on the measured value of the color temperature of the peripheral light E1, it is possible to match the synthetic light emission color temperatures of the strobe lights F1 and F2 to the color temperature of the peripheral light E1 and to easily obtain the optimal exposure by the quenching control.

Moreover, since the quantities of light of the xenon tubes 410 and 412 are restricted by the maximum light emission times La and Lb that are determined according to the color temperature of the peripheral light E1, it is possible to prevent the light emission quantity of one of the xenon tubes from becoming large enough to break the ratio A:B during the quenching control.

Moreover, since the trigger circuit 471, the charging circuit 428 and the main condenser 419 are common to both xenon tubes 410 and 412, the addition of a xenon tube does not substantially increase the need for supporting component parts. This makes it possible to realize a small, inexpensive and reliable strobe apparatus.

Although, in the above-mentioned embodiment of FIG. 88, the trigger circuit 471 is common to the xenon tubes 410 and 412, while the separate IGBT'S, which constitute the switching means for controlling the emission and suspension of light by the xenon tubes 410 and 412, are provided for the respective xenon tubes, it is possible to provide a single switching means common to the xenon tubes and separate trigger circuits for the respective xenon tubes. In this alternative, the trigger circuits can be activated independently by the control circuit 430. To emit the strobe light from one of the xenon tubes, the switching means is turned ON and at the same time, the trigger circuit for the xenon tube that is required to emit the strobe light is activated, so that the trigger pulse is applied only to that xenon tube. The light emission of the xenon tube is suspended when the switching means is turned OFF.

Thus, it is possible not only to control the light emission of more than one xenon tube independently by the respective trigger circuits, but also to alternately repeat the light emission and suspension of the xenon tubes. Alternatively, it is also possible to provide the switching means and the trigger circuits for each of the xenon tubes independently.

Figure 89:
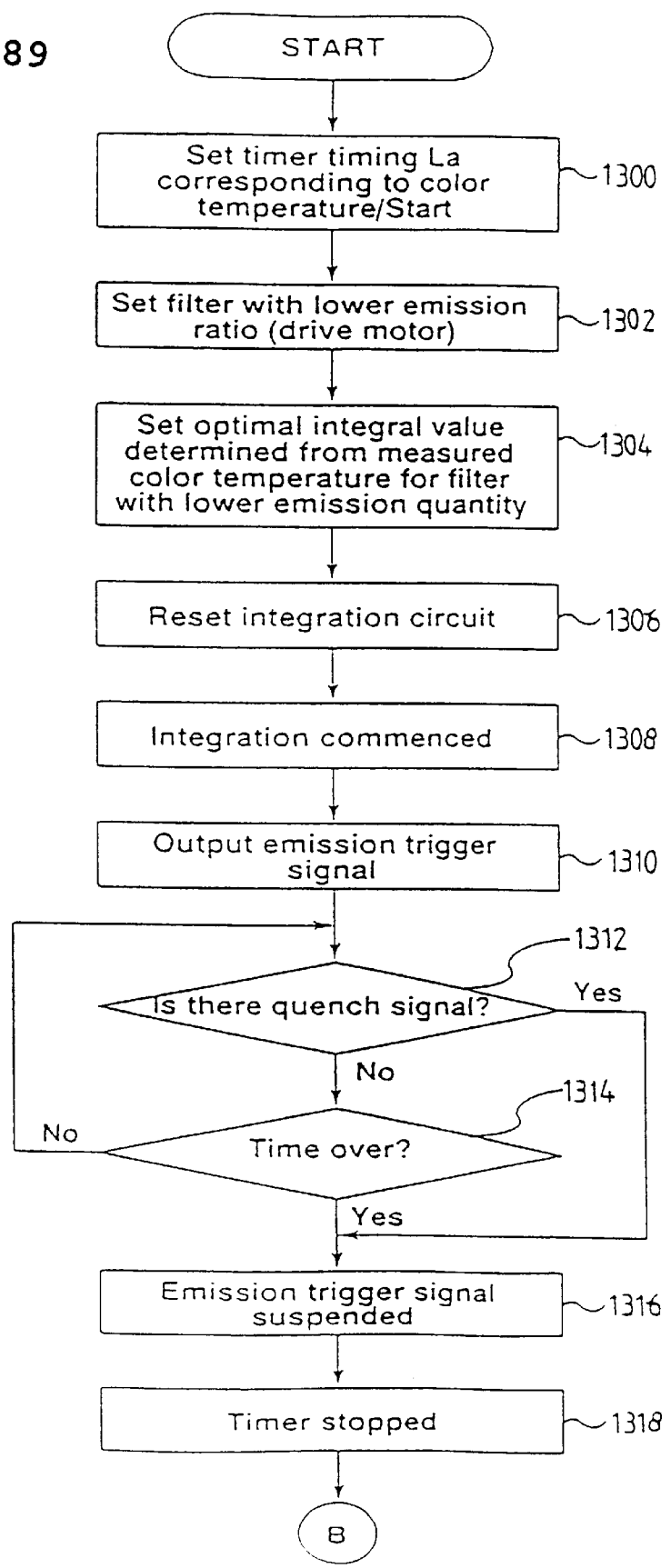
FIGS. 89 and 90 are flow charts of an emission control in a still video camera shown in FIG. 68.

The operation of the embodiment shown in FIGS. 68 through 71 will now be described, with reference to flowcharts shown in FIGS. 89 and 90. Since the entire photographing operation of the still video camera to which this embodiment is applied is the same as that of the previous embodiment, description therefor will not be given herein. The light emission ratio A:B of the light emissions of the xenon tube 610 using the color filters 656A and 656B is determined according to the measured color temperature of the peripheral light E1 in the color measuring operation prior to strobe light emission control.

Namely, the ratio A:B of the light emission quantity of the xenon tube 610 obtained through the color filter 656A moved in front thereof and the light emission quantity of the xenon tube 610 obtained through the color filter 656B moved in front thereof is determined according to the color temperature of the peripheral light E1. In the following description, it is assumed that B is larger than A (A<B).

The maximum light emission time La when the filter 656A of small quantity of light is used is determined from the data table stored in the memory of the control circuit 630.

The maximum light emission time La thus determined is set in the timer circuit 654, and the timer circuit 654 commences counting (step 1300).

The motor 661 is driven to move the color filter 656A to the front of the projection plane of the xenon tube 610 (step 1302). Note that if A>B, the color filter 656B is first moved to the front of the xenon tube 610, and then the following operation is similarly performed.

To perform the quenching control, the optimal integral value Ma (digital data) when the color filter 656A is used is determined from the measured color temperature of the peripheral light E1, with reference to the data table stored in the memory of the control circuit 630 and is outputted to the D/A convertor 648 (step 1304). The optimal integral value Ma corresponds to the quantity A and is converted to an analog voltage signal S8 by the D/A convertor 648 and outputted to the comparative circuit 646.

After the integration circuit 644 is reset by the reset signal S5 (step 1306), the integration by the integration circuit 644 is commenced (step 1308). Consequently, the quenching control according to the cumulative quantity of the reflected light F3 is commenced.

With the commencement of the integration by the integration circuit 644, a light emission trigger signal S3 is outputted, and light emission by the xenon tube 610 is commenced (step 1310). Thereafter the control circuit 630 checks whether or not the quenching signal S6 is inputted by the quenching control (step 1312). If the quenching signal S6 is inputted to the control circuit 630, the output of the light emission trigger signal S3 is suspended to stop the light emission of the xenon tube 610 (step 1316).

If the quenching signal S6 is not inputted, the control circuit 30 checks whether or not a time over signal is inputted from the timer circuit 654 (step 1314). If the time over signal is not inputted, the control is returned to step 1312. On the other hand, if the time over signal is inputted, the output of the light emission trigger signal S3 is suspended, and the light emission of the xenon tube 610 is suspended (step 216). Thereafter, the timing operation of the timer circuit 654 is suspended (step 218).

Figure 90:
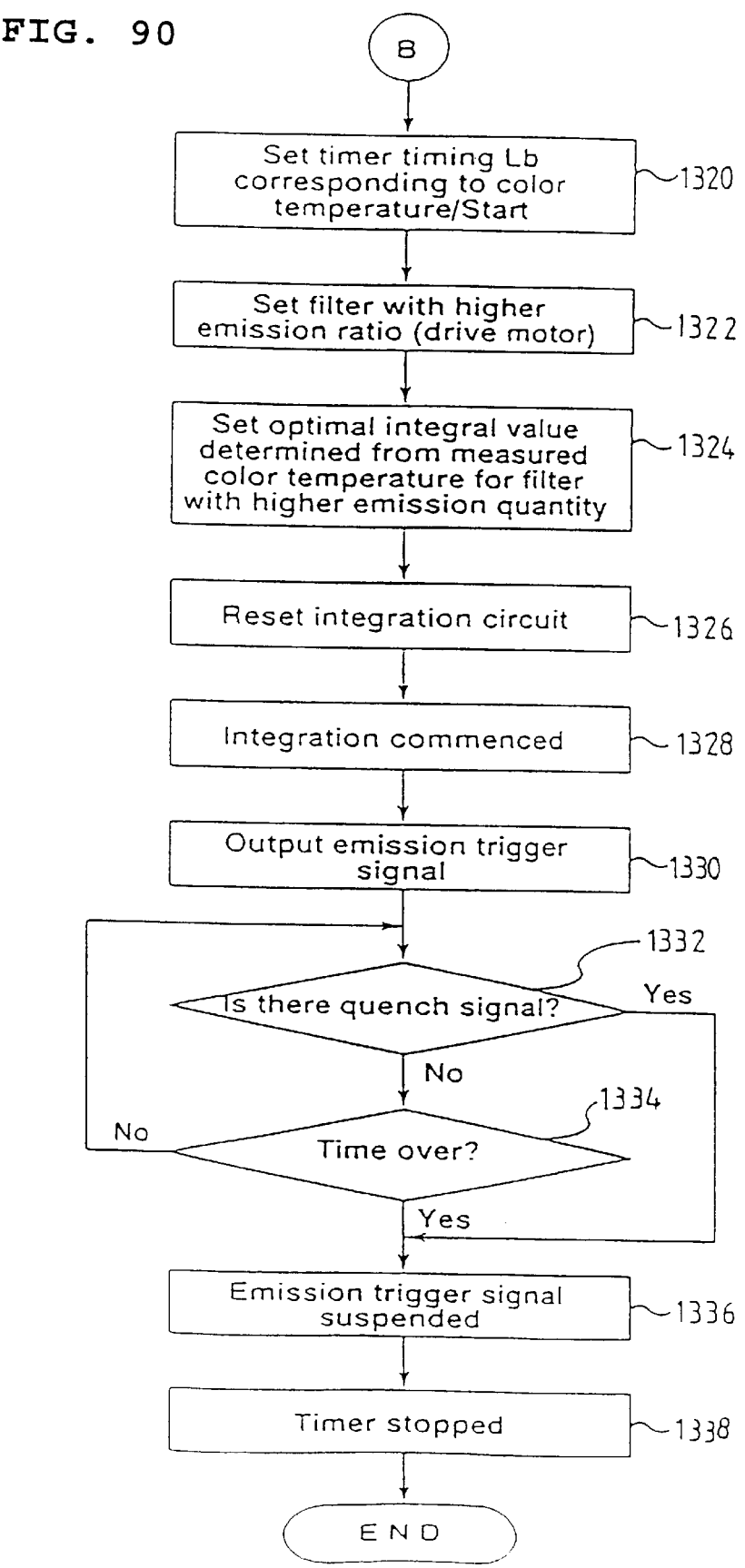

Next, the maximum light emission time Lb, corresponding to the color filter 656B is read out from the data table and sent to the timer circuit 654, and consequently, the timer circuit 654 commences counting (step 1320 of FIG. 90).

In place of the color filter 656A, the color filter 656B is moved to the front of the xenon tube 610 by the motor 661. (step 1322). To perform the quenching control for the xenon tube 610 with the color filter 656B, the optimal integral value Mb determined from the measured color temperature of the peripheral light E1 is sent to the D/A convertor 648 (step 1324).

After the integration circuit 644 is reset by the reset signal S5 (step 1326), the integration by the integration circuit 644 is commenced (step 1328). Thereafter, the light emission trigger signal S3 is outputted, and the light emission of the xenon tube 610 is commenced again (step 1330).

After that, whether or not the quenching signal S6 is inputted from the comparative circuit 646 by the quenching control, and whether or not the time over signal S14 is inputted from the timer circuit 654 are checked (steps 1332 and 1334). If the quenching signal S6 is inputted or the time over signal S14 is inputted, the output of the light emission trigger signal S3 is suspended (step 1336), and the light emission of the xenon tube 610 is suspended. Thereafter, the timer circuit 654 stops counting (step 1338).

When the strobe light emission control is thus completed, the electric charges accumulated in the solid state image pickup element 638 are read out as image signals which, after being converted to a predetermined format of image signals by the signal processing circuit 634, are recorded on a recording medium (not shown) by the recording circuit 632.

Thereafter, if necessary, an electric charge commencement signal S2 is outputted from the control circuit 630 to the charging circuit 628 again to prepare for a subsequent strobe light emission control.

As described above, in this embodiment, the color temperature conversion filter 656B, which satisfies the formula 7 and the color temperature conversion filter 656A which satisfies the formula 8 are selectively moved to the front of the xenon tube 610, in accordance with the desired range of the color temperature. Furthermore, the ratio of the light emission quantities of the xenon tube 610 when the color filter 656A is located in front thereof and when the color filter 656B is located in front thereof is determined from the color temperature of the peripheral light E1 of the object 652 to adjust the synthetic color temperature of the entire strobe apparatus 670. Additionally, to prevent an excessive increase of the light emission quantity of the xenon tube when one of the color filters is used in the quenching control, the light emission duration of the xenon tube 610 is restricted, based on the color temperature of the peripheral light E1, for each color filter.

Consequently, it is possible not only to accurately adjust the synthetic light emission color temperature of the strobe apparatus, based on the color temperature of the peripheral light, but also to obtain a picture of natural colors by still video photography. Moreover, it is possible to limit the light emission quantity of the xenon tube when one of the color filters is used in the quenching control to prevent the synthetic color temperature of the strobe apparatus from being deviated from the target value.

Consequently, the filters of different color temperature conversion powers that are to be used can be easily selected in accordance with the direct color temperature of the xenon tube and the control range. Furthermore, the resultant color temperature of the strobe apparatus can be more precisely controlled. Moreover, from among the color filters, a filter which is considered most appropriate to the control range can be used, and accordingly, even if a slight change in the light emission quantity of the xenon tube occurs due to the quantity of the accumulated electric charges of the main condenser upon emission of the strobe light, deviation of the synthetic light emission color temperature from the target value due to the variation in the emission quantity can be minimized.

In addition, since the color temperature conversion filters to be used can be specified, light of various color temperatures can be generated, regardless of the color temperature of the emission light. For example, if a xenon tube is used as a light emission means as in the above-mentioned embodiments, light of a color temperature corresponding to natural light source or an artificial light source, such as a fluorescent lamp can be obtained, so that a picture image of an improved color balance can be obtained in any photographing environment.

The number of kinds of color filters is not limited to two, and three or more color temperature conversion filters may be used. For example, if there were three or more color temperature conversion filters in the embodiment shown in FIGS. 87 and 88, the separate xenon tubes would be provided for the respective filters, and the light emission quantity of each xenon tube would be determined and controlled in accordance with the color temperature of the peripheral light E1. In the embodiment shown in FIGS. 89 and 90, the respective color temperature conversion filters would be selectively moved to the front of the projection plane of the xenon tube 610 by the motor 661, and the light emission quantity of the xenon tube when each color filter is used could be controlled according to the color temperature of the peripheral light E1. Consequently, the synthetic light emission color temperature of the strobe apparatus 670 can be optimally controlled.

As described above, with the present invention, a color temperature conversion filter having a color temperature conversion power which is considered most appropriate to the direct color temperature of light emission means and the control range can be easily selected. Consequently, a possible deviation of the synthetic light emission color temperature from the target value due to the variation of the light emission quantity of the light emission means, caused by the variation of the quantity of the accumulated electric charge of the main condenser upon emission of light can be minimized.

Figure 91:
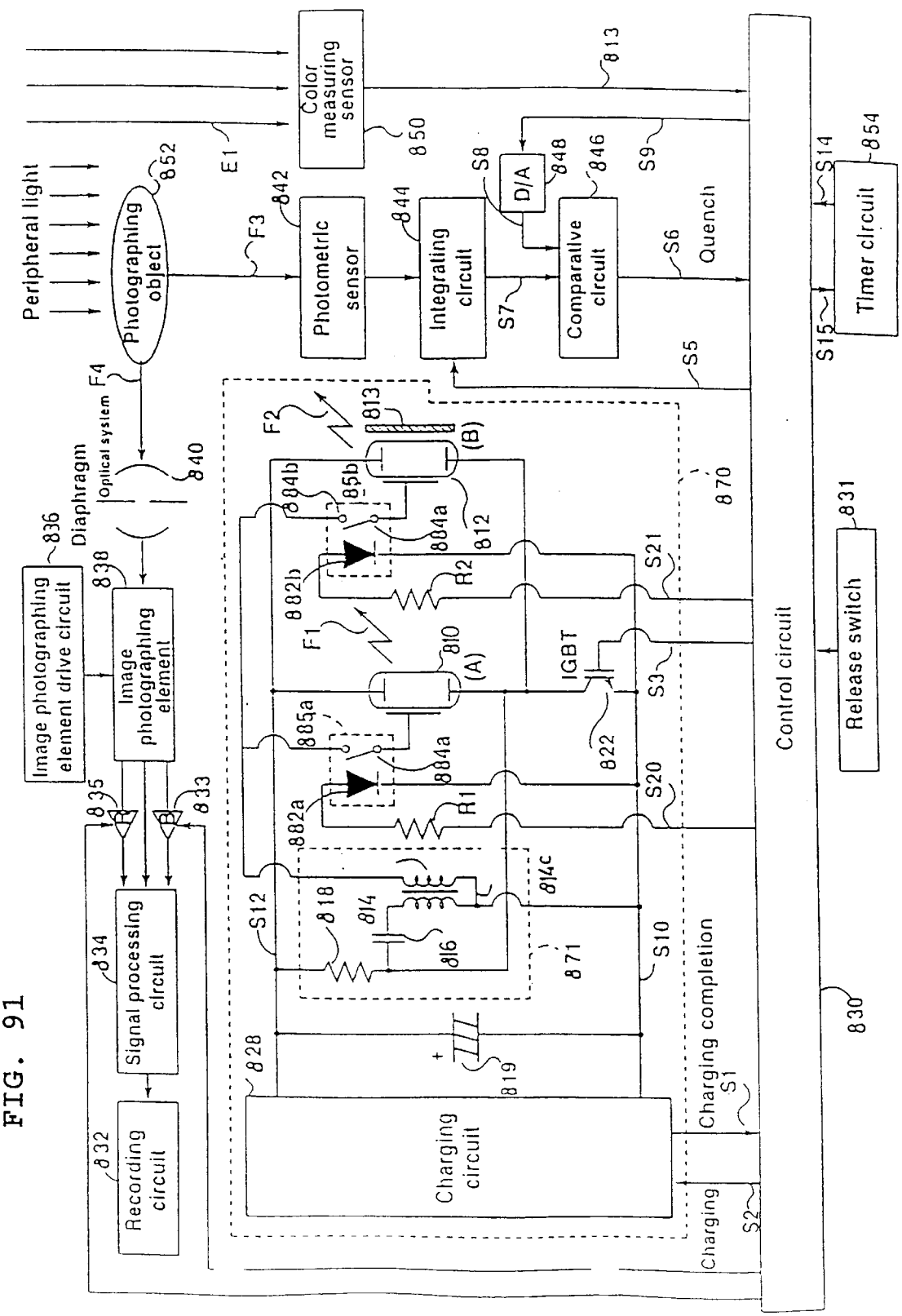
FIG. 91 is a fourteenth block circuit diagram of a still video camera, to which the present invention is applied.
Figure 92:
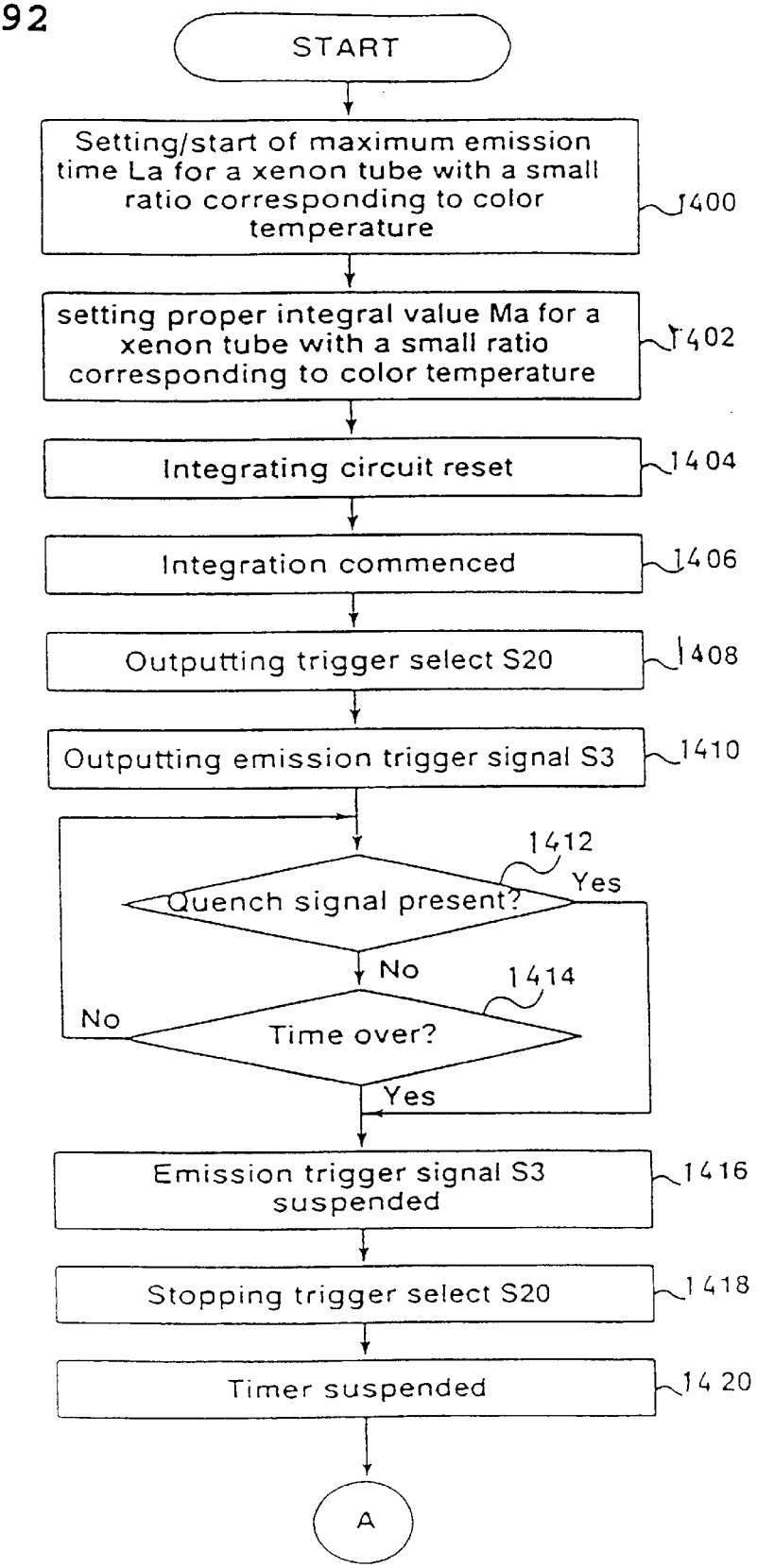
FIGS. 92 and 93 are flow charts of an emission control in a still video camera shown in FIG. 91.
Figure 93:
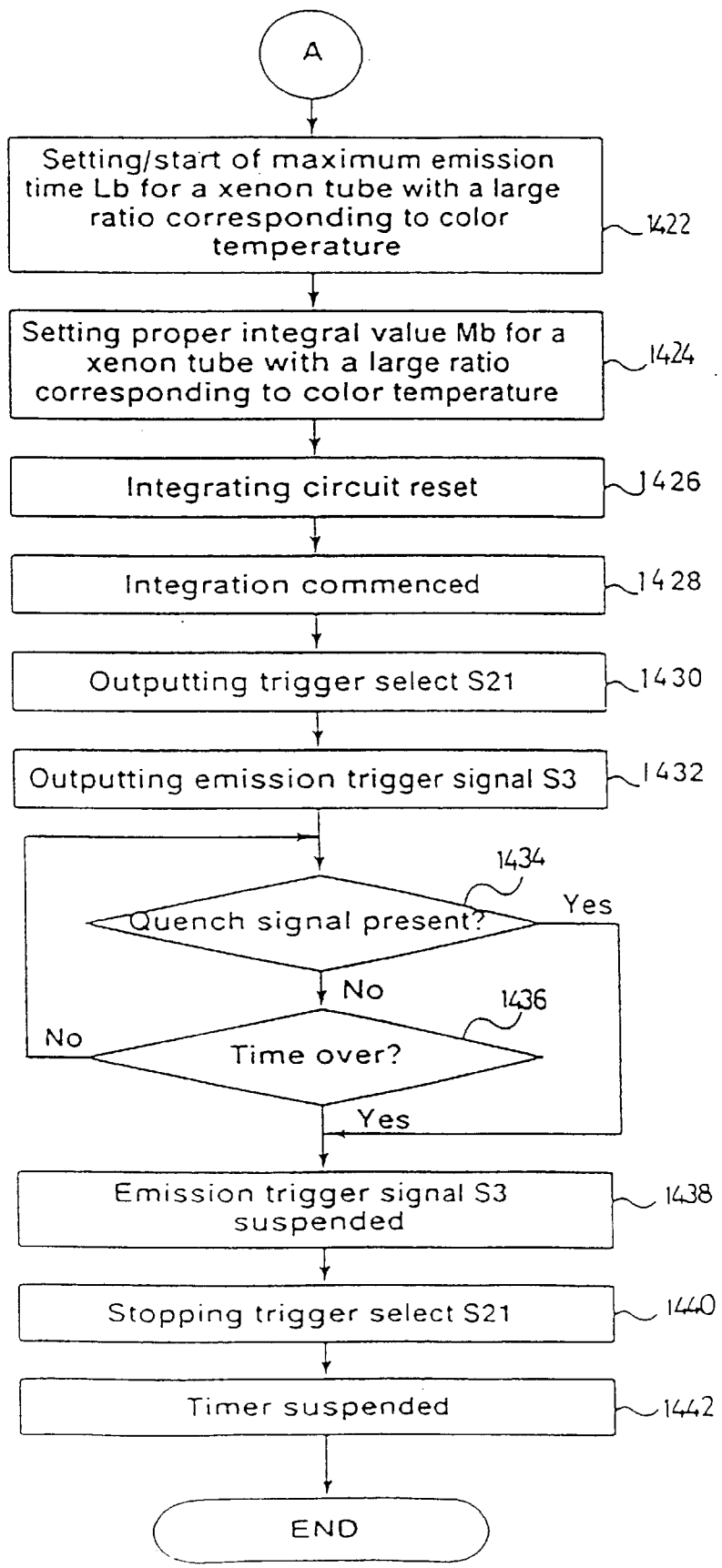

FIGS. 92 and 93 show flow charts of strobe light emission control in another embodiment in FIG. 91. In FIG. 92, the ratio A:B of the light emission quantities of the xenon tubes 810 and 812 is determined to be identical to the color temperature of the peripheral light E1 calculated by the control circuit 830. The ratio A:B is determined according to the control target value of the synthetic light emission color temperature of the strobe apparatus 870. For example, if the target temperature is high, the light emission quantity of the xenon tube 810 which emits a higher color temperature of light is increased, and the light emission quantity of the xenon tube 812 which emits a lower color temperature of light by the filter 813 is reduced. In addition, according to the determined ratio A:B, the control is carried out so that the xenon tube to emit a lesser quantity of light emits light first.

The reason that the order of the emission is specified as above is as follows. If a first xenon tube a greater quantity of light emission was allowed to emit light first, then a large quantity of electric charges of the main condenser 819 could be consumed by the larger quantity of the light emission. As a result, there would be a shortage of voltage to be applied between the anode terminal and the cathode terminal of a second xenon tube, thus resulting in a failure to generate subsequent flash light from the second xenon tube. To prevent this, a xenon tube providing a lower quantity of light emission must emit light first.

If the rate A:B of the quantities of light emission, is A<B, for example, the xenon tube 810 will emit light first. At the same time as the determination of the xenon tube which should emit light first, the maximum light emission time La of the first xenon tube, e.g., the xenon tube 810 is obtained from the data table stored in the memory of the control circuit 830, on the basis of the measured value of the color temperature.

The definition of the maximum light emission time La of the xenon tube 810 has been given hereinbefore.

Data on the maximum light emission time La is set in the timer circuit 854 via the signal line S15, and time-measuring operation of the timer circuit 854 is commenced (step 1400). If the measured time is above the maximum light emission time La, the time-over signal S14 is outputted from the timer circuit 854 to the control circuit 830. In general, the quantity of light emission by a xenon tube is not proportional to light emission time, as discussed before. Hence, the quenching control is executed for the xenon tube which emits light. The quenching control is to adjust the quantity of the light emitted by the xenon tube so that a predetermined quantity light reflected from the object 852 is gained by the strobe light projected toward the object 852 from the strobe apparatus 870 to obtain good picture images.

Accordingly, if the distance from the still video camera to the object 852 is long and the quantity of the reflected light of the strobe light reflected from the object 852 is small, it is necessary for the xenon tubes to emit light longer and more intensely. In other words, by the quenching control, there is a possibility that the quantity of light emitted by the xenon tube which emits light first is increased, depending on the photographing circumstances.

If the quantity of light emitted by the xenon tube which emits light first becomes greater, as stated above, there will be a case where the ratio of A:B can not be maintained even by a full light emission by the xenon tube which emits light later. If the ratio of A:B can not be maintained, the synthetic light emission color temperature of the strobe apparatus 870 cannot be adjusted to a target value, thus the color temperature of the strobe cannot be controlled sufficiently to form an object image of natural color. Hence, the quantity of the light emitted by the xenon tube 810 is restricted by the above maximum light emission time La, during the quenching control.

To perform the quenching control, a proper integral value Ma (digital data) corresponding to the xenon tube 810 is outputted from the control circuit 830 to a D/A converter 848 (step 1402). The proper integral value Ma corresponds to A of the xenon tube 810 and can be obtained from the measured value of the color temperature of the peripheral light E1, using the data table stored in the memory of the control circuit 830. The proper integral value Ma is a threshold value at which the optimal exposure can be attained with light reflected from the object 852. The proper integral value Ma inputted to the D/A converter 848 is converted to a signal S8 of an analog voltage value, and outputted to a comparative circuit 846.

A reset signal S5 is outputted from the control circuit 830 to an integrating circuit 844, which is reset (step 1404). After this resetting, the integration of the integrating circuit 844 is commenced (step 1406). Thereby, a photocurrent of the photometric sensor 842 is time-integrated. In other words, while the photocurrent flowing through the photometric sensor 842 changes according to the luminance of the light F3 reflected from the object 852 and received by the photometric sensor 842, the cumulative quantity of the light F3 reflected from the object 852 is determined by integrating the photocurrent. Thereafter, the integral value of the integration circuit 844 is compared with the proper integral value Ma in a comparative circuit 846.

As soon as the integration is commenced, a trigger select signal S20 is outputted from the control circuit 830 to a light emitting diode 882a of the photo MOS relay 885a (step 1408). Since light of a light emitting diode 882a, which is generated when the trigger select signal S20 is in the "H" state is projected onto a photoelectric element of a switching portion 884a, photoelectric current flows through the photoelectric element. This photoelectric current is converted into a voltage signal by bleeder resistance and is impressed between the source gates of power MOSFET, thereby causing the power MOSFET to be turned ON and the switching portion 884a to be closed (connected). In other words, only when the trigger select signal S20 is in the "H" state is the switching portion 884a closed.

This is because the switching portion 884a is turned ON only when the xenon tube 810 is allowed to emit light. Thereafter, the light emission trigger signal S3 is outputted from the control circuit 830 to the IGBT 822 (step 1410). In response to the light emission trigger signal S3, the IGBT 822 is turned ON, and the electric charges accumulated in the trigger condenser 816 flow towards the common signal line S10 by way of the IGBT 822.

The discharge of the trigger condenser 816 causes current to flow through the low-voltage side coil of a trigger transformer 814 and a high-voltage trigger signal to be induced into the high-voltage side coil of the trigger transformer 814. This trigger signal is applied to the trigger electrode of the xenon tube 810 by the switching portion 884a being turned ON. When the trigger signal is applied, the xenon gas in the xenon tube 810 is ionized. The ionization of the xenon gas causes resistance between the anode terminal and the cathode terminal to be sharply reduced, and a spark current flows from the anode terminal to the cathode terminal to generate strobe light F1.

The strobe light F1 causes the light F3 reflected from the object 852 to increase, and when the integral value of the integrating circuit 844 falls below the proper integral value Ma, a quenching signal S6 is inputted from the comparative circuit 846 to the control circuit 830. It is determined by the control circuit 830 whether or not the quenching signal S6 is inputted (step 1412), and if the quenching signal S6 is inputted, output of the light emission trigger signal S3 is suspended (step 1416).

If the light emission trigger signal S3 is suspended and the IGBT 822 is turned OFF, the current flowing through the xenon tube 810 is interrupted by the IGBT 822, and strobe light emission by the xenon tube 810 is suspended. However, If the Quenching signal S6 is no, inputted, it is determined by the control circuit 830 whether or not the time-over signal S14 is inputted from the timer circuit 854 (step 1414).

If the time-over signal S14 is not inputted, step 1412 is resumed, and it is determined again whether or not the quenching signal S6 is inputted. On the contrary, if the time-over signal S14 is inputted, output of the light emission trigger signal S3 is suspended, followed by suspension of the light emission by the xenon tube 810 (step 1416).

If the output of the light emission trigger signal S3 is suspended, the output of the trigger select signal S20 is suspended (that is, changed to the "L" state), thereby causing the trigger circuit 871 to be disconnected from the trigger electrode of the xenon tube 810 (Step 1418). And the timer circuit 854 is suspended (Step 1420), and the light emission commencement of the next xenon tube 812 is controlled.

In FIG. 93, similarly to step 1400, the maximum light emission time Lb for the xenon tube 812 is retrieved in the control circuit 830 from the data table, on the basis of the color temperature measurement value of the peripheral light E1. This maximum light emission time Lb is set in the timer circuit 854, thereby causing the time-measuring operation of the timer circuit 854 to be commenced (step 1422).

To perform the quenching control of the xenon tube 812, a proper integral value Mb (digital data) corresponding to a quantity B of the xenon tube 812 is retrieved from the data table stored in the memory of the control circuit 830 on the basis of the measurement value of the color temperature of the peripheral light E1 and is outputted to a D/A convertor 848 (step 1424). The proper integral value Mb inputted to the D/A convertor 848 is converted to an analog voltage signal S8 and is outputted to a comparative circuit 846.

The proper integral value Mb is a threshold value which, like said proper integral value Ma, maintains the ratio of A:B and determines whether or not the quantity of light reflected from the object 852 is sufficient to obtain an optimal image.

The integrating circuit 844 is reset by a reset signal S5 (step 1426), and the integration by an integrating circuit 844 is commenced (step 1428). Thereafter, a trigger select signal S21 which is in the "H" state, is outputted from the control circuit 830 to a light emitting diode 882b of the photo MOS relay 885b (Step 1430). With the trigger select signal S21 in the "H" state, the power MOS FET of the photo MOS relay 885b is turned ON, thereby causing the switching portion 884b to be closed (connected). Thereafter, the light emission trigger signal S3 is outputted to the IGBT 822, and the xenon tube 812 commences light emission (step 1432).

If a quenching signal S6 is inputted from the comparative circuit 846 or the time-over signal S14 is inputted from the timer circuit 854, output of the light emission trigger signal S3 is suspended, and the xenon tube 812 suspends emission (step 1438). Namely, light emission of the xenon tube 812 is continued until the quenching signal S6 or the time-over signal S14 which defines the time limit is inputted to the control circuit 830. If the light emission of the xenon tube 812 is suspended, the trigger selection signal S21 is inverted to the "L" state, thereby causing the trigger electrode of the xenon tube 812 to be disconnected from the trigger circuit 871 (Step 1440). Furthermore, the time-measuring operation of the timer circuit 854 is suspended (Step 1442).

FIGS. 92 and 93 show a flowchart in which the emission ratio A:B is A<B. If, conversely, A>B the xenon tube 812 emits light first. Therefore the trigger selected in steps 1408 and 1418 changes to S21, and the trigger selected in steps 1430 and 1440 changes to S20.

Thereafter, image signals are read out from the solid state image photographing elements 838 and are stored in a recording medium, (not shown) like a floppy disk, etc. Then, the photographing operation is completed.

Thereafter, the charging operation of the main condenser is commenced for subsequent new strobe light emission control.

Thus, according to the embodiment illustrated in FIGS. 92 and 93, the synthetic color temperature of the strobe apparatus is controlled by the xenon tubes of different color temperatures whose electrical connections are controlled by the IGBT 822, as well as the electrical connection between the trigger electrodes thereof and the trigger circuit 871 the breakage of the electrical connection are carried out by the photo MOS relays 885*a* and 885*b*. Consequently, in spite of the number of the xenon tubes, there is no or little increase in the number of the components associated therewith, thus resulting in a realization of a small and simple strobe apparatus.

Figure 94:
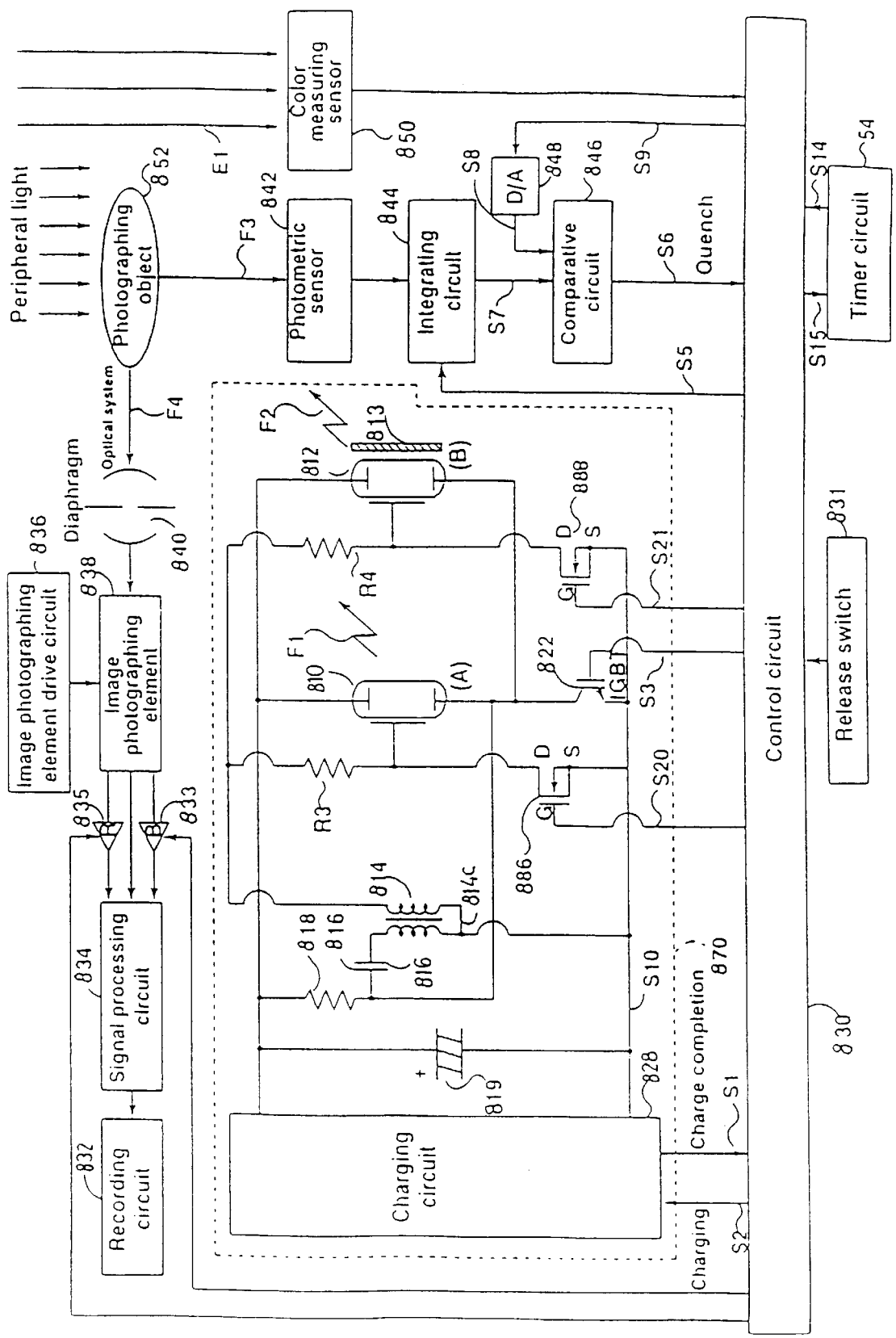
FIG. 94 is a fifteenth block circuit diagram of a still video camera, to which the present invention is applied.

FIG. 94 shows another embodiment of the invention. In the drawing, the elements corresponding to those in the previous embodiments are designated with like reference numerals. In this embodiment, the selection of the xenon tubes 810 and 812 to which the trigger signals are to be applied is effected by FETs 886 and 888. Namely, the high-voltage side coil of the trigger transformer 814 is connected to the drain terminal of FET 886 via a resistor R3 and to the drain terminal of FET 888 via another resistor R4. The source terminals of FETs 886 and 888 are connected to the common ground line S10, and the gate terminal thereof are connected to the control circuit 830. The trigger selection signal S20 and trigger selection signal S21 are inputted to the FETs 886 and 888 respectively from the control circuit 830.

The operation in the embodiment of FIG. 94 will be described below. The still photographing control and the strobe light emission control in this embodiment are the same as those in the embodiment in FIGS. 92 and 93. Namely, the photometry/exposure operation for the object 852 and the color temperature measurement of the peripheral light E1 are performed according to half and full depressions of the release switch 831, respectively. The gain adjustment of the amplifiers 833 and 835, i.e. the white balance, is performed according to the color temperature of the peripheral light E1, followed by the exposure adjustment including the adjustment of the diaphragm and the control of the electronic shutter to execute the strobe light emission control.

In the strobe light emission control, the light emission quantity ratio A:B of the xenon tubes 810 and 812 is determined according to the color temperature of the peripheral light E1, and the determination of the order of the emission, the restriction of the quantity of light emission by the maximum light emission duration, and the quenching control are performed according to the ratio A:B. The relation between the trigger selection signals S20 and S21 and the commencement of the light emission of the xenon tube 810 or 812 will be described below. The trigger selection signals S20 and S21 are normally in the "L" state, while the FETs 886 and 888 are normally in the OFF state.

Accordingly, the trigger signal of high voltage generated in the trigger transformer 814 is in a position in which the trigger signal can be applied to both the xenon tubes 810 and 812. If the xenon tube 810 is to emit light first, the trigger selection signal S21 in the "H" state is outputted to the FET 888, so as not to apply the trigger signal to the trigger electrode of the xenon tube 812. In this state, the light emission trigger signal S3 is outputted to generate a trigger signal in the trigger transformer 814. Since the FET 886 is OFF, the trigger signal is applied only to the trigger electrode of the xenon tube 810, so that the xenon tube 810 commences the emission.

When the quenching signal S6, resulting from the quenching control or the time over signal S14 resulting from the restriction of the light emission time, is outputted, the output of the light emission trigger signal S3 is suspended, so that the IGBT 822 is turned OFF to stop the light emission by the xenon tube 810.

Similarly, to commence the light emission by the xenon tube 812, the trigger selection signal S20 in the "H" state is outputted to the FET 886 so as not to apply the trigger signal to the xenon tube 810. After that, a light emission trigger signal S3 is outputted to the IGBT 822, and a trigger signal is generated in the trigger transformer 814 to be applied to the electrode of the xenon tube 812. The light emission is suspended when the quenching signal S6 or the time over signal S14 is outputted and the IGBT 822 is turned OFF.

As described above, in the embodiments shown in FIGS. 92, 93 and 94, in which a plurality of xenon tubes having different color temperatures are used to adjust the synthetic color temperature of the strobe apparatus, the main condenser for storing the electric charges for flashes of these xenon tubes, the charging circuit for charging the main condenser, the trigger circuit for generating flashes and the IGBT for controlling the commencement and suspension of the light emission of the respective xenon tubes are common to the xenon tubes. Consequently, there is substantially no increase of the number of the associated components, in spite of the provision of the plural number of xenon tubes. Note that although the two photo MOS relays or FETs are provided to selectively apply the trigger signals of the trigger circuits to the respective xenon tubes, the mounting spaces therefor are negligibly small, resulting in a small strobe apparatus.

In addition, the use of a plurality of the xenon tubes having different color temperatures enables the synthetic light emission color temperature of a strobe apparatus to be optionally controlled. For example, since light with color temperature corresponding to natural light or artificial light, such as fluorescent light can be generated, the reproduction of colors closer to natural colors can be realized in a taken picture.

As described above, according to the invention, it is possible to reproduce colors almost identical to natural colors in a taken picture by adjusting the quantity of the light emission by a plurality of light emitters to control the synthetic light emission color temperature of the strobe apparatus. In addition, since the application of the trigger signal for generating flashes of each of the light emitters is controlled by the selecting means which requires a very small mounting space; and the electric charge accumulating means, the charging means, and the light emission trigger means are common to the light emitters, a small strobe apparatus can be realized.

Figure 95:
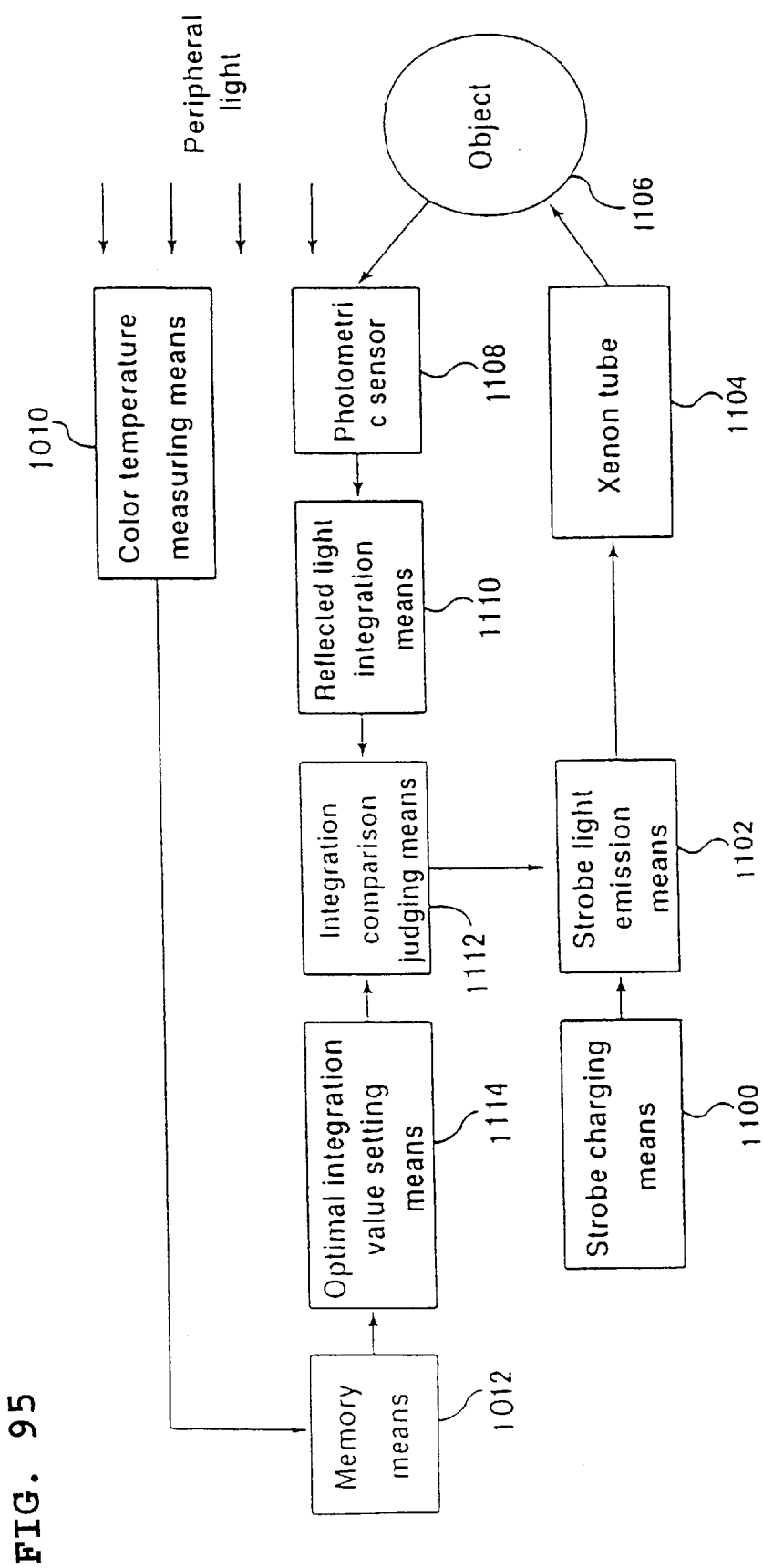
FIG. 95 is a block circuit diagram of a strobe device according to the present invention.

FIG. 95 shows another block diagram of a strobe apparatus of the present invention. In FIG. 95, the elements corresponding to those in the previous embodiments are designated with like reference numerals. A color temperature measuring means 1010 is provided for measuring the color temperature of peripheral light surrounding the object 1106, and this color temperature measuring means 1010 is connected so that it outputs measured color temperature information to a memory means 1012. The memory means 1012 is connected to an optimal integration value setting means 1114 which is connected to an integration value comparing means 1112. Data in the memory means 1012 corresponding to the measured color temperature is set in the integration value comparing means 1112 by the optimal integration setting means 1114.

The integration value comparing means 1112 is connected to a reflected light integrating means 1110 which is connected to a photometric sensor 1108 to receive light reflected from the object 1106. The photo-electric current of the photometric sensor 1108 which varies according to the quantity of the received light is time-integrated by the reflected light integrating means 1110, and then outputted to the integration value comparing means (referred to as a comparison means) 1112. Furthermore, the strobe emission control means 1102 is connected to the comparison means 1112, and the commencement and termination of the flash of the xenon tube 1104 is carried out by the strobe emission control means 1102. The strobe charging means 1100 for accumulating the electric charges for the flash of the xenon tube 1104 is connected to the strobe emission control means 1102.

Figure 96:
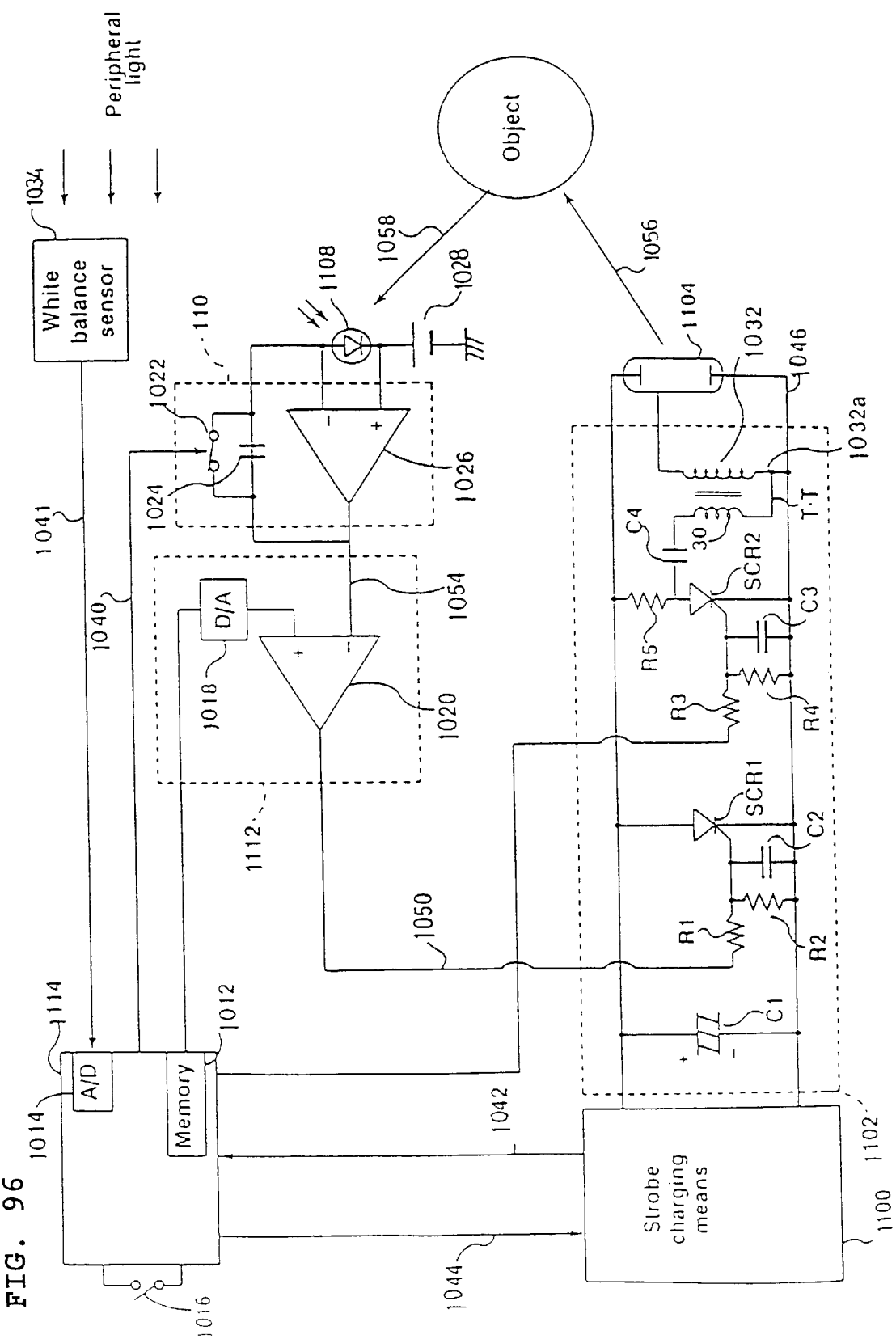
FIG. 96 is a circuit diagram of a strobe device shown in FIG. 95.

FIG. 96 shows a more concrete circuit arrangement of the block circuit diagram shown in FIG. 95. In FIG. 96, the optimal integration value setting means 1114 comprises a microchip computer, or the like, provided with a memory means 1012 such as a ROM. A white balance sensor 1034 is connected to the optimal integration value setting means 1114, and the measured color temperature data 1041 including color temperature data of each visible light is inputted thereto.

The white balance sensor 1034 comprises light receiving elements having primary color (red (R), blue (B), and green (G)) filters, and a calculating means for generating, based on R output signal, B output signal, and G output signal, output from each light receiving element, an R/G signal (R output signal divided by G output signal) and a B/G signal (B output signal divided by G output signal). The R/G signal and B/G signal are outputted to the optimal integration value setting means 1114 as the measured color temperature information 1041.

The optimal integration value setting means 1114 converts the R/G signal and the B/G signal to digital data by an A/D converter 1014, and sets an optimal integration value, based on the digital data. A light emission trigger switch 1016 is connected to the optimal integration value setting means, and the control of the output of a light emission trigger signal 1052, which will be explained later, is carried out, in accordance with the operation of the light emission trigger switch.

The reflected light integrating means 1110, which is connected to the optimal integration setting means 1114, is provided with an operational amplifier 1026, and a condenser 1024 and an integration switch 1022 are connected in parallel between the inversion input terminal and output terminal of the operational amplifier 1026. A photometric sensor 1108 is connected between the inversion input terminal and the noninversion input terminal of the operational amplifier 1026. An electric power source 1028 is connected to the noninversion input terminal. The opening and closing of the contact points of the integration switch 1022 is controlled according to an integration commencement signal 1040 that is outputted from the optimal integration value setting means 1114.

The output terminal of the operational amplifier 1026 is connected to the inversion input terminal of a comparator 1020 of the comparison means 1112, and a reflected light integration value signal 1054 is inputted thereto. A D/A converter 1018 is connected to the noninversion input terminal of the comparator 1020, and the D/A converter 1018 is connected such that the digital data from the optimal integration value setting means 1114 is inputted.

The optimal integration setting means 1114 is also connected to the strobe charging means 1100, to transmit and receive the charging signals 1042 and 1044 therebetween.

The strobe charging means 1100 comprises a step-up circuit and a charge completion detecting circuit, etc., and an electric power source (not shown) is connected thereto. The strobe charging means 1100 raises the voltage supplied by the electric power source to a predetermined high voltage by the step-up circuit, and outputs the raised voltage to the main condenser Cl, etc., of the strobe emission control means 1102 that is connected to the strobe charging means 1100. The charge completion detecting circuit of the strobe charging means 1100, which comprises a Zener diode and a transistor, etc., detects that the voltage at the positive electrode terminal of the main condenser C1 reaches a predetermined value due to the electric charges accumulated in the main condenser, and outputs the charge completion signal 1042 to the optimal integration setting means 1114.

The strobe emission control means 1102 comprises the main condenser C1, a thyristor SCR1, a thyristor SCR2, and a trigger transformer T.T, etc. The negative electrode terminal of the main condenser C1, the cathode terminal of the thyristor SCR1, the cathode terminal of the thyristor SCR2, and the common connection point 1032$a$ of the trigger transformer T.T are connected to a common signal line 1046, which is in turn connected to the cathode sides of the strobe charging means 1100 and the xenon tube 1104.

A resistor R2 and a condenser C2 are connected in parallel between the gate terminal and cathode terminal of the thyristor SCR1, so that the thyristor SCR1 is not activated by mistake by a leakage current. In the same manner, a resistor R4 and condenser C3 are connected in parallel between the gate terminal and cathode terminal of the thyristor SCR2. A resistor R5 and a condenser C4 are connected to the anode terminal of the thyristor SCR2, and the other terminal of the condenser C4 is connected to a primary coil 1030 of the trigger transformer T.T.

The positive electrode terminal of the condenser C1, the anode terminal of the thyristor SCR1, the other end of the resistor R5, and the anode of the xenon tube 1104 are connected to the positive voltage signal line 1048 to which a high voltage is outputted from the strobe charging means 1100. The secondary coil of the trigger transformer T.T is connected to the trigger electrode of the xenon tube 1104.

The output terminal of the comparator 1020 of the comparison means 1112 is connected through resistor R1 to the trigger terminal of the thyristor SCR1, and a quenching signal 1050 is inputted thereto. The trigger terminal of the thyristor SCR2 is connected to the optimal integration value setting means 1114 through the resistor R3, and a light emission trigger signal 1052 is inputted thereto.

The operation of the embodiment shown in FIG. 96 will now be explained below.

Figure 97:
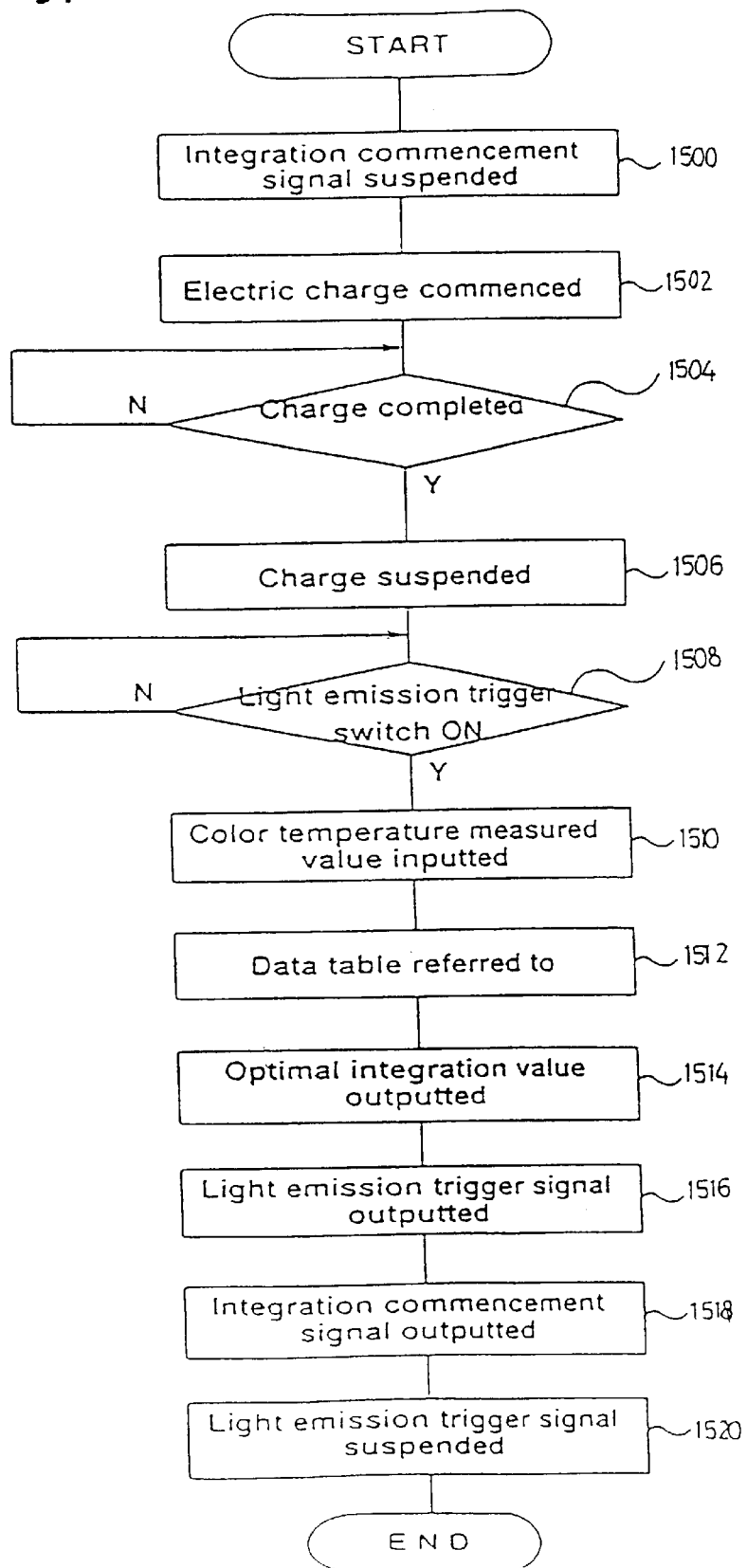
FIG. 97 is a flow chart of sequential operations of a strobe device shown in FIG. 96; and, FIG. 98 is a block diagram of a known strobe device.
Figure 98:
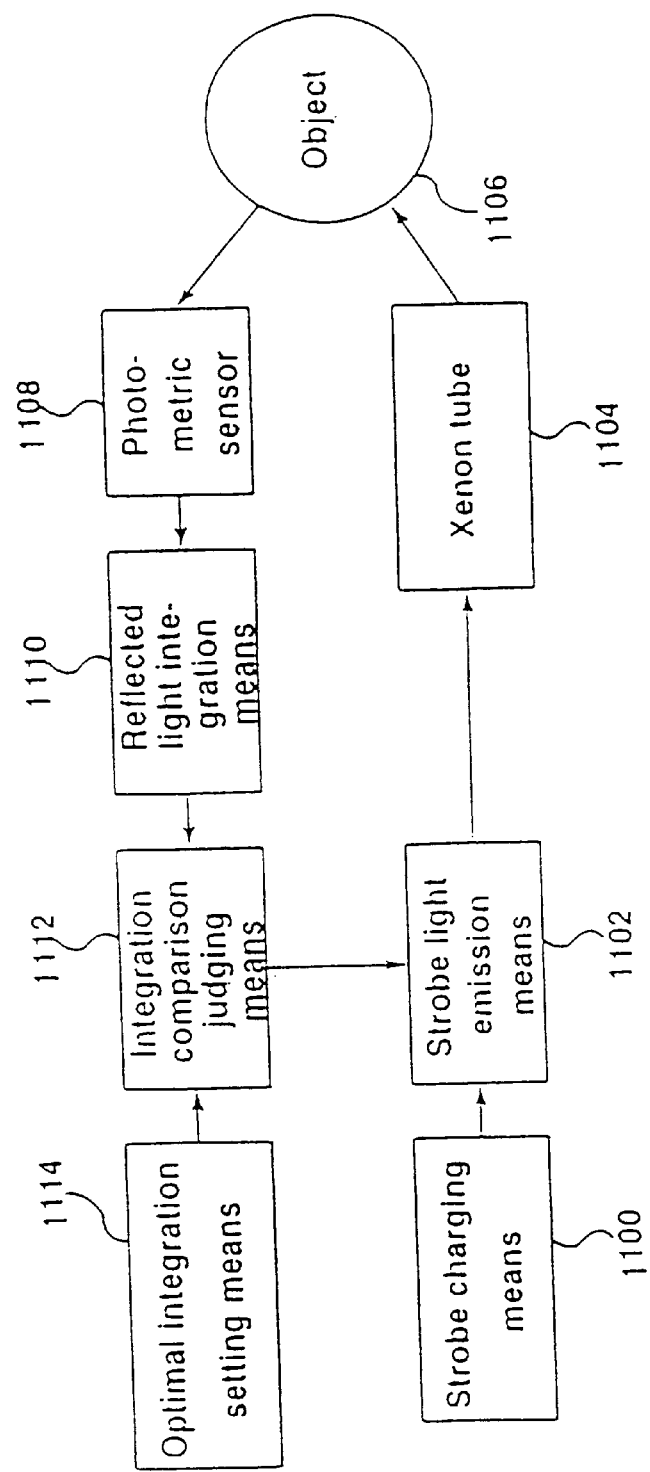

FIG. 97 is a flow chart of the sequential operation of the embodiment. At step 1500, the opening and closing of the integration switch 1022 of the reflected light integrating means 1110 is controlled, and the integration commencement signal 1040 outputted from the optimal integration value setting means 1114 is cleared. As a result, the contact points of the integration switch are closed, and the integration of the photo-electric current by the photometric sensor 1108 according to the operational amplifier 1026 is suspended. At step 1502, the optimal integration value setting means 1114 outputs the charging signal 1044 to the strobe charging means 1100 and instructs the main condenser C1 to commence with the charging operation.

The strobe charging means 1100 boots the voltage supplied from the electric power source to a high voltage of intermittent signals according to the charging signal 1044, and applies the voltage signal to the main condenser C1. The main condenser C1 is charged with the electric charges by the high voltage signal. If a predetermined high voltage is detected by the charge completion detecting circuit, the charge completion signal 1042 is outputted to the optimal integration value setting means 1114. At step 1504, the optimal integration value setting means 1114 waits until the charging of the main condenser C1 is completed in response to the charge completion signal 1042. The high voltage outputted from the strobe charging means 1100 is applied to the condenser C4 of the strobe emission control means 1102 to charge the same.

When the charge completion signal 1042 is inputted, the optimal integration value setting means 1114 stops outputting the charging signal 1044 (step 1506). Then, at step 1508, control does not proceed until the light emission trigger switch 1016 is turned ON. If the light emission trigger switch 1016 is turned ON, the optimal integration value setting means 1114 converts the measured color temperature data 1041 (R/G signal and B/G signal) inputted from the white balance sensor 1034 to digital data by way of the A/D converter 1014 thereof, at step 1510.

The light emission trigger switch 1016 is turned ON when a camera control circuit (not shown) outputs a light emission trigger signal at a predetermined time, in association with the shutter release operation.

The optimal integration value setting means 1114 sets an optimal integration value corresponding to the measured color temperature information 1041 that has been converted to digital data. That is, based on the respective digital data of the R/G signal and B/G signal, and referring to a stored data table which represents a relationship between the digital data and the quantity of light an optimal integration to control the quantity of light emission is obtained so that the total quantity of light is not excessive due to the peripheral light, in comparison with the quantity of light emitted by the xenon tube 1104 alone at the time of measurement of the light by the photometric sensor 1108 which has specific spectral sensitivity characteristics. In the embodiment shown in FIG. 96, to quickly set the optimal integration value, it is possible to calculate the optimal integration value as a function of the signal from the white balance sensor without reference to the data table.

The optimal integration setting means 1114 sets the optimal integration value in the D/A converter 1018 of the comparison means 1112 (step 1514). The D/A converter 1018 converts the optimal integration value to an analog signal which is then output to the noninversion input terminal of the comparator 1020.

After the optimal integration is gained and set in the D/A converter 1018, the light emission trigger signal 1052 is inputted from the optimal integration value setting means 1114 to the gate terminal of the thyristor SCR2 of the strobe emission control means 1102, at step 1516. If the light emission trigger signal 1052 is inputted, the thyristor SCR2 is activated, hence the electrical charges accumulated in the condenser C4 are discharged into the common signal line 1046 through the thyristor SCR2. The discharge causes an electrical current to flow in the primary-side coil 1030 of the trigger transformer T.T, thereby inducing a high voltage in the secondary coil 1032. The high voltage thus induced in the secondary coil 1032 is applied as a trigger voltage to the trigger electrode of the xenon discharge tube 1104 so that the xenon gas within the xenon discharge tube 1104 is ionized. Consequently the resistance between the anode and the cathode of the xenon discharge tube 1104 is suddenly reduced. Accordingly, the electric charges stored in the main condenser C1 are discharged within the xenon discharge tube 1104 to emit flash light.

After the light emission trigger signal 1052 is outputted to the strobe emission control means 1102, an integration commencement signal 1040 is immediately outputted from the optimal integration value setting means 1114 to the reflected light integrating means 1110 (step 1518). If the integration commencement signal 1040 is inputted, the contact points of the integration switch 1022 are opened, and the integration of the photo-electric current of the light sensor 1108, which changes according to the quantity of the strobe light 1058 from the xenon tube 1104 reflected by the object 1106 and received by the photometric sensor 1108, is commenced. As a result of the integration, the reflected light integration value signal (voltage) 1054, which is the output of the operational amplifier 1026 and which has reached a fixed voltage determined by the voltage of the electric power source connected to the operational amplifier 1026, is gradually reduced.

If the reflected light integration value signal 1054 reaches the optimal integration value of the analog signal outputted from the D/A converter 1018, the quenching signal 1050 is outputted from the comparator 1020 to the trigger terminal of the thyristor SCR1 of the strobe emission control means 1102.

The thyristor SCRi is activated upon receipt of the quenching signal 1050, so that the electric charges of the main condenser C1 that have been used for the flash of the xenon tube 1104 are discharged to the common signal line 1046 through the thyristor SCRI, and the electric charges of the main condenser C1 are consumed. Consequently, the xenon tube 1104 stops the emission of strobe light. After this, the optimal integration value setting means 1114 suspends the outputting of the light emission trigger signal 1052 (step 1520).

Thus, upon taking a picture using strobe light, even if there is a deviation in the spectral power distribution of the light measured by the photometric sensor 1108, with respect to the spectral power distribution of the strobe light alone, due to the peripheral light about the object 1106 having a color temperature distribution different from that of the strobe light so that the light received by the photometric sensor 1108 includes a large quantity of light of low spectral sensitivity, the optimal integration value which sets the quantity of light to be emitted is adjusted in accordance with the color temperature measured by the white balance sensor 1034. Hence, a more precise control of the strobe emission quantity can be achieved.

In the embodiment shown in FIG. 96, the quenching signal that controls the quenching level of the strobe light is set by the optimal integration value setting means 1114, and the optimal integration value converted to analog data by the D/A converter 1018 and the reflected light integration value signal 1054 of the photometric sensor 1108, outputted from the reflected light integrating means 1110, are compared by the comparator 1020 as mentioned above.

In place thereof, it is possible to convert the reflected light integration value signal 1054 outputted from the reflected light integrating means 1110 to digital data by the A/D converter installed in the optimal integration setting means 1114. Then, based on the measured color temperature information 1041 of the white balance sensor 1034, an integration value that is obtained from the data table and the digital value of the reflected light integration value signal 1054 are directly compared. If they are identical, a quenching signal is outputted directly from the optimal integration value setting means 1114 to the strobe emission control means 1102. In this alternative, the integration comparison judging means 1112 can be dispensed with, thus resulting in a smaller strobe apparatus.

A can be understood from the foregoing, according to the embodiment illustrated in FIG. 96, even if there is peripheral light having a color temperature different from the color temperature distribution of the strobe light, the deviation of the color temperature distribution of the reflected light is detected in accordance with the color temperature of the peripheral light measured by the white balance sensor 1034, to adjust the quantity of light to be emitted. Hence an optimal quenching control can be always carried out.

What is claimed is:

1. A strobe emission apparatus, comprising:
    a color temperature measuring device that measures a color temperature of ambient light;
    a light emitting device that emits strobe light of a predetermined color temperature;
    a light measuring device having a light receiving element with a predetermined spectral sensitivity and an integrator that integrates output signals from said light receiving element; and
    an optimal integration setting device that sets an optimal integration value by compensating for a difference between said predetermined spectral sensitivity of said light receiving element and that of a light that includes said strobe light, emitted by said light emitting device, and reflected light, reflected from an object, incident on said light receiving element in accordance with a signal issued from said color temperature measuring device, wherein said optimal integration setting device includes a memory having a data table in which a set of optimal integration values are stored, each stored optimal integration value being arranged to correspond to a detected signal from said color temperature measuring device, said optimal integration value being determined by comparing a detected signal from said color temperature measuring device with said set of optimal integration values stored in said data table.

2. The apparatus of claim 1, wherein said light emitting device comprises a single light emitter.

3. The apparatus of claim 2, further comprising a camera that is associated with said strobe emission apparatus.

4. The apparatus of claim 3, wherein said camera comprises a still video camera.

5. A fill-in light emitting apparatus, comprising:
    a color temperature measuring device that measures a color temperature of ambient light;
    a light emitting device that emits strobe light of a predetermined color temperature;
    a light quantity measuring device that measures a quantity of light from a photographing object, said light quantity measuring device including a light receiving element having a predetermined spectral sensitivity and an integrator that integrates output signals from said light receiving element;
    a trigger circuit connected to said light emitting device; and
    an emission controller that issues a trigger signal and a quench signal to said trigger circuit to control a quantity of strobe light to be emitted by said light emitting device in accordance with said color temperature of ambient light measured by said color temperature measuring device, said trigger signal initiating an emission of strobe light by said light emitting device, said quench signal terminating said emission of strobe light when said quantity of light from said photographing object measured by said light receiving element reaches an optimal integration value by compensating for a difference between said predetermined spectral sensitivity of said light receiving element and that of a light that includes said strobe light emitted by said light emitting device and reflected from said photographing object, incident on said light receiving element in accordance with a signal issued from said color temperature measuring device, wherein said emisssion controller includes a memory having a data table in which a set of optimal integration values are stored, each stored optimal integration value being arranged to correspond to a detected signal from said color temperature measuring device, said optimal integration value being determined by comparing a detected signal from said color temperature measuring device with said set of optimal integration values stored in said data table.

6. The fill-in light emitting apparatus of claim 5, wherein said light emitting device comprises a single light emitter.

7. The fill-in light emitting apparatus of claim 5, wherein said light emitting device comprises a plurality of light emitters.

8. The fill-in light emitting apparatus of claim 5, wherein said color temperature measuring device separately measures a red color component, a blue color component and a green color component of ambient light, an emission controller determining said optimal integration value in accordance with said measured red color component, said measured green color component and said measured blue color component.

9. The fill-in light emitting apparatus of claim 8, wherein said emission controller controls said quantity of light according to a ratio of said red color component to said green color component, and a ratio of said blue color component to said green color component.

10. A camera, comprising:
    first means for measuring a color temperature of ambient light;
    means for emitting strobe light of a predetermined color temperature;
    second means for measuring light with a predetermined spectral sensitivity and for integrating output signals from said second measuring means; and means for setting an optimal integration value by compensating for a difference between said predetermined spectral sensitivity of said second measuring means and that of a light that includes said strobe light, emitted by said light emitting device, and reflected light, reflected from an object, incident on said second measuring means in accordance with a signal issued from said first measuring means, wherein said optimal integration setting means includes a memory having a data table in which a set of optimal integration values are stored, each stored optimal integration value being arranged to correspond to a detected signal from said first measuring means, said optimal integration value being determined by comparing a detected signal from said first measuring means with said set of optimal integration values stored in said data table.

11. The camera of claim 10, wherein said camera comprises a still video camera.

12. The fill-in light emitting apparatus of claim 5, wherein an emission controller performs an integration to determine a quantity of strobe light to emit.

13. The strobe emission apparatus of claim 1, further comprising:

an adjusting device that adjusts said optimal integration value set by said optimal integration setting device when a predetermined quantity of light with a low spectral sensitivity falls incident upon said light measuring device.

* * * * *

UNITED STATES PATENT AND TRADEMARK OFFICE
CERTIFICATE OF CORRECTION

PATENT NO.   : 6,072,281
DATED        : June 6, 2000
INVENTOR(S)  : K. OGAWA

It is certified that error appears in the above-identified patent and that said Letters Patent is hereby corrected as shown below:

At column 88, line 46 (claim 8, line 4) of the printed patent, "an emission" should be ---said emission---.

Signed and Sealed this

Third Day of April, 2001

Attest:

NICHOLAS P. GODICI

Attesting Officer    Acting Director of the United States Patent and Trademark Office